(12) United States Patent
Sun et al.

(10) Patent No.: US 12,105,355 B2
(45) Date of Patent: Oct. 1, 2024

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventors: Chia-Hung Sun, Taichung (TW); Tsan-Haw Lee, Taichung (TW); Yu-Wen Tai, Taichung (TW); Shu-Hung Lin, Taichung (TW)

(73) Assignees: Sintai Optical (Shenzhen) Co., Ltd., ShenZhen (CN); Asia Optical Co., Inc., Taichung (TW)

( * ) Notice: Subject to any disclaimer, the term of this patent is extended or adjusted under 35 U.S.C. 154(b) by 532 days.

(21) Appl. No.: 17/114,778

(22) Filed: Dec. 8, 2020

(65) Prior Publication Data

US 2021/0173180 A1  Jun. 10, 2021

(30) Foreign Application Priority Data

Dec. 9, 2019   (CN) .......................... 201911250161.5
Dec. 12, 2019  (CN) .......................... 201911273285.5
Jan. 17, 2020  (CN) .......................... 202010054946.1

(51) Int. Cl.
  *G02B 9/64*   (2006.01)
  *G02B 13/18*  (2006.01)

(52) U.S. Cl.
  CPC .............. *G02B 9/64* (2013.01); *G02B 13/18* (2013.01)

(58) Field of Classification Search
  CPC .......... G02B 9/00; G02B 9/64; G02B 13/002; G02B 13/006; G02B 13/06; G02B 13/18; G02B 13/0045; G02B 7/028
  See application file for complete search history.

(56) References Cited

U.S. PATENT DOCUMENTS 3,545,845 A * 12/1970 Takahasi ................ G02B 13/04
                                                    359/750
4,183,625 A *  1/1980 Tsunashima ........... G02B 13/06
                                                    359/740

(Continued)

FOREIGN PATENT DOCUMENTS

CN        1258853 A     7/2000
CN      201434931 Y     3/2010

(Continued)

OTHER PUBLICATIONS

Mortimer Abramowitz, Introduction to Lenses and Geometrical Optics, (2018), pp. 1-8 [online], [retrieved Apr. 20, 2023], retrieved from the Internet <URL: https://micro.magnet.fsc.edu/primer/lightandcolor/lensesintro.html >. (Year: 2018).*

(Continued)

*Primary Examiner* — Cara E Rakowski
*Assistant Examiner* — Wesley Scott Ashton
(74) *Attorney, Agent, or Firm* — McClure, Qualey & Rodack, LLP

(57) ABSTRACT

A wide-angle lens assembly includes a first lens, a second lens, a third lens, a fourth lens, and a fifth lens. The first lens is a meniscus lens with refractive power and includes a convex surface facing an object side and a concave surface facing an image side. The second lens is with refractive power. The third lens is with positive refractive power. The fourth lens is with refractive power. The fifth lens is with positive refractive power and includes a convex surface facing the image side. The first lens, the second lens, the third lens, the fourth lens, and the fifth lens are arranged in order from the object side to the image side along an optical axis.

20 Claims, 106 Drawing Sheets

(56) References Cited

U.S. PATENT DOCUMENTS

| | | | | |
|---|---|---|---|---|
| 4,206,973 | A | * | 6/1980 | Ikemori ............... G02B 13/04 |
| | | | | 359/749 |
| 4,673,259 | A | * | 6/1987 | Kawamura ............ G02B 9/60 |
| | | | | 359/753 |
| 7,142,374 | B2 | * | 11/2006 | Cheng ............... G02B 27/4283 |
| | | | | 359/708 |
| 7,796,346 | B2 | * | 9/2010 | Chang ........... G02B 15/144113 |
| | | | | 359/687 |
| 8,605,369 | B2 | | 12/2013 | Peng et al. |
| 10,120,165 | B2 | | 11/2018 | Chen |
| 10,197,767 | B2 | | 2/2019 | Lin |
| 10,539,760 | B2 | | 1/2020 | Chen et al. |
| 10,684,452 | B2 | | 6/2020 | Chen et al. |
| 2007/0041102 | A1 | * | 2/2007 | Kuo ................. G02B 15/1425 |
| | | | | 359/680 |
| 2012/0275034 | A1 | * | 11/2012 | Lee ............... G02B 15/143507 |
| | | | | 359/682 |
| 2015/0362708 | A1 | * | 12/2015 | Lee ....................... G02B 13/04 |
| | | | | 359/708 |
| 2016/0103301 | A1 | * | 4/2016 | Liang ..................... G02B 9/64 |
| | | | | 359/755 |
| 2017/0307858 | A1 | * | 10/2017 | Chen ..................... G02B 13/18 |
| 2020/0073086 | A1 | * | 3/2020 | Fu ........................ H04N 23/698 |
| 2020/0073090 | A1 | | 3/2020 | Hsieh |
| 2020/0081226 | A1 | * | 3/2020 | Lee ....................... G02B 13/005 |
| 2020/0241243 | A1 | * | 7/2020 | Hirano ..................... G02B 9/64 |
| 2022/0066146 | A1 | * | 3/2022 | Huang ............... G02B 13/0045 |
| 2023/0146383 | A1 | * | 5/2023 | Lee ......................... G02B 9/12 |
| | | | | 359/716 |

FOREIGN PATENT DOCUMENTS

| | | | | |
|---|---|---|---|---|
| CN | 201926807 | U | | 8/2011 |
| CN | 104297906 | A | | 1/2015 |
| CN | 105527694 | A | | 4/2016 |
| CN | 106680970 | A | | 5/2017 |
| CN | 107305276 | A | * | 10/2017 ......... G02B 13/0045 |
| CN | 107728292 | A | | 2/2018 |
| CN | 108663773 | A | | 10/2018 |
| CN | 108761734 | A | * | 11/2018 |
| CN | 208092316 | U | | 11/2018 |
| CN | 109425968 | A | | 3/2019 |
| CN | 109541786 | A | | 3/2019 |
| CN | 109683289 | A | | 4/2019 |
| CN | 110426826 | A | | 11/2019 |
| CN | 110879458 | A | * | 3/2020 ........... G02B 13/005 |
| CN | 111766687 | A | * | 10/2020 ......... G02B 13/0045 |
| CN | 111812812 | A | * | 10/2020 ......... G02B 13/0045 |
| CN | 111812817 | A | * | 10/2020 ......... G02B 13/0045 |
| JP | 201881240 | A | | 5/2018 |
| JP | 2018081240 | A | | 5/2018 |
| JP | 2018136476 | A | | 8/2018 |
| JP | 2020118914 | A | | 8/2020 |
| JP | 2020126183 | A | * | 8/2020 ......... G02B 13/0045 |
| TW | 201323977 | A | | 6/2013 |
| TW | 201734533 | A | | 10/2017 |
| TW | I611208 | A | | 12/2017 |
| TW | 202011074 | A | | 3/2020 |
| TW | I667492 | A | | 3/2020 |
| TW | I671566 | B | | 3/2020 |

OTHER PUBLICATIONS

Patent Translate Machine English translation of CN 109683289 A with Espacenet Bibliographic Data attached to CN 109683289 A. (Year: 2023).*

Simon Thibault et al., Consumer Electronic Optics: How Small a Lens Can Be? The Case of Panomorph Lenses, 9192 Proceedings of SPIE 91920H-1 to 91920H-7 (2014). (Year: 2014).*

Andy Rowlands, Physics of Digital Photograph, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*

Herbert Gross (ed.), Handbook of Optical Systems, vol. 3, 377-379 (2007). (Year: 2007).*

* cited by examiner

+ 0.450μm     ✳ 0.610μm
× 0.510μm     ⋈ 0.650μm
▫ 0.555μm     Spot Diagram

IMA : 0.000mm
RMS radius : 0.912μm
GEO radius : 3.298μm

IMA : 2.778mm
RMS radius : 1.479μm
GEO radius : 6.950μm

IMA : 3.928mm
RMS radius : 1.893μm
GEO radius : 11.756μm

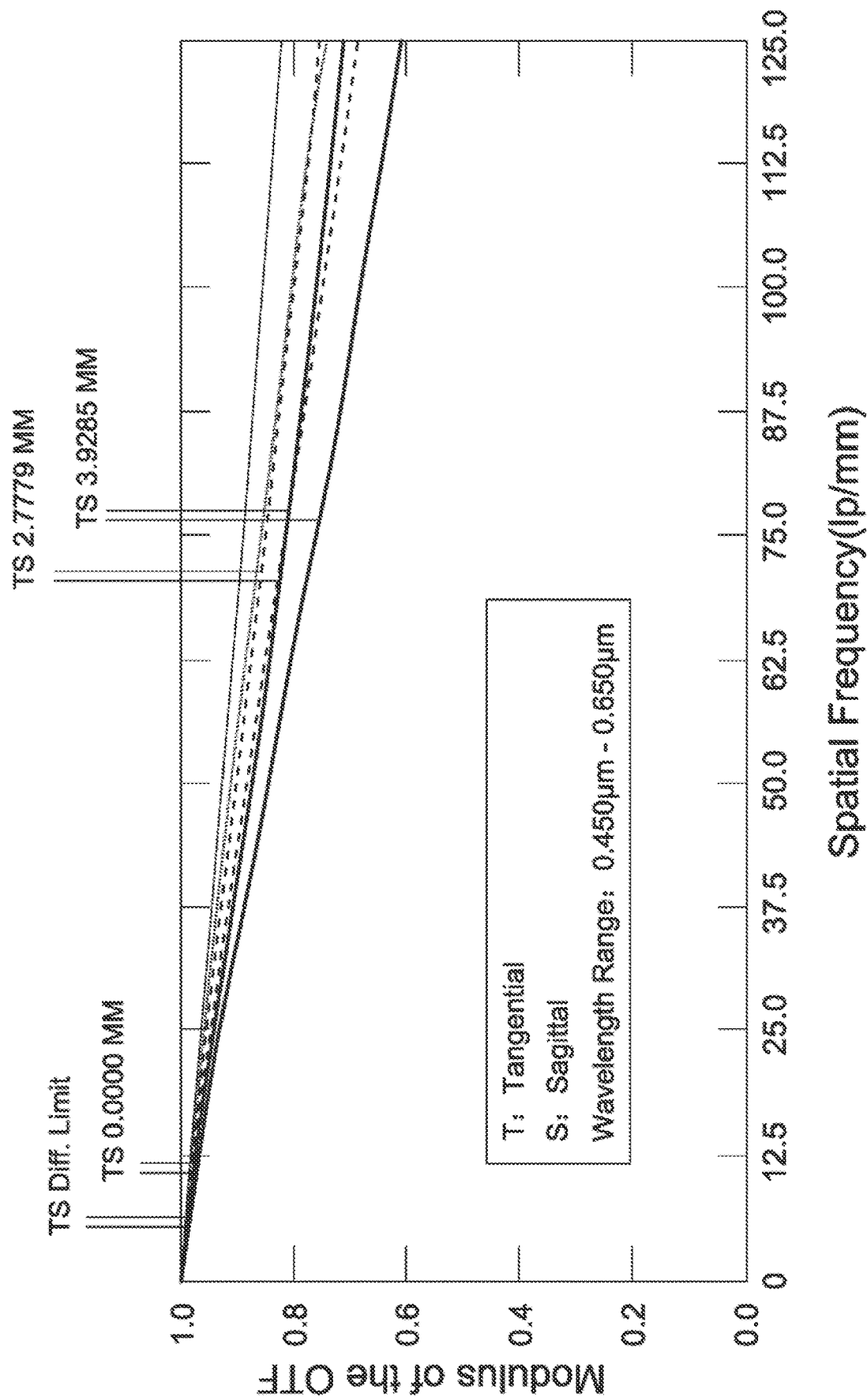

| + 0.450μm | ☒ 0.610μm |
| × 0.510μm | ⋈ 0.650μm |
| ▫ 0.555μm | Spot Diagram |

IMA：0.000mm
RMS radius：1.141μm
GEO radius：2.847μm

IMA：2.778mm
RMS radius：1.816μm
GEO radius：6.950μm

IMA：3.928mm
RMS radius：3.448μm
GEO radius：16.413μm

| + 0.450μm | ✱ 0.610μm |
| × 0.510μm | ⋈ 0.650μm |
| ▫ 0.555μm | Spot Diagram |

IMA : 0.000mm
RMS radius : 0.824μm
GEO radius : 3.083μm

IMA : 2.750mm
RMS radius : 1.389μm
GEO radius : 6.950μm

IMA : 3.928mm
RMS radius : 1.973μm
GEO radius : 11.821μm

```
+  0.450μm      ☒  0.610μm
×  0.510μm      ⋈  0.650μm
▫  0.555μm      Spot Diagram
```

IMA : 0.000mm
RMS radius : 0.787μm
GEO radius : 3.168μm

IMA : 2.750mm
RMS radius : 1.479μm
GEO radius : 6.950μm

IMA : 3.928mm
RMS radius : 2.082μm
GEO radius : 9.702μm

```
+  0.450μm      ☒  0.610μm
×  0.510μm      ⋈  0.650μm
▫  0.555μm      Spot Diagram
```

IMA : 0.000mm
RMS radius : 1.052μm
GEO radius : 3.992μm

IMA : 2.750mm
RMS radius : 1.153μm
GEO radius : 6.678μm

IMA : 3.928mm
RMS radius : 1.821μm
GEO radius : 10.259μm

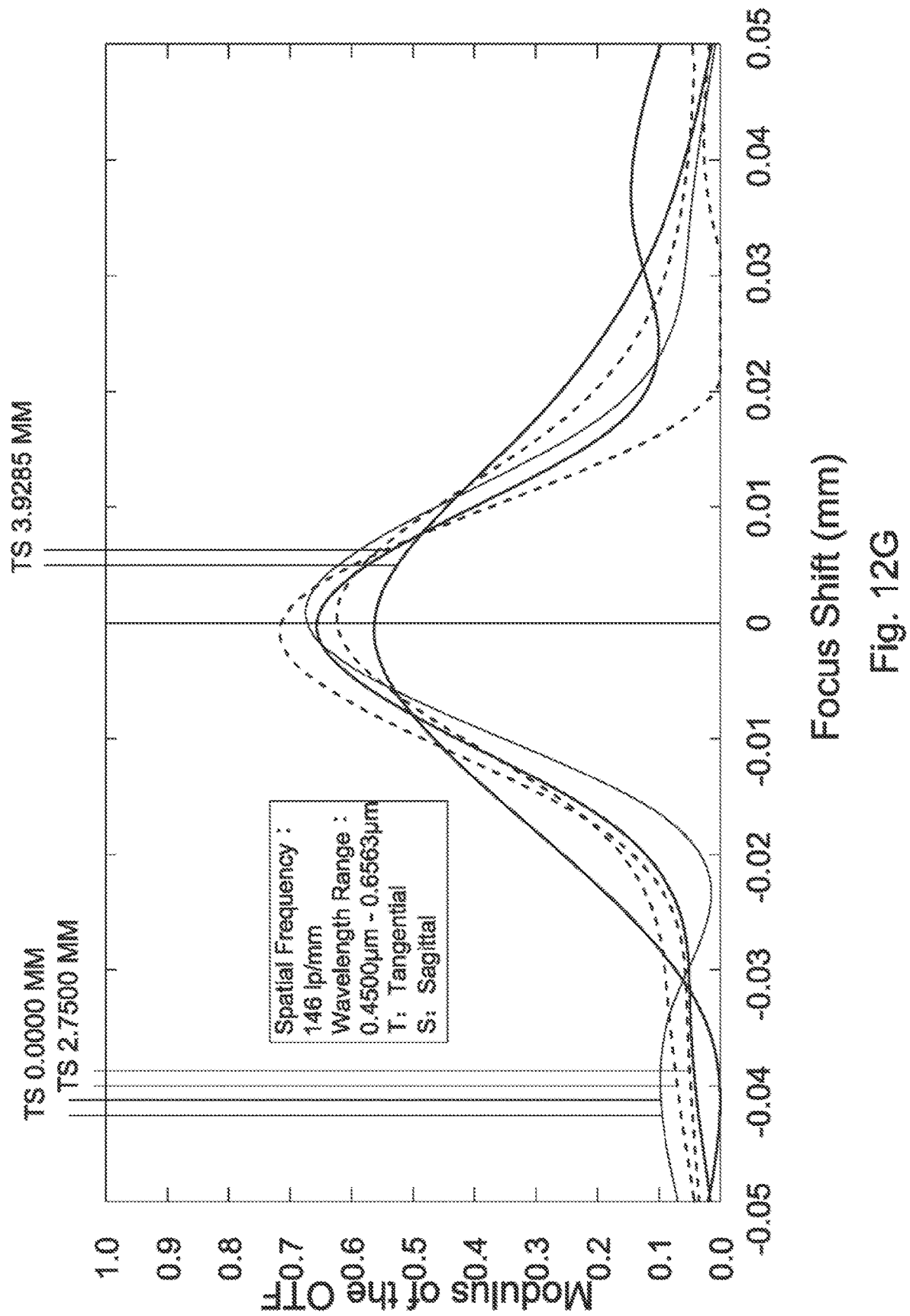

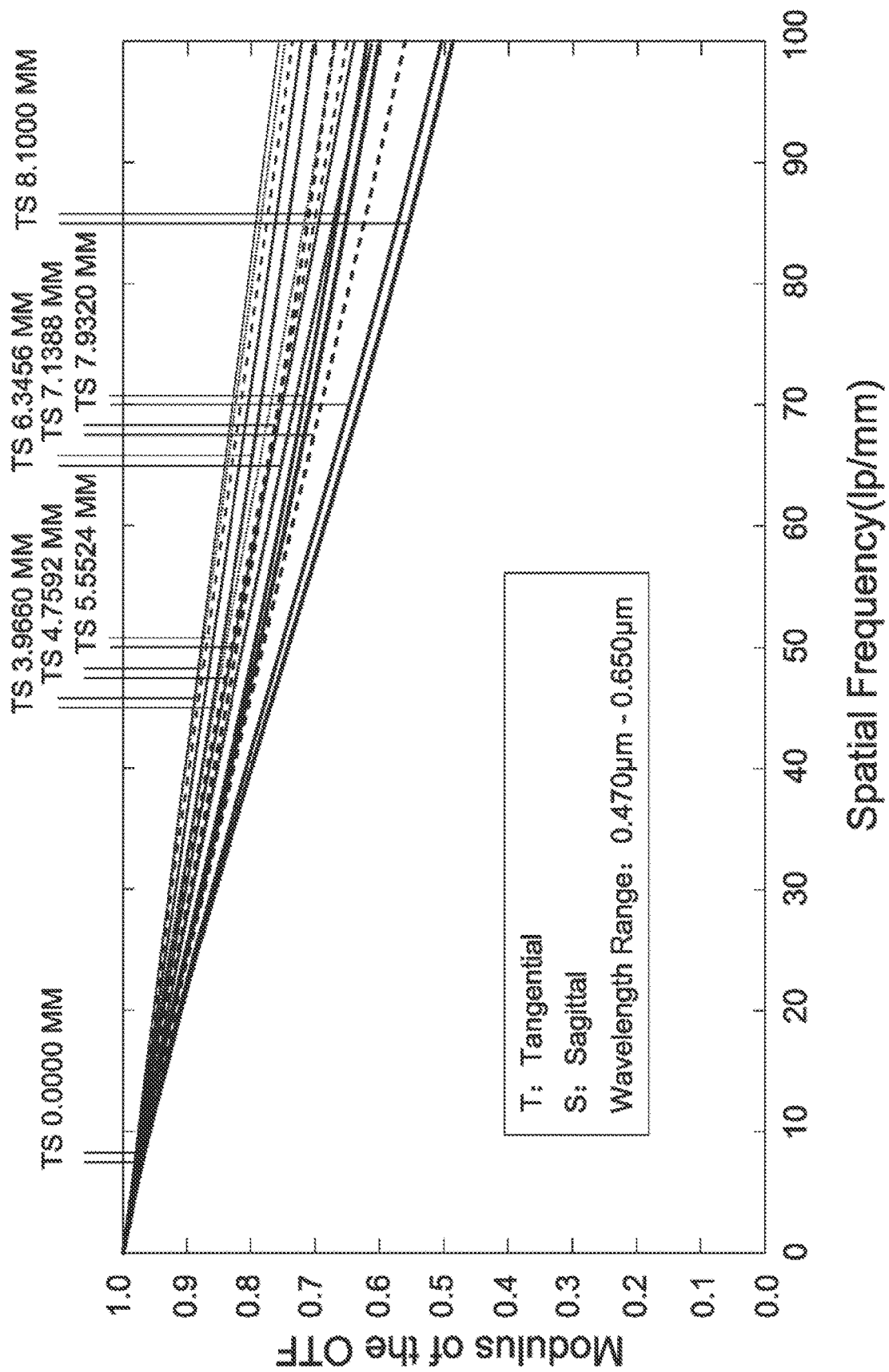

| | | | |
|---|---|---|---|
| + | 0.470μm | ✱ | 0.610μm |
| × | 0.510μm | ⋈ | 0.650μm |
| ▫ | 0.555μm | Spot Diagram | |

IMA : 0.00mm
RMS radius : 1.082μm
GEO radius : 2.763μm

IMA : 1.509 mm
RMS radius : 1.567 μm
GEO radius : 5.539 μm

IMA : 3.018 mm
RMS radius : 2.370 μm
GEO radius : 7.535 μm

+ 0.470μm   ✱ 0.610μm
× 0.510μm   ⋈ 0.650μm
□ 0.555μm   Spot Diagram

IMA : 0.000mm
RMS radius : 1.126 μm
GEO radius : 2.701 μm

IMA : 1.509 mm
RMS radius : 1.327 μm
GEO radius : 4.898 μm

IMA : 3.018 mm
RMS radius : 2.613 μm
GEO radius : 7.727 μm

+ 0.470μm     ☒ 0.610μm
× 0.510μm     ⋈ 0.650μm
▫ 0.555μm     Spot Diagram

IMA : 0.000mm
RMS radius : 1.037 μm
GEO radius : 2.675 μm

IMA : 1.509 mm
RMS radius : 1.991 μm
GEO radius : 7.342 μm

IMA : 3.018 mm
RMS radius : 3.880 μm
GEO radius : 17.837 μm

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward miniaturization and small F-number. Additionally, the wide-angle lens assembly is developed to have high resolution and resistance to environmental temperature change in accordance with different application requirements. However, the known wide-angle lens assembly can't satisfy such requirements. Therefore, the wide-angle lens assembly needs a new structure in order to meet the requirements of miniaturization, small F-number, high resolution, and resistance to environmental temperature change at the same time.

BRIEF SUMMARY OF THE INVENTION

The invention provides a wide-angle lens assembly to solve the above problems. The wide-angle lens assembly of the invention is provided with characteristics of a decreased total lens length, a decreased F-number, an increased resolution, a resisted environmental temperature change, and still has a good optical performance.

The wide-angle lens assembly in accordance with an exemplary embodiment of the invention includes a first lens, a second lens, a third lens, a fourth lens, and a fifth lens. The first lens is a meniscus lens with refractive power and includes a convex surface facing an object side and a concave surface facing an image side. The second lens is with refractive power. The third lens is with positive refractive power. The fourth lens is with refractive power. The fifth lens is a biconvex lens with positive refractive power and includes a convex surface facing the object side and another convex surface facing the image side. The first lens, the second lens, the third lens, the fourth lens, and the fifth lens are arranged in order from the object side to the image side along an optical axis.

In another exemplary embodiment, the wide-angle lens assembly further includes a sixth lens disposed between the first lens and the second lens, a seventh lens disposed between the object side and the first lens; an eighth lens disposed between the third lens and the fourth lens; and a stop disposed between the second lens and the eighth lens; wherein the second lens is with positive refractive power; wherein the third lens includes a convex surface facing the object side; wherein the fourth lens includes a concave surface facing the object side; wherein the sixth lens is with refractive power; wherein the seventh lens is with refractive power and includes a convex surface facing the object side; wherein the eighth lens is with positive refractive power; wherein the seventh lens, the first lens, the sixth lens, the second lens, the third lens, the eighth lens, the fourth lens, and the fifth lens are arranged in order from the object side to the image side along an optical axis; wherein the relative positions of the lenses are fixed; wherein the wide-angle lens assembly satisfies the following condition: 5.5<TTL/f<10; wherein TTL is an interval from an object side surface of the seventh lens to an image plane along the optical axis and f is an effective focal length of the wide-angle lens assembly.

In yet another exemplary embodiment, the eighth lens is cemented with the fourth lens.

In another exemplary embodiment, the wide-angle lens assembly further includes a ninth lens disposed between the fourth lens and the image side.

In yet another exemplary embodiment, the fifth lens is cemented with the ninth lens.

In another exemplary embodiment, the ninth lens is with negative refractive power and includes a concave surface facing the object side.

In yet another exemplary embodiment, the wide-angle lens assembly further includes a tenth lens disposed between the fourth lens and the image side.

In another exemplary embodiment, the tenth lens is with positive refractive power and includes a convex surface facing the object side and another convex surface facing the image side.

In yet another exemplary embodiment, the second lens includes a convex surface facing the image side; the sixth lens is with negative refractive power and includes a concave surface facing the image side; the seventh lens is with positive refractive power.

In another exemplary embodiment, the seventh lens is with negative refractive power; the sixth lens is with positive refractive power; the sixth lens includes a concave surface facing the object side, or the fifth lens includes a concave surface facing the object side, or both the sixth lens and the fifth lens includes a concave surface facing the object side; the sixth lens includes a convex surface facing the image side, or the third lens includes a convex surface facing the image side, or both the sixth lens and the third lens includes a convex surface facing the image side; the second lens comprises a convex surface facing the object side and a concave surface facing the image side.

In yet another exemplary embodiment, the seventh lens further includes a concave surface facing the image side; the first lens is with negative refractive power, or the fourth lens is with negative refractive power, or both the first lens and the fourth lens are with negative refractive power; the third lens is with positive refractive power, or the fifth lens is with positive refractive power, or both the third lens and the fifth lens are with positive refractive power; the eighth lens includes a convex surface facing the object side and another convex surface facing the image side.

In another exemplary embodiment, the wide-angle lens assembly satisfies at least one of the following conditions: $1.3<TTL/R_{71}<2.6$; $0.03<|f_{71}/f_{62}|<1.7$; $30<Vd_7<64.3$; $35<Vd_1<54.5$; wherein TTL is the interval from the object side surface of the seventh lens to the image plane along the optical axis, $R_{71}$ is a radius of curvature of the object side surface of the seventh lens, $f_{71}$ is an effective focal length of a combination of the seventh lens and the first lens, $f_{62}$ is an effective focal length of a combination of the sixth lens and the second lens, $Vd_7$ is an Abbe number of the seventh lens, and $Vd_1$ is an Abbe number of the first lens.

In yet another exemplary embodiment, the wide-angle lens assembly further includes a sixth lens disposed between the first lens and the second lens; a seventh lens disposed between the object side and the first lens; an eighth lens disposed between the third lens and the fourth lens; a ninth lens disposed between the fourth lens and the image side; wherein the second lens is with positive refractive power; wherein the third lens includes a convex surface facing the object side; wherein the fourth lens includes a concave surface facing the object side; wherein the sixth lens is with refractive power; wherein the seventh lens is with refractive power and includes a convex surface facing the object side;

wherein the eighth lens is with positive refractive power; wherein the ninth lens is with negative refractive power and includes a concave surface facing the object side; wherein the seventh lens, the first lens, the sixth lens, the second lens, the third lens, the eighth lens, the fourth lens, the fifth lens, and the ninth lens are arranged in order from the object side to the image side along an optical axis; wherein the relative positions of the lenses are fixed.

In another exemplary embodiment, the first lens is with negative refractive power: the second lens includes a convex surface facing the object side; the third lens includes a convex surface facing the image side; the wide-angle lens assembly satisfies the following condition: $0.8 \leq |f_1|/f \leq 1.5$; wherein $f_1$ is an effective focal length of the first lens and f is an effective focal length of the wide-angle lens assembly.

In yet another exemplary embodiment, the wide-angle lens assembly satisfies the following condition: $0.4 \leq BFL/TTL \leq 0.5$; wherein BFL is an interval from an image side surface of the fifth lens to an image plane along the optical axis and TTL is an interval from an object side surface of the first lens to the image plane along the optical axis.

In another exemplary embodiment, the wide-angle lens assembly further includes a sixth lens disposed between the first lens and the second lens, wherein the sixth lens is with negative refractive power and includes a concave surface facing the object side and another concave surface facing the image side.

In yet another exemplary embodiment, the first lens further includes a convex surface facing the object side; the second lens is with positive refractive power and further includes another convex surface facing the image side; the third lens is with positive refractive power and further includes another convex surface facing the object side; the fourth lens is with negative refractive power and includes a concave surface facing the object side and another concave surface facing the image side; the fifth lens further includes another convex surface facing the object side.

In another exemplary embodiment, the wide-angle lens assembly satisfies at least one of the following conditions: $1.1 \leq BFL/IH < 2.8$; $4 \leq TTL/IH \leq 6.5$; $-0.93 \leq f_1/f_5 \leq -0.68$; wherein BFL is an interval from an image side surface of the fifth lens to an image plane along the optical axis, IH is a half image height of the image plane of the wide-angle lens assembly, TTL is an interval from an object side surface of the first lens to the image plane along the optical axis, $f_1$ is the effective focal length of the first lens, and $f_5$ is an effective focal length of the fifth lens.

In yet another exemplary embodiment, the wide-angle lens assembly further includes a stop disposed between the second lens and the third lens.

In another exemplary embodiment, the first lens, the second lens, the third lens, the fourth lens, the fifth lens, and the sixth lens are aspheric plastic lenses.

In yet another exemplary embodiment, the wide-angle lens assembly further includes a reflective element disposed between the fifth lens and the image side.

In another exemplary embodiment, the wide-angle lens assembly further includes a sixth lens disposed between the first lens and the second lens, wherein the sixth lens is with negative refractive power and includes a convex surface facing the object side; the second lens includes a convex surface facing the image side; the wide-angle lens assembly satisfies the following condition: $-8.3 < f_{162}/f \leq 14$; wherein $f_{162}$ is an effective focal length of a combination of the first lens, the sixth lens, and the second lens, and f is an effective focal length of the wide-angle lens assembly.

In yet another exemplary embodiment, the wide-angle lens assembly further includes a sixth lens disposed between the first lens and the second lens, wherein the sixth lens is with negative refractive power and includes a convex surface facing the object side; the second lens includes a convex surface facing the image side; the wide-angle lens assembly satisfies the following condition: $4 \text{ mm} \leq f+f_3 \leq 5 \text{ mm}$; wherein f is an effective focal length of the wide-angle lens assembly and $f_3$ is an effective focal length of the third lens.

In another exemplary embodiment, the wide-angle lens assembly satisfies the following condition: $-5.65 \text{ mm} \leq (R_{21} \times R_{22})/(R_{21}+R_{22}) \leq -3.8 \text{ mm}$: wherein $R_{21}$ is a radius of curvature of an object side surface of the second lens and $R_{22}$ is a radius of curvature of an image side surface of the second lens.

In yet another exemplary embodiment, the wide-angle lens assembly satisfies the following condition: $0.5 < |(CRA-MRA)/CRA| < 1.02$; wherein CRA is a chief ray angle of a maximum image height of the wide-angle lens assembly and MRA is a marginal ray angle of the maximum image height of the wide-angle lens assembly.

In another exemplary embodiment, the first lens is with negative refractive power; the sixth lens further includes a concave surface facing the image side; the second lens is with negative refractive power and further includes a convex surface or a concave surface facing the object side; the third lens includes a convex surface facing the object side and another convex surface facing the image side; the fourth lens is with negative refractive power and includes a concave surface facing the object side and another concave surface facing the image side.

In yet another exemplary embodiment, the wide-angle lens assembly satisfies at least one of the following conditions: $-45 \text{ degrees/mm} \leq FOV/f_1 \leq -22 \text{ degrees/mm}$; $105 \leq Vd_1+Vd_3 < 140$; wherein FOV is a field of view of the wide-angle lens assembly, $f_1$ is an effective focal length of the first lens, $Vd_1$ is an Abbe number of the first lens, and $Vd_3$ is an Abbe number of the third lens.

In another exemplary embodiment, the wide-angle lens assembly satisfies the following condition: $-5.1 \leq (f_6+f_4)/f < -3.6$, wherein f is the effective focal length of the wide-angle lens assembly, $f_6$ is an effective focal length of the sixth lens, and $f_4$ is an effective focal length of the fourth lens.

In yet another exemplary embodiment, the wide-angle lens assembly satisfies at least one of the following conditions: $0.12 \leq BFL/TTL \leq 0.23$; $9 \leq TTL/T_3 \leq 19$; wherein BFL is an interval from an image side surface of a lens which is closest to the image side to an image plane along the optical axis, TTL is an interval from an object side surface of the first lens to the image plane along the optical axis, and $T_3$ is a thickness of the third lens along the optical axis.

In another exemplary embodiment, the wide-angle lens assembly further includes a seventh lens disposed between the fifth lens and the image side, wherein the seventh lens is with positive refractive power and includes a concave surface facing the object side and a convex surface facing the image side.

In yet another exemplary embodiment, the wide-angle lens assembly further includes a seventh lens disposed between the fifth lens and the image side, wherein the seventh lens is with negative refractive power and includes a concave surface facing the object side and another concave surface facing the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2F is a modulation transfer function diagram of the wide-angle lens assembly in accordance with the first embodiment of the invention;

FIG. 12G is a through focus modulation transfer function diagram of the wide-angle lens assembly in accordance with the sixth embodiment of the invention;

FIG. 16E is a modulation transfer function diagram of the wide-angle lens assembly in accordance with the eighth embodiment of the invention;

DETAILED DESCRIPTION OF THE INVENTION

Figure 1:
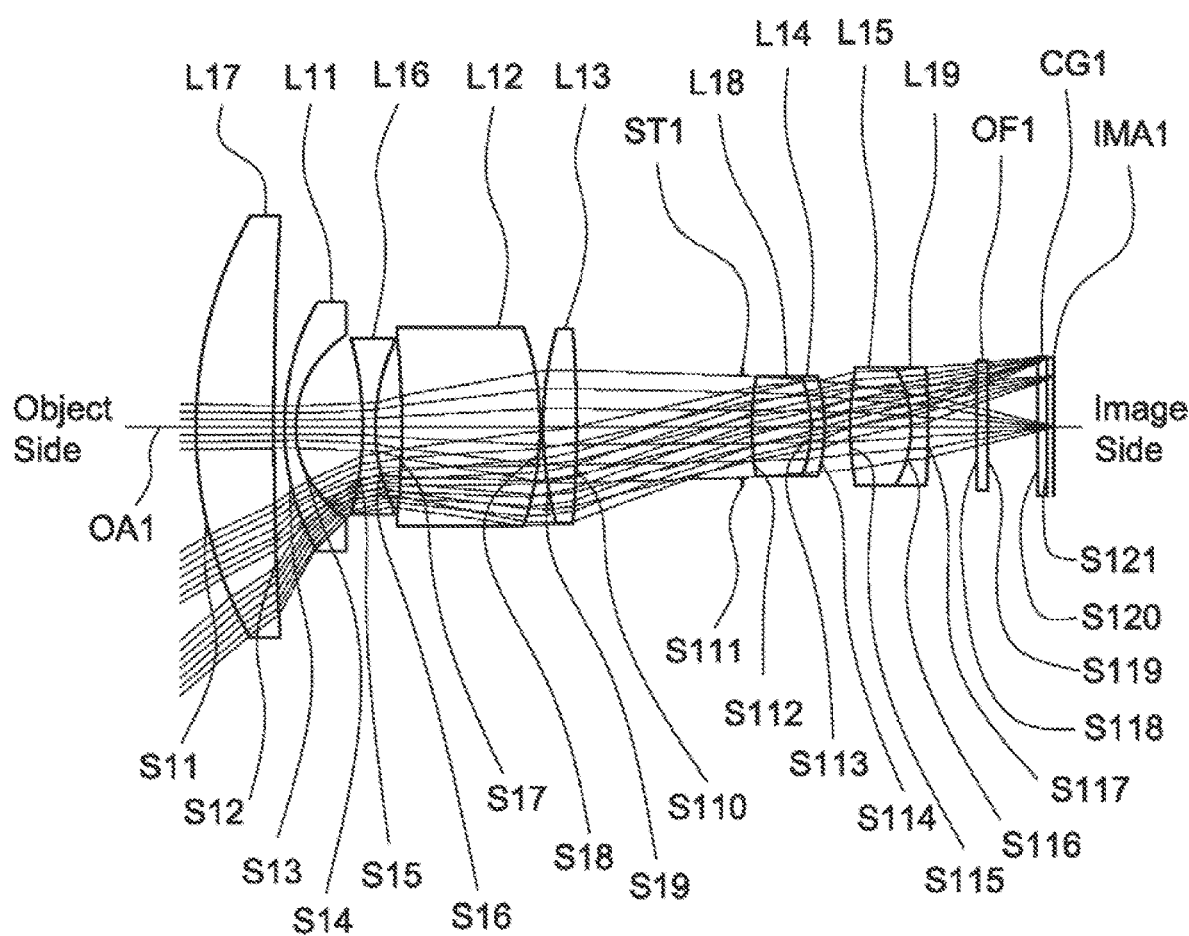
FIG. 1 is a lens layout diagram of a wide-angle lens assembly in accordance with a first embodiment of the invention.

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, and a fifth lens. The first lens is a meniscus lens with refractive power and includes a convex surface facing an object side and a concave surface facing an image side. The second lens is with refractive power. The third lens is with positive refractive power. The fourth lens is with refractive power. The fifth lens is a biconvex lens with positive refractive power and includes a convex surface facing the object side and another convex surface facing the image side. The first lens, the second lens, the third lens, the fourth lens, and the fifth lens are arranged in order from the object side to the image side along an optical axis.

Referring to Table 1, Table 3, Table 5, Table 7, Table 9, Table 11, Table 12, Table 14, Table 15, Table 17, Table 18, Table 20, and Table 21, wherein Table 1, Table 3, Table 5, Table 7, Table 9, Table 11, Table 14, Table 17, and Table 20 show optical specification in accordance with a first, second, third, fourth, fifth, sixth, seventh, eighth, and ninth embodiments of the invention respectively and Table 12, Table 15, Table 18, and Table 21 show aspheric coefficients of each aspheric lens in Table 11, Table 14, Table 17, and Table 20 respectively.

FIG. 1, FIG. 3, FIG. 5, FIG. 7, FIG. 9, FIG. 11, FIG. 13, FIG. 15, and FIG. 17 are lens layout diagrams of the wide-angle lens assemblies in accordance with the first, second, third, fourth, fifth, sixth, seventh, eighth, and ninth embodiments of the invention respectively.

The seventh lenses L17, L27, L37, L47, L57, L67, L77, L87, L97 are meniscus lenses and made of glass material, wherein the object side surfaces S11, S21, S31, S41, S51, S61, S71, S81, S91 are convex surfaces, the image side surfaces S12, S22, S32, S42, S52, S62, S72, S82, S92 are concave surfaces, and the object side surfaces S11, S21, S31, S41, S51, S61, S71, S81, S91 and the image side surfaces S12, S22, S32, S42, S52, S62, S72, S82, S92 are spherical surfaces.

The first lenses L11, L21, L31, L41, L51, L61, L71, L81, L91 are meniscus lenses with negative refractive power and made of glass material, wherein the object side surfaces S13, S23, S33, S43, S53, S63, S73, S83, S93 are convex surfaces, the image side surfaces S14, S24, S34, S44, S54, S64, S74, S84, S94 are concave surfaces, and the object side surfaces S13, S23, S33, S43, S53, S63, S73, S83, S93 and the image side surfaces S14, S24, S34, S44, S54, S64, S74, S84, S94 are spherical surfaces.

The sixth lenses L16, L26, L36, L46, L56, L66, L76, L86, L96 are with refractive power and made of glass material.

The second lenses L12, L22, L32, L42, L52, L62, L72, L82, L92 are with positive refractive power and made of glass material.

The third lenses L13, L23, L33, L43, L53, L63, L73, L83, L93 are with positive refractive power and made of glass material, wherein the object side surfaces S19, S29, S39, S49, S59, S69, S710, S810, S910 are convex surfaces and the object side surfaces S19, S29, S39, S49, S59, S69, S710, S810, S910 and the image side surfaces S110, S210, S310, S410, S510, S610, S711, S811, S911 are spherical surfaces.

The eighth lenses L18, L28, L38, L48, L58, L68, L78, L88, L98 are biconvex lenses with positive refractive power and made of glass material, wherein the object side surfaces S112, S212, S312, S412, S512, S612, S712, S812, S912 are convex surfaces, the image side surfaces S113, S213, S313, S413, S513, S613, S713, S813, S913 are convex surfaces, and the object side surfaces S112, S212, S312, S412, S512, S612, S712, S812, S912 and the image side surfaces S113, S213, S313, S413, S513, S613, S713, S813, S913 are spherical surfaces.

The fourth lenses L14, L24, L34, L44, L54, L64, L74, L84, L94 are with negative refractive power and made of glass material, wherein the object side surfaces S113, S213, S313, S413, S513, S613, S713, S813, S913 are concave surfaces and the object side surfaces S13, S213, S313, S413, S513, S613, S713, S813, S913 and the image side surfaces S114, S214, S314, S414, S514, S614, S714, S814, S914 are spherical surfaces.

The fifth lenses L15, L25, L35, L45, L55, L65, L75, L85, L95 are with positive refractive power and made of glass material, wherein the image side surfaces S116, S216, S316, S416, S516, S616, S716, S816, S916 are convex surfaces.

The eighth lenses L18, L28, L38, L48, L58, L68, L78, L88, L98 and the fourth lenses L14, L24, L34, L44, L54, L64, L74, L84, L94 are cemented respectively.

In addition, the wide-angle lens assemblies 1, 2, 3, 4, 5, 6, 7, 8, 9 satisfy at least one of the following conditions:

$$5.5 < TTL/f < 10; \quad (1)$$

$$1.3 < TTL/R_{71} < 2.6; \quad (2)$$

$$0.03 < |f_{71}/f_{62}| < 1.7; \quad (3)$$

$$30 < Vd_7 < 64.3; \quad (4)$$

$$35 < Vd_1 < 54.5; \quad (5)$$

wherein f is an effective focal length of the wide-angle lens assemblies 1, 2, 3, 4, 5, 6, 7, 8, 9 for the first to ninth embodiments, $f_{71}$ is an effective focal length of a combination of the seventh lenses L17, L27, L37, L47, L57, L67, L77, L87, L97 and the first lenses L11, L21, L31, L41, L51, L61, L71, L81, L91 respectively for the first to ninth embodiments, $f_{62}$ is an effective focal length of a combination of the sixth lenses L16, L26, L36, L46, L56, L66, L76, L86, L96 and the second lenses L12, L22, L32, L42, L52, L62, L72, L82, L92 respectively for the first to ninth embodiments, $R_{71}$ is a radius of curvature of the object side surfaces S11, S21, S31, S41, S51, S61, S71, S81, S91 of the seventh lenses L17, L27, L37, L47, L57, L67, L77, L87, L97 respectively for the first to ninth embodiments, TTL is an interval from the object side surfaces S11, S21, S31, S41, S51, S61, S71, S81, S91 of the seventh lenses L17, L27, L37, L47, L57, L67, L77, L87, L97 to image planes IMA1, IMA2, IMA3, IMA4, IMA5, IMA6, IMA7, IMA8, IMA9 along the optical axes OA1, OA2, OA3, OA4, OA5, OA6, OA7, OA8, OA9 respectively for the first to ninth embodiments, $Vd_1$ is an Abbe number of the first lenses L11, L21, L31, L41, L51, L61, L71, L81, L91 for the first to ninth embodiments, and $Vd_7$ is an Abbe number of the seventh lenses L17, L27, L37, L47, L57, L67, L77, L87, L97 for the first to ninth embodiments. With the wide-angle lens assemblies 1, 2, 3, 4, 5, 6, 7, 8, 9 satisfying at least one of the above conditions (1)-(5), the total lens length can be effectively decreased, the F-number can be effectively decreased, the resolution can be effectively increased, the environmental temperature change can be effectively resisted, the aberration can be effectively corrected, and the chromatic aberration can be effectively corrected.

The object side surface of the seventh lens can be convex surface, thereby helping to receive light, reduce the surface reflection of wide-field light, and improve the wide-field illumination. The image side surface of the seventh lens can be concave surface, thereby helping to reduce astigmatism. The first lens can have negative refractive power, thereby helping to correct aberration and distortion produced by the seventh lens. The object side surface of the first lens can be convex surface, thereby adjusting the surface shape of the first lens and helping to receive the light of large incident angle, so that make it propagating smoothly in the wide-angle lens assembly. The image side surface of the first lens may be concave surface, thereby helping to reduce astigmatism. The third lens can have positive refractive power, thereby helping to distribute the positive refractive power of the wide-angle lens assembly evenly to reduce the aberration caused by a single lens. The object side surface of the third lens can be convex surface, thereby, adjusting the surface shape of the third lens and helping to correct off-axis aberration such as field curvature. The eighth lens can have positive refractive power, wherein the object side surface can be convex surface, the image side surface can be convex surface, thereby providing the light-gathering ability and shortening the total lens length to meet the requirement of miniaturization for the wide-angle lens assembly. The fourth lens can have negative refractive power, thereby helping to balance the positive refractive power of the eighth lens and effectively correct chromatic aberration. The object side surface of the fourth lens can be concave surface, thereby helping to correct chromatic aberration. The fifth lens can have positive refractive power, thereby helping to match the fourth lens with strong negative refractive power to correct peripheral aberration. The image side surface of the fifth lens can be convex surface, thereby helping further to shorten the total lens length of the wide-angle lens assembly. The configuration of the stop is to be disposed between the seventh lens and the image plane which helps to expand the field of view of the wide-angle lens assembly.

A detailed description of a wide-angle lens assembly in accordance with a first embodiment of the invention is as follows. Referring to FIG. 1, the wide-angle lens assembly 1 includes a seventh lens L17, a first lens L11, a sixth lens L16, a second lens L12, a third lens L13, a stop ST1, an eighth lens L18, a fourth lens L14, a fifth lens L15, a ninth lens L19, an optical filter OF1, and a cover glass CG1, all of which are arranged in order from an object side to an image side along an optical axis OA1. In operation, an image of light rays from the object side is formed at an image plane IMA1.

According to the foregoing, wherein: the seventh lens L17 is with positive refractive power; the sixth lens L16 is a biconcave lens with negative refractive power, wherein the object side surface S15 is a concave surface, the image side surface S16 is a concave surface, and the object side surface S15 and the image side surface S16 are spherical surfaces; the second lens L12 is a meniscus lens, wherein the object side surface S17 is a concave surface, the image side surface S18 is a convex surface, and the object side surface S17 and the image side surface S18 are spherical surfaces; the third lens L13 is a biconvex lens, wherein the image side surface S110 is a convex surface; the fourth lens L14 is a meniscus lens, wherein the image side surface S114 is a convex surface; the fifth lens L15 is a biconvex lens, wherein the object side surface S115 is a convex surface and the object side surface S115 and the image side surface S116 are spherical surfaces; the ninth lens L19 is a meniscus lens with negative refractive power and made of glass material, wherein the object side surface S116 is a concave surface, the image side surface S117 is a convex surface, and the object side surface S116 and the image side surface S117 are spherical surfaces; the fifth lens L15 cemented with the ninth lens L19; both of the object side surface S118 and image side surface S119 of the optical filter OF1 are plane surfaces; and both of the object side surface S120 and image side surface S121 of the cover glass CG1 are plane surfaces.

With the above design of the lenses and stop ST1 and at least any one of the conditions (1)-(5) satisfied, the wide-angle lens assembly 1 can have an effective decreased total lens length, an effective decreased F-number, an effective increased resolution, an effective resisted environmental temperature change, an effective corrected aberration, and an effective corrected chromatic aberration.

If the value TTL/f of condition (1) is greater than 10 then the purpose of miniaturization of the wide-angle lens assembly is difficult to achieve. Therefore, the value TT/f must beat least less than 10. An optimal range for TTL/f is between 5.5 and 10. The wide-angle lens assembly 1 has the optimal condition for miniaturization when satisfies the condition: $5.5<TTL/f<10$.

Table 1 shows the optical specification of the wide-angle lens assembly 1 in FIG. 1.

TABLE 1

Effective Focal Length = 4.93 mm F-number = 2.0
Total Lens Length = 47.93 mm Field of View = 81.738 degrees

| Surface Number | Radius of Curvature (mm) | Thickness (mm) | Nd | Vd | Effective Focal Length (mm) | Remark |
|---|---|---|---|---|---|---|
| S11 | 25.00 | 4.32 | 1.56 | 62.9 | 50.99 | The Seventh Lens L17 |
| S12 | 166.50 | 0.55 | | | | |
| S13 | 14.51 | 0.63 | 1.8 | 46.5 | −13.25 | The First Lens L11 |
| S14 | 6.04 | 3.77 | | | | |
| S15 | −19.35 | 0.68 | 1.92 | 20.8 | −7.14 | The Sixth Lens L16 |
| S16 | 10.30 | 1.53 | | | | |
| S17 | −42.45 | 7.71 | 1.65 | 50.8 | 31.92 | The Second Lens L12 |
| S18 | −15.11 | 0.09 | | | | |
| S19 | 20.20 | 1.90 | 1.92 | 23.9 | 17.68 | The Third Lens L13 |
| S110 | −83.41 | 9.40 | | | | |
| S111 | ∞ | 0.46 | | | | Stop ST1 |
| S112 | 25.25 | 3.32 | 1.61 | 63.3 | 8.80 | The Eighth Lens L18 |
| S113 | −6.61 | 0.69 | 1.8 | 25.4 | −15.38 | The Fourth Lens L14 |
| S114 | −14.70 | 1.41 | | | | |
| S115 | 17.53 | 3.55 | 1.67 | 55.1 | 7.07 | The Fifth Lens L15 |
| S116 | −6.09 | 0.88 | 1.78 | 25.6 | −8.82 | The Ninth Lens L19 |
| S117 | −50.92 | 2.80 | | | | |
| S118 | ∞ | 0.55 | 1.51 | 64.1 | | Optical Filter OF1 |
| S119 | ∞ | 2.78 | | | | |
| S120 | ∞ | 0.50 | 1.51 | 64.1 | | Cover Glass CG1 |
| S121 | ∞ | 0.40 | | | | |

Table 2 shows the parameters and condition values for conditions (1)-(5) in accordance with the first embodiment of the invention. It can be seen from Table 2 that the wide-angle lens assembly 1 of the first embodiment satisfies the conditions (1)-(5).

TABLE 2

| $f_{71}$ | −20.245 mm | $f_{62}$ | −13.7 mm | | |
|---|---|---|---|---|---|
| TTL/f | 9.722 | $TTL/R_{71}$ | 1.917 | $|f_{71}/f_{62}|$ | 1.478 |
| $Vd_7$ | 62.9 | $Vd_1$ | 46.5 | | |

By the above arrangements of the lenses and stop ST1, the wide-angle lens assembly 1 of the first embodiment can meet the requirements of optical performance as seen in FIGS. 2A-2G.

Figure 2A:
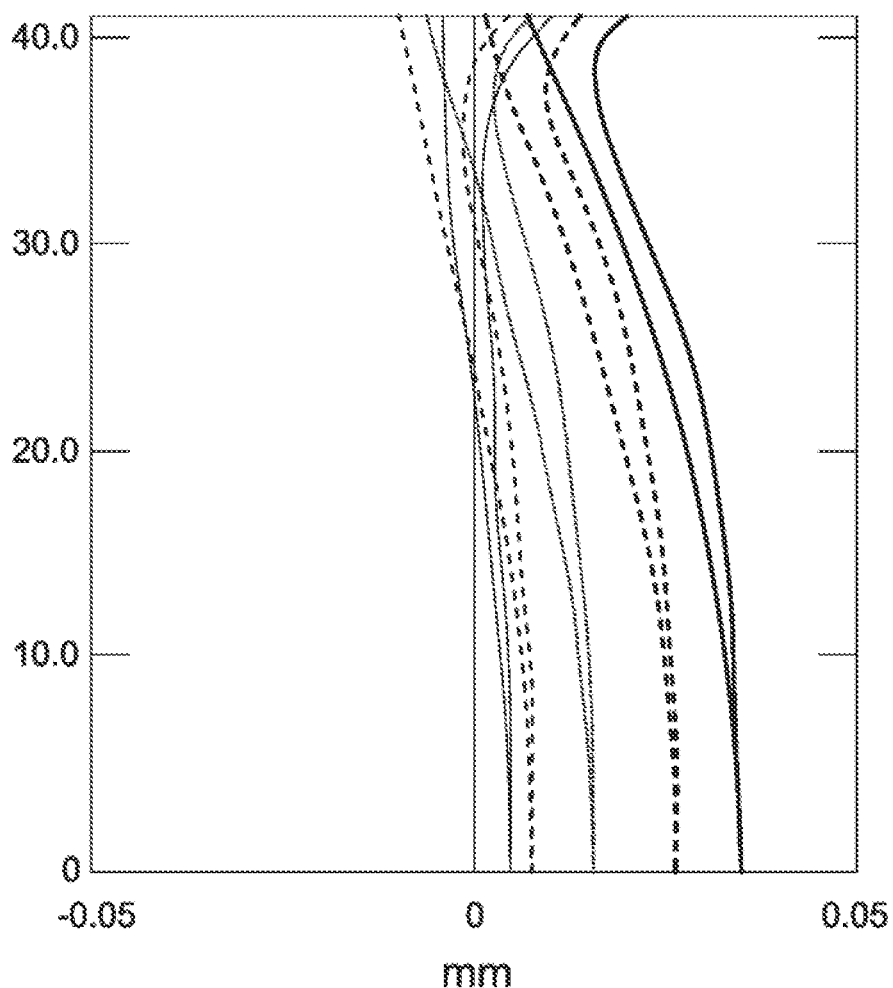
FIG. 2A depicts a field curvature diagram of the wide-angle lens assembly in accordance with the first embodiment of the invention.
Figure 2B:
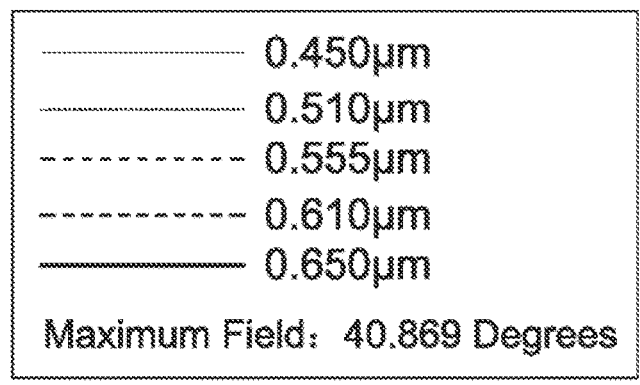
FIG. 2B is a distortion diagram of the wide-angle lens assembly in accordance with the first embodiment of the invention.
Figure 2B:
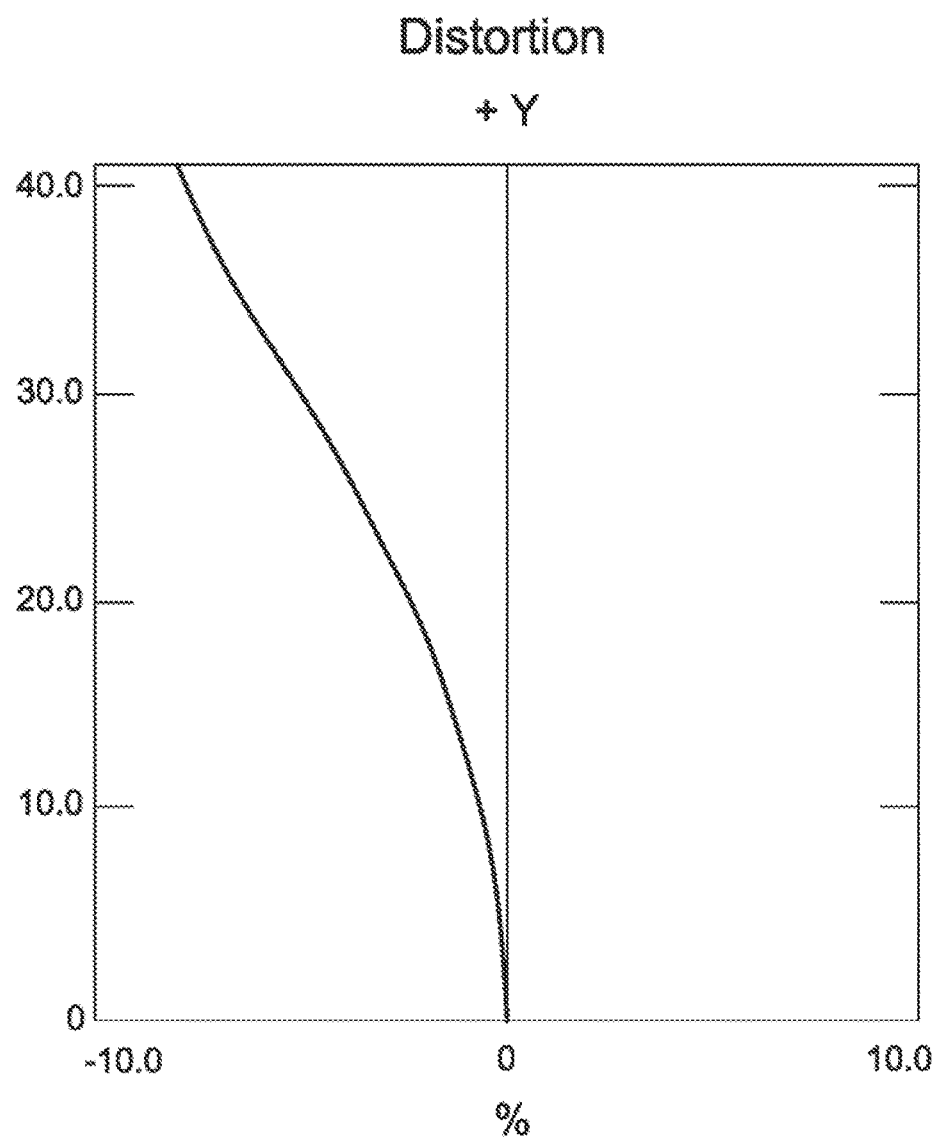
Figure 2C:
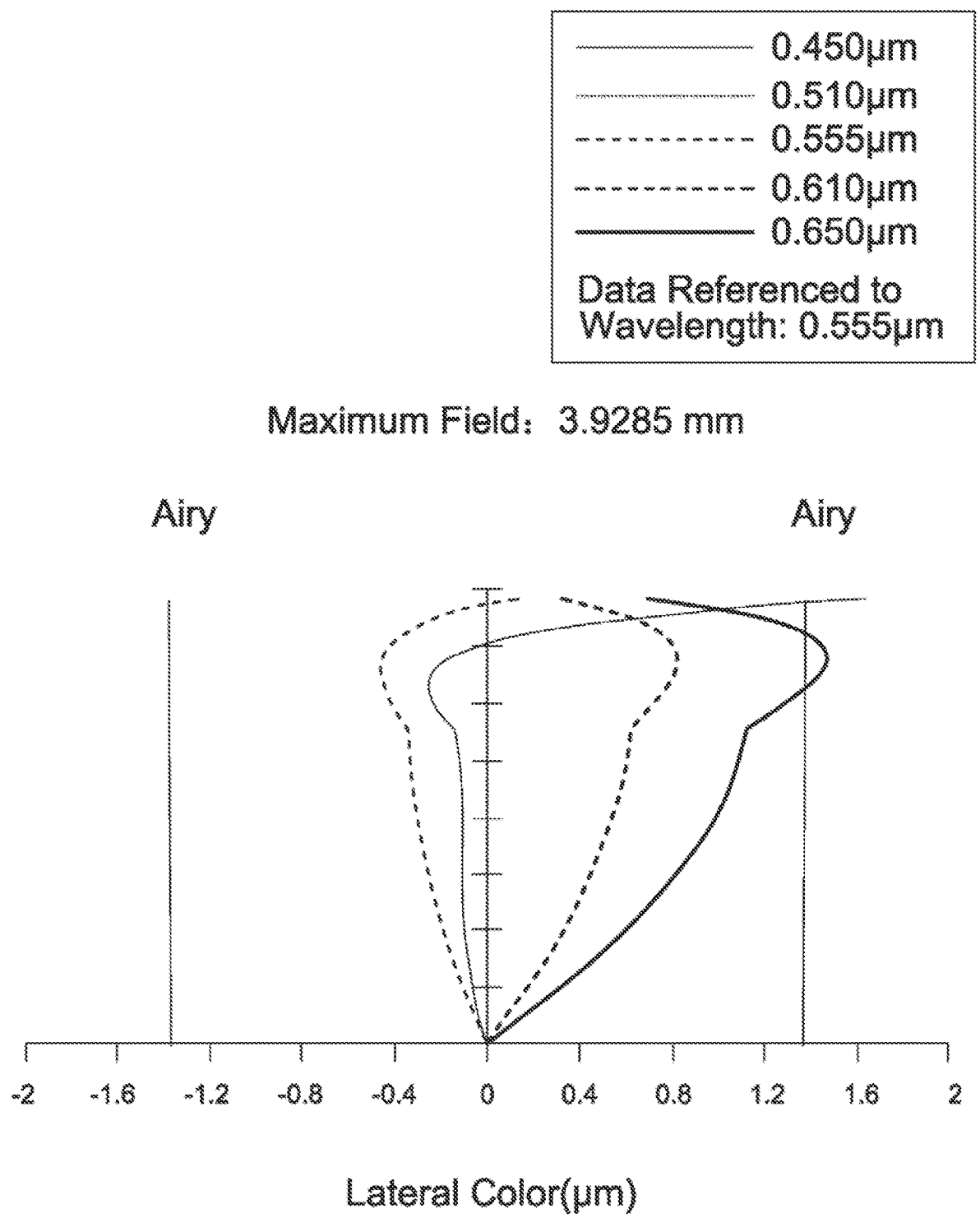
FIG. 2C is a lateral color diagram of the wide-angle lens assembly in accordance with the first embodiment of the invention.
Figure 2D:
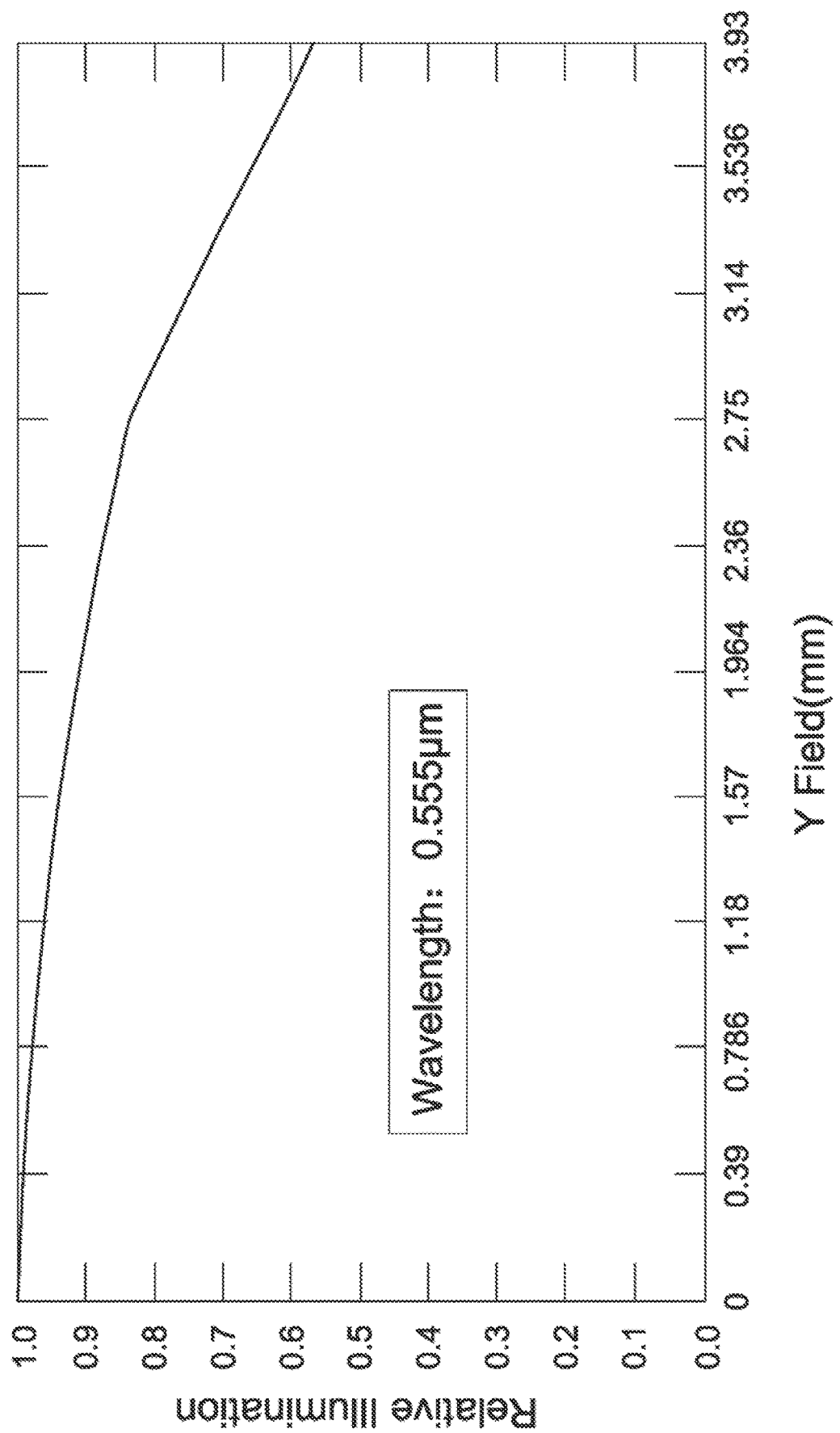
FIG. 2D is a relative illumination diagram of the wide-angle lens assembly in accordance with the first embodiment of the invention.
Figure 2E:
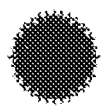
FIG. 2E is a spot diagram of the wide-angle lens assembly in accordance with the first embodiment of the invention.
Figure 2E:
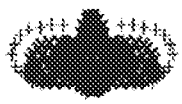
Figure 2E:
Figure 2G:
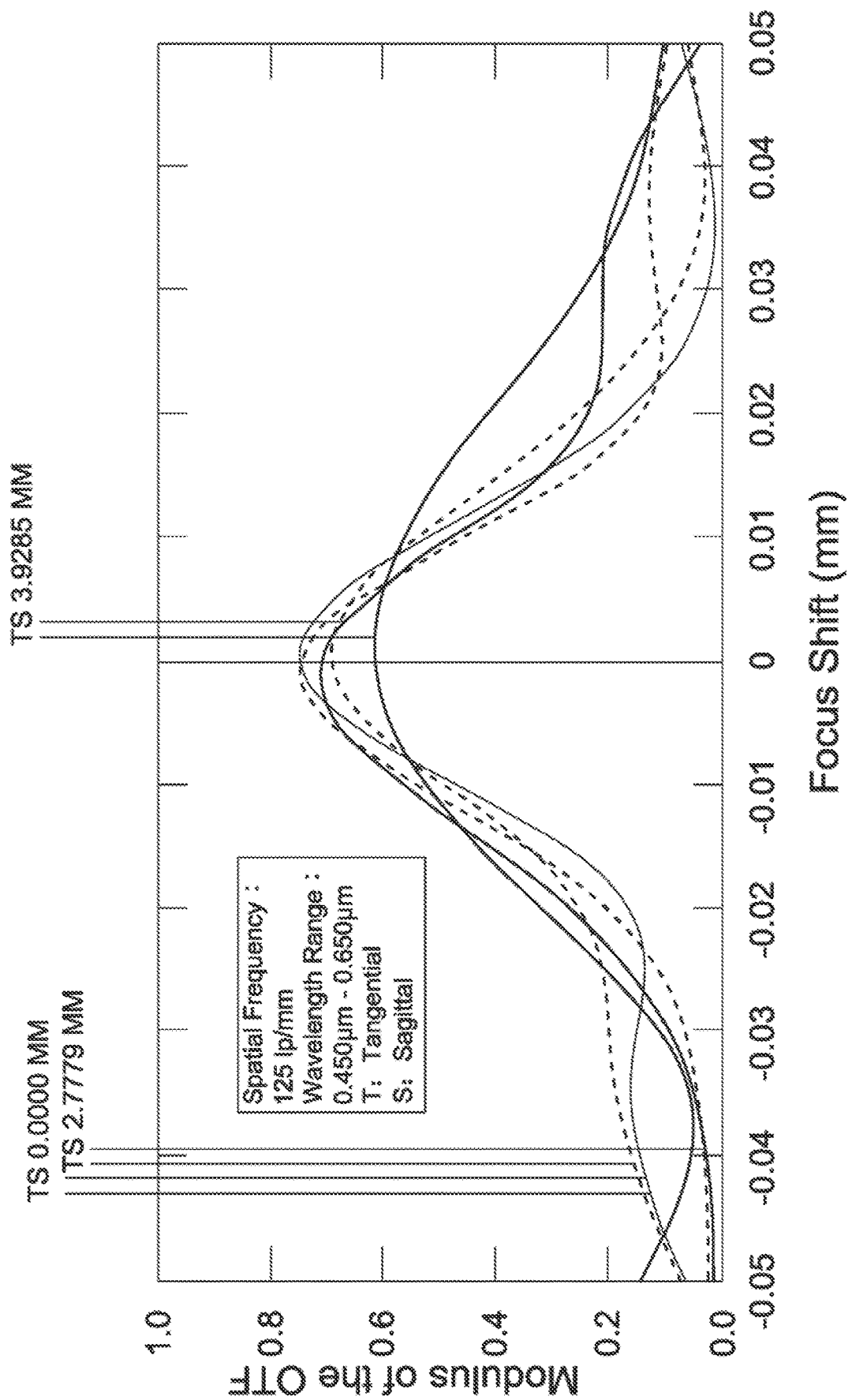
FIG. 2G is a through focus modulation transfer function diagram of the wide-angle lens assembly in accordance with the first embodiment of the invention.

It can be seen from FIG. 2A that the field curvature of tangential direction and sagittal direction in the wide-angle lens assembly 1 of the first embodiment ranges from −0.01 mm to 0.04 mm. It can be seen from FIG. 2B that the distortion in the wide-angle lens assembly 1 of the first embodiment ranges from −8% to 0%. It can be seen from FIG. 2C that the lateral color in the wide-angle lens assembly 1 of the first embodiment ranges from −0.5 μm to 1.7 μm. It can be seen from FIG. 2D that the relative illumination in the wide-angle lens assembly 1 of the first embodiment ranges from 0.58 to 1.0. It can be seen from FIG. 2E that the root mean square spot radius is equal to 0.912 μm and geometrical spot radius is equal to 3.298 μm as image height is equal to 0.000 mm, the root mean square spot radius is equal to 1.479 μm and geometrical spot radius is equal to 6.950 μm as image height is equal to 2.778 mm, and the root mean square spot radius is equal to 1.893 μm and geometrical spot radius is equal to 11.756 μm as image height is equal to 3.928 mm for the wide-angle lens assembly 1 of the first embodiment. It can be seen from FIG. 2F that the modulation transfer function of tangential direction and sagittal direction in the wide-angle lens assembly 1 of the first embodiment ranges from 0.60 to 1.0. It can be seen from FIG. 2G that the through focus modulation transfer function of tangential direction and sagittal direction in the wide-angle lens assembly 1 of the first embodiment ranges from 0.0 to 0.76 as focus shift ranges from −0.05 mm to 0.05 mm.

It is obvious that the field curvature, the distortion, and the lateral color of the wide-angle lens assembly 1 of the first embodiment can be corrected effectively, and the relative illumination, the resolution and the depth of focus of the wide-angle lens assembly 1 of the first embodiment can meet the requirement. Therefore, the wide-angle lens assembly 1 of the first embodiment is capable of good optical performance.

Figure 3:
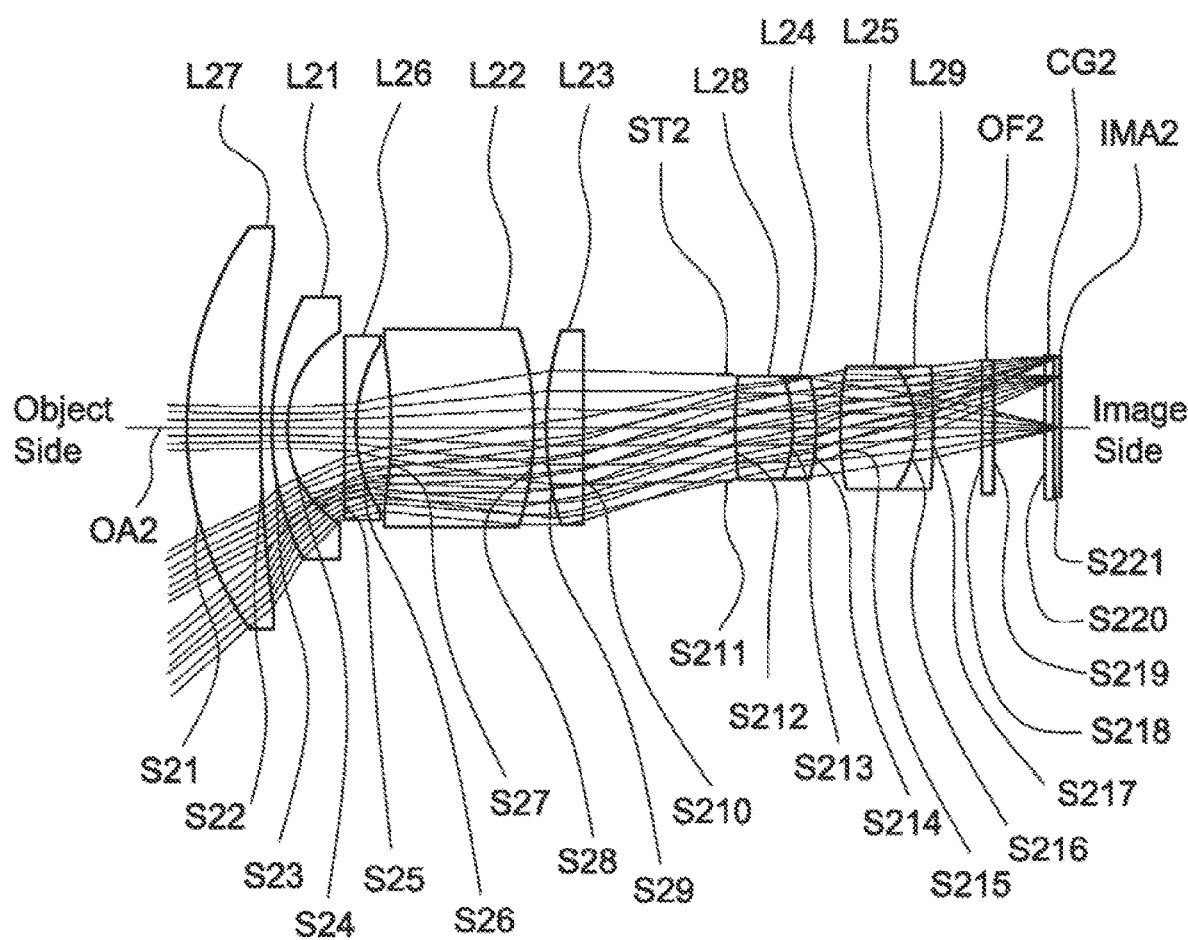
FIG. 3 is a lens layout diagram of a wide-angle lens assembly in accordance with a second embodiment of the invention.

Referring to FIG. 3, the wide-angle lens assembly 2 includes a seventh lens L27, a first lens L21, a sixth lens L26, a second lens L22, a third lens L23, a stop ST2, an eighth lens L28, a fourth lens L24, a fifth lens L25, a ninth lens L29, an optical filter OF2, and a cover glass CG2, all of which are arranged in order from an object side to an image side along an optical axis OA2. In operation, an image of light rays from the object side is formed at an image plane IMA2.

According to the foregoing, wherein: the seventh lens L27 is with positive refractive power; the sixth lens L26 is a meniscus lens with negative refractive power, wherein the object side surface S25 is a convex surface, the image side surface S26 is a concave surface, and the object side surface S25 and the image side surface S26 are spherical surfaces; the second lens L22 is a meniscus lens, wherein the object side surface S27 is a concave surface, the image side surface S28 is a convex surface, and the object side surface S27 and the image side surface S28 are spherical surfaces; the third lens L23 is a biconvex lens, wherein the image side surface S210 is a convex surface; the fourth lens L24 is a meniscus lens, wherein the image side surface S214 is a convex surface; the fifth lens L25 is a biconvex lens, wherein the object side surface S215 is a convex surface and the object side surface S215 and the image side surface S216 are spherical surfaces; the ninth lens L29 is a meniscus lens with negative refractive power and made of glass material, wherein the object side surface S216 is a concave surface, the image side surface S217 is a convex surface, and the object side surface S216 and the image side surface S217 are spherical surfaces; the fifth lens L25 cemented with the ninth lens L29; both of the object side surface S218 and image side surface S219 of the optical filter OF2 are plane surfaces;

and both of the object side surface S220 and image side surface S221 of the cover glass CG2 are plane surfaces.

With the above design of the lenses and stop ST2 and at least any one of the conditions (1)-(5) satisfied, the wide-angle lens assembly 2 can have an effective decreased total lens length, an effective decreased F-number, an effective increased resolution, an effective resisted environmental temperature change, an effective corrected aberration, and an effective corrected chromatic aberration.

If the value $TTL/R_1$ of condition (2) is greater than 2.6 then the total lens length is difficult to be shortened. Therefore, the value $TTL/R_{71}$ must be at least less than 2.6. An optimal range for $TTL/R_{71}$ is between 1.3 and 2.6. The wide-angle lens assembly has the optimal condition for miniaturization when satisfies the condition: $1.3<TTL/R_{71}<2.6$.

Table 3 shows the optical specification of the wide-angle lens assembly 2 in FIG. 3.

TABLE 3

Effective Focal Length = 4.93 mm F-number = 2.0
Total Lens Length = 48.81 mm Field of View = 81.720 degrees

| Surface Number | Radius of Curvature (mm) | Thickness (mm) | Nd | Vd | Effective Focal Length (mm) | Remark |
|---|---|---|---|---|---|---|
| S21 | 19.49 | 4.10 | 1.51 | 58.9 | 48.94 | The Seventh Lens L27 |
| S22 | 77.39 | 0.66 | | | | |
| S23 | 16.35 | 0.70 | 1.8 | 46.5 | −12.15 | The First Lens L21 |
| S24 | 6.01 | 3.20 | | | | |
| S25 | 290.60 | 0.68 | 2 | 19.3 | −8.55 | The Sixth Lens L26 |
| S26 | 8.40 | 1.91 | | | | |
| S27 | −29.35 | 7.89 | 1.62 | 39 | 58.248 | The Second Lens L22 |
| S28 | −17.99 | 0.66 | | | | |
| S29 | 18.15 | 2.16 | 1.96 | 24.1 | 17.543 | The Third Lens L23 |
| S210 | −256.99 | 7.82 | | | | |
| S211 | ∞ | 0.45 | | | | Stop ST2 |
| S212 | 24.18 | 3.20 | 1.61 | 63.4 | 8.831 | The Eighth Lens L28 |
| S213 | −6.72 | 1.19 | 1.8 | 25.4 | −15.75 | The Fourth Lens L24 |
| S214 | −15.29 | 1.42 | | | | |
| S215 | 16.51 | 4.17 | 1.67 | 55.5 | 6.561 | The Fifth Lens L25 |
| S216 | −5.49 | 0.86 | 1.78 | 25.6 | −7.643 | The Ninth Lens L29 |
| S217 | −64.58 | 2.80 | | | | |
| S218 | ∞ | 0.55 | 1.51 | 64.1 | | Optical Filter OF2 |
| S219 | ∞ | 2.86 | | | | |
| S220 | ∞ | 0.50 | 1.51 | 64.1 | | Cover Glass CG2 |
| S221 | ∞ | 0.40 | | | | |

Table 4 shows the parameters and condition values for conditions (1)-(5) in accordance with the second embodiment of the invention. It can be seen from Table 4 that the wide-angle lens assembly 2 of the second embodiment satisfies the conditions (1)-(5).

TABLE 4

| $f_{72}$ | −18.599 mm | $f_{62}$ | −13.133 mm | | |
|---|---|---|---|---|---|
| TTL/f | 9.773 | $TTL/R_{71}$ | 2.472 | $|f_{71}/f_{62}|$ | 1.416 |
| $Vd_7$ | 58.9 | $Vd_1$ | 46.5 | | |

By the above arrangements of the lenses and stop ST2, the wide-angle lens assembly 2 of the second embodiment can meet the requirements of optical performance as seen in FIGS. 4A-4G.

Figure 4A:
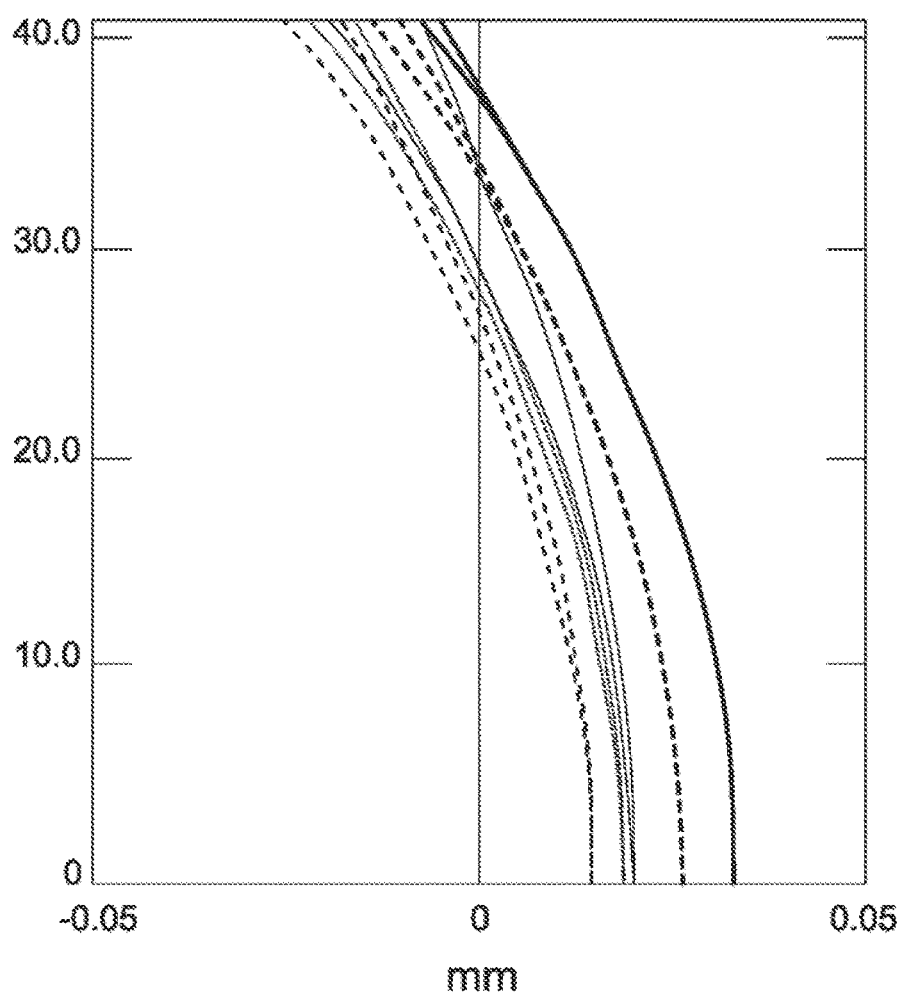
FIG. 4A depicts a field curvature diagram of the wide-angle lens assembly in accordance with the second embodiment of the invention.
Figure 4B:
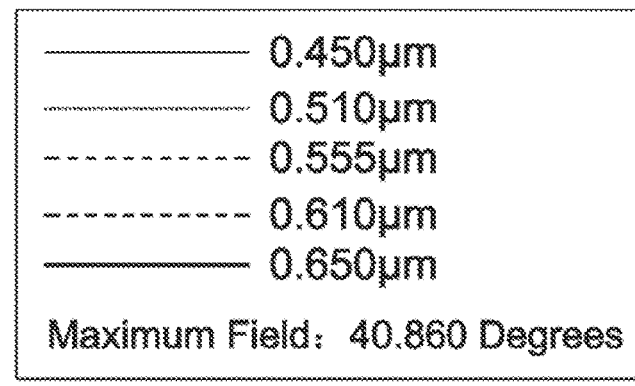
FIG. 4B is a distortion diagram of the wide-angle lens assembly in accordance with the second embodiment of the invention.
Figure 4B:
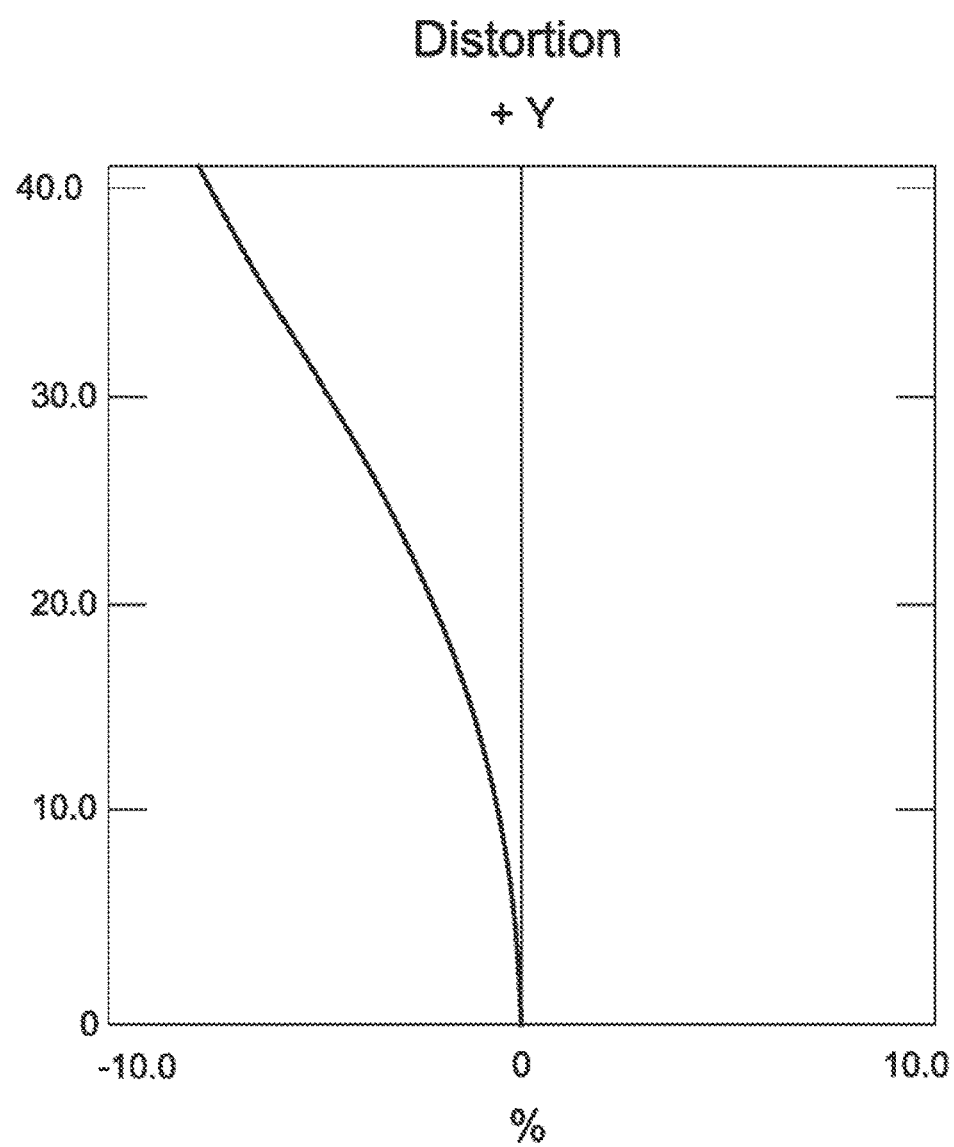
Figure 4C:
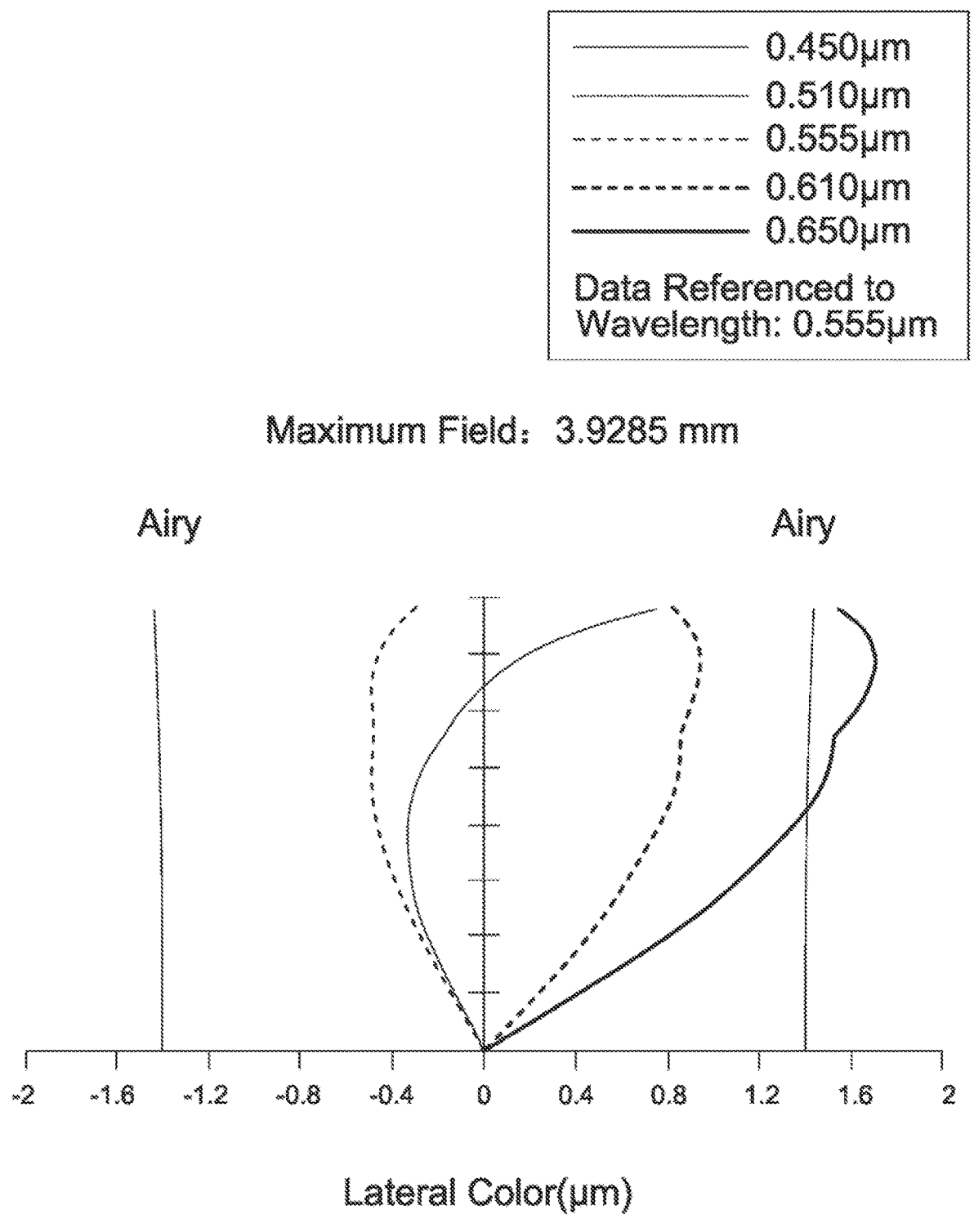
FIG. 4C is a lateral color diagram of the wide-angle lens assembly in accordance with the second embodiment of the invention.
Figure 4D:
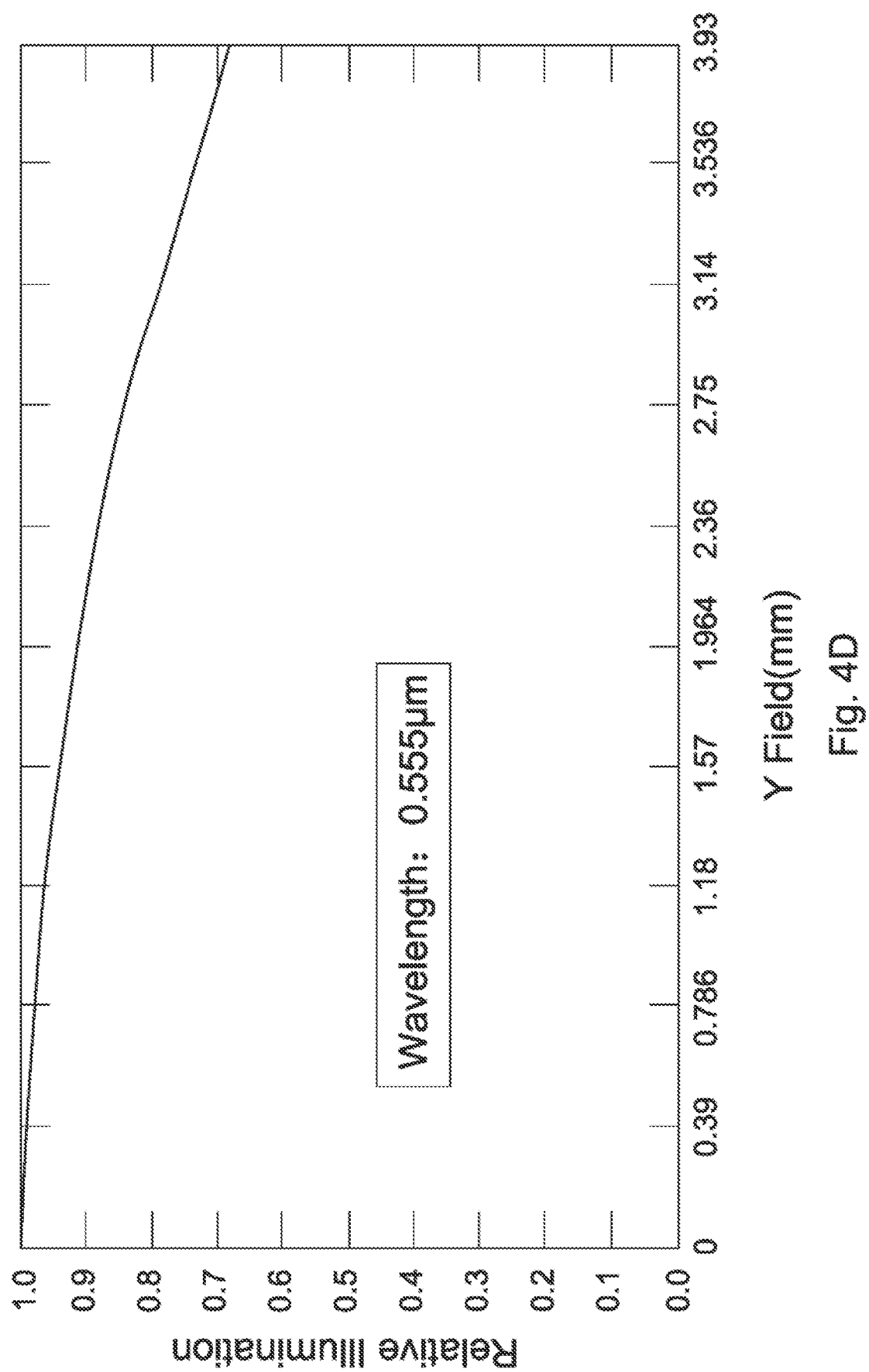
FIG. 4D is a relative illumination diagram of the wide-angle lens assembly in accordance with the second embodiment of the invention.
Figure 4E:
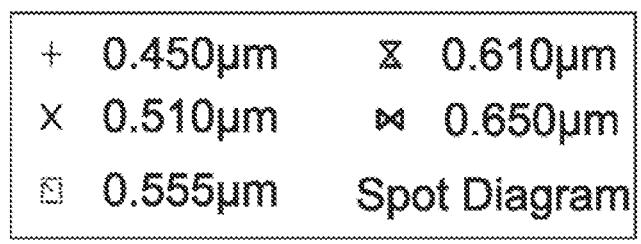
FIG. 4E is a spot diagram of the wide-angle lens assembly in accordance with the second embodiment of the invention.
Figure 4E:
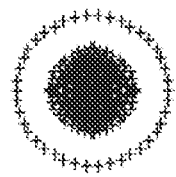
Figure 4E:
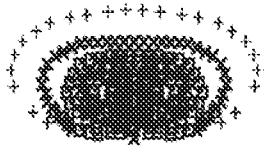
Figure 4E:
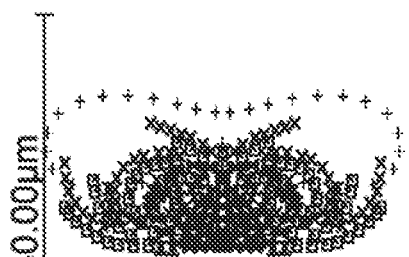
Figure 4F:
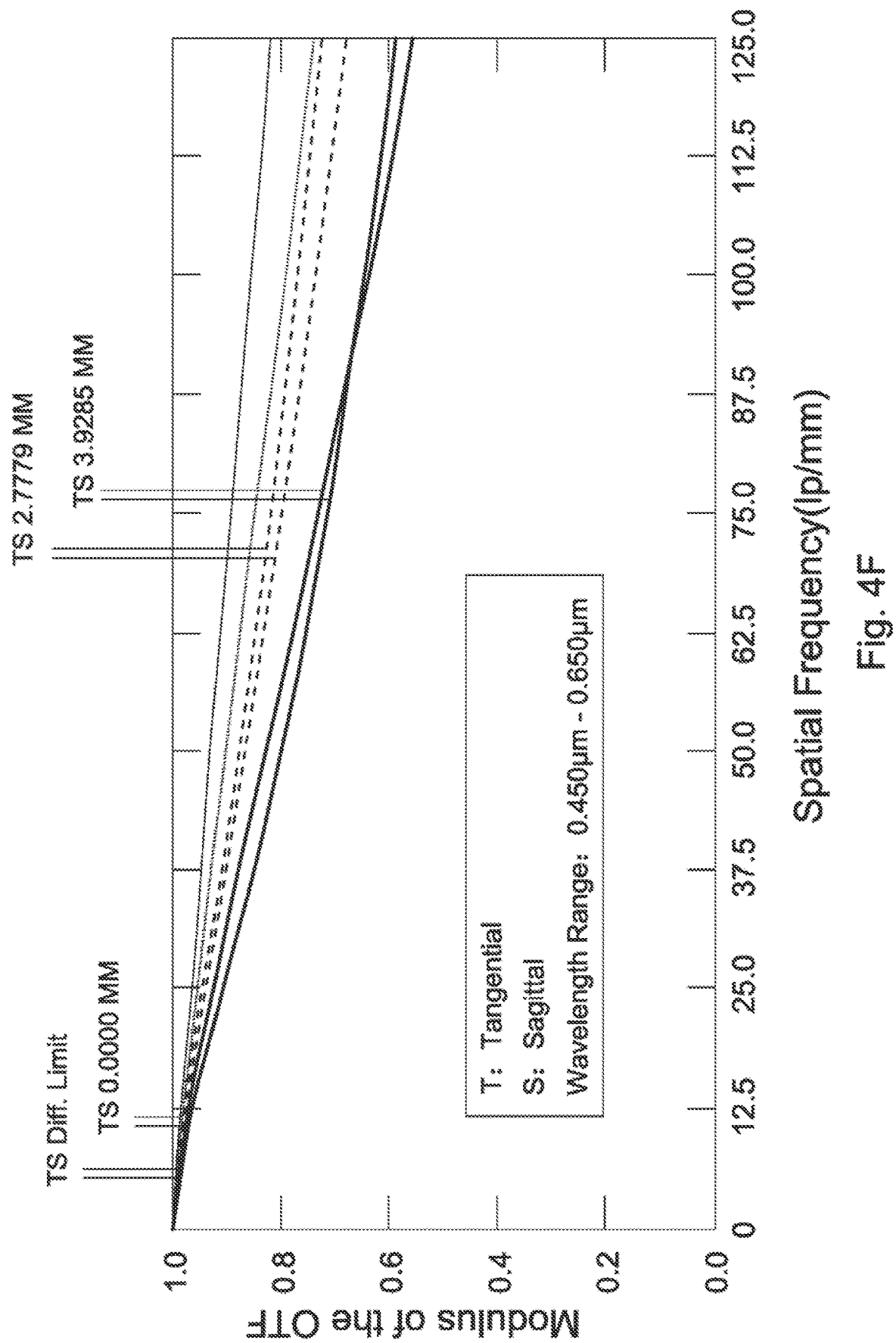
FIG. 4F is a modulation transfer function diagram of the wide-angle lens assembly in accordance with the second embodiment of the invention.
Figure 4G:
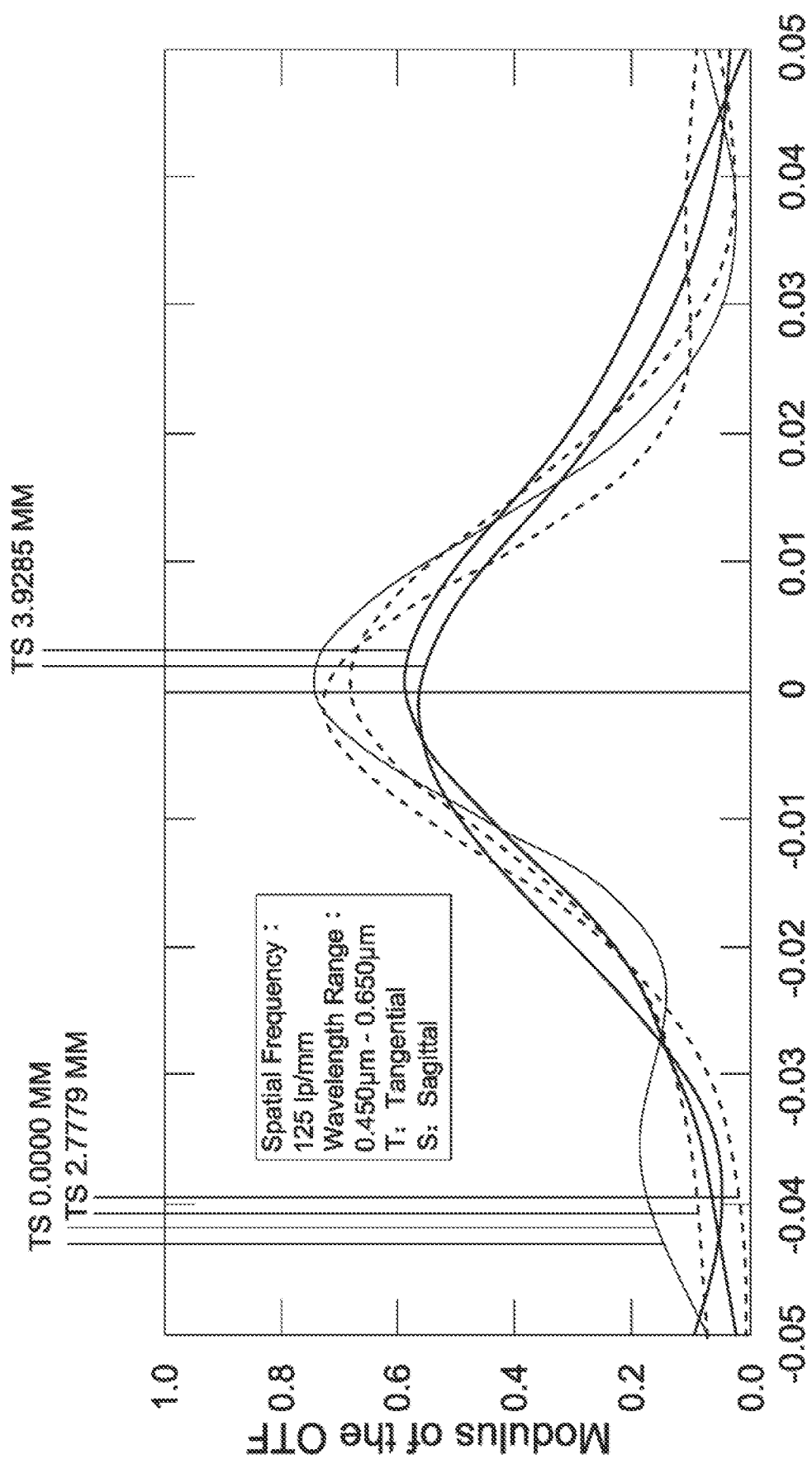
FIG. 4G is a through focus modulation transfer function diagram of the wide-angle lens assembly in accordance with the second embodiment of the invention.

It can be seen from FIG. 4A that the field curvature of tangential direction and sagittal direction in the wide-angle lens assembly 2 of the second embodiment ranges from −0.03 mm to 0.04 mm. It can be seen from FIG. 4B that the distortion in the wide-angle lens assembly 2 of the second embodiment ranges from −8% to 0%. It can be seen from FIG. 4C that the lateral color in the wide-angle lens assembly 2 of the second embodiment ranges from −0.5 μm to 1.7 μm. It can be seen from FIG. 4D that the relative illumination in the wide-angle lens assembly 2 of the second embodiment ranges from 0.68 to 1.0. It can be seen from FIG. 4E that the root mean square spot radius is equal to 1.192 μm and geometrical spot radius is equal to 6.500 μm as image height is equal to 0.000 mm, the root mean square spot radius is equal to 2.110 μm and geometrical spot radius is equal to 11.556 μm as image height is equal to 2.778 mm, and the root mean square spot radius is equal to 3.310 μm and geometrical spot radius is equal to 15.712 μm as image height is equal to 3.928 mm for the wide-angle lens assembly 2 of the second embodiment. It can be seen from FIG. 4F that the modulation transfer function of tangential direction and sagittal direction in the wide-angle lens assembly 2 of the second embodiment ranges from 0.55 to 1.0. It can be seen from FIG. 4G that the through focus modulation transfer function of tangential direction and sagittal direction in the wide-angle lens assembly 2 of the second embodiment ranges from 0.0 to 0.75 as focus shift ranges from −0.05 mm to 0.05 mm.

It is obvious that the field curvature, the distortion, and the lateral color of the wide-angle lens assembly 2 of the second embodiment can be corrected effectively, and the relative illumination, the resolution and the depth of focus of the wide-angle lens assembly 2 of the second embodiment can meet the requirement. Therefore, the wide-angle lens assembly 2 of the second embodiment is capable of good optical performance.

Figure 5:
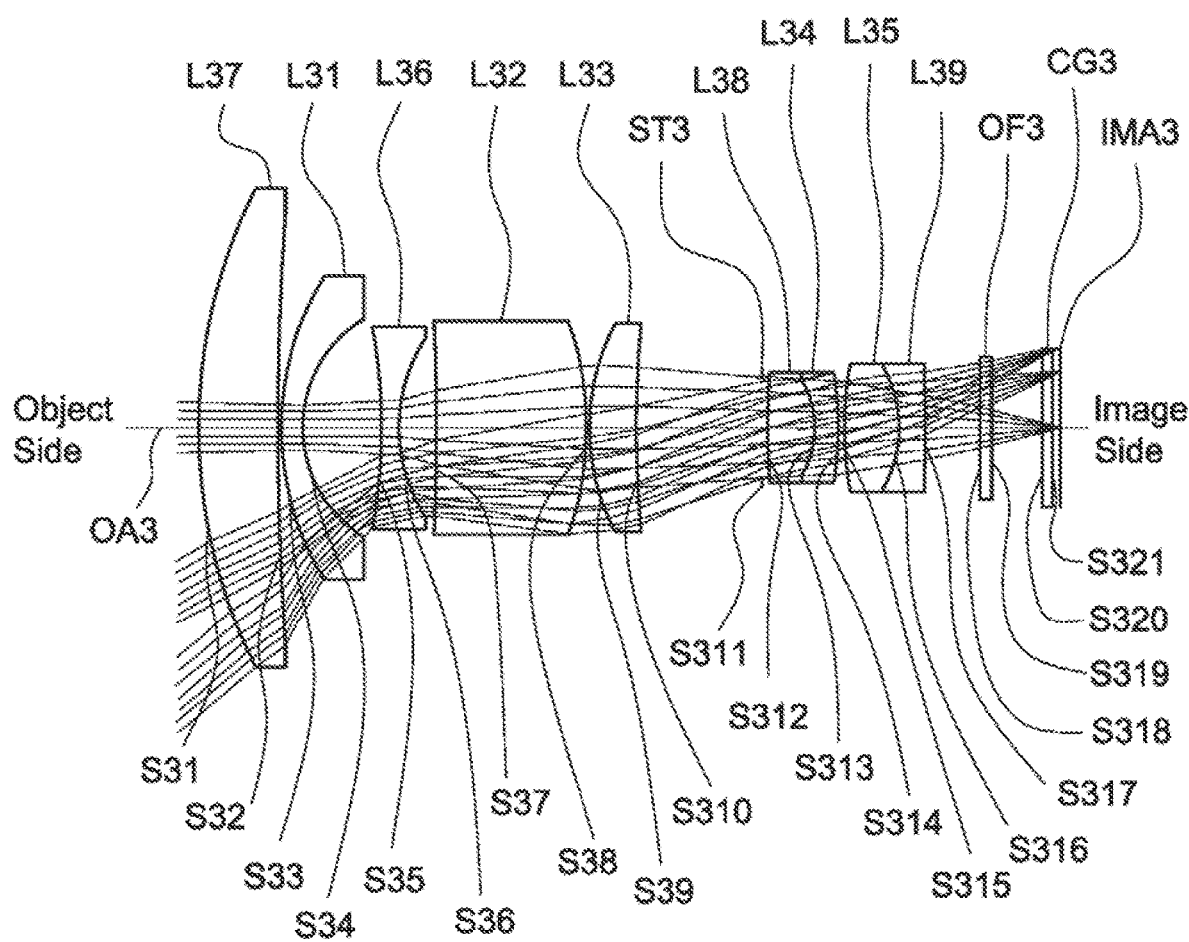
FIG. 5 is a lens layout diagram of a wide-angle lens assembly in accordance with a third embodiment of the invention.

Referring to FIG. 5, the wide-angle lens assembly 3 includes a seventh lens L37, a first lens L31, a sixth lens L36, a second lens L32, a third lens L33, a stop ST3, an eighth lens L38, a fourth lens L34, a fifth lens L35, a ninth lens L39, an optical filter OF3, and a cover glass CG3, all of which are arranged in order from an object side to an image side along an optical axis OA3. In operation, an image of light rays from the object side is formed at an image plane IMA3.

According to the foregoing, wherein: the seventh lens L37 is with positive refractive power; the sixth lens L36 is a biconcave lens with negative refractive power, wherein the object side surface S35 is a concave surface, the image side surface S36 is a concave surface, and the object side surface S35 and the image side surface S36 are spherical surfaces; the second lens L32 is a meniscus lens, wherein the object side surface S37 is a concave surface, the image side surface S38 is a convex surface, and the object side surface S37 and the image side surface S38 are spherical surfaces; the third lens L33 is a meniscus lens, wherein the image side surface S310 is a concave surface; the fourth lens L34 is a meniscus lens, wherein the image side surface S314 is a convex surface; the fifth lens L35 is a biconvex lens, wherein the object side surface S315 is a convex surface and the object side surface S315 and the image side surface S316 are spherical surfaces; the ninth lens L39 is a meniscus lens with negative refractive power and made of glass material, wherein the object side surface S316 is a concave surface, the image side surface S317 is a convex surface, and the object side surface S316 and the image side surface S317 are spherical surfaces; the fifth lens L35 cemented with the ninth lens L39; both of the object side surface S318 and image side surface S319 of the optical filter OF3 are plane surfaces; and both of the object side surface S320 and image side surface S321 of the cover glass CG3 are plane surfaces.

With the above design of the lenses and stop ST3 and at least any one of the conditions (1)-(5) satisfied, the wide-angle lens assembly 3 can have an effective decreased total lens length, an effective decreased F-number, an effective increased resolution, an effective resisted environmental temperature change, an effective corrected aberration, and an effective corrected chromatic aberration.

If the value $|f_{71}/f_{62}|$ of condition (3) is greater than 1.7 then the ability to balance the refractive power distribution of the object side and the middle section of the wide-angle lens is decreased. Therefore, the value $|f_{71}/f_{62}|$ must be at least less than 1.7. An optimal range for $|f_{71}/f_{62}|$ is between 0.03 and 1.7. The wide-angle lens assembly has the optimal condition for effective controlled field of view when satisfies the condition: $0.03 < |f_{71}/f_{62}| < 1.7$.

Table 5 shows the optical specification of the wide-angle lens assembly 3 in FIG. 5.

TABLE 5

Effective Focal Length = 4.93 mm F-number = 2.0
Total Lens Length = 43 mm Field of View = 81.686 degrees

| Surface Number | Radius of Curvature (mm) | Thickness (mm) | Nd | Vd | Effective Focal Length (mm) | Remark |
|---|---|---|---|---|---|---|
| S31 | 26.48 | 4.00 | 1.56 | 62.9 | 54.51 | The Seventh Lens L37 |
| S32 | 168.42 | 0.11 | | | | |
| S33 | 14.10 | 1.12 | 1.77 | 49.5 | −15.02 | The First Lens L31 |
| S34 | 6.16 | 3.89 | | | | |
| S35 | −29.35 | 0.85 | 1.92 | 20.8 | −6.70 | The Sixth Lens L36 |
| S36 | 8.03 | 1.86 | | | | |
| S37 | −125.57 | 7.57 | 1.61 | 49.8 | 25.194 | The Second Lens L32 |
| S38 | −14.21 | 0.10 | | | | |
| S39 | 11.38 | 2.33 | 1.92 | 23.9 | 15.138 | The Third Lens L33 |
| S310 | 53.89 | 6.32 | | | | |
| S311 | ∞ | 0.27 | | | | Stop ST3 |
| S312 | 40.80 | 2.29 | 1.61 | 63.3 | 7.383 | The Eighth Lens L38 |
| S313 | −5.04 | 1.20 | 1.78 | 26.2 | −10.752 | The Fourth Lens L34 |
| S314 | −13.71 | 0.28 | | | | |
| S315 | 13.66 | 2.79 | 1.67 | 55.3 | 6.334 | The Fifth Lens L35 |
| S316 | −5.77 | 1.21 | 1.8 | 25.4 | −7.771 | The Ninth Lens L39 |
| S317 | −75.24 | 2.80 | | | | |
| S318 | ∞ | 0.55 | 1.51 | 64.1 | | Optical Filter OF3 |
| S319 | ∞ | 2.55 | | | | |
| S320 | ∞ | 0.50 | 1.51 | 64.1 | | Cover Glass CG3 |
| S321 | ∞ | 0.40 | | | | |

Table 6 shows the parameters and condition values for conditions (1)-(5) in accordance with the third embodiment of the invention. It can be seen from Table 6 that the wide-angle lens assembly 3 of the third embodiment satisfies the conditions (1)-(5).

TABLE 6

| $f_{71}$ | −23.259 mm | $f_{62}$ | −14.807 mm | | |
|---|---|---|---|---|---|
| TTL/f | 8.722 | $TTL/R_{71}$ | 1.624 | $\|f_{71}/f_{62}\|$ | 1.571 |
| $Vd_7$ | 62.9 | $Vd_1$ | 49.5 | | |

By the above arrangements of the lenses and stop ST3, the wide-angle lens assembly 3 of the third embodiment can meet the requirements of optical performance as seen in FIGS. 6A-6G.

Figure 6A:
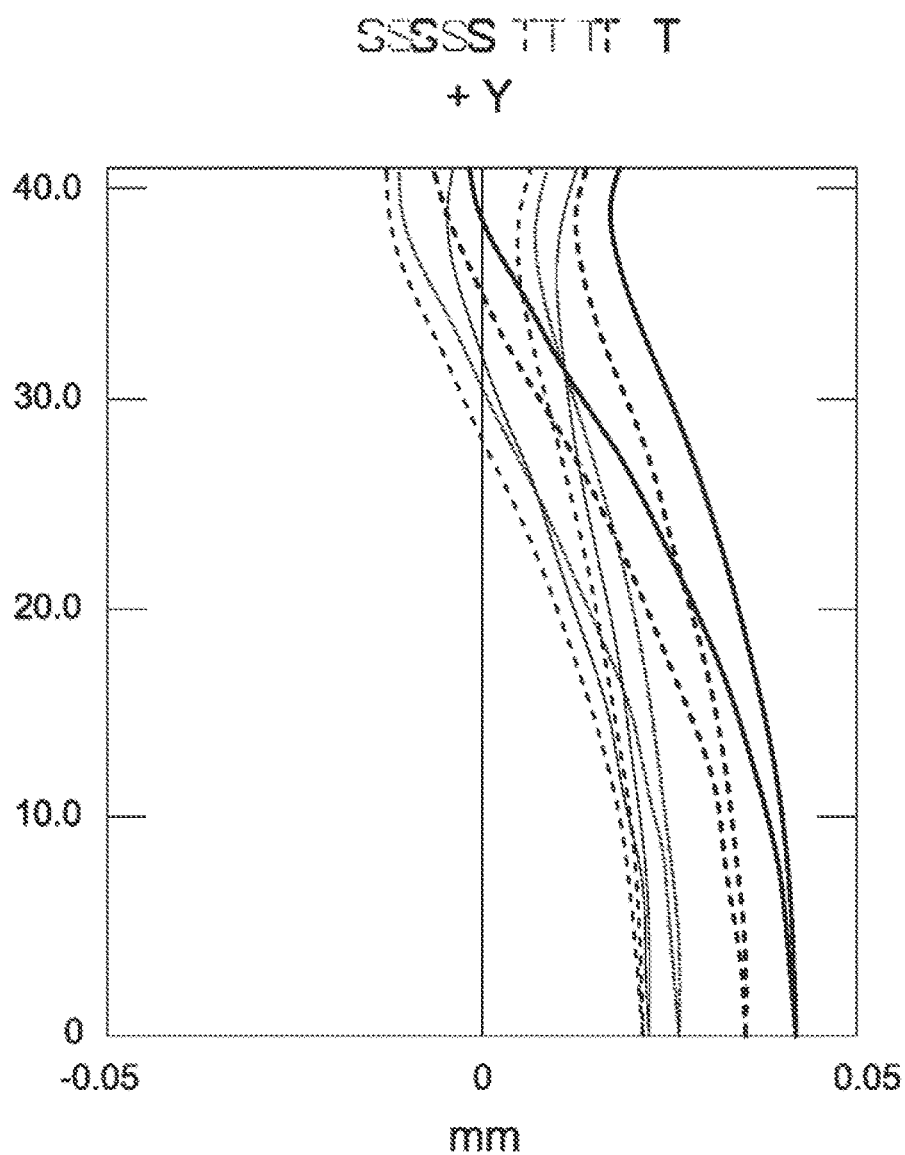
FIG. 6A depicts a field curvature diagram of the wide-angle lens assembly in accordance with the third embodiment of the invention.
Figure 6B:
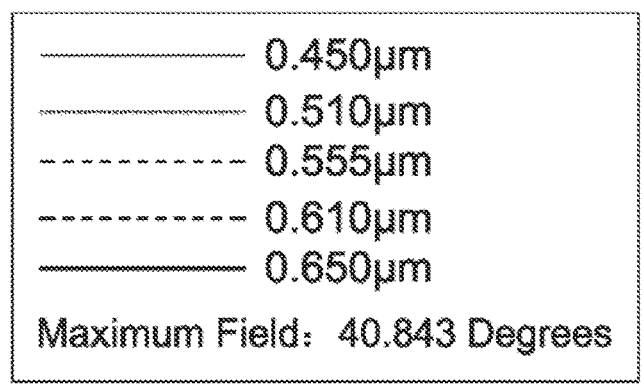
FIG. 6B is a distortion diagram of the wide-angle lens assembly in accordance with the third embodiment of the invention.
Figure 6B:
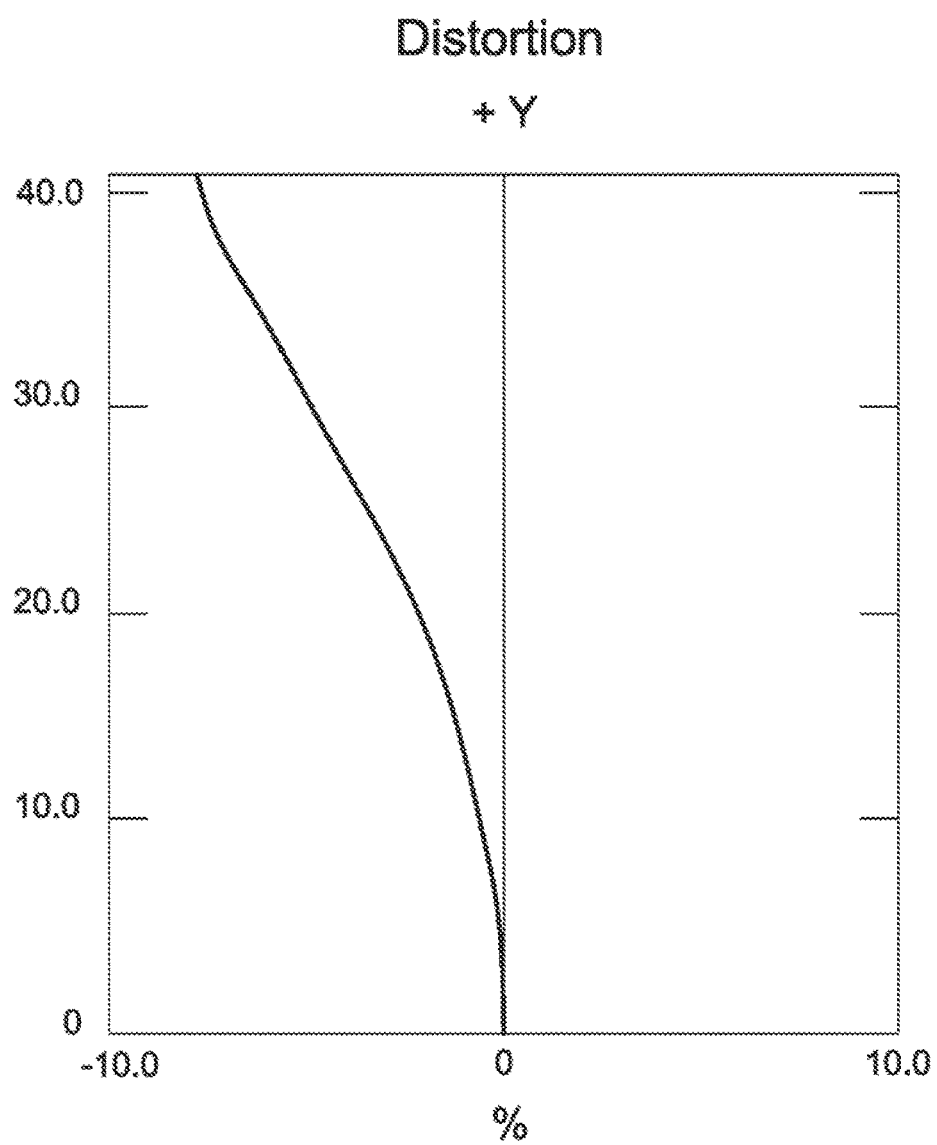
Figure 6C:
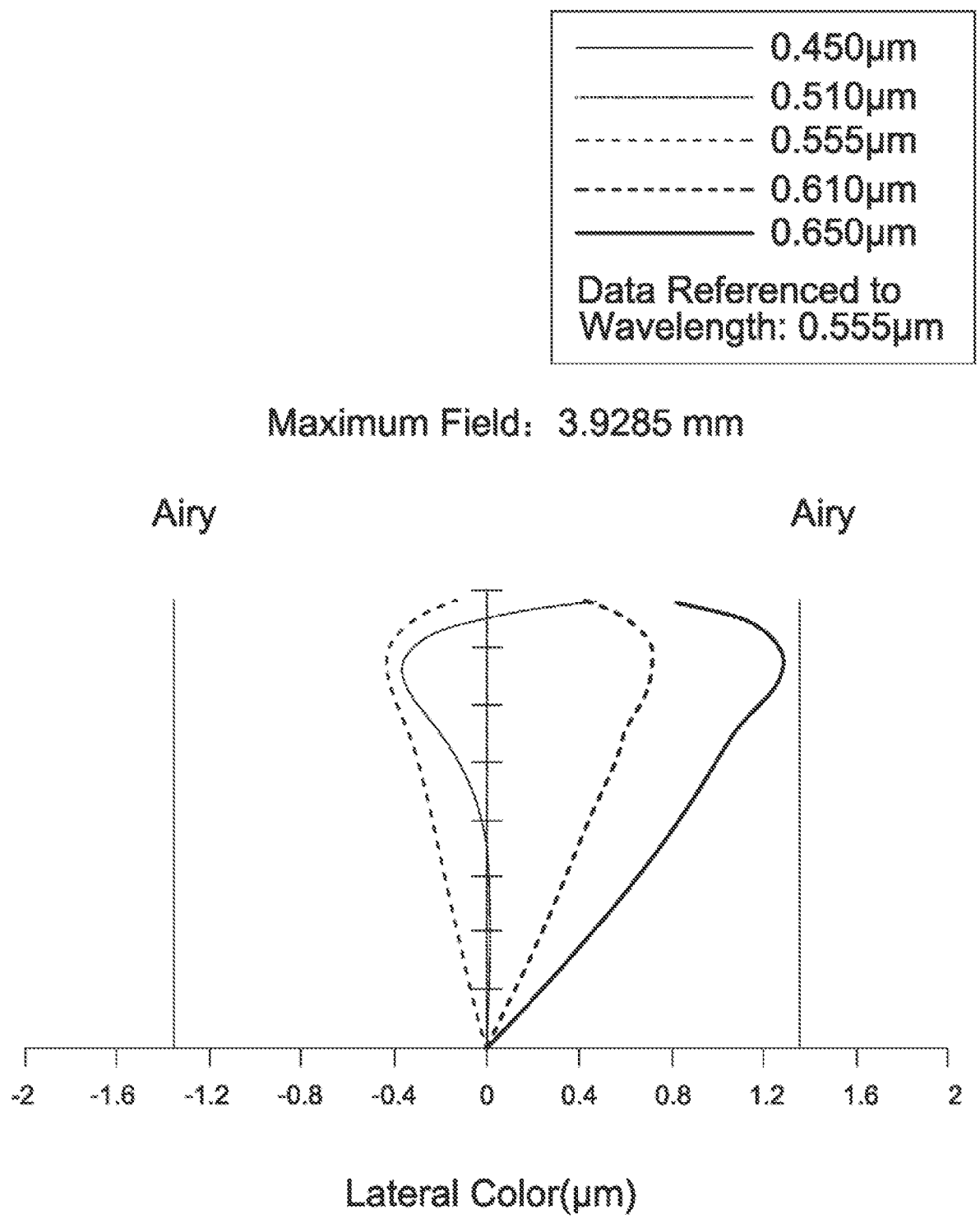
FIG. 6C is a lateral color diagram of the wide-angle lens assembly in accordance with the third embodiment of the invention.
Figure 6D:
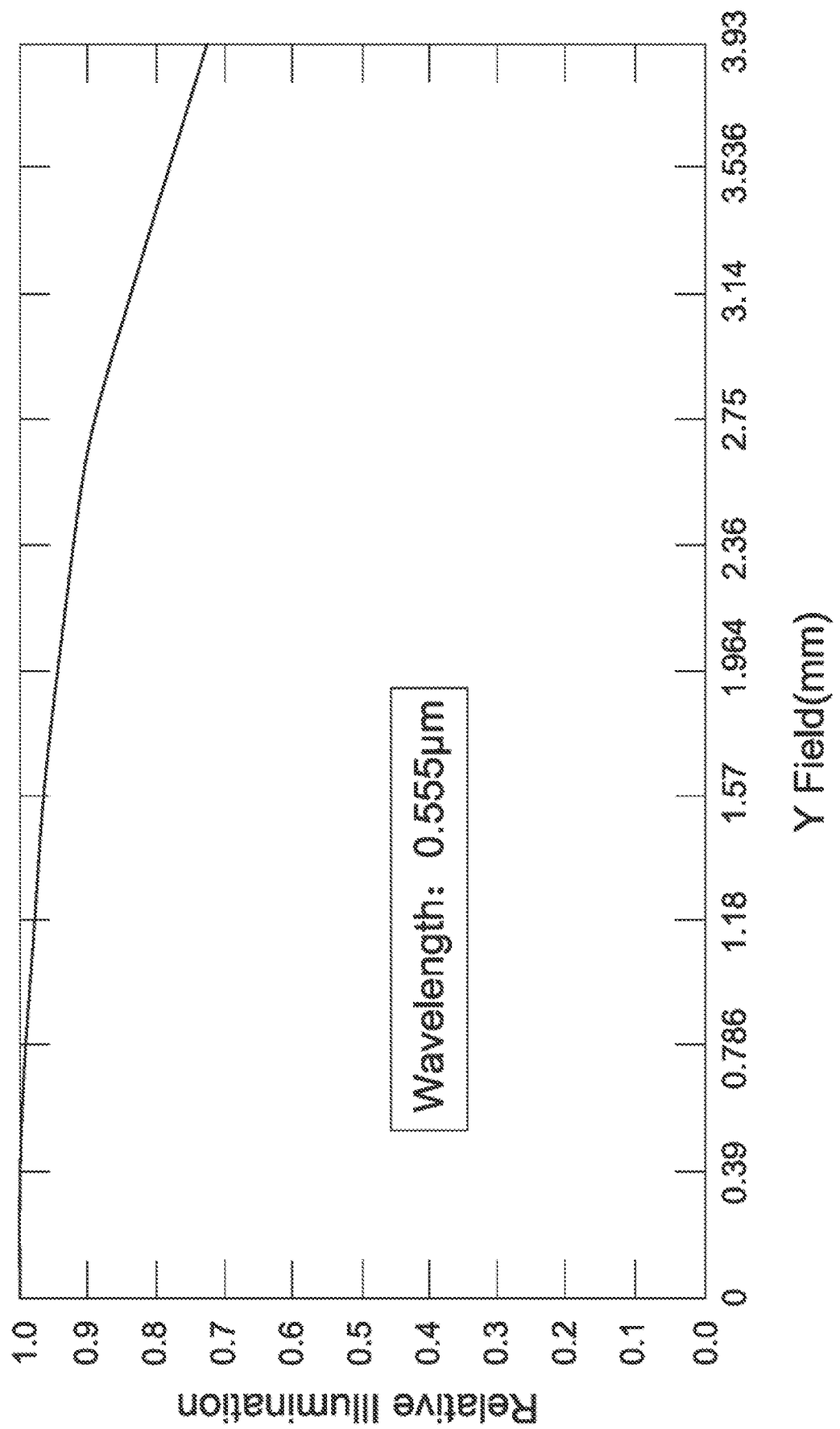
FIG. 6D is a relative illumination diagram of the wide-angle lens assembly in accordance with the third embodiment of the invention.
Figure 6E:
FIG. 6E is a spot diagram of the wide-angle lens assembly in accordance with the third embodiment of the invention.
Figure 6E:
Figure 6E:
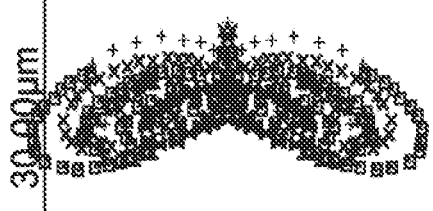
Figure 6F:
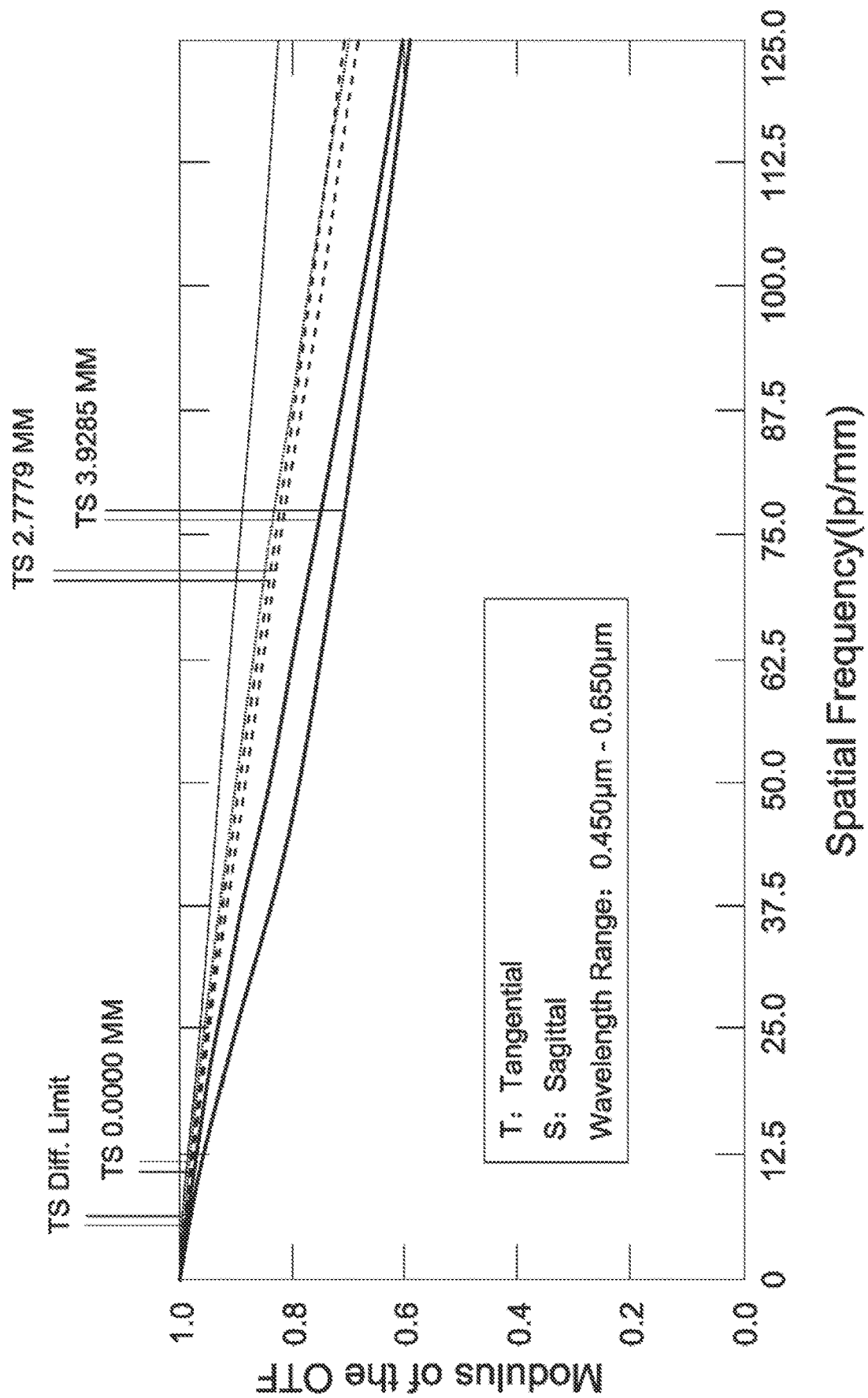
FIG. 6F is a modulation transfer function diagram of the wide-angle lens assembly in accordance with the third embodiment of the invention.
Figure 6G:
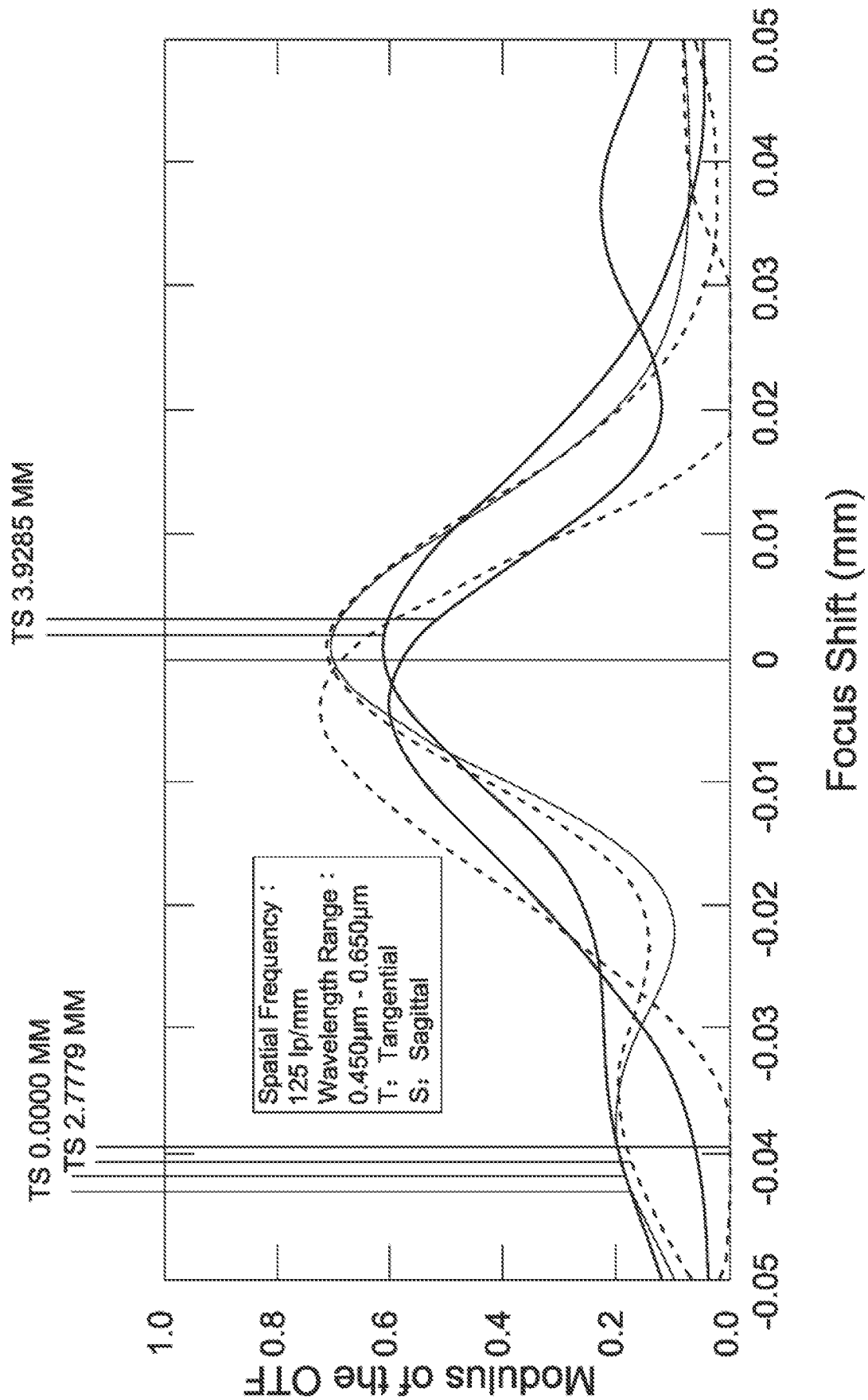
FIG. 6G is a through focus modulation transfer function diagram of the wide-angle lens assembly in accordance with the third embodiment of the invention.

It can be seen from FIG. 6A that the field curvature of tangential direction and sagittal direction in the wide-angle lens assembly 3 of the third embodiment ranges from −0.02 mm to 0.05 mm. It can be seen from FIG. 6B that the distortion in the wide-angle lens assembly 3 of the third embodiment ranges from −8% to 0%. It can be seen from FIG. 6C that the lateral color in the wide-angle lens assembly 3 of the third embodiment ranges from −0.5 μm to 1.3 μm. It can be seen from FIG. 6D that the relative illumination in the wide-angle lens assembly 3 of the third embodiment ranges from 0.73 to 1.0. It can be seen from FIG. 6E that the root mean square spot radius is equal to 1.141 μm and geometrical spot radius is equal to 2.847 μm as image height is equal to 0.000 mm, the root mean square spot radius is equal to 1.816 μm and geometrical spot radius is equal to 8.275 μm as image height is equal to 2.778 mm, and the root mean square spot radius is equal to 3.448 μm and geometrical spot radius is equal to 16.413 μm as image height is equal to 3.928 mm for the wide-angle lens assembly 3 of the third embodiment. It can be seen from FIG. 6F that the modulation transfer function of tangential direction and sagittal direction in the wide-angle lens assembly 3 of the third embodiment ranges from 0.58 to 1.0. It can be seen from FIG. 6G that the through focus modulation transfer function of tangential direction and sagittal direction in the wide-angle lens assembly 3 of the third embodiment ranges from 0.0 to 0.72 as focus shift ranges from −0.05 mm to 0.05 mm.

It is obvious that the field curvature, the distortion, and the lateral color of the wide-angle lens assembly 3 of the third embodiment can be corrected effectively, and the relative illumination, the resolution and the depth of focus of the wide-angle lens assembly 3 of the third embodiment can meet the requirement. Therefore, the wide-angle lens assembly 3 of the third embodiment is capable of good optical performance.

Figure 7:
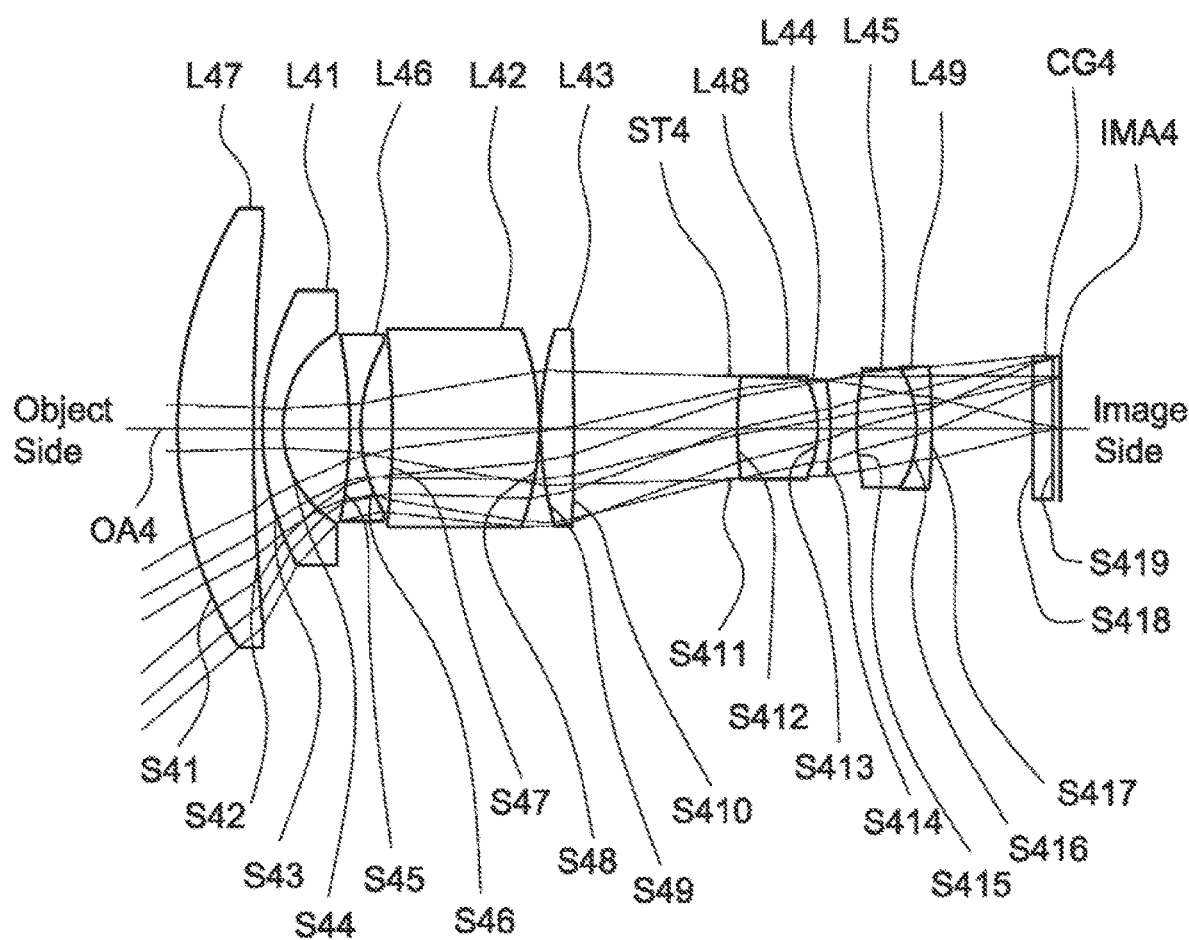
FIG. 7 is a lens layout diagram of a wide-angle lens assembly in accordance with a fourth embodiment of the invention.

Referring to FIG. 7, the wide-angle lens assembly 4 includes a seventh lens L47, a first lens L41, a sixth lens L46, a second lens L42, a third lens L43, a stop ST4, an eighth lens L48, a fourth lens L44, a fifth lens L45, a ninth lens L49, and a cover glass CG4, all of which are arranged in order from an object side to an image side along an optical axis OA4. In operation, an image of light rays from the object side is formed at an image plane IMA4.

According to the foregoing, wherein: the seventh lens L47 is with positive refractive power; the sixth lens L46 is a biconcave lens with negative refractive power, wherein the object side surface S45 is a concave surface, the image side surface S46 is a concave surface, and the object side surface S45 and the image side surface S46 are spherical surfaces; the second lens L42 is a meniscus lens, wherein the object side surface S47 is a concave surface, the image side surface S48 is a convex surface, and the object side surface S47 and the image side surface S48 are spherical surfaces; the third lens L43 is a biconvex lens, wherein the image side surface S410 is a convex surface; the fourth lens L44 is a meniscus lens, wherein the image side surface S414 is a convex surface; the fifth lens L45 is a biconvex lens, wherein the object side surface S415 is a convex surface and the object side surface S415 and the image side surface S416 are spherical surfaces; the ninth lens L49 is a meniscus lens with negative refractive power and made of glass material, wherein the object side surface S416 is a concave surface, the image side surface S417 is a convex surface, and the object side surface S416 and the image side surface S417 are spherical surfaces; the fifth lens L45 cemented with the ninth lens L49; and both of the object side surface S418 and image side surface S419 of the cover glass CG4 are plane surfaces.

With the above design of the lenses and stop ST4 and at least any one of the conditions (1)-(5) satisfied, the wide-angle lens assembly 4 can have an effective decreased total lens length, an effective decreased F-number, an effective increased resolution, an effective resisted environmental temperature change, an effective corrected aberration, and an effective corrected chromatic aberration.

If the value $Vd_7$ of condition (4) is less than 30 then the ability of achromatic function is poor. Therefore, the value $Vd_7$ must be at least greater than 30. An optimal range for $Vd_7$ is between 30 and 64.3. The wide-angle lens assembly has the optimal condition for effective reduced chromatic aberration when satisfies the condition: $30<Vd_7<64.3$.

Table 7 shows the optical specification of the wide-angle lens assembly 4 in FIG. 7.

By the above arrangements of the lenses and stop ST4, the wide-angle lens assembly 4 of the fourth embodiment can meet the requirements of optical performance as seen in FIGS. 8A-8G.

Figure 8A:
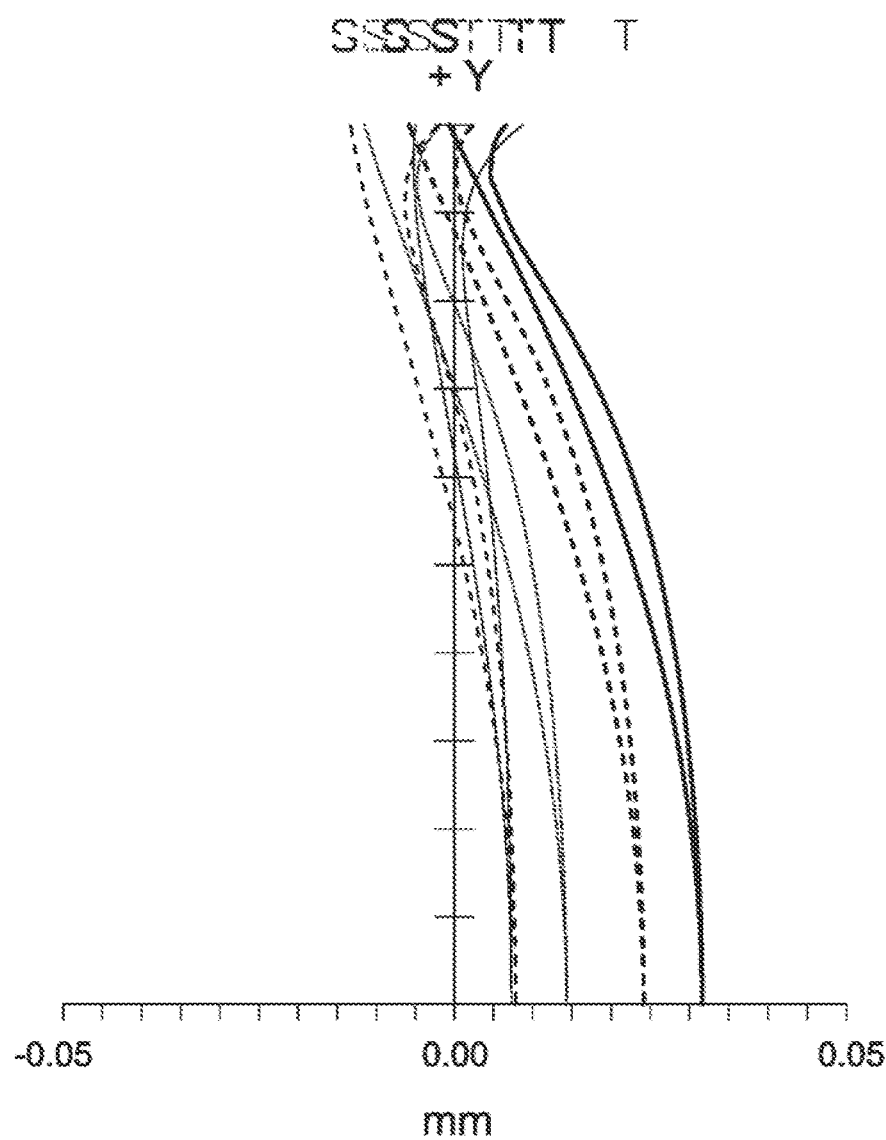
FIG. 8A depicts a field curvature diagram of the wide-angle lens assembly in accordance with the fourth embodiment of the invention.
Figure 8B:
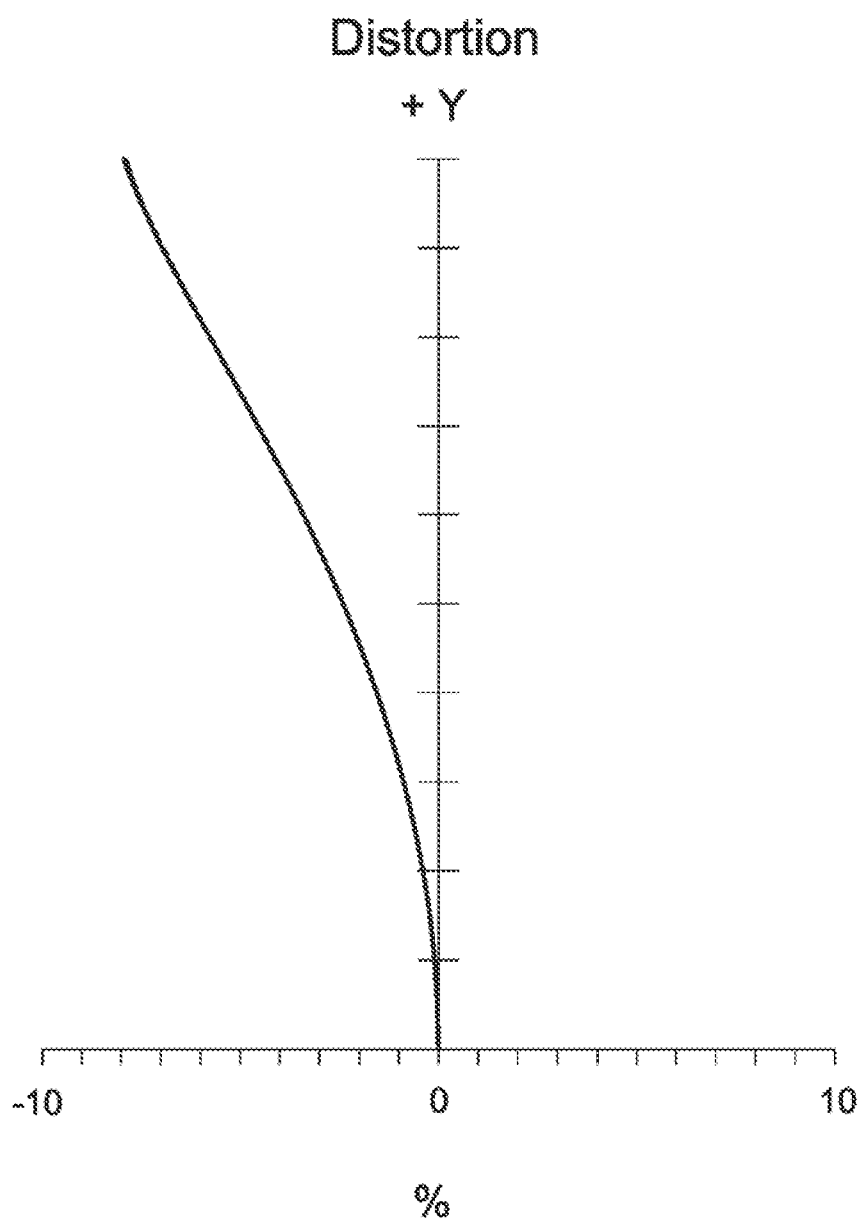
FIG. 8B is a distortion diagram of the wide-angle lens assembly in accordance with the fourth embodiment of the invention.
Figure 8C:
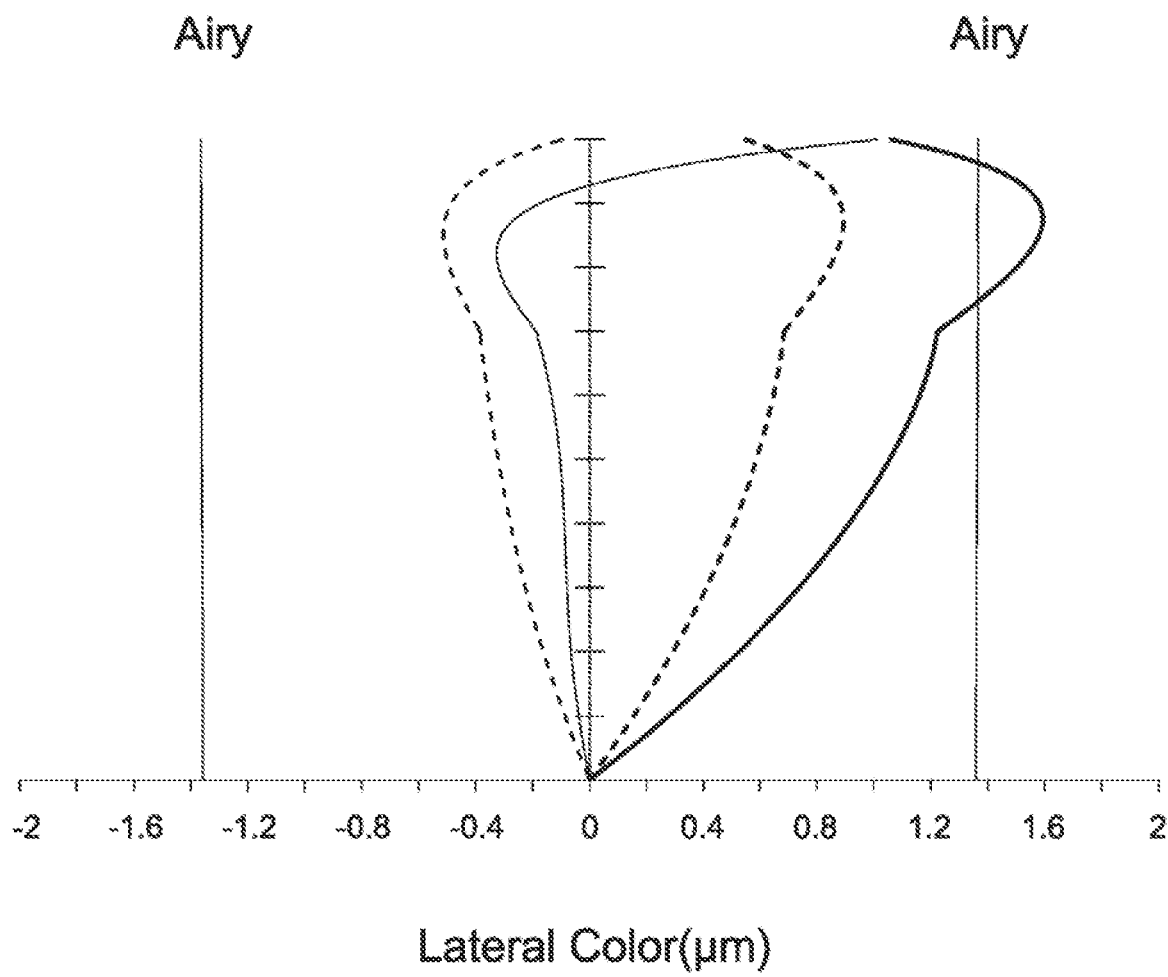
FIG. 8C is a lateral color diagram of the wide-angle lens assembly in accordance with the fourth embodiment of the invention.
Figure 8D:
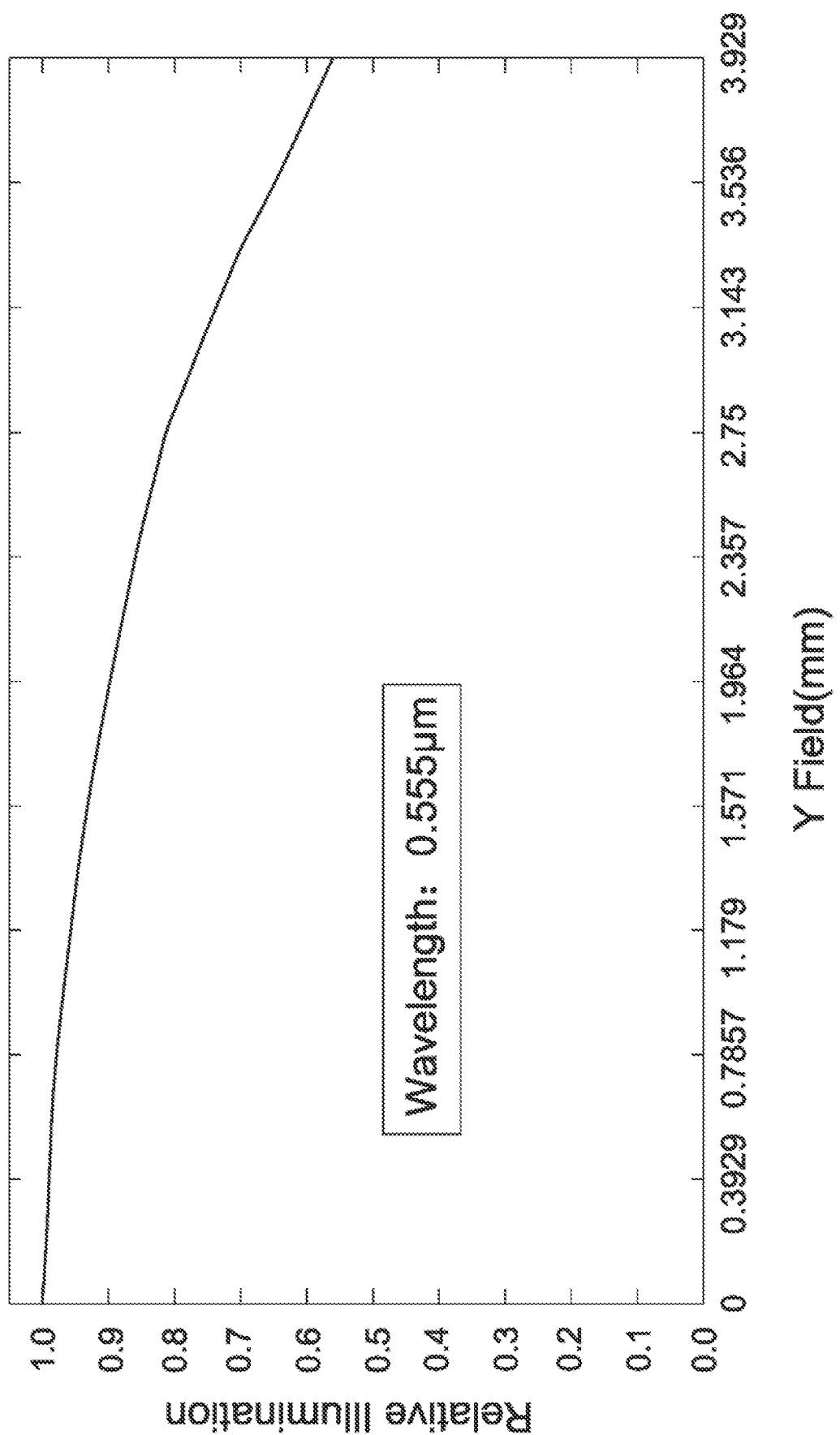
FIG. 8D is a relative illumination diagram of the wide-angle lens assembly in accordance with the fourth embodiment of the invention.
Figure 8E:
FIG. 8E is a spot diagram of the wide-angle lens assembly in accordance with the fourth embodiment of the invention.
Figure 8E:
Figure 8E:
Figure 8F:
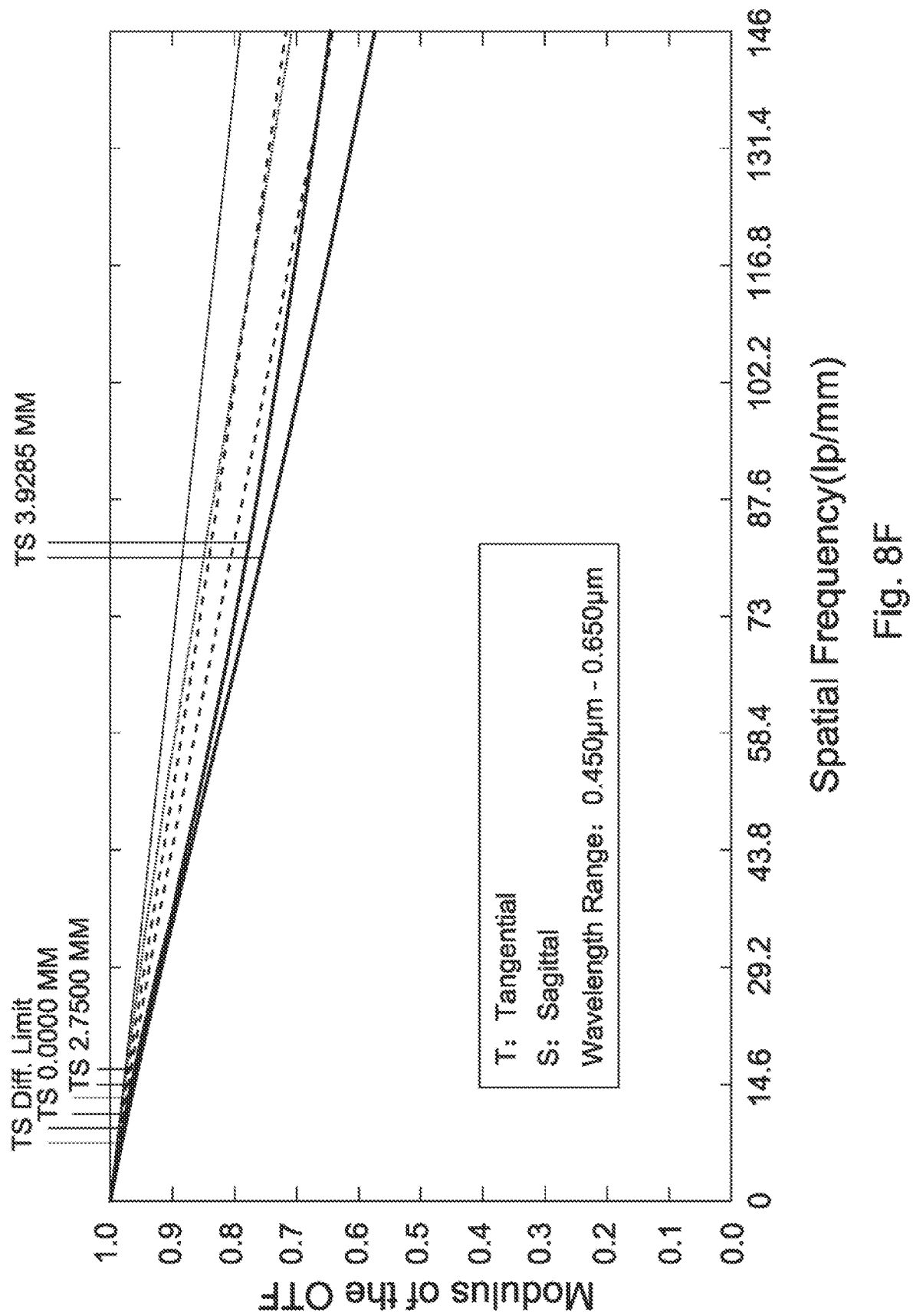
FIG. 8F is a modulation transfer function diagram of the wide-angle lens assembly in accordance with the fourth embodiment of the invention.
Figure 8G:
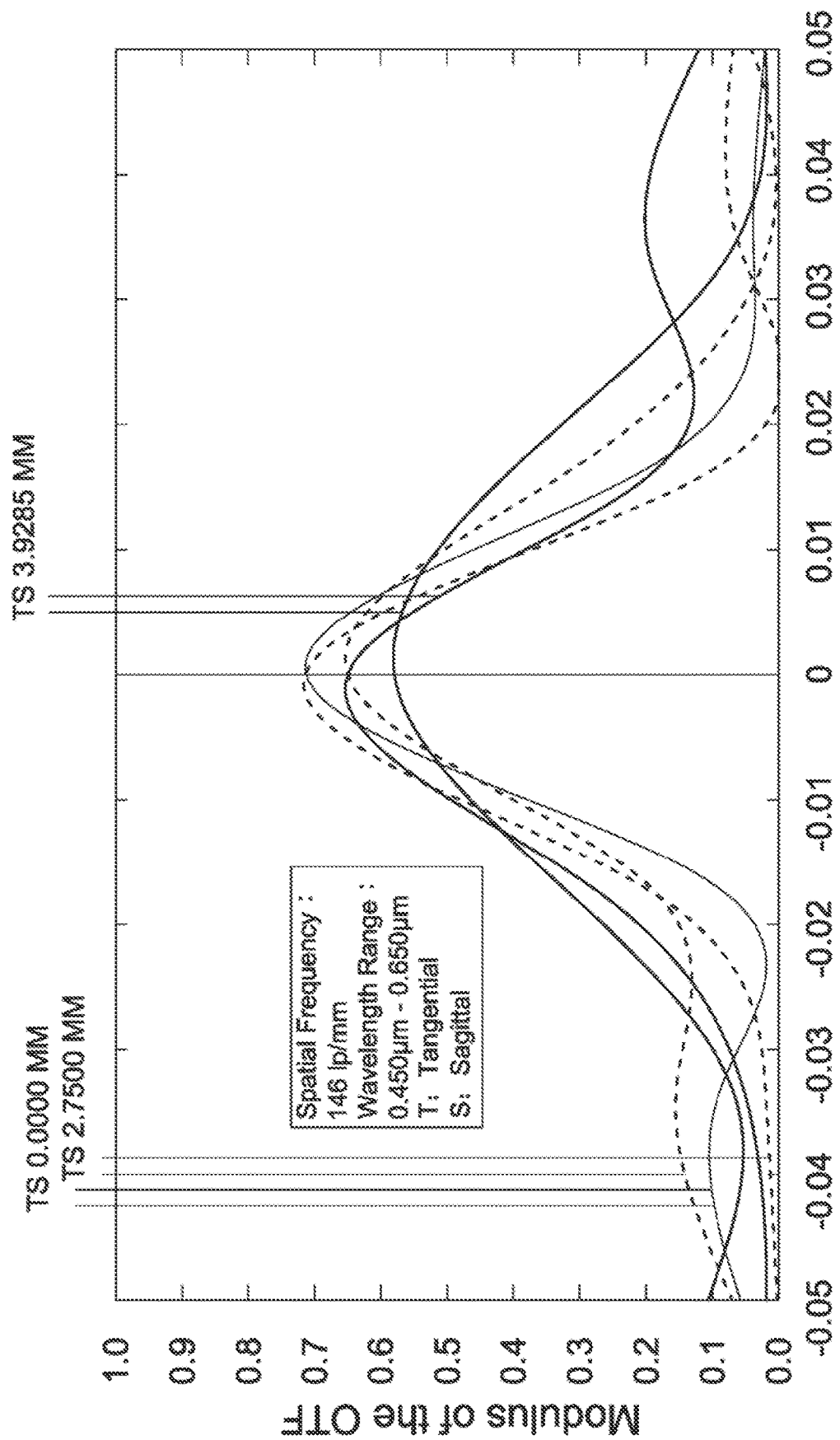
FIG. 8G is a through focus modulation transfer function diagram of the wide-angle lens assembly in accordance with the fourth embodiment of the invention.

It can be seen from FIG. 8A that the field curvature of tangential direction and sagittal direction in the wide-angle lens assembly 4 of the fourth embodiment ranges from −0.015 mm to 0.035 mm. It can be seen from FIG. 8B that the distortion in the wide-angle lens assembly 4 of the fourth embodiment ranges from −8% to 0%. It can be seen from FIG. 8C that the lateral color in the wide-angle lens assembly 4 of the fourth embodiment ranges from −0.6 µm to 1.6 µm. It can be seen from FIG. 8D that the relative illumination in the wide-angle lens assembly 4 of the fourth embodiment ranges from 0.58 to 1.0. It can be seen from FIG. 8E that the root mean square spot radius is equal to 0.824 µm and geometrical spot radius is equal to 3.083 µm as image height is equal to 0.000 mm, the root mean square spot radius is equal to 1.389 µm and geometrical spot radius is equal to 6.870 µm as image height is equal to 2.750 mm, and the root mean square spot radius is equal to 1.973 µm and geometrical spot radius is equal to 11.821 µm as image height is equal to 3.928 mm for the wide-angle lens assembly 4 of the fourth embodiment. It can be seen from FIG. 8F that the modulation transfer function of tangential direction and sagittal direction in the wide-angle lens assembly 4 of

TABLE 7

Effective Focal Length = 4.93 mm F-number = 2.0
Total Lens Length = 47.86 mm Field of View = 81.704 degrees

| Surface Number | Radius of Curvature (mm) | Thickness (mm) | Nd | Vd | Effective Focal Length (mm) | Remark |
|---|---|---|---|---|---|---|
| S41 | 23.37 | 4.05 | 1.58 | 61.2 | 48.90 | The Seventh Lens L47 |
| S42 | 114.31 | 0.57 | | | | |
| S43 | 15.78 | 1.06 | 1.77 | 49.5 | −13.34 | The First Lens L41 |
| S44 | 6.06 | 3.59 | | | | |
| S45 | −27.28 | 0.67 | 1.92 | 20.8 | −7.37 | The Sixth Lens L46 |
| S46 | 9.28 | 1.65 | | | | |
| S47 | −39.56 | 7.93 | 1.65 | 56.1 | 36.006 | The Second Lens L42 |
| S48 | −15.92 | 0.09 | | | | |
| S49 | 18.02 | 1.83 | 1.92 | 23.9 | 17.744 | The Third Lens L43 |
| S410 | −181.85 | 8.45 | | | | |
| S411 | ∞ | 0.48 | | | | Stop ST4 |
| S412 | 25.34 | 4.30 | 1.61 | 63.3 | 8.805 | The Eighth Lens L48 |
| S413 | −6.50 | 0.71 | 1.8 | 25.4 | −14.562 | The Fourth Lens L44 |
| S414 | −15.19 | 1.43 | | | | |
| S415 | 14.73 | 3.27 | 1.67 | 55.1 | 6.879 | The Fifth Lens L45 |
| S416 | −6.24 | 0.82 | 1.78 | 25.6 | −8.852 | The Ninth Lens L49 |
| S417 | −61.29 | 5.51 | | | | |
| S418 | ∞ | 1.05 | 1.51 | 64.1 | | Cover Glass CG4 |
| S419 | ∞ | 0.40 | | | | |

Table 8 shows the parameters and condition values for conditions (1)-(5) in accordance with the fourth embodiment of the invention. It can be seen from Table 8 that the wide-angle lens assembly 4 of the fourth embodiment satisfies the conditions (1)-(5).

TABLE 8

| $f_{71}$ | −21.151 mm | $f_{62}$ | −13.404 mm | | |
|---|---|---|---|---|---|
| TTL/f | 9.708 | TTL/$R_{71}$ | 2.048 | $\|f_{71}/f_{62}\|$ | 1.578 |
| $Vd_7$ | 61.2 | $Vd_1$ | 49.5 | | | the fourth embodiment ranges from 0.58 to 1.0. It can be seen from FIG. 8G that the through focus modulation transfer function of tangential direction and sagittal direction in the wide-angle lens assembly 4 of the fourth embodiment ranges from 0.0 to 0.72 as focus shift ranges from −0.05 mm to 0.05 mm.

It is obvious that the field curvature, the distortion, and the lateral color of the wide-angle lens assembly 4 of the fourth embodiment can be corrected effectively, and the relative illumination, the resolution and the depth of focus of the wide-angle lens assembly 4 of the fourth embodiment can meet the requirement. Therefore, the wide-angle lens assembly 4 of the fourth embodiment is capable of good optical performance.

Figure 9:
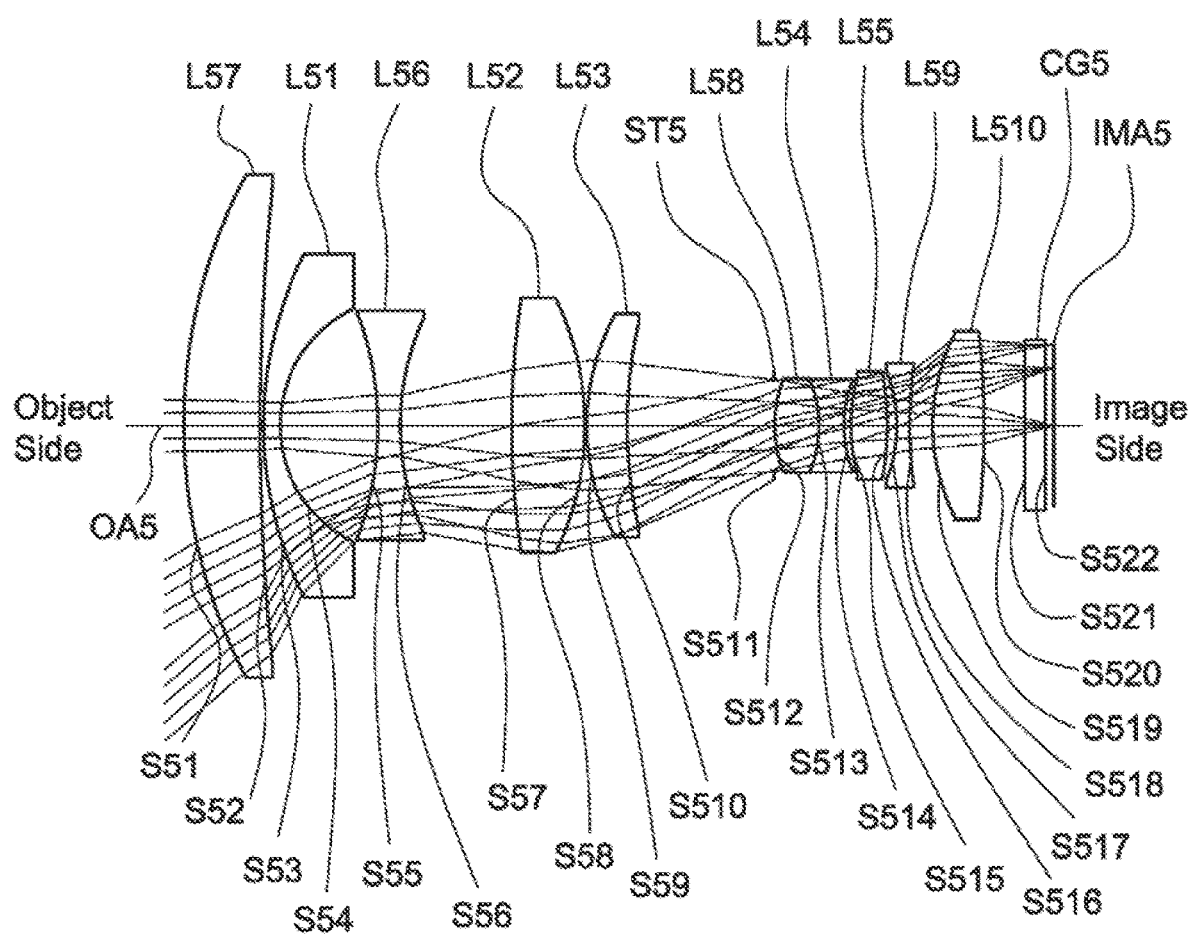
FIG. 9 is a lens layout diagram of a wide-angle lens assembly in accordance with a fifth embodiment of the invention.

Referring to FIG. 9, the wide-angle lens assembly 5 includes a seventh lens L57, a first lens L51, a sixth lens L56, a second lens L52, a third lens L53, a stop ST5, an eighth lens L58, a fourth lens L54, a fifth lens L55, a ninth lens L59, a tenth lens L510, and a cover glass CG5, all of which are arranged in order from an object side to an image side along an optical axis OA5. In operation, an image of light rays from the object side is formed at an image plane IMA5.

According to the foregoing, wherein: the seventh lens L57 is with positive refractive power; the sixth lens L56 is a biconcave lens with negative refractive power, wherein the object side surface S55 is a concave surface, the image side surface S56 is a concave surface, and the object side surface S55 and the image side surface S56 are spherical surfaces; the second lens L52 is a biconvex lens, wherein the object side surface S57 is a convex surface, the image side surface S58 is a convex surface, and the object side surface S57 and the image side surface S58 are spherical surfaces; the third lens L53 is a meniscus lens, wherein the image side surface S510 is a concave surface; the fourth lens L54 is a biconcave lens, wherein the image side surface S514 is a concave surface; the fifth lens L55 is a biconvex lens, wherein the object side surface S515 is a convex surface and the object side surface S515 and the image side surface S516 are spherical surfaces; the ninth lens L59 is a biconcave lens with negative refractive power and made of glass material, wherein the object side surface S517 is a concave surface, the image side surface S518 is a concave surface, and the object side surface S517 and the image side surface S518 are spherical surfaces; the tenth lens L510 is a biconvex lens with positive refractive power and made of glass material, wherein the object side surface S519 is a convex surface, the image side surface S520 is a convex surface, and the object side surface S519 and the image side surface S520 are spherical surfaces; and both of the object side surface S521 and image side surface S522 of the cover glass CG5 are plane surfaces.

With the above design of the lenses and stop ST5 and at least any one of the conditions (1)-(5) satisfied, the wide-angle lens assembly 5 can have an effective decreased total lens length, an effective decreased F-number, an effective increased resolution, an effective resisted environmental temperature change, an effective corrected aberration, and an effective corrected chromatic aberration.

If the condition (1): $5.5<TTL/f<10$ is satisfied, thereby enhancing the features of the positive refractive power and the shape configuration of the object side surface S59 of the third lens L53, the positive refractive power and shape configuration on the object side S512 and image side S513 of the eighth lens L58, the fourth lens L54 and shape configuration on the object side S513 of the fourth lens L54, and the fifth lens L55 and shape configuration on the image side surface S516 of the fifth lens L55 to effective balanced the field of view and the total lens length of the wide-angle lens assembly. If conditions (2) and (3): $1.3<TTL/R_{71}<2.6$; $0.03<|f_{71}/f_{62}|<1.7$ are satisfied, thereby with combining the stop is to be disposed between the seventh lens and the image plane enhancing the features of the shape configuration of the seventh lens L57, the object side surface S51, the image side surface S52, the first lens L51 with negative refractive power, the object side surface S53, and the image side surface S54 to strengthen the miniaturization, effectively control the field of view, help achieving a balance between F-number, field of view and total lens length for the wide-angle lens assembly. If the conditions (4) and (5): $30<Vd_7<64.3$; $35<Vd_1<54.5$ are satisfied, thereby strengthening the ability of achromatic function for the seventh lens L57 and the first lens L51.

Table 9 shows the optical specification of the wide-angle lens assembly 5 in FIG. 9.

TABLE 9

Effective Focal Length = 4.93 mm F-number = 2.0
Total Lens Length = 42.06 mm Field of View = 81.704 degrees

| Surface Number | Radius of Curvature (mm) | Thickness (mm) | Nd | Vd | Effective Focal Length (mm) | Remark |
|---|---|---|---|---|---|---|
| S51 | 25.76 | 3.71 | 1.67 | 55.2 | 47.93 | The Seventh Lens L57 |
| S52 | 115.59 | 0.07 | | | | |
| S53 | 17.95 | 0.92 | 1.8 | 40.9 | −12.36 | The First Lens L51 |
| S54 | 6.28 | 4.75 | | | | |
| S55 | −14.96 | 1.02 | 1.7 | 41.1 | −9.41 | The Sixth Lens L56 |
| S56 | 12.23 | 5.42 | | | | |
| S57 | 40.79 | 3.55 | 1.61 | 63.3 | 17.068 | The Second Lens L52 |
| S58 | −13.81 | 0.06 | | | | |
| S59 | 11.01 | 1.95 | 1.9 | 31.3 | 22.16 | The Third Lens L53 |
| S510 | 22.25 | 7.19 | | | | |
| S511 | ∞ | 0.00 | | | | Stop ST5 |
| S512 | 6.84 | 2.08 | 1.69 | 55.5 | 4.952 | The Eighth Lens L58 |
| S513 | −6.14 | 1.20 | 1.78 | 25.6 | −3.585 | The Fourth Lens L54 |
| S514 | 5.72 | 0.38 | | | | |
| S515 | 11.25 | 1.77 | 1.9 | 37 | 6.919 | The Fifth Lens L55 |
| S516 | −13.07 | 0.43 | | | | |
| S517 | −7.31 | 0.64 | 1.76 | 26.5 | −7.231 | The Ninth Lens L59 |
| S518 | 23.83 | 1.05 | | | | |
| S519 | 9.20 | 2.56 | 1.9 | 31.3 | 8.32 | The Tenth Lens L510 |
| S520 | −36.76 | 1.93 | | | | |
| S521 | ∞ | 1.00 | 1.51 | 64.1 | | Cover Glass CG5 |
| S522 | ∞ | 0.40 | | | | |

Table 10 shows the parameters and condition values for conditions (1)-(5) in accordance with the fifth embodiment of the invention. It can be seen from Table 10 that the wide-angle lens assembly 5 of the fifth embodiment satisfies the conditions (1)-(5).

TABLE 10

| $f_{71}$ | −18.568 mm | $f_{62}$ | −527.76 mm | | |
|---|---|---|---|---|---|
| TTL/f | 8.531 | TTL/$R_{71}$ | 1.633 | $\|f_{71}/f_{62}\|$ | 0.035 |
| $Vd_7$ | 55.2 | $Vd_1$ | 40.9 | | |

By the above arrangements of the lenses and stop ST5, the wide-angle lens assembly 5 of the fifth embodiment can meet the requirements of optical performance as seen in FIGS. 10A-10G.

Figure 10A:
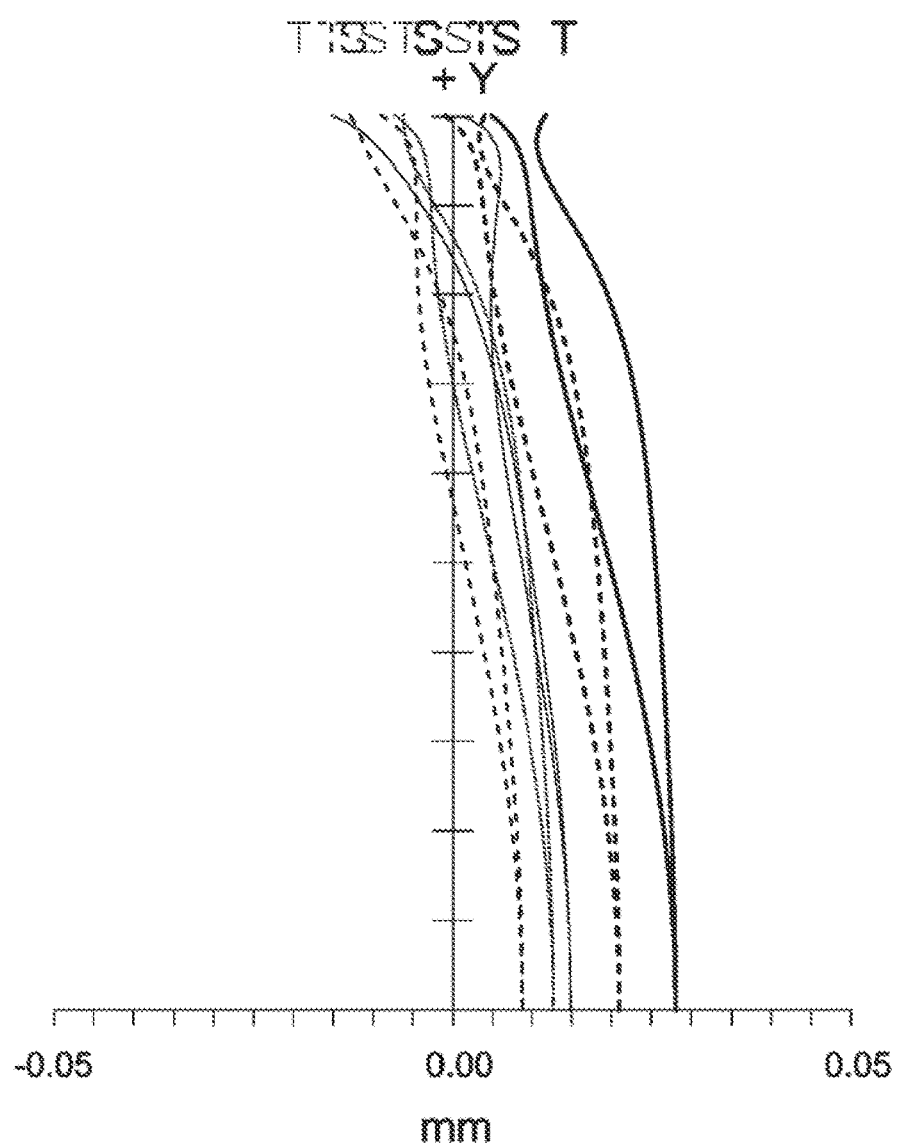
FIG. 10A depicts a field curvature diagram of the wide-angle lens assembly in accordance with the fifth embodiment of the invention.
Figure 10B:
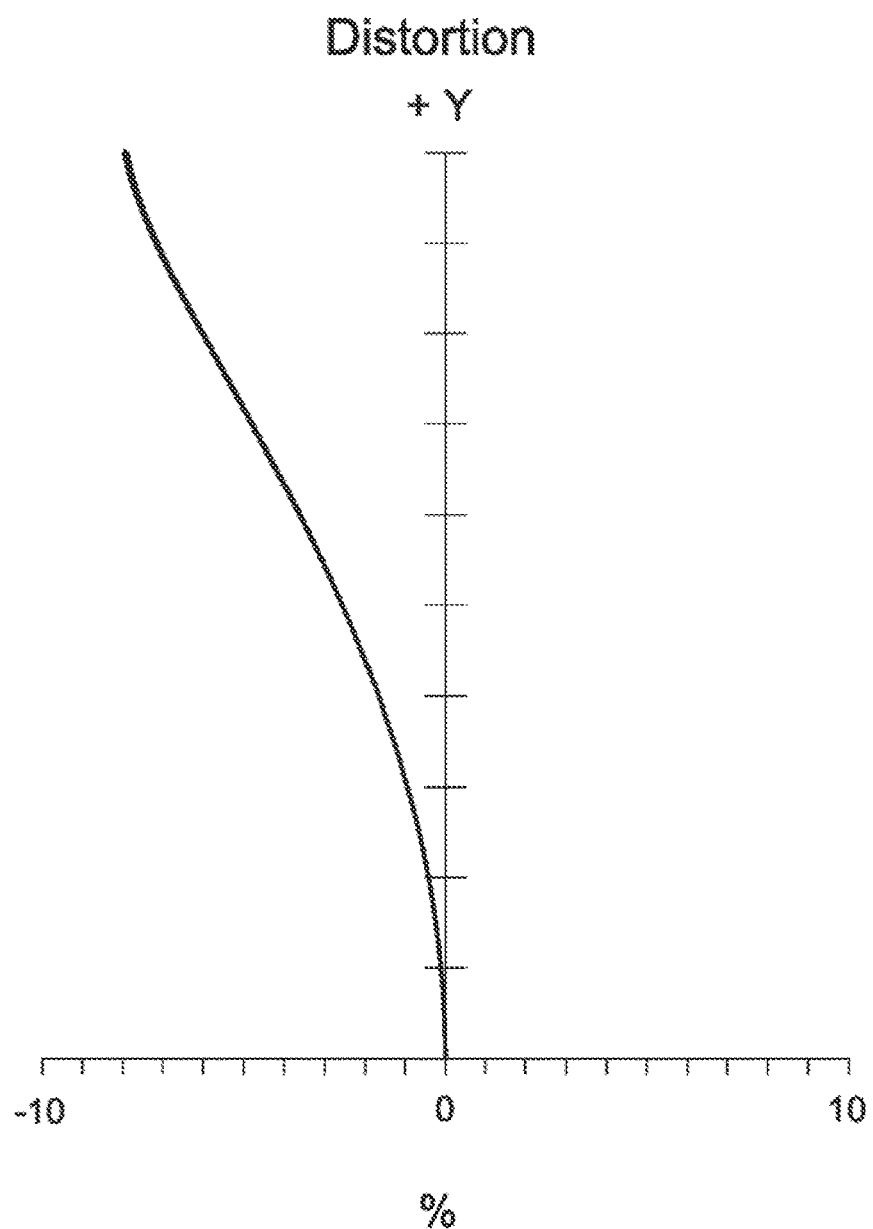
FIG. 10B is a distortion diagram of the wide-angle lens assembly in accordance with the fifth embodiment of the invention.
Figure 10C:
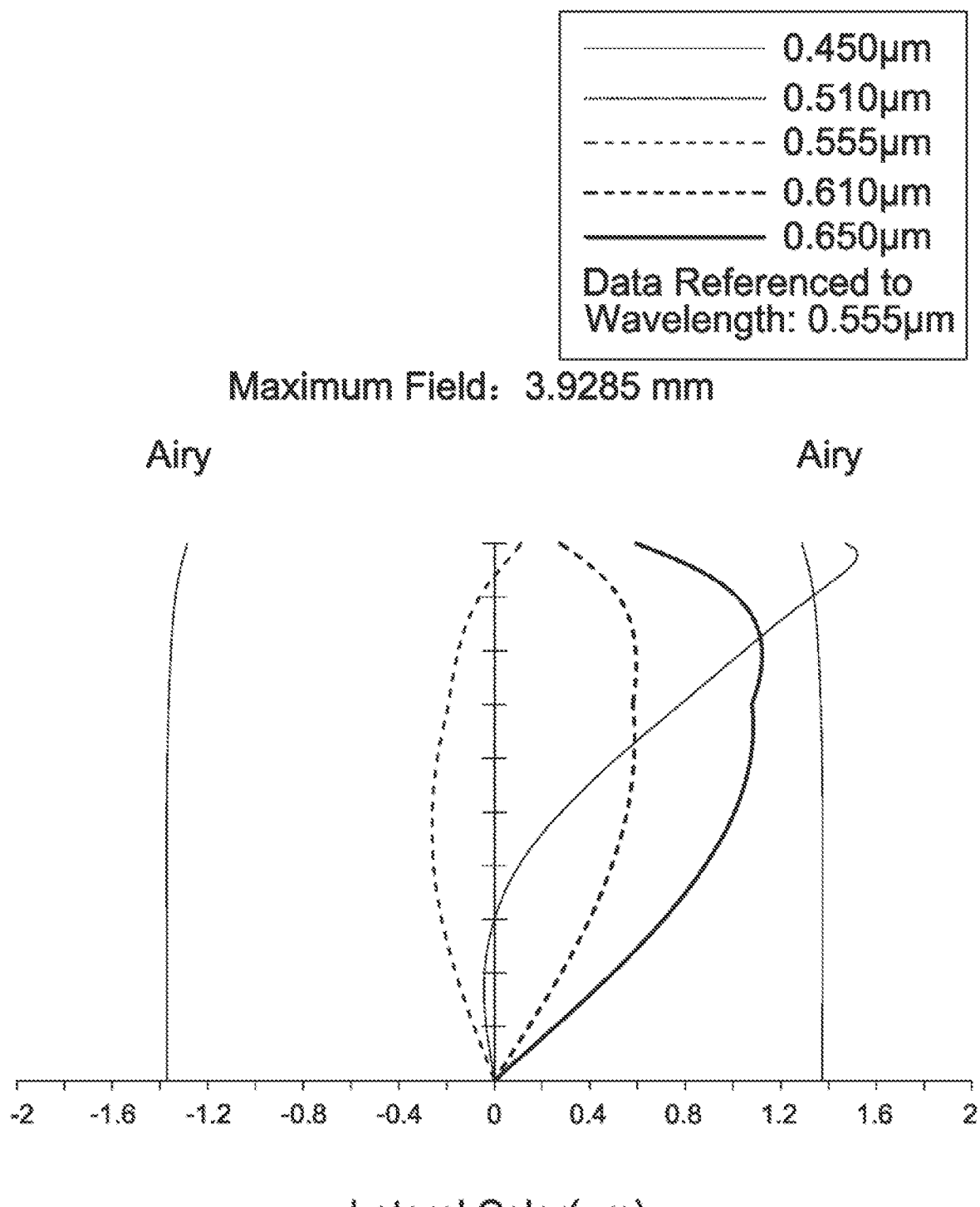
FIG. 10C is a lateral color diagram of the wide-angle lens assembly in accordance with the fifth embodiment of the invention.
Figure 10D:
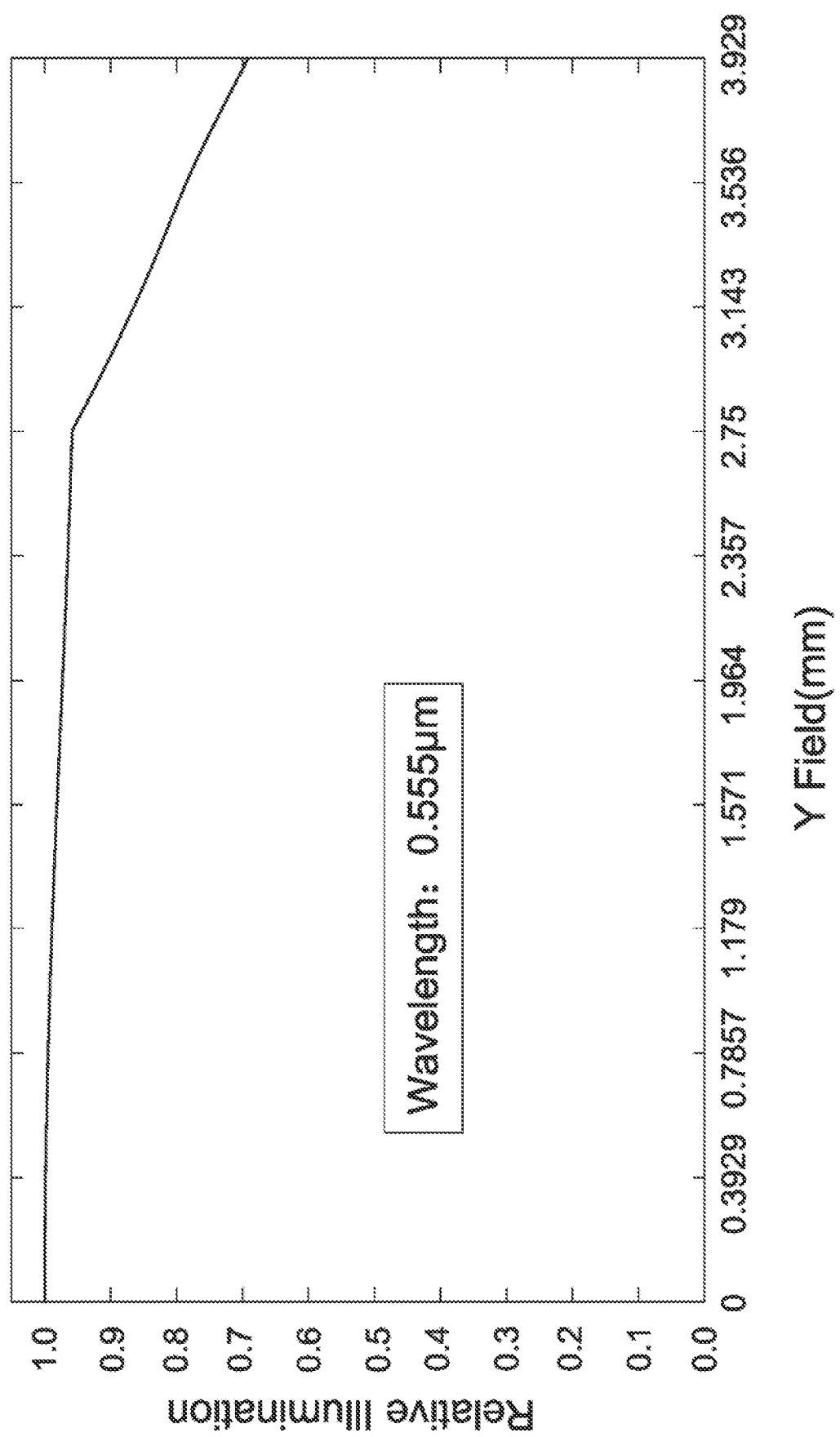
FIG. 10D is a relative illumination diagram of the wide-angle lens assembly in accordance with the fifth embodiment of the invention.
Figure 10E:
FIG. 10E is a spot diagram of the wide-angle lens assembly in accordance with the fifth embodiment of the invention.
Figure 10E:
Figure 10E:
Figure 10F:
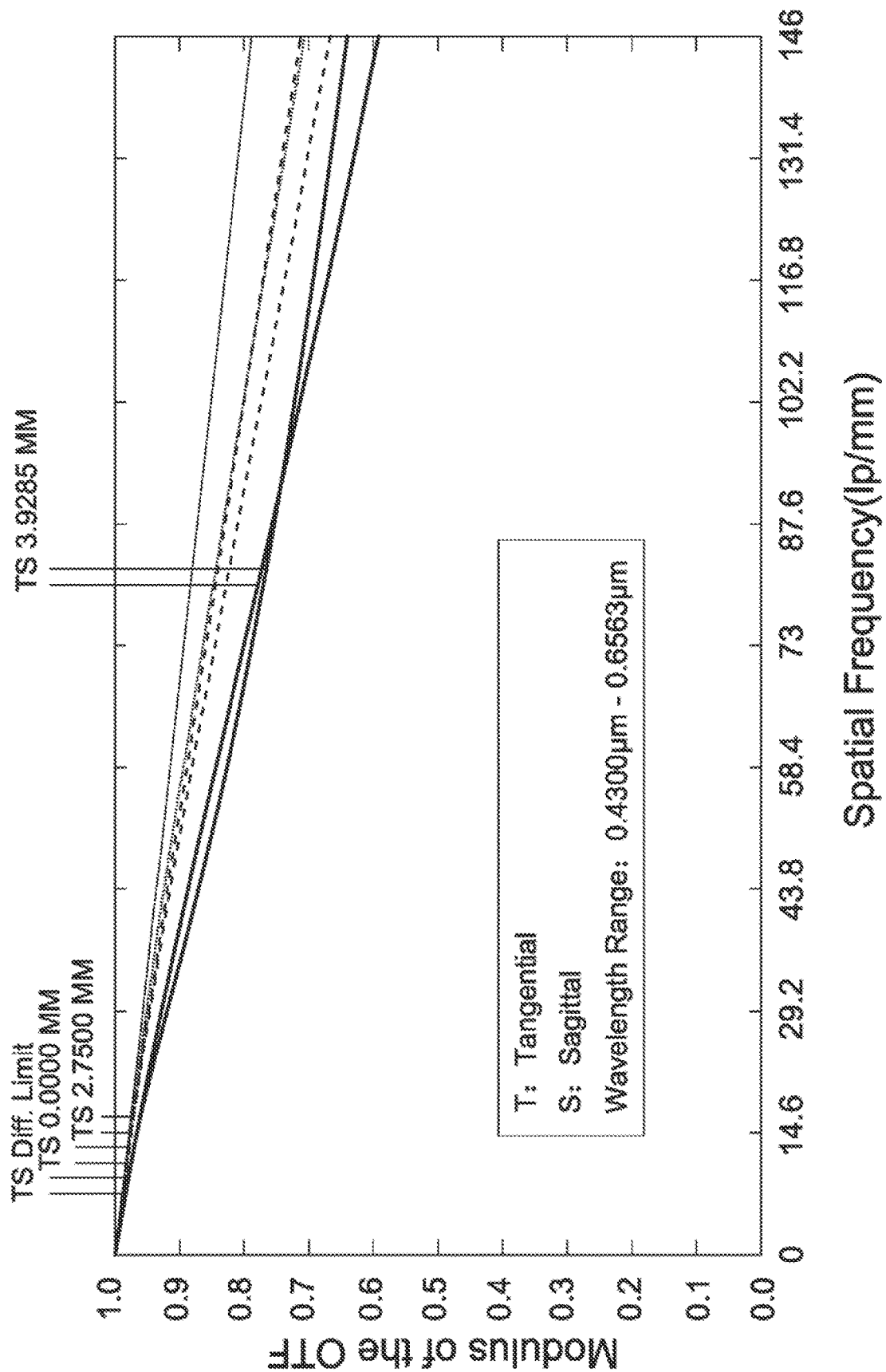
FIG. 10F is a modulation transfer function diagram of the wide-angle lens assembly in accordance with the fifth embodiment of the invention.
Figure 10G:
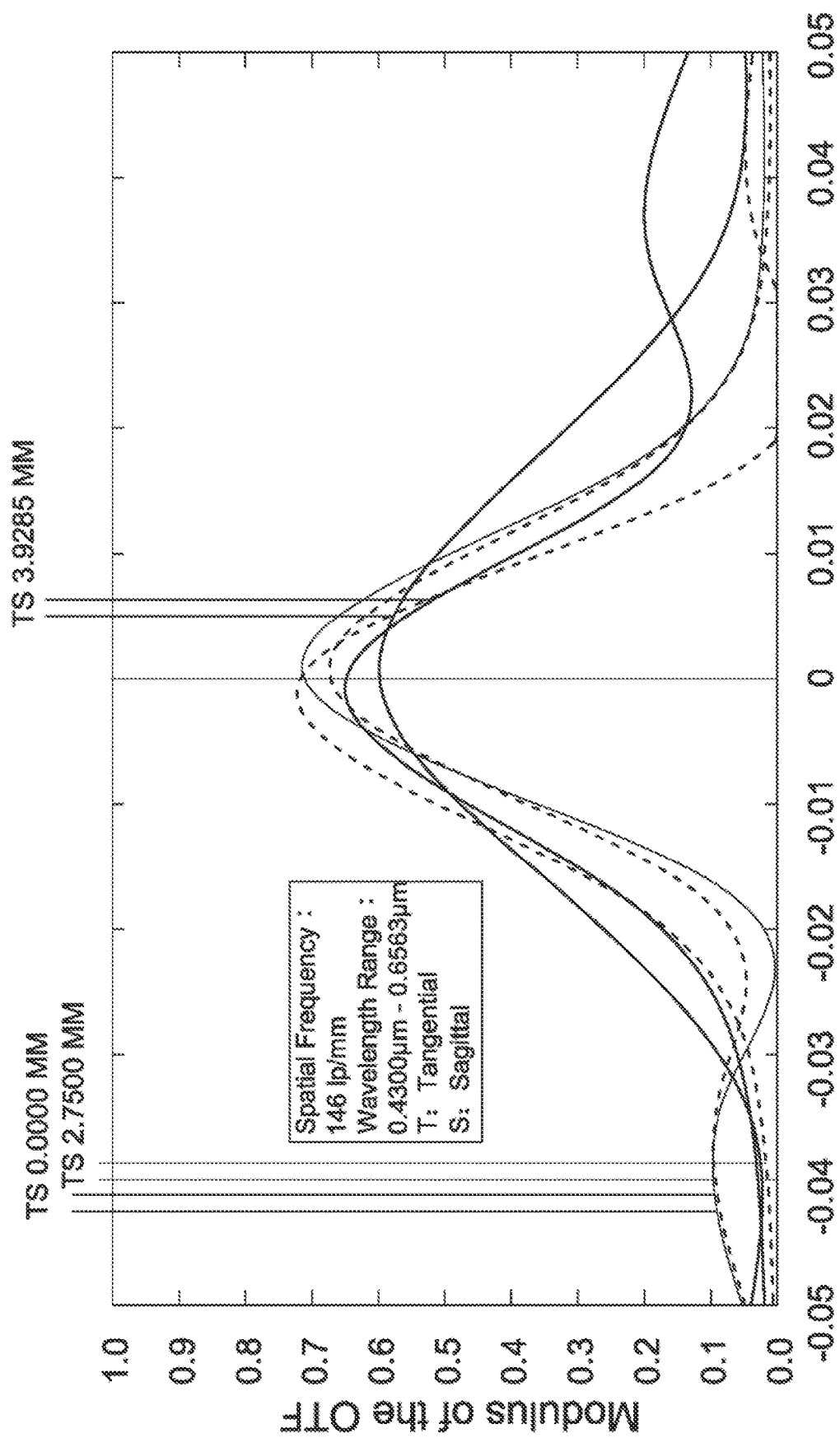
FIG. 10G is a through focus modulation transfer function diagram of the wide-angle lens assembly in accordance with the fifth embodiment of the invention.

It can be seen from FIG. 10A that the field curvature of tangential direction and sagittal direction in the wide-angle lens assembly 5 of the fifth embodiment ranges from −0.02 mm to 0.03 mm. It can be seen from FIG. 10B that the distortion in the wide-angle lens assembly 5 of the fifth embodiment ranges from −8% to 0%. It can be seen from FIG. 10C that the lateral color in the wide-angle lens assembly 5 of the fifth embodiment ranges from −0.3 μm to 1.6 μm. It can be seen from FIG. 10D that the relative illumination in the wide-angle lens assembly 5 of the fifth embodiment ranges from 0.69 to 1.0. It can be seen from FIG. 10E that the root mean square spot radius is equal to 0.787 μm and geometrical spot radius is equal to 3.168 μm as image height is equal to 0.000 mm, the root mean square spot radius is equal to 1.114 μm and geometrical spot radius is equal to 6.010 μm as image height is equal to 2.750 mm, and the root mean square spot radius is equal to 2.082 μm and geometrical spot radius is equal to 9.702 μm as image height is equal to 3.928 mm for the wide-angle lens assembly 5 of the fifth embodiment. It can be seen from FIG. 10F that the modulation transfer function of tangential direction and sagittal direction in the wide-angle lens assembly 5 of the fifth embodiment ranges from 0.59 to 1.0. It can be seen from FIG. 10G that the through focus modulation transfer function of tangential direction and sagittal direction in the wide-angle lens assembly 5 of the fifth embodiment ranges from 0.0 to 0.72 as focus shift ranges from −0.05 mm to 0.05 mm.

It is obvious that the field curvature, the distortion, and the lateral color of the wide-angle lens assembly 5 of the fifth embodiment can be corrected effectively, and the relative illumination, the resolution and the depth of focus of the wide-angle lens assembly 5 of the fifth embodiment can meet the requirement. Therefore, the wide-angle lens assembly 5 of the fifth embodiment is capable of good optical performance.

Figure 11:
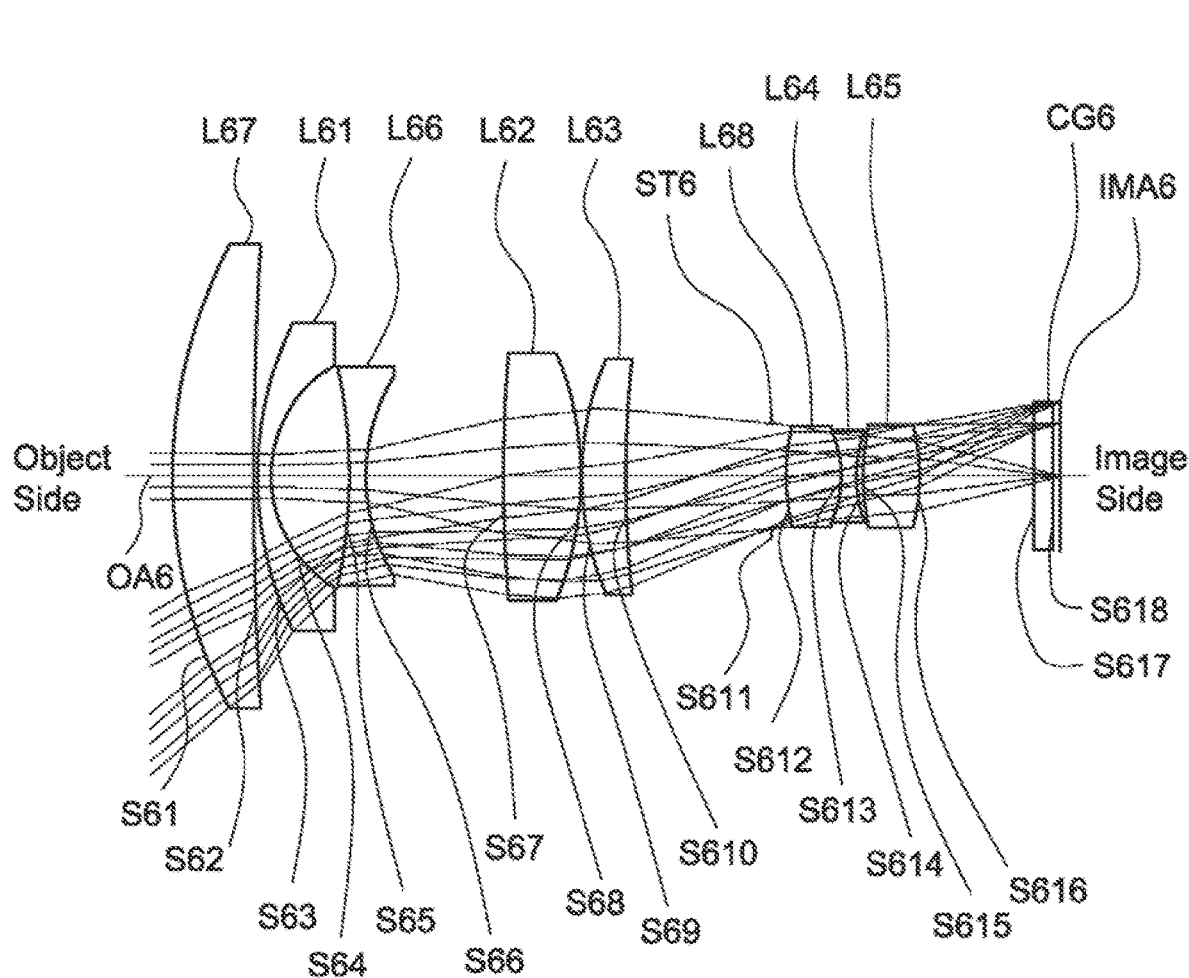
FIG. 11 is a lens layout diagram of a wide-angle lens assembly in accordance with a sixth embodiment of the invention.

Referring to FIG. 11, the wide-angle lens assembly 6 includes a seventh lens L67, a first lens L61, a sixth lens L66, a second lens L62, a third lens L63, a stop ST6, an eighth lens L68, a fourth lens L64, a fifth lens L65, and a cover glass CG6, all of which are arranged in order from an object side to an image side along an optical axis OA6. In operation, an image of light rays from the object side is formed at an image plane IMA6.

According to the foregoing, wherein: the seventh lens L67 is with positive refractive power; the sixth lens L66 is a biconcave lens with negative refractive power, wherein the object side surface S65 is a concave surface, the image side surface S66 is a concave surface, and the object side surface S65 and the image side surface S66 are spherical surfaces; the second lens L62 is a biconvex lens, wherein the object side surface S67 is a convex surface, the image side surface S68 is a convex surface, and the object side surface S67 and the image side surface S68 are spherical surfaces; the third lens L63 is a meniscus lens, wherein the image side surface S610 is a concave surface; the fourth lens L64 is a biconcave lens, wherein the image side surface S614 is a concave surface; the fifth lens L65 is a biconvex lens, wherein the object side surface S615 is a convex surface and the object side surface S615 and the image side surface S616 are aspheric surfaces; and both of the object side surface S617 and image side surface S618 of the cover glass CG6 are plane surfaces.

With the above design of the lenses and stop ST6 and at least any one of the conditions (1)-(5) satisfied, the wide-angle lens assembly 6 can have an effective decreased total lens length, an effective decreased F-number, an effective increased resolution, an effective resisted environmental temperature change, an effective corrected aberration, and an effective corrected chromatic aberration.

If the value $Vd_1$ of condition (5) is less than 35 then the ability of achromatic function is poor. Therefore, the value $Vd_1$ must be at least greater than 35. An optimal range for $Vd_1$ is between 35 and 54.5. The wide-angle lens assembly has the optimal condition for effective reduced chromatic aberration when satisfies the condition: $35 < Vd_1 < 54.5$.

Table 11 shows the optical specification of the wide-angle lens assembly 6 in FIG. 11.

TABLE 11

Effective Focal Length = 4.93 mm F-number = 2.0
Total Lens Length = 46.6 mm Field of View = 81.688 degrees

| Surface Number | Radius of Curvature (mm) | Thickness (mm) | Nd | Vd | Effective Focal Length (mm) | Remark |
|---|---|---|---|---|---|---|
| S61 | 26.40 | 4.21 | 1.56 | 62.9 | 54.00 | The Seventh Lens L67 |
| S62 | 173.97 | 0.24 | | | | |
| S63 | 19.26 | 0.78 | 1.71 | 53.8 | −15.47 | The First Lens L61 |
| S64 | 6.91 | 4.03 | | | | |
| S65 | −28.46 | 0.92 | 1.92 | 23.9 | −7.97 | The Sixth Lens L66 |
| S66 | 10.14 | 7.14 | | | | |
| S67 | 66.19 | 4.04 | 1.61 | 63.3 | 23.153 | The Second Lens L62 |
| S68 | −17.89 | 0.10 | | | | |
| S69 | 15.10 | 2.33 | 1.92 | 23.9 | 22.714 | The Third Lens L63 |
| S610 | 49.24 | 7.64 | | | | |
| S611 | ∞ | 0.80 | | | | Stop ST6 |
| S612 | 9.76 | 2.91 | 1.72 | 54 | 5.134 | The Eighth Lens L68 |

TABLE 11-continued

Effective Focal Length = 4.93 mm F-number = 2.0
Total Lens Length = 46.6 mm Field of View = 81.688 degrees

| Surface Number | Radius of Curvature (mm) | Thickness (mm) | Nd | Vd | Effective Focal Length (mm) | Remark |
|---|---|---|---|---|---|---|
| S613 | −5.34 | 0.78 | 1.76 | 26.6 | −3.874 | The Fourth Lens L64 |
| S614 | 7.13 | 0.37 | | | | |
| S615 | 11.22 | 2.93 | 1.64 | 58.1 | 9.444 | The Fifth Lens L65 |
| S616 | −12.17 | 5.97 | | | | |
| S617 | ∞ | 1.00 | 1.51 | 64.1 | | Cover Glass CG6 |
| S618 | ∞ | 0.40 | | | | |

The aspheric surface sag z of each aspheric lens in table 11 can be calculated by the following formula:

$$z = ch^2/\{1+[1-(k+1)c^2h^2]^{1/2}\} + Ah^4 + Bh^6 + Ch^8$$

where c is curvature, h is the vertical distance from the lens surface to the optical axis, k is conic constant and A, B and C are aspheric coefficients.

In the sixth embodiment, the conic constant k and the aspheric coefficients A, B, C of each aspheric lens are shown in Table 12.

TABLE 12

| Surface Number | k | A | B | C |
|---|---|---|---|---|
| S615 | −4.602692 | −0.000547 | −2.26E−05 | −3.00E−06 |
| S616 | 8.75262 | −5.50E−07 | −6.58E−06 | 5.57E−07 |

Table 13 shows the parameters and condition values for conditions (1)-(5) in accordance with the sixth embodiment of the invention. It can be seen from Table 13 that the wide-angle lens assembly 6 of the sixth embodiment satisfies the conditions (1)-(5).

TABLE 13

| | | | | |
|---|---|---|---|---|
| $f_{71}$ | −24.246 mm | $f_{62}$ | −31.159 mm | |
| TTL/f | 9.452 | TTL/$R_{71}$ | 1.765 | $|f_{71}/f_{62}|$ 0.778 |
| $Vd_7$ | 62.9 | $Vd_1$ | 53.8 | |

By the above arrangements of the lenses and stop ST6, the wide-angle lens assembly 6 of the sixth embodiment can meet the requirements of optical performance as seen in FIGS. 12A-12G.

Figure 12A:
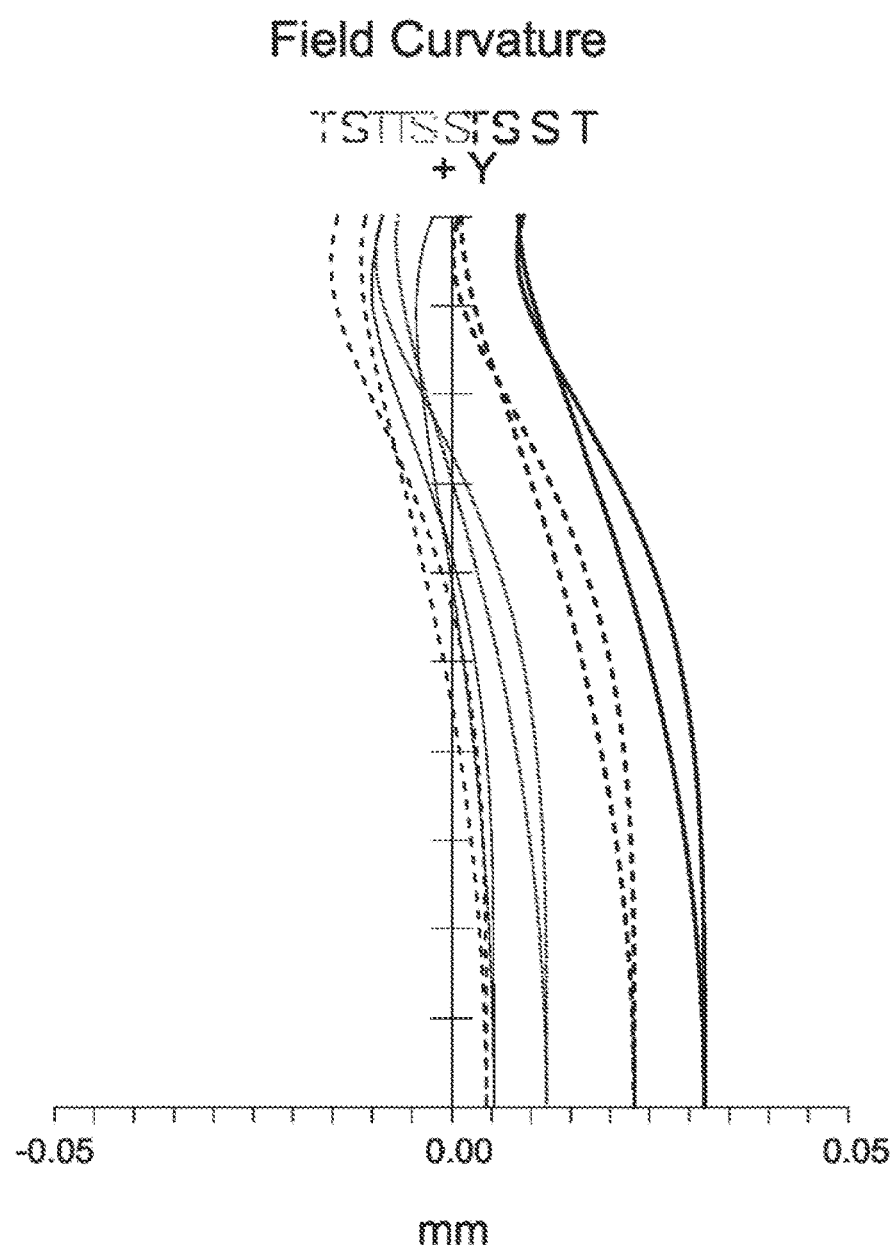
FIG. 12A depicts a field curvature diagram of the wide-angle lens assembly in accordance with the sixth embodiment of the invention.
Figure 12B:
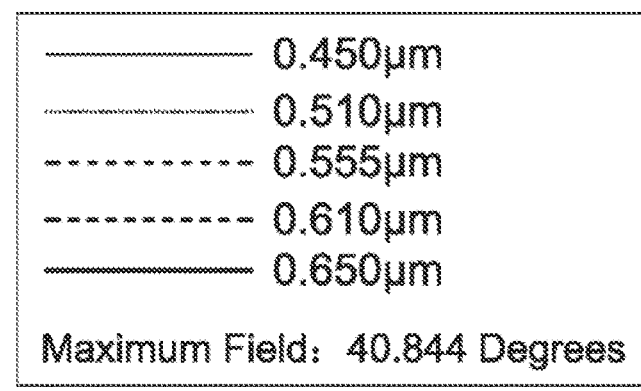
FIG. 12B is a distortion diagram of the wide-angle lens assembly in accordance with the sixth embodiment of the invention.
Figure 12B:
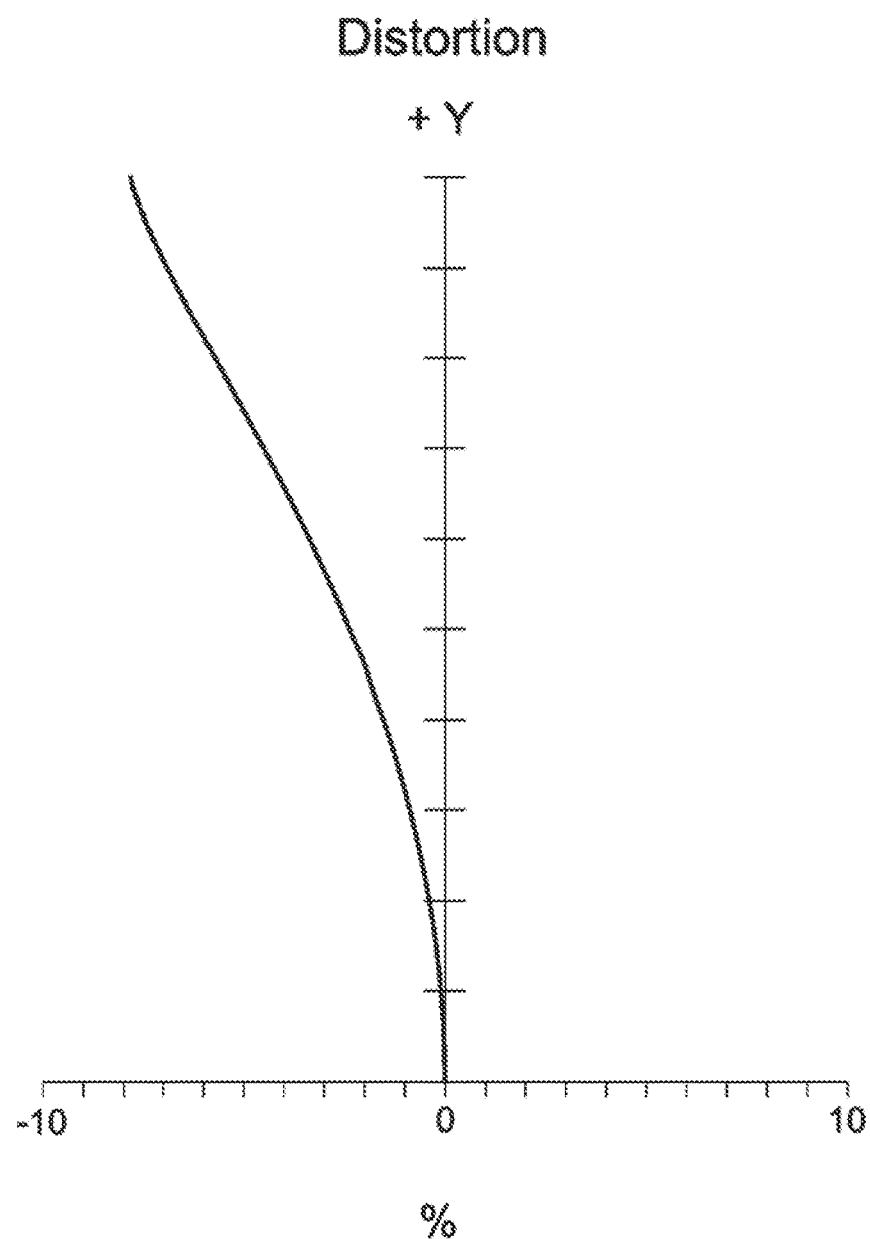
Figure 12C:
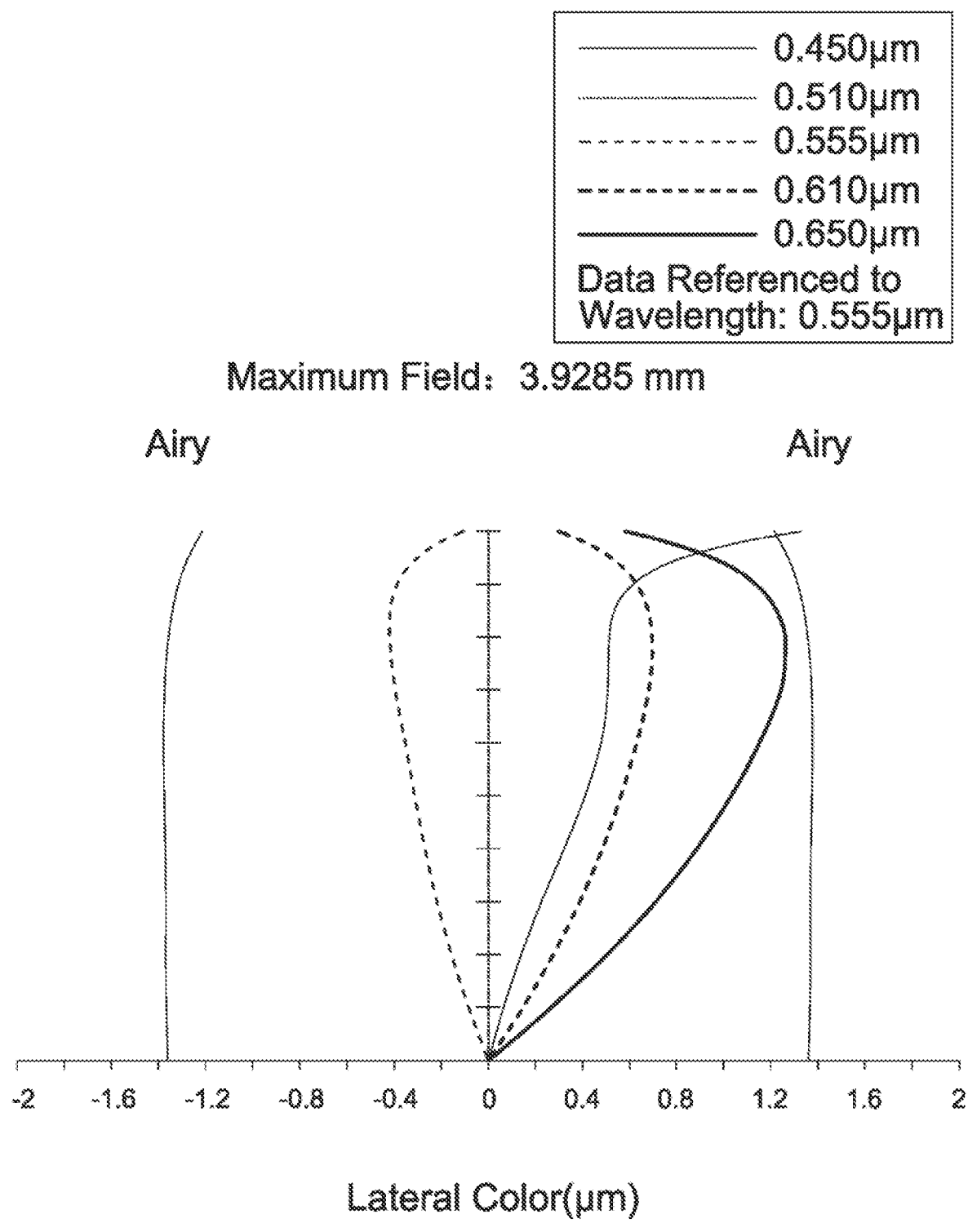
FIG. 12C is a lateral color diagram of the wide-angle lens assembly in accordance with the sixth embodiment of the invention.
Figure 12D:
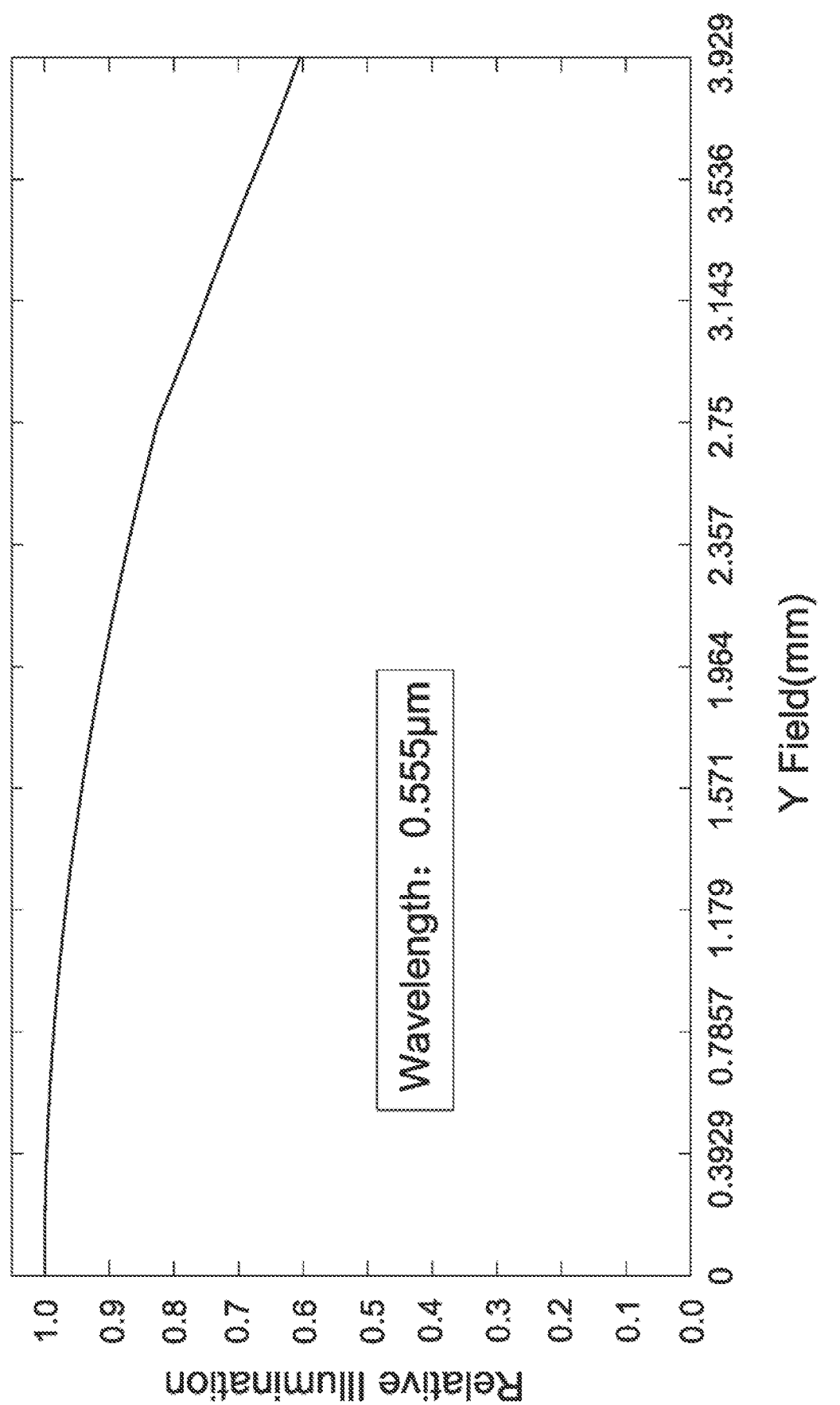
FIG. 12D is a relative illumination diagram of the wide-angle lens assembly in accordance with the sixth embodiment of the invention.
Figure 12E:
FIG. 12E is a spot diagram of the wide-angle lens assembly in accordance with the sixth embodiment of the invention.
Figure 12E:
Figure 12E:
Figure 12F:
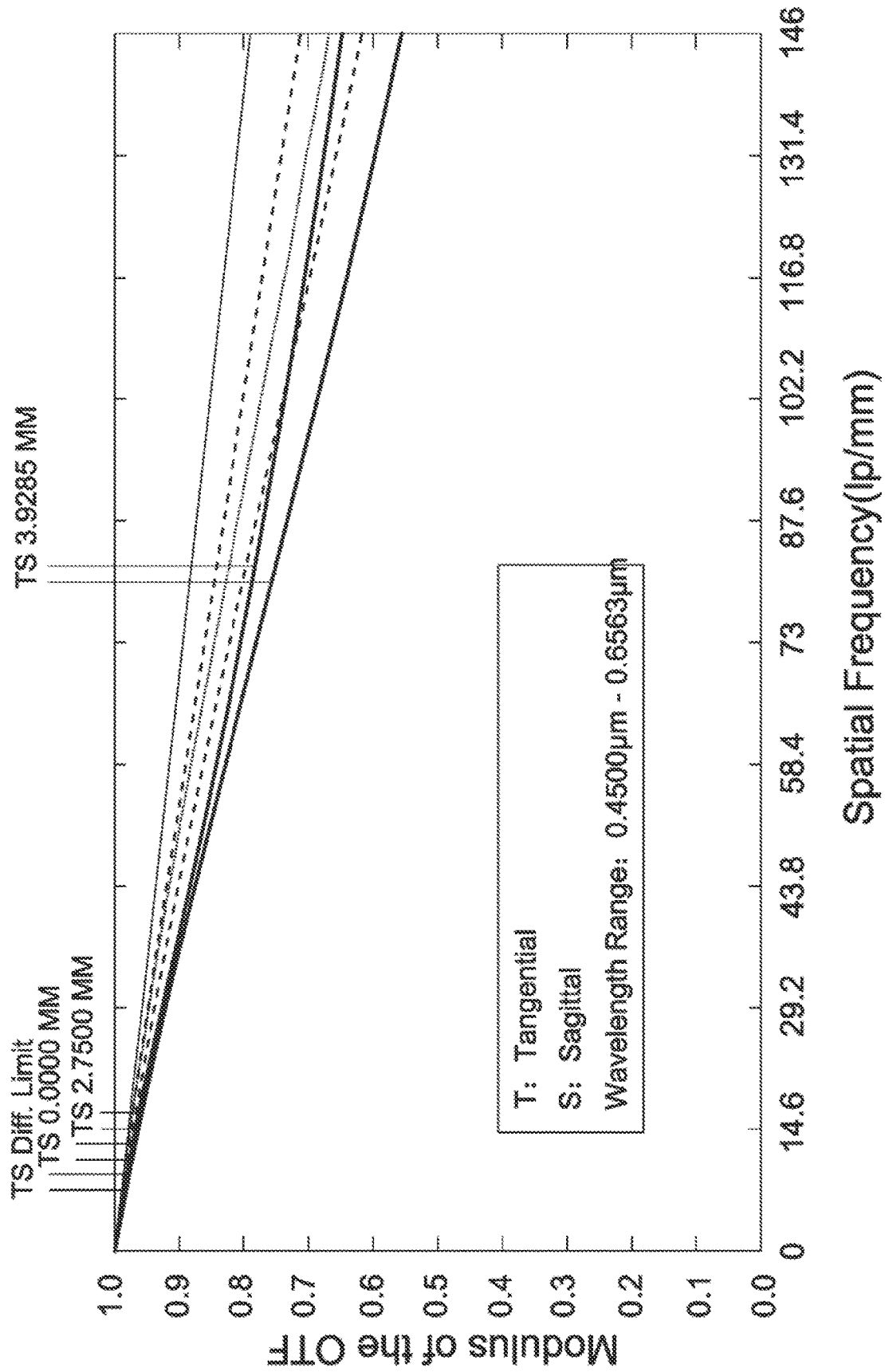
FIG. 12F is a modulation transfer function diagram of the wide-angle lens assembly in accordance with the sixth embodiment of the invention.

It can be seen from FIG. 12A that the field curvature of tangential direction and sagittal direction in the wide-angle lens assembly 6 of the sixth embodiment ranges from −0.02 mm to 0.035 mm. It can be seen from FIG. 12B that the distortion in the wide-angle lens assembly 6 of the sixth embodiment ranges from −8% to 0%. It can be seen from FIG. 12C that the lateral color in the wide-angle lens assembly 6 of the sixth embodiment ranges from −0.5 μm to 1.4 μm. It can be seen from FIG. 12D that the relative illumination in the wide-angle lens assembly 6 of the sixth embodiment ranges from 0.60 to 1.0. It can be seen from FIG. 12E that the root mean square spot radius is equal to 1.052 μm and geometrical spot radius is equal to 3.992 μm as image height is equal to 0.000 mm, the root mean square spot radius is equal to 1.153 μm and geometrical spot radius is equal to 6.678 μm as image height is equal to 2.750 mm, and the root mean square spot radius is equal to 1.821 μm and geometrical spot radius is equal to 10.259 μm as image height is equal to 3.928 mm for the wide-angle lens assembly 6 of the sixth embodiment. It can be seen from FIG. 12F that the modulation transfer function of tangential direction and sagittal direction in the wide-angle lens assembly 6 of the sixth embodiment ranges from 0.56 to 1.0. It can be seen from FIG. 12G that the through focus modulation transfer function of tangential direction and sagittal direction in the wide-angle lens assembly 6 of the sixth embodiment ranges from 0.0 to 0.72 as focus shift ranges from −0.05 mm to 0.05 mm.

It is obvious that the field curvature, the distortion, and the lateral color of the wide-angle lens assembly 6 of the sixth embodiment can be corrected effectively, and the relative illumination, the resolution and the depth of focus of the wide-angle lens assembly 6 of the sixth embodiment can meet the requirement. Therefore, the wide-angle lens assembly 6 of the sixth embodiment is capable of good optical performance.

Figure 13:
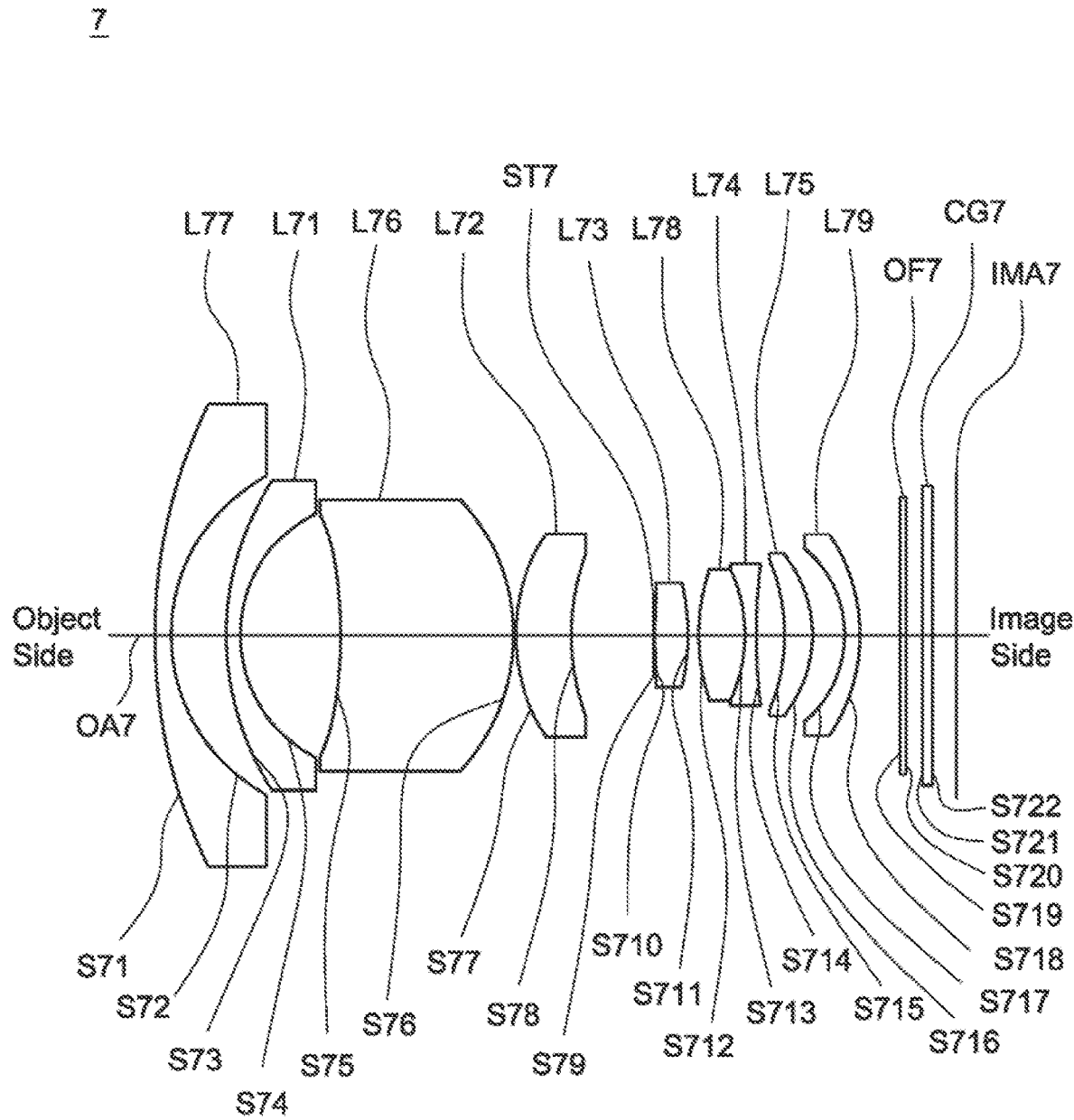
FIG. 13 is a lens layout diagram of a wide-angle lens assembly in accordance with a seventh embodiment of the invention.

Referring to FIG. 13, the wide-angle lens assembly 7 includes a seventh lens L77, a first lens L71, a sixth lens L76, a second lens L72, a stop ST7, a third lens L73, an eighth lens L78, a fourth lens L74, a fifth lens L75, a ninth lens L79, an optical filter OF7, and a cover glass CG7, all of which are arranged in order from an object side to an image side along an optical axis OA7. In operation, an image of light rays from the object side is formed at an image plane IMA7.

According to the foregoing, wherein: the seventh lens L77 is with negative refractive power; the sixth lens L76 is a meniscus lens with positive refractive power, wherein the object side surface S75 is a concave surface, the image side surface S76 is a convex surface, and the object side surface S75 and the image side surface S76 are aspheric surfaces; the second lens L72 is a meniscus lens, wherein the object side surface S77 is a convex surface, the image side surface S78 is a concave surface, and the object side surface S77 and the image side surface S78 are aspheric surfaces; the third lens L73 is a biconvex lens, wherein the image side surface S711 is a convex surface; the fourth lens L74 is a biconcave lens, wherein the image side surface S714 is a concave surface; the fifth lens L75 is a meniscus lens, wherein the object side surface S715 is a concave surface and the object side surface S715 and the image side surface S716 are aspheric surfaces; the ninth lens L79 is a meniscus lens with negative refractive power and made of glass material, wherein the object side surface S717 is a concave surface, the image side surface S718 is a convex surface, and the object side surface S717 and the image side surface S718 are spherical surfaces; both of the object side surface S719 and image side surface S720 of the optical filter OF7 are plane surfaces; and both of the object side surface S721 and image side surface S722 of the cover glass CG7 are plane surfaces.

With the above design of the lenses and stop ST7 and at least any one of the conditions (1)-(5) satisfied, the wide-angle lens assembly 7 can have an effective decreased total lens length, an effective decreased F-number, an effective increased resolution, an effective resisted environmental temperature change, an effective corrected aberration, and an effective corrected chromatic aberration.

Table 14 shows the optical specification of the wide-angle lens assembly 7 in FIG. 13.

TABLE 14

Effective Focal Length = 5.3 mm F-number = 3.0
Total Lens Length = 40.0 mm Field of View = 159.452 degrees

| Surface Number | Radius of Curvature (mm) | Thickness (mm) | Nd | Vd | Effective Focal Length (mm) | Remark |
|---|---|---|---|---|---|---|
| S71 | 26.59 | 0.80 | 1.91 | 35.25 | −15.40 | The Seventh Lens L77 |
| S72 | 9.08 | 2.74 | | | | |
| S73 | 14.20 | 0.70 | 1.88 | 40.77 | −15.50 | The First Lens L71 |
| S74 | 6.82 | 5.02 | | | | |
| S75 | −24.04 | 8.63 | 1.52 | 64.05 | 23.20 | The Sixth Lens L76 |
| S76 | −9.00 | 0.10 | | | | |
| S77 | 9.30 | 2.81 | 1.71 | 29.67 | 39.9 | The Second Lens L72 |
| S78 | 12.04 | 4.06 | | | | |
| S79 | ∞ | 0.10 | | | | Stop ST7 |
| S710 | 41.27 | 1.67 | 1.5 | 81.61 | 16.3 | The Third Lens L73 |
| S711 | −10.01 | 0.50 | | | | |
| S712 | 10.19 | 2.29 | 1.5 | 81.61 | 9.3 | The Eighth Lens L78 |
| S713 | −7.92 | 0.60 | 1.85 | 23.78 | −7.4 | The Fourth Lens L74 |
| S714 | 32.85 | 1.37 | | | | |
| S715 | −12.72 | 1.40 | 1.81 | 40.25 | 18.4 | The Fifth Lens L75 |
| S716 | −7.19 | 1.61 | | | | |
| S717 | −5.69 | 0.80 | 1.85 | 23.78 | −20.3 | The Ninth Lens L79 |
| S718 | −9.03 | 2.00 | | | | |
| S719 | ∞ | 0.30 | 1.52 | 64.17 | | Optical Filter OF7 |
| S720 | ∞ | 0.80 | | | | |
| S721 | ∞ | 0.50 | 1.52 | 64.17 | | Cover Glass CG7 |
| S722 | ∞ | 1.20 | | | | |

The definition of aspheric surface sag z of each aspheric lens in table 14 is the same as that of in Table 11, and is not described here again.

In the seventh embodiment, the conic constant k and the aspheric coefficients A, B, C of each aspheric lens are shown in Table 15.

TABLE 15

| Surface Number | k | A | B | C |
|---|---|---|---|---|
| S75 | 11.78259 | 2.70E−05 | −6.49E−07 | 2.32E−08 |
| S76 | 0 | 2.72E−04 | −2.43E−06 | 2.20E−08 |
| S77 | 0 | −7.49E−05 | 3.05E−06 | 4.20E−08 |
| S78 | 0 | −2.59E−04 | 1.52E−05 | 1.72E−07 |
| S715 | 0 | −6.47E−04 | −2.17E−05 | 3.86E−07 |
| S716 | 0 | −3.55E−04 | −1.67E−05 | 4.51E−09 |

Table 16 shows the parameters and condition values for conditions (1)-(5) in accordance with the seventh embodiment of the invention. It can be seen from Table 16 that the wide-angle lens assembly 7 of the seventh embodiment satisfies the conditions (1)-(5).

TABLE 16

| $f_{71}$ | −6.99 mm | $f_{62}$ | 13.28 mm | | |
|---|---|---|---|---|---|
| TTL/f | 7.547 | TTL/$R_{71}$ | 1.504 | $\vert f_{71}/f_{62} \vert$ | 0.526 |
| $Vd_7$ | 35.3 | $Vd_1$ | 40.8 | | |

By the above arrangements of the lenses and stop ST7, the wide-angle lens assembly 7 of the seventh embodiment can meet the requirements of optical performance as seen in FIGS. 14A-14E.

Figure 14A:
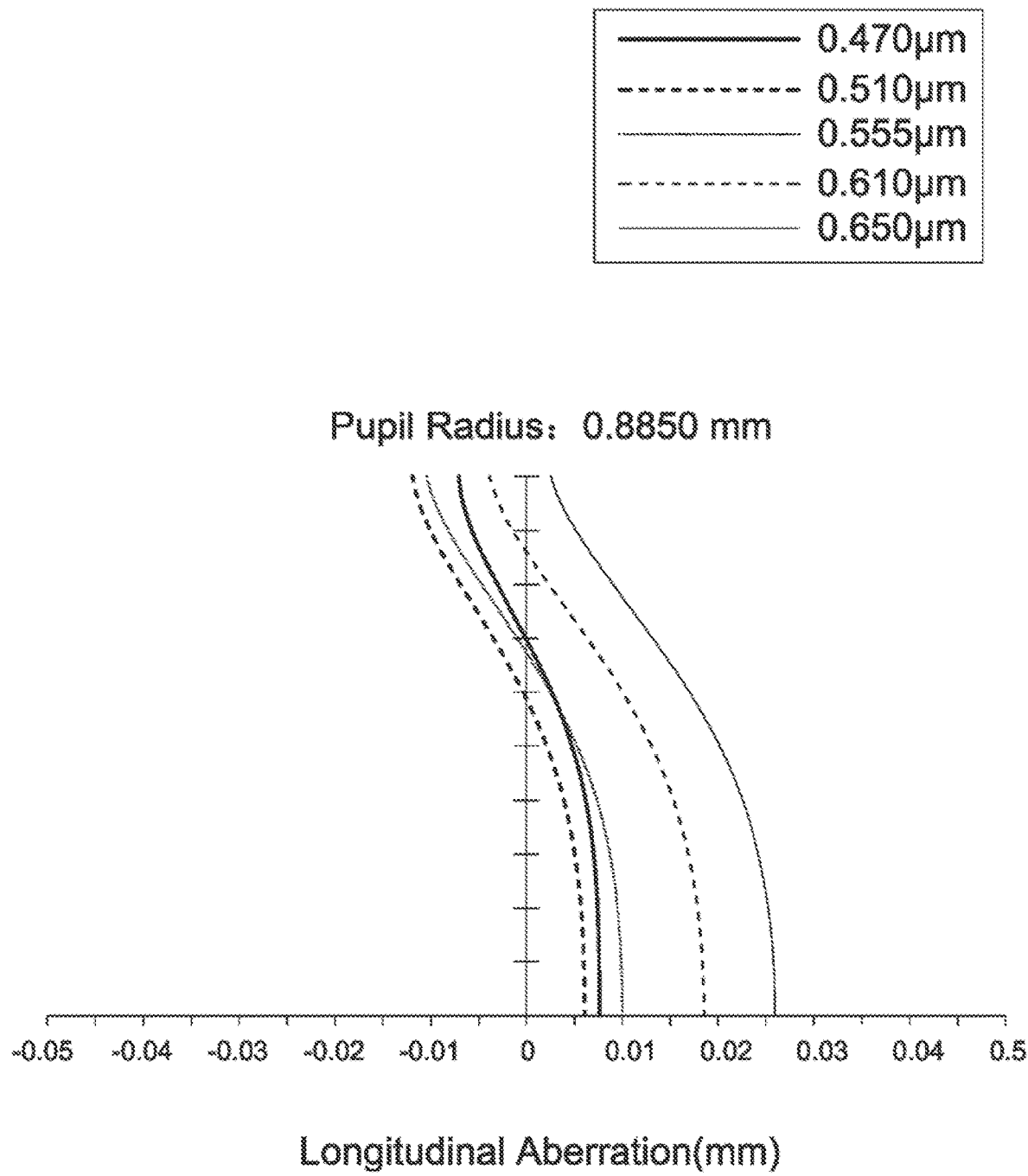
FIG. 14A depicts a longitudinal aberration diagram of the wide-angle lens assembly in accordance with the seventh embodiment of the invention.
Figure 14B:
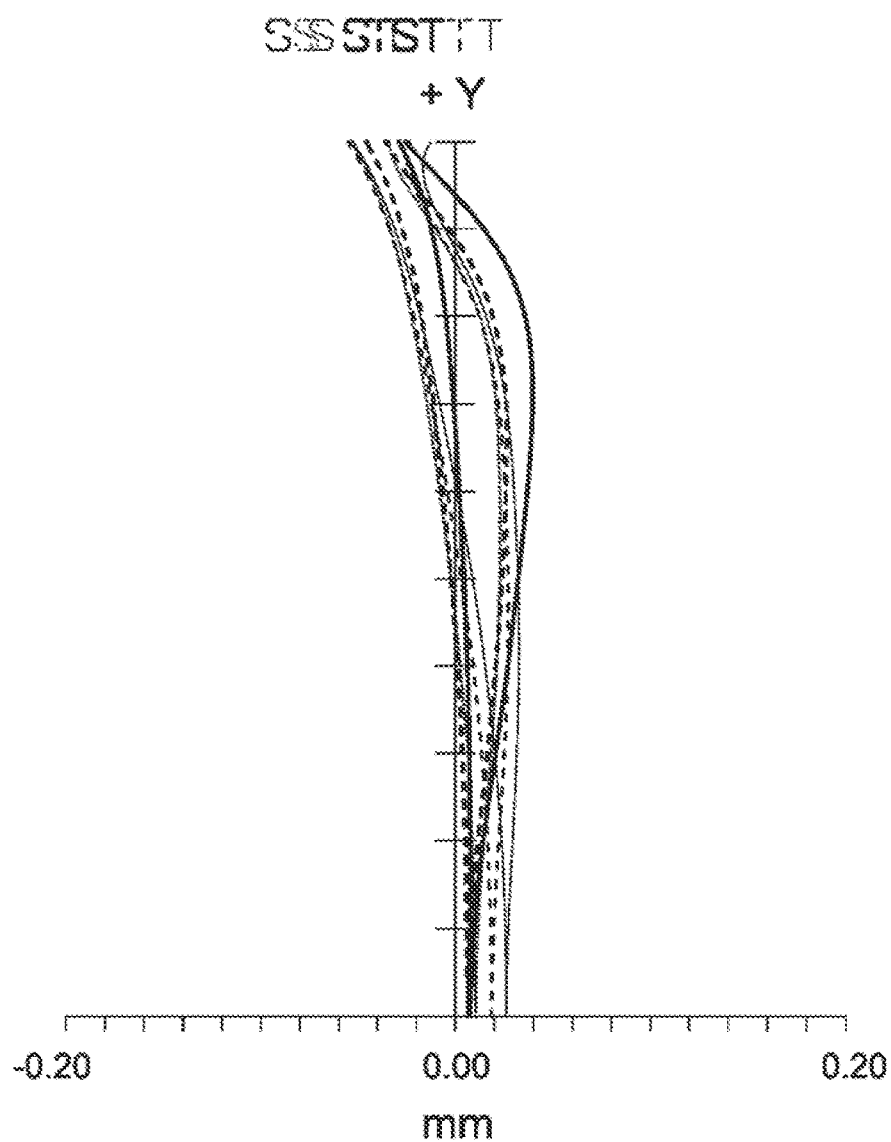
FIG. 14B is a field curvature diagram of the wide-angle lens assembly in accordance with the seventh embodiment of the invention.
Figure 14C:
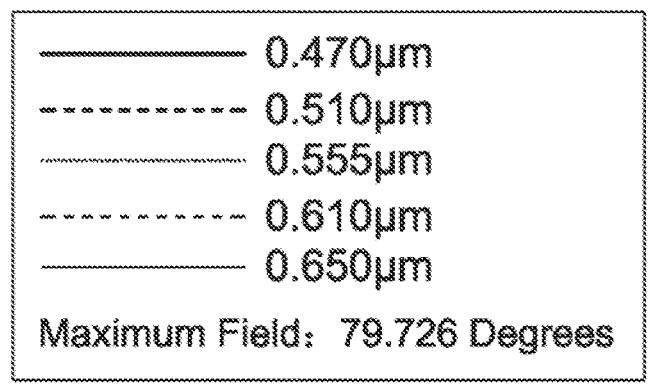
FIG. 14C is a distortion diagram of the wide-angle lens assembly in accordance with the seventh embodiment of the invention.
Figure 14C:
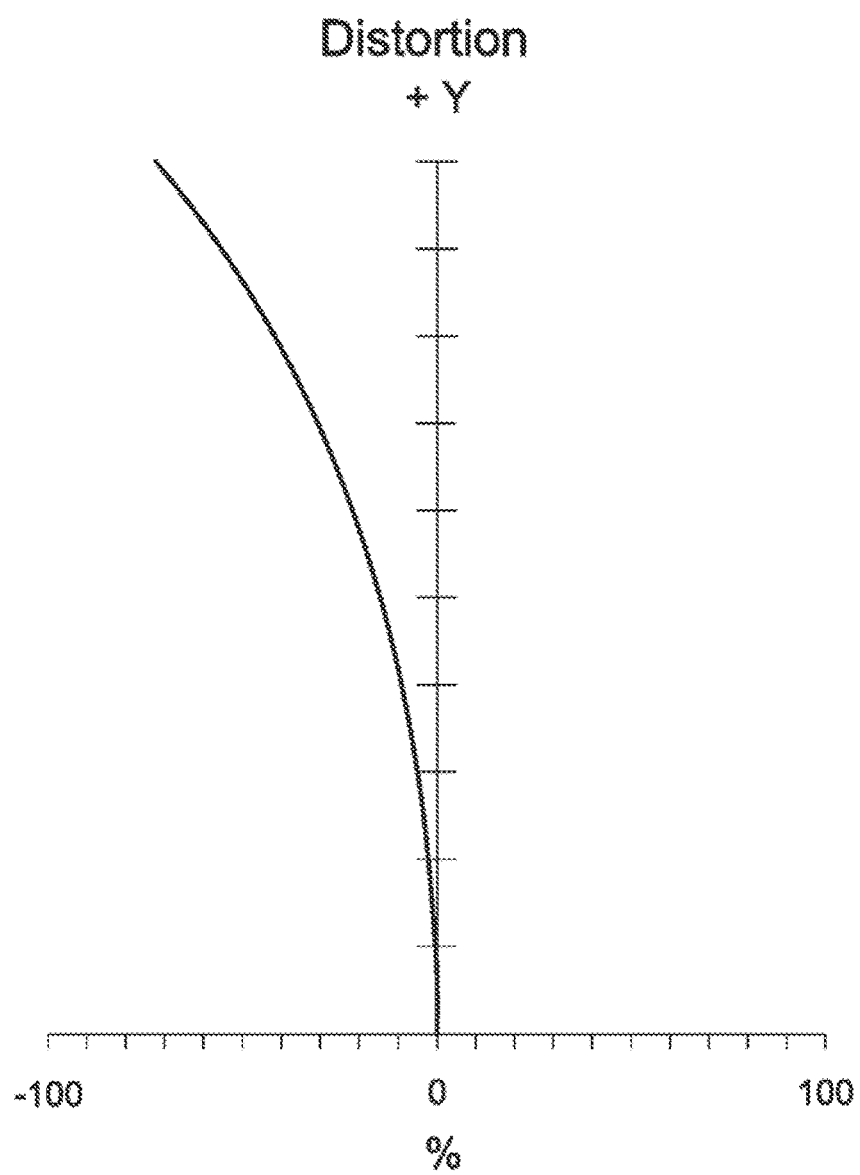
Figure 14D:
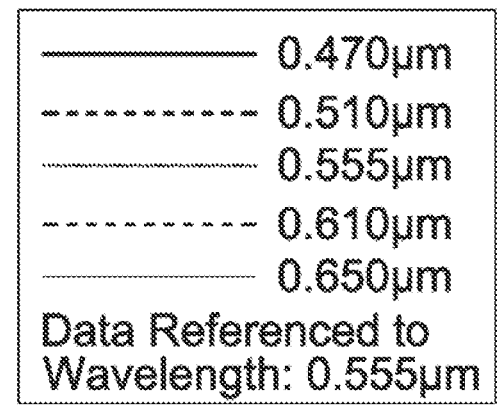
FIG. 14D is a lateral color diagram of the wide-angle lens assembly in accordance with the seventh embodiment of the invention.
Figure 14D:
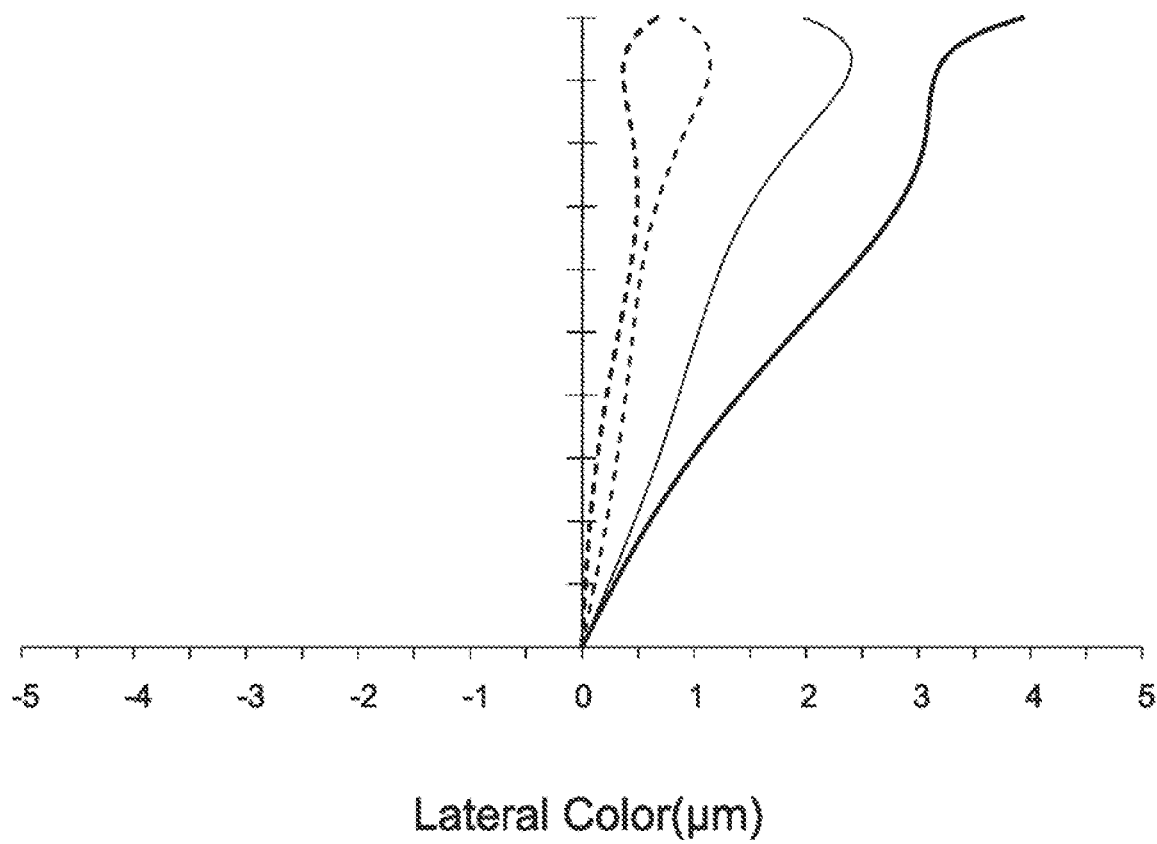
Figure 14E:
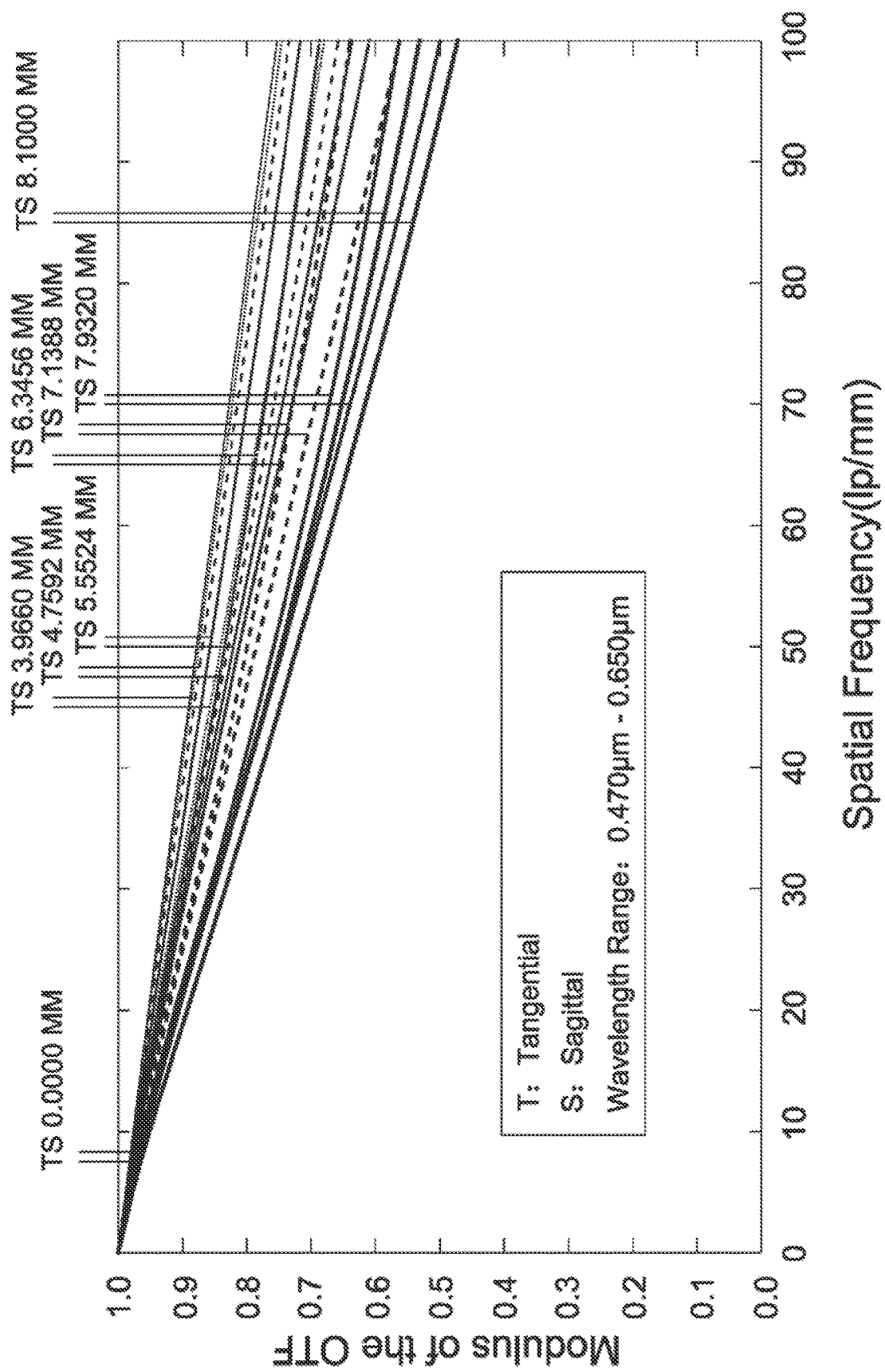
FIG. 14E is a modulation transfer function diagram of the wide-angle lens assembly in accordance with the seventh embodiment of the invention.

It can be seen from FIG. 14A that the longitudinal aberration in the wide-angle lens assembly 7 of the seventh embodiment ranges from −0.015 mm to 0.03 mm. It can be seen from FIG. 14B that the field curvature of tangential direction and sagittal direction in the wide-angle lens assembly 7 of the seventh embodiment ranges from −0.04 mm to 0.06 mm. It can be seen from FIG. 14C that the distortion in the wide-angle lens assembly 7 of the seventh embodiment ranges from −80% to 0%. It can be seen from FIG. 14D that the lateral color in the wide-angle lens assembly 7 of the seventh embodiment ranges from 0 μm to 4.0 μm. It can be seen from FIG. 14E that the modulation transfer function of tangential direction and sagittal direction in the wide-angle lens assembly 7 of the seventh embodiment ranges from 0.48 to 1.0.

It is obvious that the longitudinal aberration, the field curvature, the distortion, and the lateral color of the wide-angle lens assembly 7 of the seventh embodiment can be corrected effectively, and the resolution of the wide-angle lens assembly 7 of the seventh embodiment can meet the requirement. Therefore, the wide-angle lens assembly 7 of the seventh embodiment is capable of good optical performance.

Figure 15:
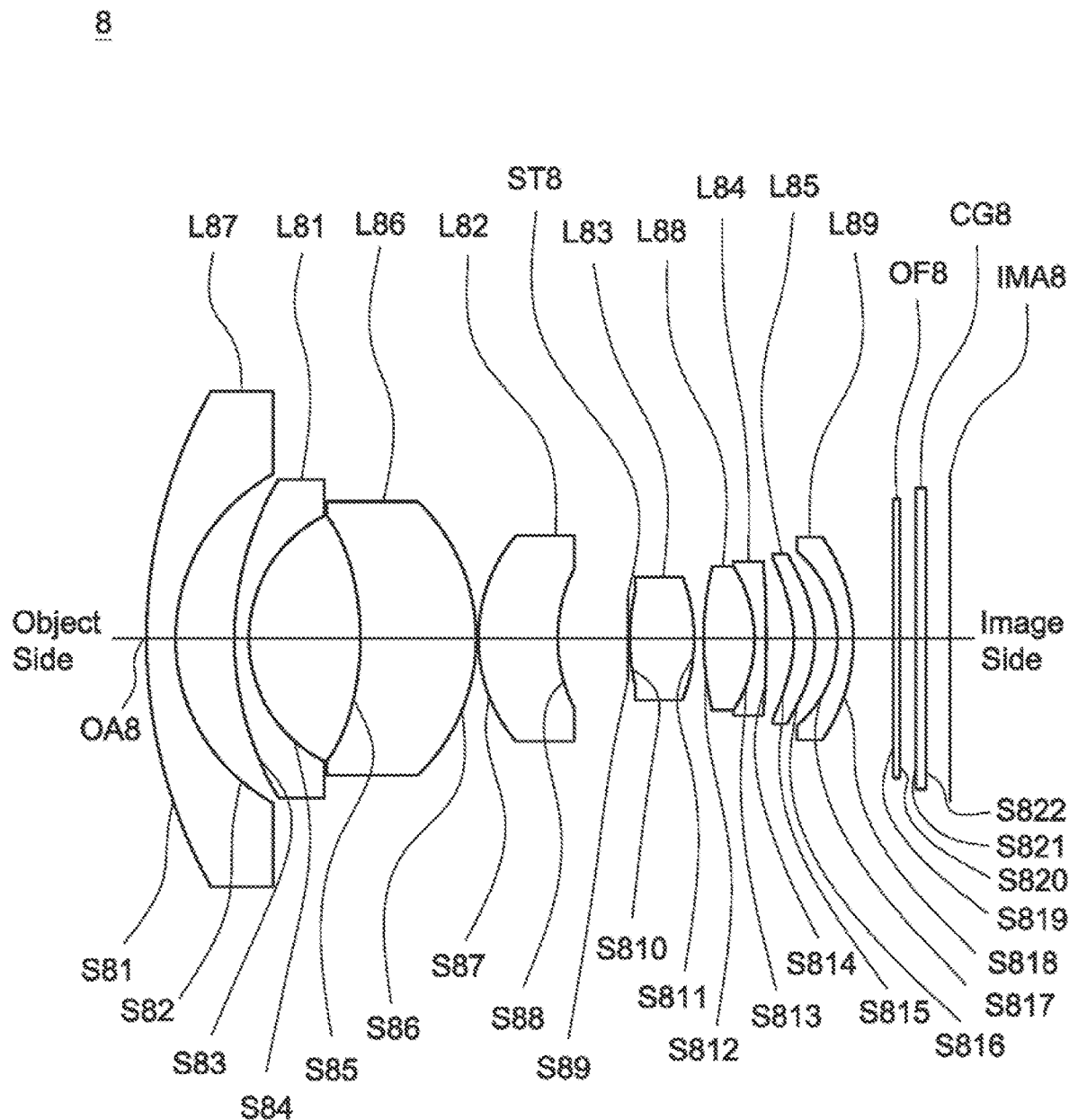
FIG. 15 is a lens layout diagram of a wide-angle lens assembly in accordance with an eighth embodiment of the invention.

Referring to FIG. 15, the wide-angle lens assembly 8 includes a seventh lens L87, a first lens L81, a sixth lens L86, a second lens L82, a stop ST8, a third lens L83, an eighth lens L88, a fourth lens L84, a fifth lens L85, a ninth lens L89, an optical filter OF8, and a cover glass CG8, all of which are arranged in order from an object side to an image side along an optical axis OA8. In operation, an image of light rays from the object side is formed at an image plane IMA8.

According to the foregoing, wherein: the seventh lens L87 is with negative refractive power; the sixth lens L86 is a meniscus lens with positive refractive power, wherein the object side surface S85 is a concave surface, the image side surface S86 is a convex surface, and the object side surface S85 and the image side surface S86 are aspheric surfaces; the second lens L82 is a meniscus lens, wherein the object side surface S87 is a convex surface, the image side surface S88 is a concave surface, and the object side surface S87 and the image side surface S88 are aspheric surfaces; the third lens L83 is a biconvex lens, wherein the image side surface S811 is a convex surface; the fourth lens L84 is a meniscus lens, wherein the image side surface S814 is a convex surface; the fifth lens L85 is a meniscus lens, wherein the object side surface S815 is a concave surface and the object side surface S815 and the image side surface S816 are aspheric surfaces; the ninth lens L89 is a meniscus lens with negative refractive power and made of glass material, wherein the object side surface S817 is a concave surface, the image side surface S818 is a convex surface, and the object side surface S817 and the image side surface S818 are spherical surfaces; both of the object side surface S819 and image side surface S820 of the optical filter OF8 are plane surfaces; and both of the object side surface S821 and image side surface S822 of the cover glass CG8 are plane surfaces.

With the above design of the lenses and stop ST8 and at least any one of the conditions (1)-(5) satisfied, the wide-angle lens assembly 8 can have an effective decreased total lens length, an effective decreased F-number, an effective increased resolution, an effective resisted environmental temperature change, an effective corrected aberration, and an effective corrected chromatic aberration.

Table 17 shows the optical specification of the wide-angle lens assembly 8 in FIG. 15.

The definition of aspheric surface sag z of each aspheric lens in table 17 is the same as that of in Table 11, and is not described here again.

In the eighth embodiment, the conic constant k and the aspheric coefficients A, B, C of each aspheric lens are shown in Table 18.

TABLE 18

| Surface Number | k | A | B | C |
|---|---|---|---|---|
| S85 | 2.943 | 1.61E−04 | −3.81E−06 | 6.26E−08 |
| S86 | 0 | 1.19E−04 | 5.23E−07 | −5.81E−09 |
| S87 | 0 | −5.84E−05 | 9.55E−07 | 1.84E−07 |
| S88 | 0 | 1.93E−04 | 1.31E−06 | 2.47E−06 |
| S815 | 0 | 2.44E−04 | 4.21E−05 | −3.41E−08 |
| S816 | 0 | 4.62E−04 | 2.70E−05 | 5.90E−07 |

Table 19 shows the parameters and condition values for conditions (1)-(5) in accordance with the eighth embodiment of the invention. It can be seen from Table 19 that the wide-angle lens assembly 8 of the eighth embodiment satisfies the conditions (1)-(5).

TABLE 19

| $f_{71}$ | −7.06 mm | $f_{62}$ | 18.22 mm | | |
|---|---|---|---|---|---|
| TTL/f | 7.551 | TTL/$R_{71}$ | 1.560 | $\|f_{71}/f_{62}\|$ | 0.387 |
| $Vd_7$ | 35.3 | $Vd_1$ | 40.8 | | |

By the above arrangements of the lenses and stop ST8, the wide-angle lens assembly 8 of the eighth embodiment can meet the requirements of optical performance as seen in FIGS. 16A-16E.

Figure 16A:
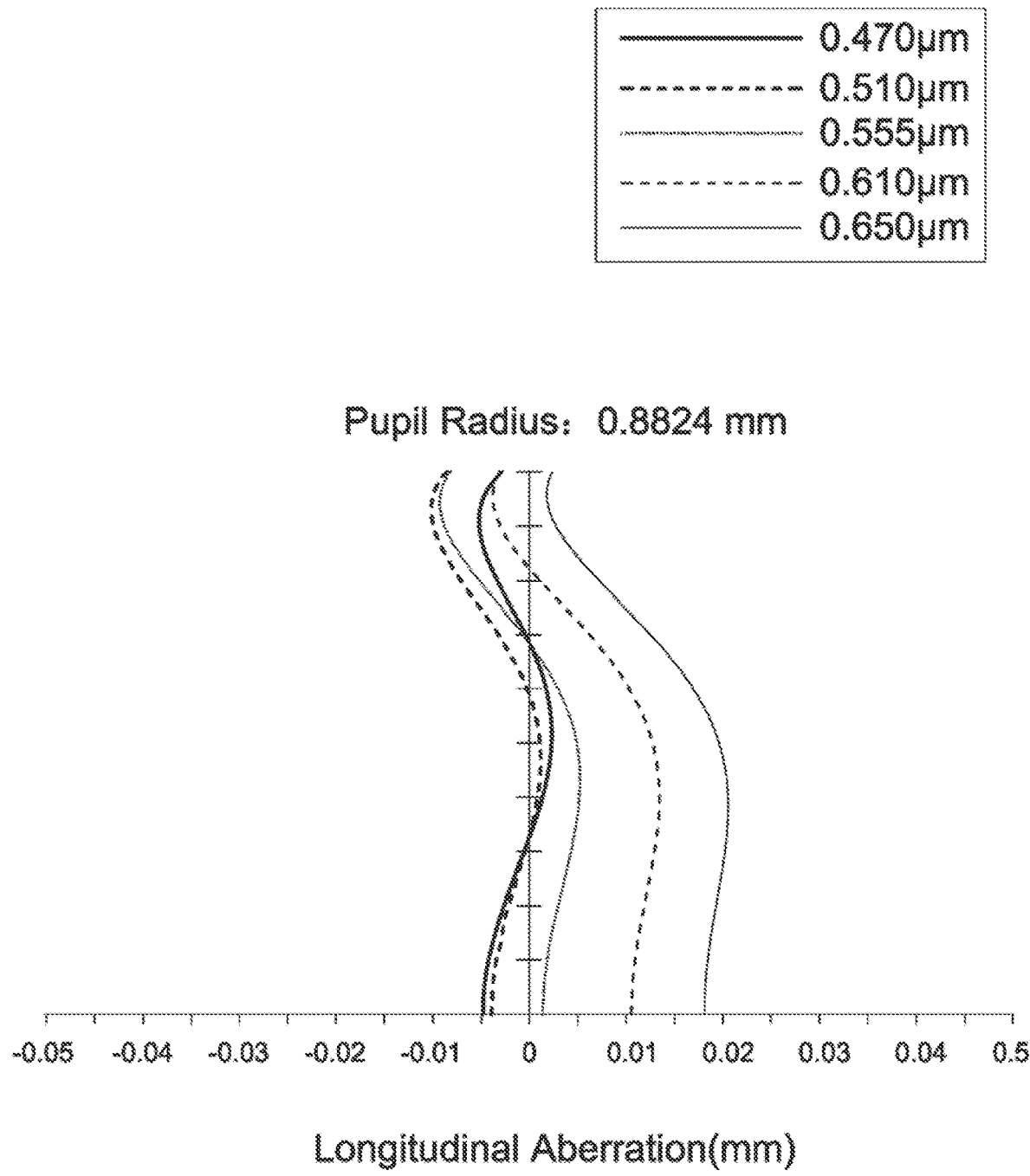
FIG. 16A depicts a longitudinal aberration diagram of the wide-angle lens assembly in accordance with the eighth embodiment of the invention.
Figure 16B:
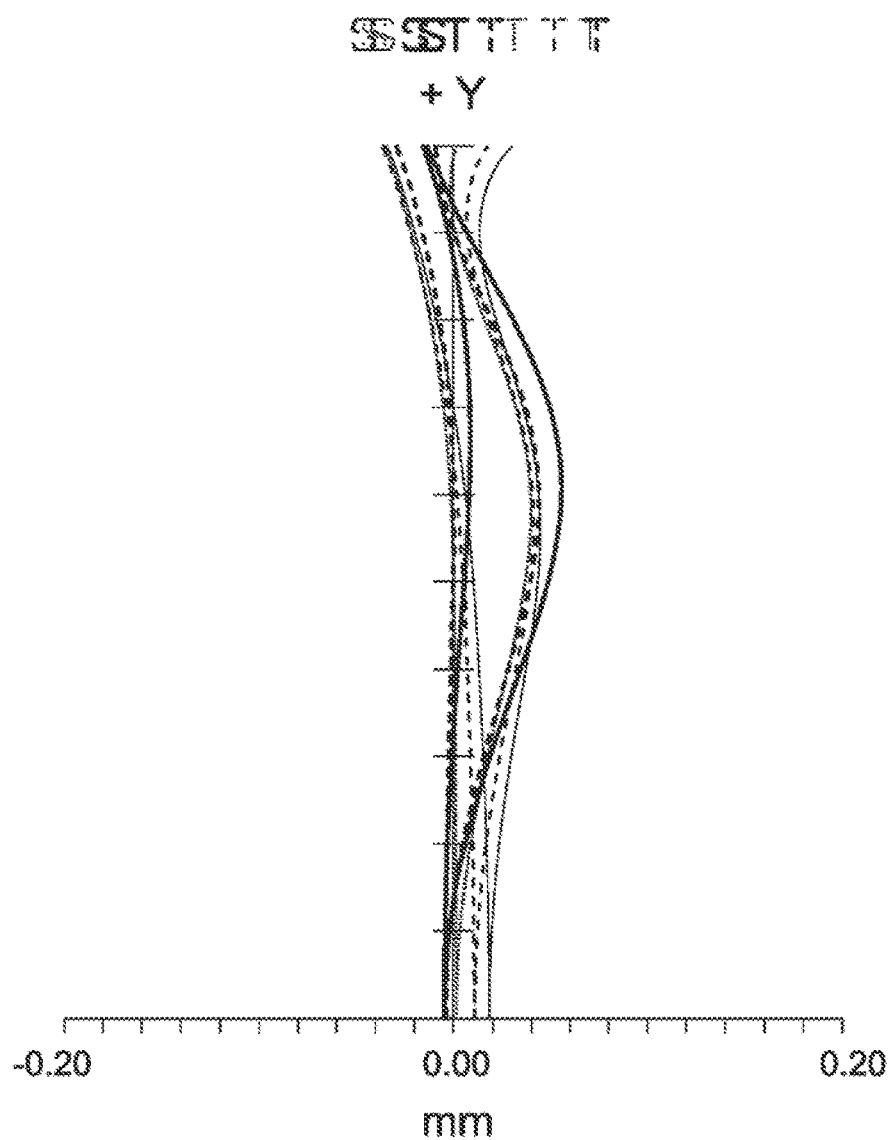
FIG. 16B is a field curvature diagram of the wide-angle lens assembly in accordance with the eighth embodiment of the invention.
Figure 16C:
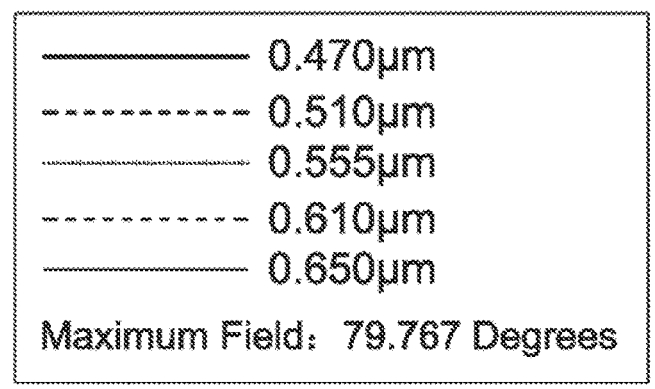
FIG. 16C is a distortion diagram of the wide-angle lens assembly in accordance with the eighth embodiment of the invention.
Figure 16C:
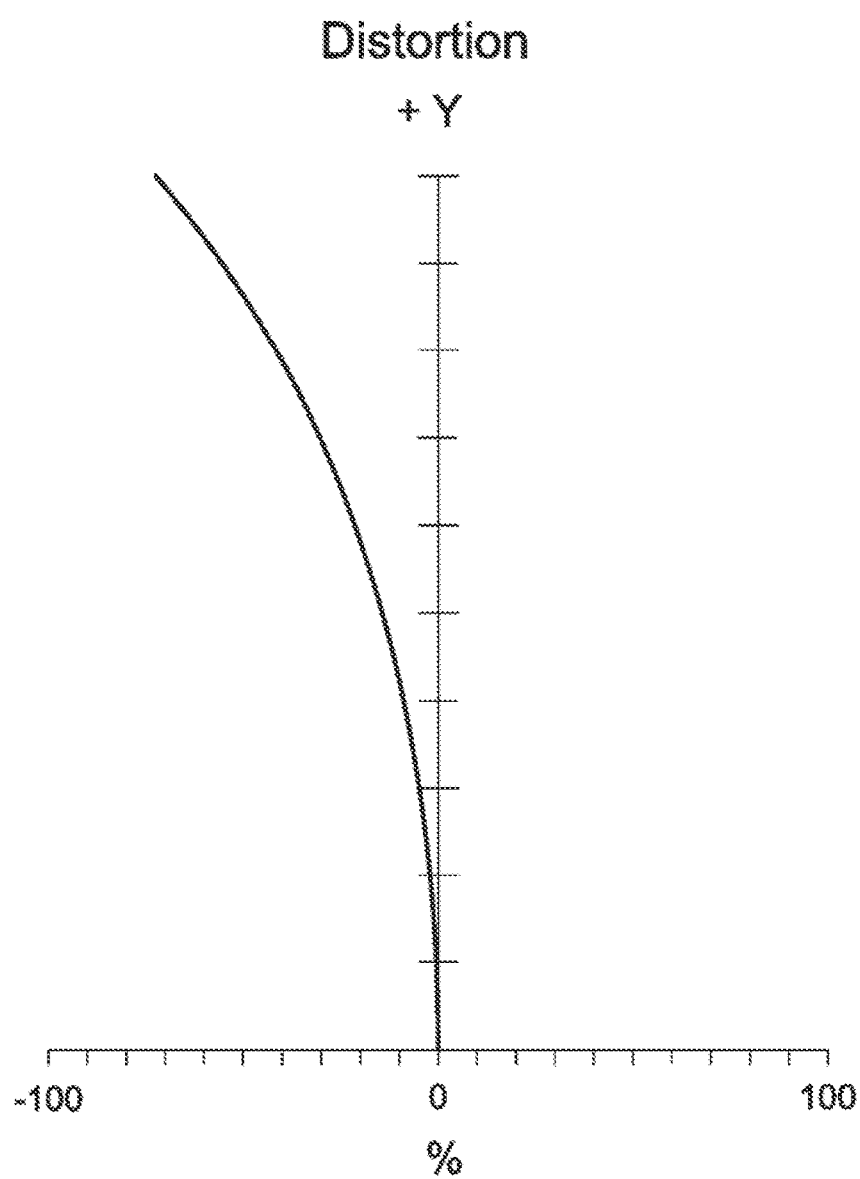
Figure 16D:
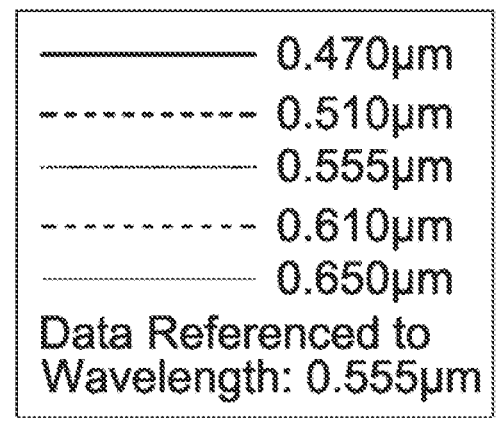
FIG. 16D is a lateral color diagram of the wide-angle lens assembly in accordance with the eighth embodiment of the invention.
Figure 16D:
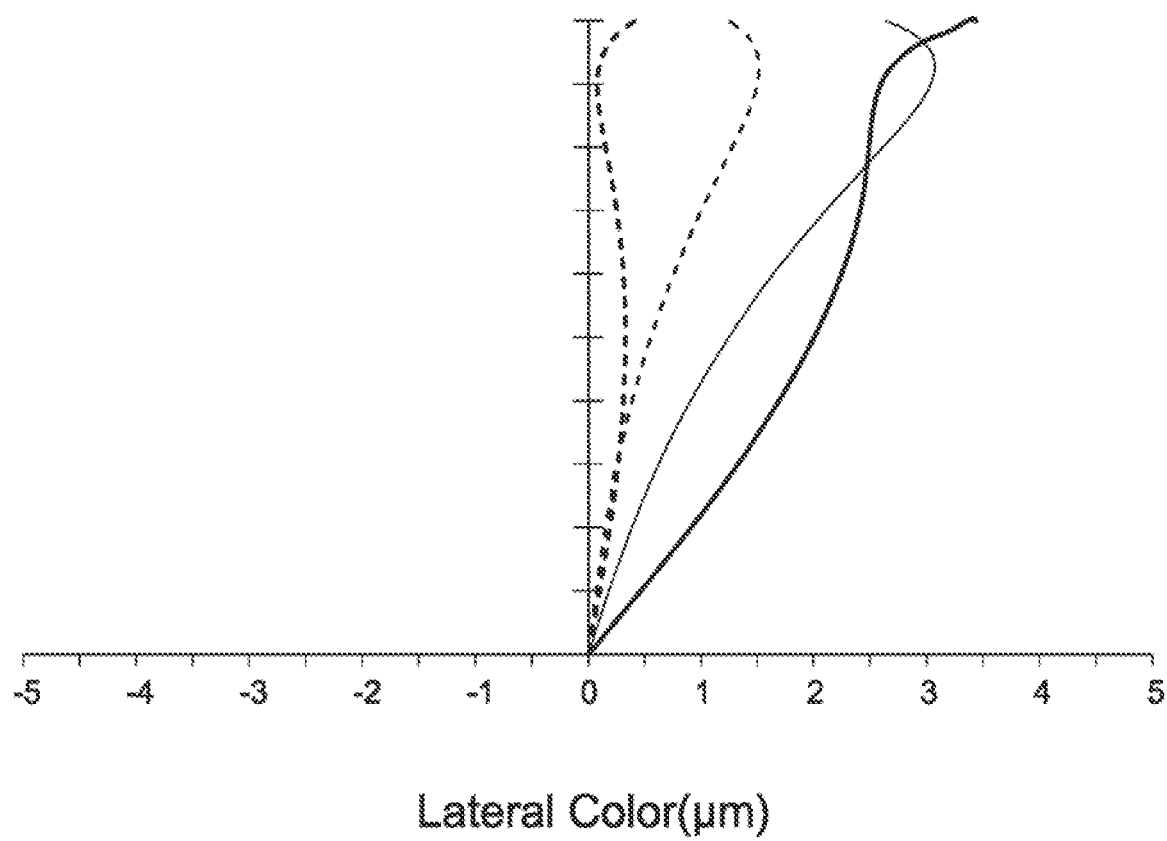

It can be seen from FIG. 16A that the longitudinal aberration in the wide-angle lens assembly 8 of the eighth embodiment ranges from −0.01 mm to 0.025 mm. It can be seen from FIG. 16B that the field curvature of tangential direction and sagittal direction in the wide-angle lens assem-

TABLE 17

Effective Focal Length = 5.3 mm F-number = 3.0
Total Lens Length = 40.02 mm Field of View = 159.534 degrees

| Surface Number | Radius of Curvature (mm) | Thickness (mm) | Nd | Vd | Effective Focal Length (mm) | Remark |
|---|---|---|---|---|---|---|
| S81 | 25.65 | 1.41 | 1.91 | 35.25 | −16.70 | The Seventh Lens L87 |
| S82 | 9.33 | 2.95 | | | | |
| S83 | 15.33 | 0.70 | 1.88 | 40.77 | −14.60 | The First Lens L81 |
| S84 | 6.86 | 5.61 | | | | |
| S85 | −13.78 | 5.76 | 1.52 | 64.05 | 34.70 | The Sixth Lens L86 |
| S86 | −8.91 | 0.10 | | | | |
| S87 | 8.24 | 3.94 | 1.71 | 29.67 | 56 | The Second Lens L82 |
| S88 | 8.29 | 3.50 | | | | |
| S89 | ∞ | 0.10 | | | | Stop ST8 |
| S810 | 10.83 | 3.19 | 1.5 | 81.61 | 10.2 | The Third Lens L83 |
| S811 | −8.60 | 0.50 | | | | |
| S812 | 15.82 | 2.51 | 1.5 | 81.61 | 9.8 | The Eighth Lens L88 |
| S813 | −6.71 | 0.60 | 1.85 | 23.78 | −9.2 | The Fourth Lens L84 |
| S814 | −46.45 | 1.38 | | | | |
| S815 | −6.86 | 1.05 | 1.81 | 40.25 | 40.8 | The Fifth Lens L85 |
| S816 | −6.06 | 1.12 | | | | |
| S817 | −5.74 | 0.80 | 1.85 | 23.78 | −20.5 | The Ninth Lens L89 |
| S818 | −9.08 | 2.00 | | | | |
| S819 | ∞ | 0.30 | 1.52 | 64.17 | | Optical Filter OF8 |
| S820 | ∞ | 0.80 | | | | |
| S821 | ∞ | 0.50 | 1.52 | 64.17 | | Cove Glass CG8 |
| S822 | ∞ | 1.20 | | | | | bly 8 of the eighth embodiment ranges from −0.04 mm to 0.06 mm. It can be seen from FIG. 16C that the distortion in the wide-angle lens assembly 8 of the eighth embodiment ranges from −80% to 0%. It can be seen from FIG. 16D that the lateral color in the wide-angle lens assembly 8 of the eighth embodiment ranges from 0 μm to 3.5 μm. It can be seen from FIG. 16E that the modulation transfer function of tangential direction and sagittal direction in the wide-angle lens assembly 8 of the eighth embodiment ranges from 0.49 to 1.0.

It is obvious that the longitudinal aberration, the field curvature, the distortion, and the lateral color of the wide-angle lens assembly 8 of the eighth embodiment can be corrected effectively, and the resolution of the wide-angle lens assembly 8 of the eighth embodiment can meet the requirement. Therefore, the wide-angle lens assembly 8 of the eighth embodiment is capable of good optical performance.

Figure 17:
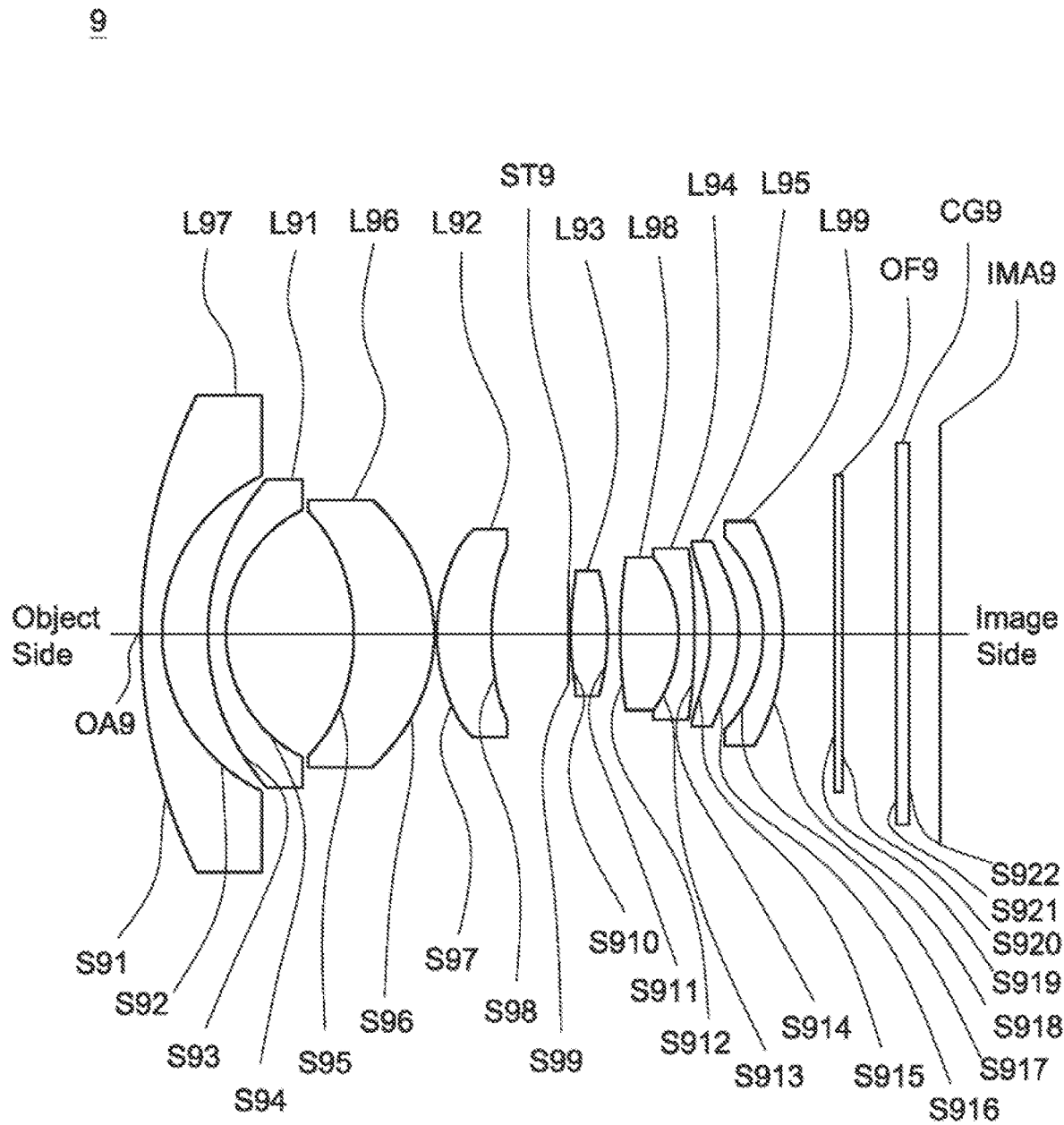
FIG. 17 is a lens layout diagram of a wide-angle lens assembly in accordance with a ninth embodiment of the invention.

Referring to FIG. 17, the wide-angle lens assembly 9 includes a seventh lens L97, a first lens L91, a sixth lens L96, a second lens L92, a stop ST9, a third lens L93, an eighth lens L98, a fourth lens L94, a fifth lens L95, a ninth lens L99, an optical filter OF9, and a cover glass CG9, all of which are arranged in order from an object side to an image side along an optical axis OA9. In operation, an image of light rays from the object side is formed at an image plane IMA9.

According to the foregoing, wherein: the seventh lens L97 is with negative refractive power; the sixth lens L96 is a meniscus lens with positive refractive power, wherein the object side surface S95 is a concave surface, the image side surface S96 is a convex surface, and the object side surface S95 and the image side surface S96 are aspheric surfaces; the second lens L92 is a meniscus lens, wherein the object side surface S97 is a convex surface, the image side surface S98 is a concave surface, and the object side surface S97 and the image side surface S98 are aspheric surfaces; the third lens L93 is a biconvex lens, wherein the image side surface S911 is a convex surface; the fourth lens L94 is a meniscus lens, wherein the image side surface S914 is a convex surface; the fifth lens L95 is a meniscus lens, wherein the object side surface S915 is a concave surface and the object side surface S915 and the image side surface S916 are aspheric surfaces; the ninth lens L99 is a meniscus lens with negative refractive power and made of glass material, wherein the object side surface S917 is a concave surface, the image side surface S918 is a convex surface, and the object side surface S917 and the image side surface S918 are spherical surfaces; both of the object side surface S919 and image side surface S920 of the optical filter OF9 are plane surfaces; and both of the object side surface S921 and image side surface S922 of the cover glass CG9 are plane surfaces.

With the above design of the lenses and stop ST9 and at least any one of the conditions (1)-(5) satisfied, the wide-angle lens assembly 9 can have an effective decreased total lens length, an effective decreased F-number, an effective increased resolution, an effective resisted environmental temperature change, an effective corrected aberration, and an effective corrected chromatic aberration.

Table 20 shows the optical specification of the wide-angle lens assembly 9 in FIG. 17.

TABLE 20

Effective Focal Length = 5.3 mm F-number = 3.0
Total Lens Length = 31.01 mm Field of View = 159.616 degrees

| Surface Number | Radius of Curvature (mm) | Thickness (mm) | Nd | Vd | Effective Focal Length (mm) | Remark |
|---|---|---|---|---|---|---|
| S91 | 21.13 | 0.80 | 1.91 | 35.25 | −11.30 | The Seventh Lens L97 |
| S92 | 6.81 | 1.80 | | | | |
| S93 | 9.08 | 0.70 | 1.88 | 40.77 | −16.50 | The First Lens L91 |
| S94 | 5.40 | 4.96 | | | | |
| S95 | −7.78 | 3.11 | 1.52 | 64.05 | 37.30 | The Sixth Lens L96 |
| S96 | −6.31 | 0.10 | | | | |
| S97 | 6.67 | 2.11 | 1.71 | 29.67 | 21.60 | The Second Lens L92 |
| S98 | 10.14 | 3.00 | | | | |
| S99 | ∞ | 0.10 | | | | Stop ST9 |
| S910 | 13.09 | 1.41 | 1.5 | 81.61 | 11.1 | The Third Lens L93 |
| S911 | −9.24 | 0.50 | | | | |
| S912 | 19.36 | 2.28 | 1.5 | 81.61 | 8.2 | The Eighth Lens L98 |
| S913 | −5.01 | 0.60 | 1.85 | 23.78 | −7.6 | The Fourth Lens L94 |
| S914 | −23.86 | 0.61 | | | | |
| S915 | −6.65 | 1.12 | 1.81 | 40.25 | 22.8 | The Fifth Lens L95 |
| S916 | −5.25 | 0.93 | | | | |
| S917 | −5.47 | 0.80 | 1.85 | 23.78 | −18.2 | The Ninth Lens L99 |
| S918 | −9.02 | 2.00 | | | | |
| S919 | ∞ | 0.30 | 1.52 | 64.17 | | Optical Filter OF9 |
| S920 | ∞ | 2.08 | | | | |
| S921 | ∞ | 0.50 | 1.52 | 64.17 | | Cover Glass CG9 |
| S922 | ∞ | 1.20 | | | | |

The definition of aspheric surface sag z of each aspheric lens in table 20 is the same as that of in Table 11, and is not described here again.

In the ninth embodiment, the conic constant k and the aspheric coefficients A, B, C of each aspheric lens are shown in Table 21.

TABLE 21

| Surface Number | k | A | B | C |
|---|---|---|---|---|
| S95 | 1.078 | 7.67E−04 | −5.67E−05 | 1.85E−06 |
| S96 | 0 | 1.64E−04 | 7.15E−06 | 2.14E−07 |

TABLE 21-continued

| Surface Number | k | A | B | C |
|---|---|---|---|---|
| S97 | 0 | −7.08E−04 | −6.32E−07 | 3.05E−06 |
| S98 | 0 | −5.78E−04 | −1.26E−05 | 8.43E−06 |
| S915 | 0 | 2.31E−04 | 1.31E−04 | 1.85E−07 |
| S916 | 0 | 8.07E−04 | 6.72E−05 | 3.66E−06 |

Table 22 shows the parameters and condition values for conditions (1)-(5) in accordance with the ninth embodiment of the invention. It can be seen from Table 22 that the wide-angle lens assembly 9 of the ninth embodiment satisfies the conditions (1)-(5).

TABLE 22

| $f_{71}$ | −6.12 mm | $f_{62}$ | 12.27 mm | | |
|---|---|---|---|---|---|
| TTL/f | 5.851 | TTL/$R_{71}$ | 1.468 | $|f_{71}/f_{62}|$ | 0.498 |
| $Vd_7$ | 35.3 | $Vd_1$ | 40.8 | | |

By the above arrangements of the lenses and stop ST9, the wide-angle lens assembly 9 of the ninth embodiment can meet the requirements of optical performance as seen in FIGS. 18A-18E.

Figure 18A:
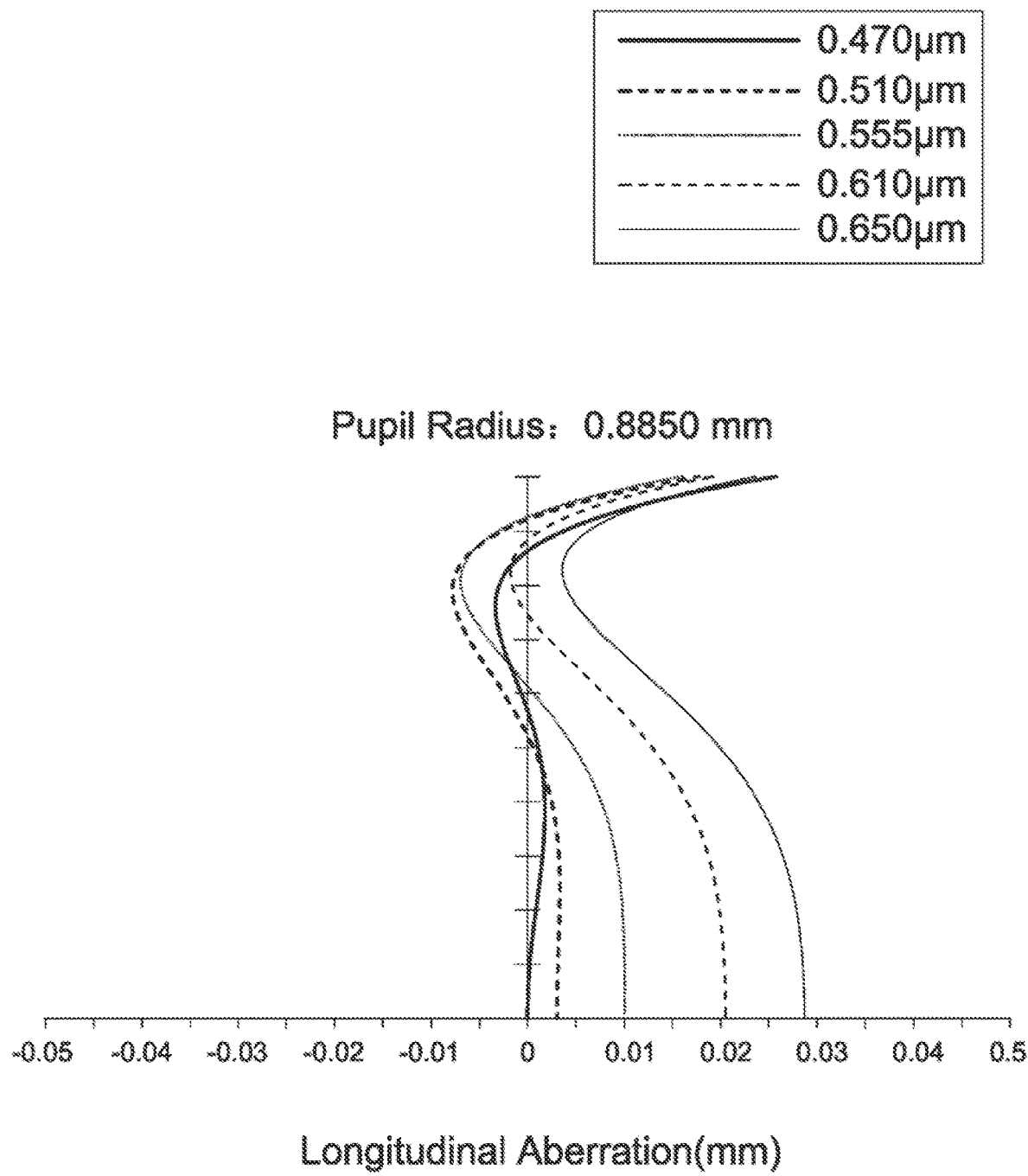
FIG. 18A depicts a longitudinal aberration diagram of the wide-angle lens assembly in accordance with the ninth embodiment of the invention.
Figure 18B:
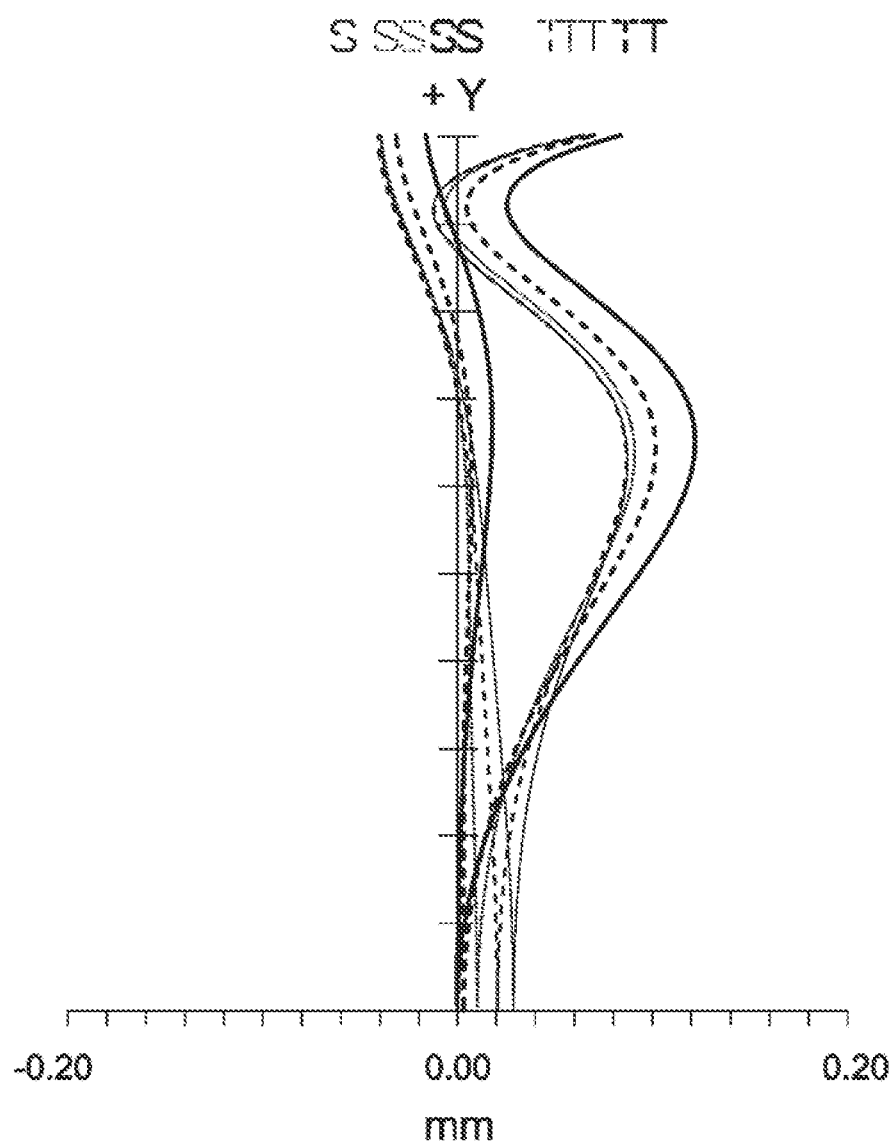
FIG. 18B is a field curvature diagram of the wide-angle lens assembly in accordance with the ninth embodiment of the invention.
Figure 18C:
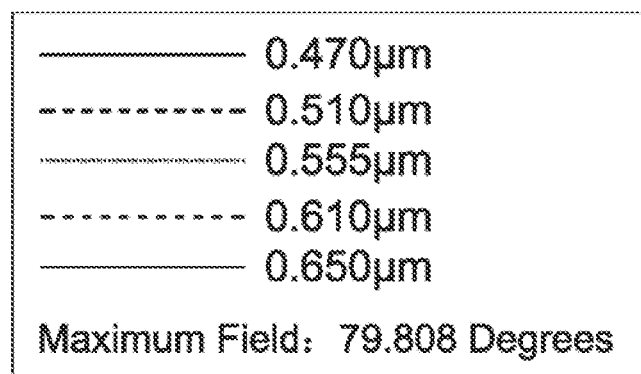
FIG. 18C is a distortion diagram of the wide-angle lens assembly in accordance with the ninth embodiment of the invention.
Figure 18C:
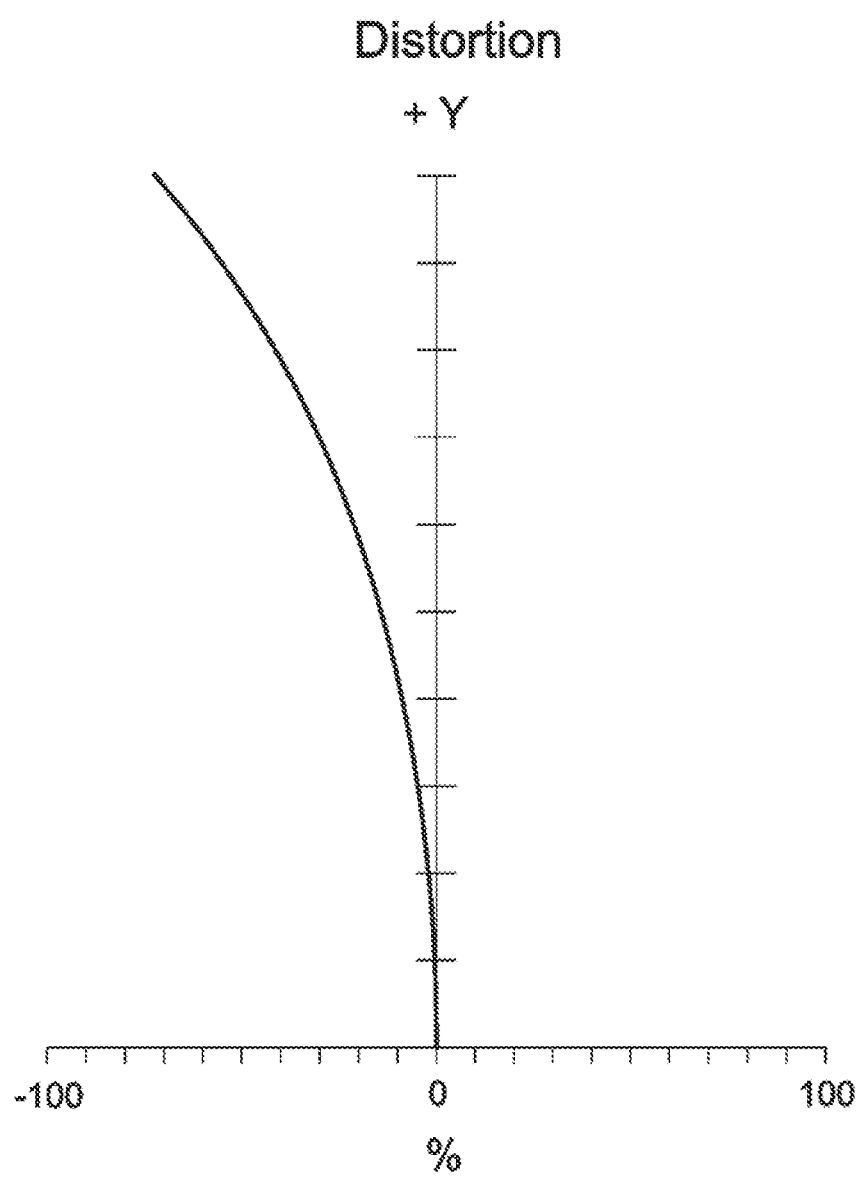
Figure 18D:
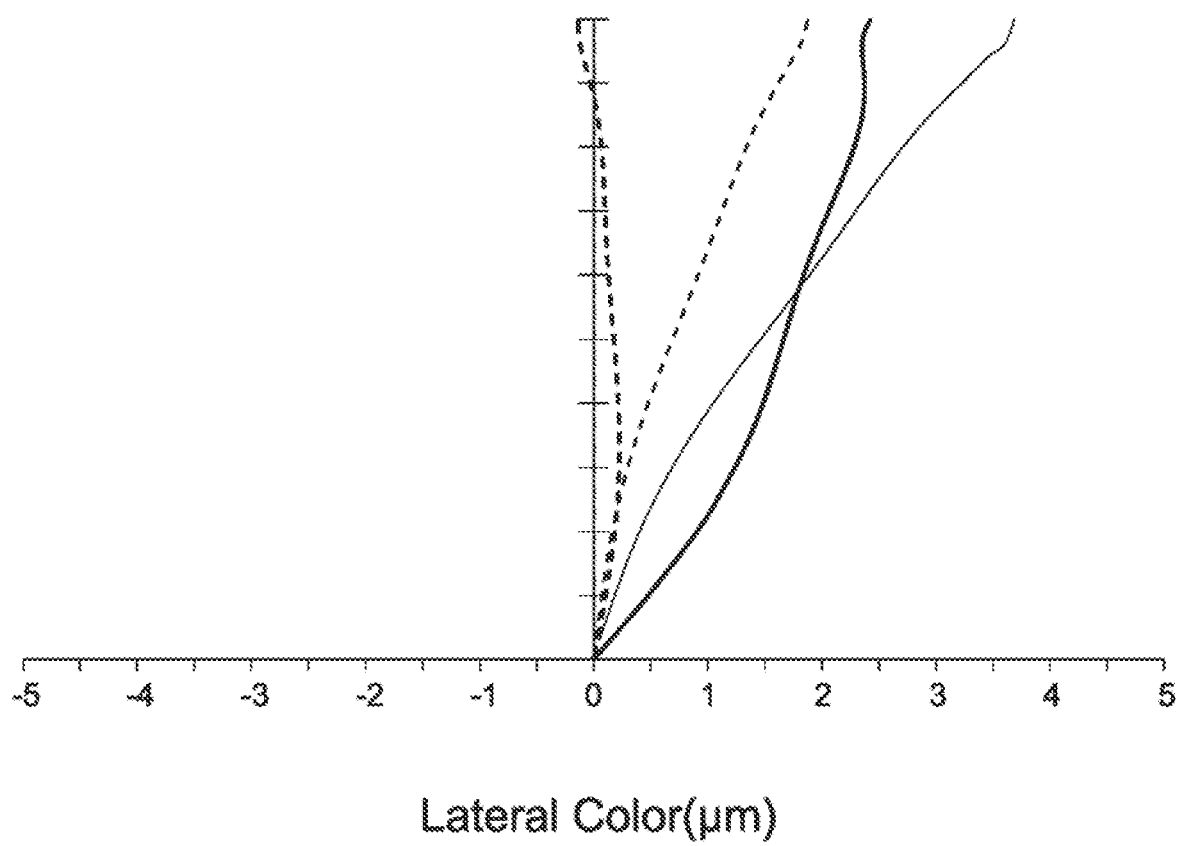
FIG. 18D is a lateral color diagram of the wide-angle lens assembly in accordance with the ninth embodiment of the invention.
Figure 18E:
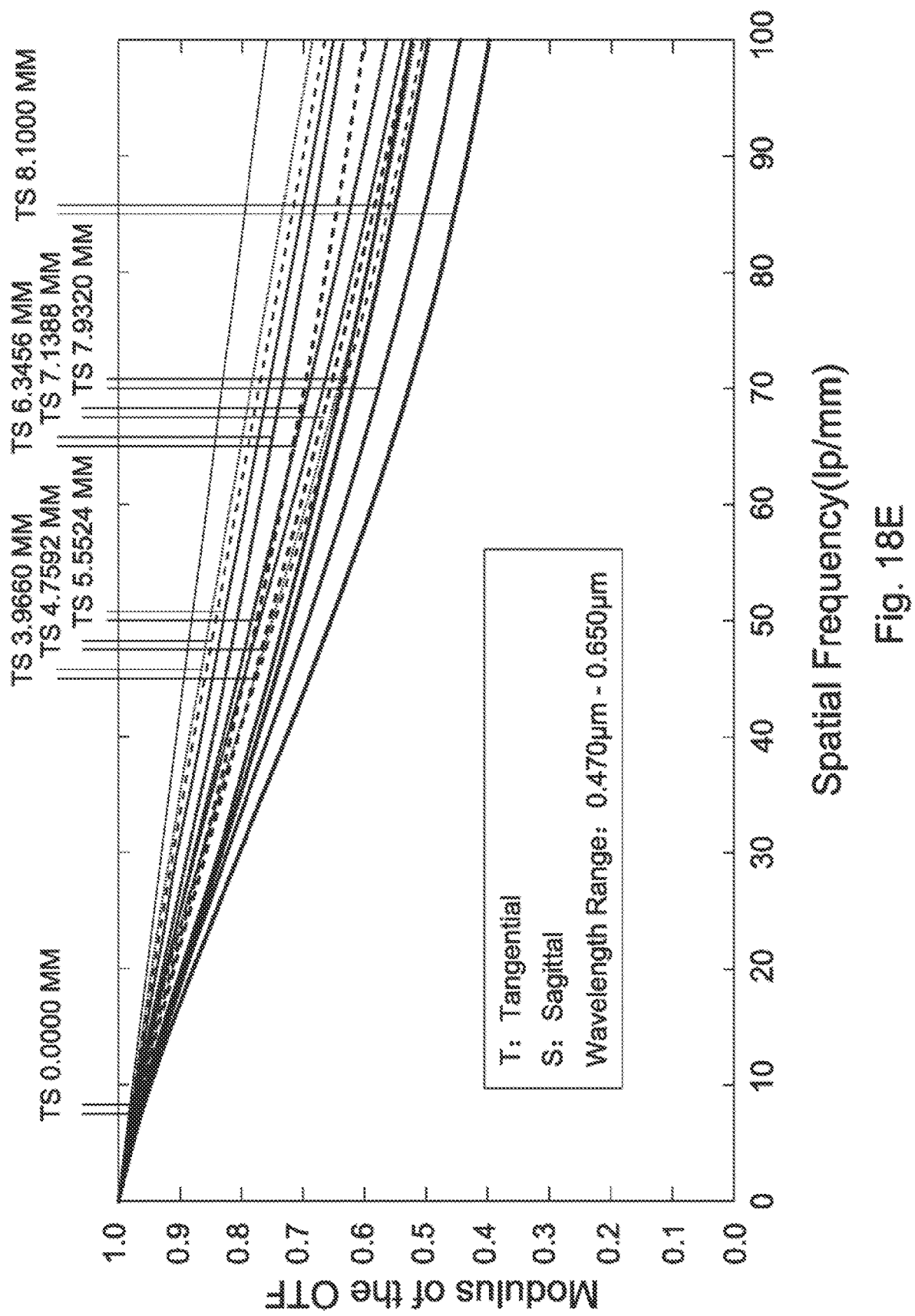
FIG. 18E is a modulation transfer function diagram of the wide-angle lens assembly in accordance with the ninth embodiment of the invention.

It can be seen from FIG. 18A that the longitudinal aberration in the wide-angle lens assembly 9 of the ninth embodiment ranges from −0.01 mm to 0.03 mm. It can be seen from FIG. 18B that the field curvature of tangential direction and sagittal direction in the wide-angle lens assembly 9 of the ninth embodiment ranges from −0.04 mm to 0.13 mm. It can be seen from FIG. 18C that the distortion in the wide-angle lens assembly 9 of the ninth embodiment ranges from −80% to 0%. It can be seen from FIG. 18D that the lateral color in the wide-angle lens assembly 9 of the ninth embodiment ranges from 0.5 μm to 4.0 μm. It can be seen from FIG. 18E that the modulation transfer function of tangential direction and sagittal direction in the wide-angle lens assembly 9 of the ninth embodiment ranges from 0.40 to 1.0.

It is obvious that the longitudinal aberration, the field curvature, the distortion, and the lateral color of the wide-angle lens assembly 9 of the ninth embodiment can be corrected effectively, and the resolution of the wide-angle lens assembly 9 of the ninth embodiment can meet the requirement. Therefore, the wide-angle lens assembly 9 of the ninth embodiment is capable of good optical performance.

Referring to Table 23, Table 24, Table 26, Table 27, Table 29, Table 30, Table 32, and Table 33, wherein Table 23, Table 26, Table 29, and Table 32 show optical specification in accordance with a tenth, eleventh, twelfth, and thirteenth embodiments of the invention respectively and Table 24, Table 27, Table 30, and Table 33 show aspheric coefficients of each aspheric lens in Table 23, Table 26, Table 29, and Table 32 respectively.

FIG. 19, FIG. 21, FIG. 23, and FIG. 25 are lens layout and optical path diagrams of the wide-angle lens assemblies in accordance with the tenth, eleventh, twelfth, and thirteenth embodiments of the invention respectively.

The first lenses L101, L111, L121, L131 are meniscus lenses with negative refractive power and made of plastic material, wherein the object side surfaces S101, S111, S121, S131 are convex surfaces, the image side surfaces S102, S112, S122, S132 are concave surfaces, and the object side surfaces S101, S111, S121, S131 and the image side surfaces S102, S112, S122, S132 are aspheric surfaces.

The second lenses L102, L112, L122, L132 are biconvex lenses with positive refractive power and made of plastic material, wherein the object side surfaces S105, S15 S125, S133 are convex surfaces, the image side surfaces S106, S116, S126, S134 are convex surfaces, and the object side surfaces S105, S115 S125, S133 and the image side surfaces S106, S116, S126, S134 are aspheric surfaces.

The third lenses L103, L113, L123, L133 are biconvex lenses with positive refractive power and made of plastic material, wherein the object side surfaces S108, S118, S128, S136 are convex surfaces, the image side surfaces S109, S119, S129, S137 are convex surfaces, and the object side surfaces S108, S118, S128, S136 and the image side surfaces S109, S119, S129, S137 are aspheric surfaces.

The fourth lenses L104, L114, L124, L134 are biconcave lenses with negative refractive power and made of plastic material, wherein the object side surfaces S1010, S1110, S1210, S138 are concave surfaces, the image side surfaces S1011, S1111, S1211, S139 are concave surfaces, and the object side surfaces S1010, S1110, S1210, S138 and the image side surfaces S011, S1111, S1211, S139 are aspheric surfaces.

The fifth lenses L105, L115, L125, L135 are biconvex lenses with positive refractive power and made of plastic material, wherein the object side surfaces S1012, S1112, S1212, S1310 are convex surfaces, the image side surfaces S1013, S1113, S1213, S1311 are convex surfaces, and the object side surfaces S1012, S1112, S1212, S1310 and the image side surfaces S1013, S1113, S1213, S1311 are aspheric surfaces.

In addition, the lens assemblies 10, 11, 12, 13 satisfy at least one of the following conditions:

$$0.4 \leq BFL/TTL \leq 0.5, \quad (6)$$

$$4 \leq TTL/IH \leq 6.5; \quad (7)$$

$$0.8 \leq |f_1|/f \leq 1.5; \quad (8)$$

$$1.1 \leq BFL/IH \leq 2.8; \quad (9)$$

$$-0.93 < f_1/f_5 \leq -0.68; \quad (10)$$

wherein BFL is an interval from the image side surfaces S1013, S1113, S1213, S1311 of the fifth lenses L105, L115, L125, L135 to the image planes IMA10, IMA11, IMA12, IMA13 along the optical axes OA10, OA11, OA12, OA13 respectively for the tenth to thirteenth embodiments, TTL is an interval from the object side surfaces S101, S111, S121, S131 of the first lenses L101, L111, L121, L131 to the image planes IMA10, IMA11, IMA12, IMA13 along the optical axes OA10, OA11, OA12, OA13 respectively for the tenth to thirteenth embodiments, IH is a half image height of the image planes IMA10, IMA11, IMA12, IMA13 of the wide-angle lens assemblies 10, 11, 12, 13 for the tenth to thirteenth embodiments, $f_1$ is an effective focal length of the first lenses L101, L11, L121, L131 for the tenth to the thirteenth embodiments, $f_5$ is an effective focal length of the fifth lenses L105, L115, L125, L135 for the tenth to the thirteenth embodiments, f is an effective focal length of the lens assemblies 10, 11, 12, 13 for the tenth to the thirteenth embodiments. With the lens assemblies 10, 11, 12, 13 satisfying at least one of the above conditions (6)-(10), the total lens length can be effectively shortened, the resolution can be effectively increased, the chromatic aberration can be effectively corrected, and the aberration can be effectively corrected.

Condition (6) is used to confirm the back focal length, condition (7) is used to confirm the relationship between image height and total lens length of the wide-angle lens assembly, condition (8) is used to confirm the ability of light collection of the first lens, condition (9) is used to confirm the size of the back focus space, and condition (10) is used to confirm the machinability of the first lens and the fifth lens.

The above conditions (6)-(10) can make the wide-angle lens assembly having good optical performance and reducing production cost.

Figure 19:
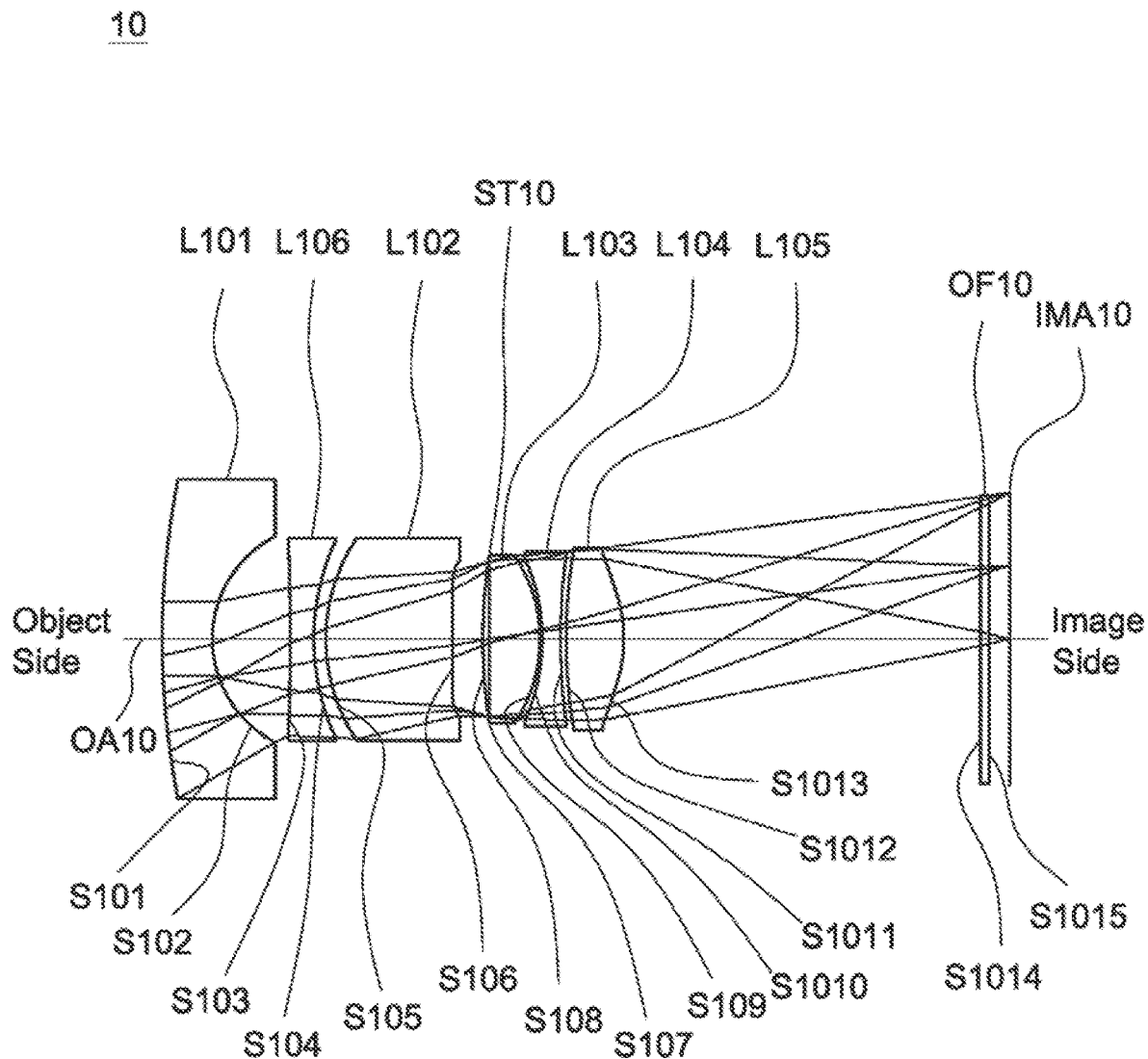
FIG. 19 is a lens layout and optical path diagram of a wide-angle lens assembly in accordance with a tenth embodiment of the invention.

A detailed description of a wide-angle lens assembly in accordance with a tenth embodiment of the invention is as follows. Referring to FIG. 19, the wide-angle lens assembly 10 includes a first lens L101, a sixth lens L106, a second lens L102, a stop ST10, a third lens L103, a fourth lens L104, a fifth lens L105, and an optical filter OF10, all of which are arranged in order from an object side to an image side along an optical axis OA10. In operation, an image of light rays from the object side is formed at an image plane IMA10.

According to the foregoing, wherein: the sixth lens L106 is a biconcave lens with negative refractive power and made of plastic material, wherein the object side surface S103 is a concave surface, the image side surface S104 is a concave surface, and both of the object side surface S103 and image side surface S104 are aspheric surfaces; and both of the object side surface S1014 and image side surface S1015 of the optical filter OF10 are plane surfaces.

With the above design of the lenses and stop ST10 and at least any one of the conditions (6)-(10) satisfied, the wide-angle lens assembly 10 can have an effective decreased total lens length, an effective increased resolution, an effective corrected chromatic aberration, and is capable of an effective corrected aberration.

Table 23 shows the optical specification of the wide-angle lens assembly 10 in FIG. 19.

TABLE 23

| | Effective Focal Length = 3.907 mm F-number = 2.4 Total Lens Length = 17.55 mm Field of View = 80.89 degrees | | | | | |
|---|---|---|---|---|---|---|
| Surface Number | Radius of Curvature (mm) | Thickness (mm) | Nd | Vd | Effective Focal Length (mm) | Remark |
| S101 | 32.21 | 1.00 | 1.54 | 56.1 | −4.71 | The First Lens L101 |
| S102 | 2.32 | 1.62 | | | | |
| S103 | −68.27 | 0.50 | 1.54 | 56.1 | −9.74 | The Sixth Lens L106 |
| S104 | 5.68 | 0.25 | | | | |
| S105 | 4.89 | 2.62 | 1.64 | 23.5 | 7.16 | The Second Lens L102 |
| S106 | −64.52 | 0.77 | | | | |
| S107 | ∞ | −0.12 | | | | Stop ST10 |
| S108 | 14.57 | 1.16 | 1.54 | 56.1 | 5.07 | The Third Lens L103 |
| S109 | −3.25 | 0.02 | | | | |
| S1010 | −6.13 | 0.44 | 1.64 | 23.5 | −5.10 | The Fourth Lens L104 |
| S1011 | 7.31 | 0.11 | | | | |
| S1012 | 22.43 | 1.18 | 1.54 | 56.1 | 5.19 | The Fifth Lens L105 |
| S1013 | −3.12 | 7.40 | | | | |
| S1014 | ∞ | 0.21 | 1.52 | 64.2 | | Optical Filter OF10 |
| S1015 | ∞ | 0.40 | | | | |

The aspheric surface sag z of each aspheric lens in table 23 can be calculated by the following formula:

$$z = ch^2/\{1+[1-(k+)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F, and G are aspheric coefficients.

In the tenth embodiment, the conic constant k and the aspheric coefficients A, B, C, D, E, F, G of each aspheric lens are shown in Table 24.

TABLE 24

| Surface Number | k | A E | B F | C G | D |
|---|---|---|---|---|---|
| S101 | 43.1643066 | 0.0010098 0 | 0.0000838 0 | −0.0000161 0 | 0.0000006 |
| S102 | −0.7379838 | 0.0052469 0 | 0.0013575 0 | 0.0001108 0 | 0.0000035 |
| S103 | 943.0635982 | −0.0000158 0 | 0.0002538 0 | −0.0000228 0 | 0 |
| S104 | 2.1643036 | 0.0011049 0 | 0.0000046 0 | 0.0000742 0 | 0 |
| S105 | −2.8777137 | 0.0055368 −0.0000041 | 0.0015033 0 | −0.0001142 0 | 0.0000362 |
| S106 | −7777.012846 | 0.0097749 0.0001011 | 0.0037767 0 | 0.0006093 0 | −0.000234 |

TABLE 24-continued

| Surface Number | k | A<br>E | B<br>F | C<br>G | D |
|---|---|---|---|---|---|
| S108 | −0.8203576 | 0.0019536<br>0 | 0.0022397<br>0 | −0.0003624<br>0 | −0.0000673 |
| S109 | −0.1589414 | −0.0036859<br>0 | −0.0006929<br>0 | 0.0003344<br>0 | −0.000034 |
| S1010 | −23.0511424 | −0.0291702<br>−0.0000553 | 0.0052135<br>−0.0000061 | −0.0019229<br>0 | 0.0008601 |
| S1011 | −81.5349384 | 0.0080265<br>−0.0000319 | −0.0064692<br>0.0000059 | 0.001255<br>0 | 0.0000571 |
| S1012 | 37.4359941 | −0.0002583<br>−0.0003636 | 0.0070008<br>0.0000401 | −0.004405<br>−0.0000021 | 0.0017525 |
| S1013 | −2.4190438 | −0.0048<br>−0.000049 | 0.0018776<br>0.0000085 | 0.0000218<br>−0.0000012 | 0.0002056 |

Table 25 shows the parameters and condition values for conditions (6)-(10) in accordance with the tenth embodiment of the invention. It can be seen from Table 25 that the wide-angle lens assembly 10 of the tenth embodiment satisfies the conditions (6)-(10).

TABLE 25

| BFL | 8.01 mm | IH | 3.0175 mm | | |
|---|---|---|---|---|---|
| BFL/TTL | 0.46 | TTL/IH | 5.82 | $|f_1|/f$ | 1.21 |
| BFL/IH | 2.65 | $f_1/f_5$ | −0.91 | | |

By the above arrangements of the lenses and stop ST10, the wide-angle lens assembly 10 of the tenth embodiment can meet the requirements of optical performance as seen in FIGS. 20A-20D.

Figure 20A:
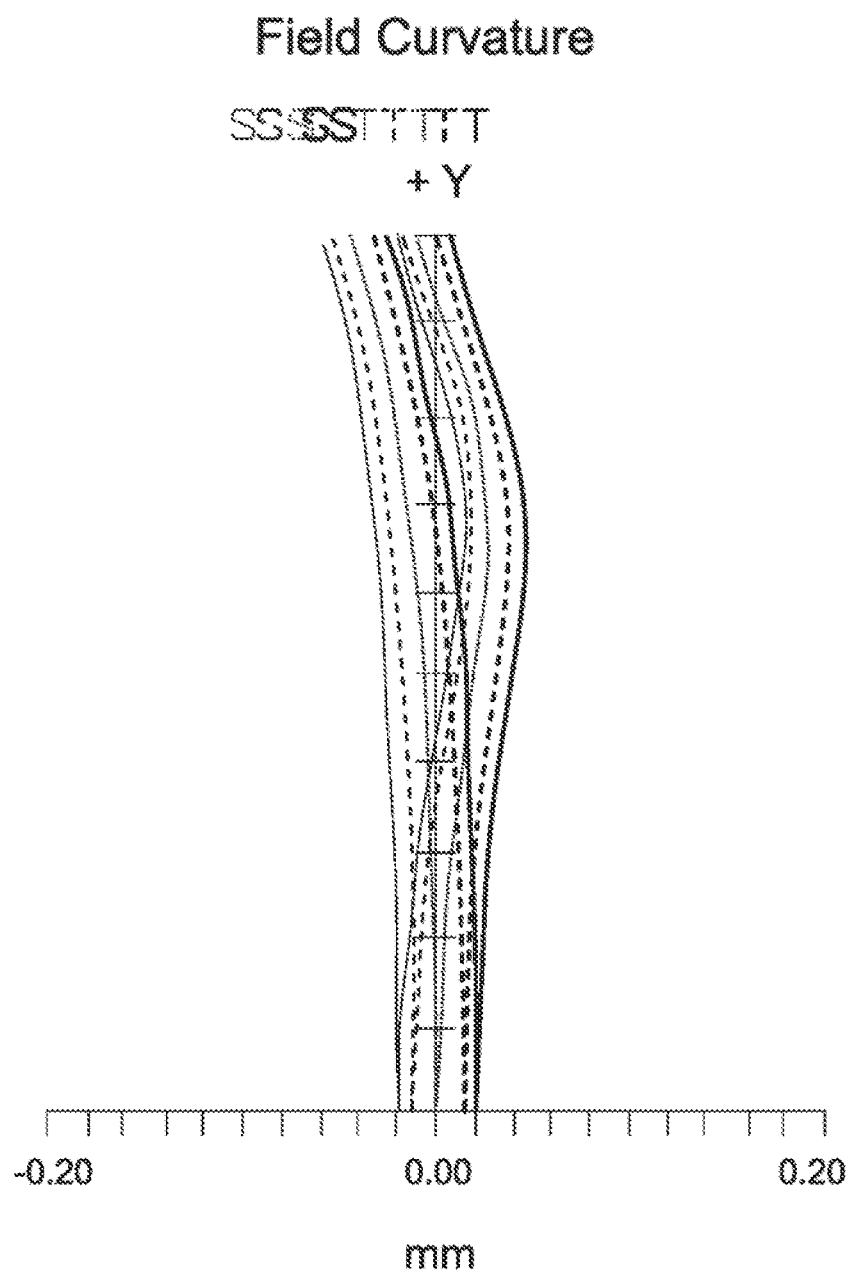
FIG. 20A depicts a field curvature diagram of the wide-angle lens assembly in accordance with the tenth embodiment of the invention.
Figure 20B:
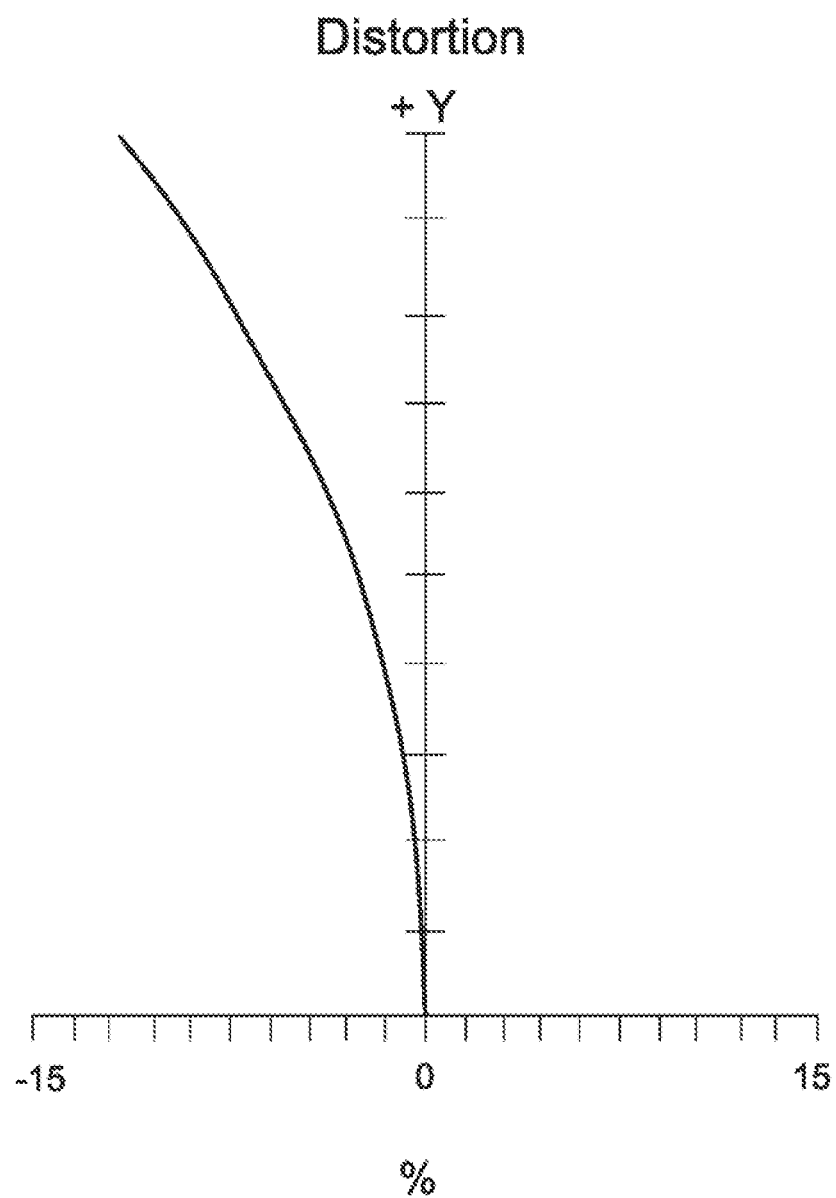
FIG. 20B is a distortion diagram of the wide-angle lens assembly in accordance with the tenth embodiment of the invention.
Figure 20C:
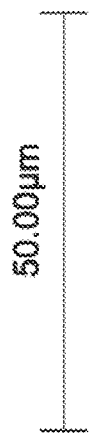
FIG. 20C is a spot diagram of the wide-angle lens assembly in accordance with the tenth embodiment of the invention.
Figure 20C:
Figure 20C:
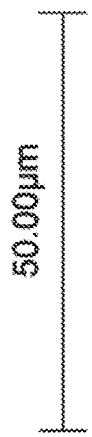
Figure 20C:
Figure 20C:
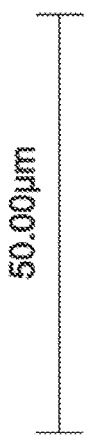
Figure 20C:
Figure 20D:
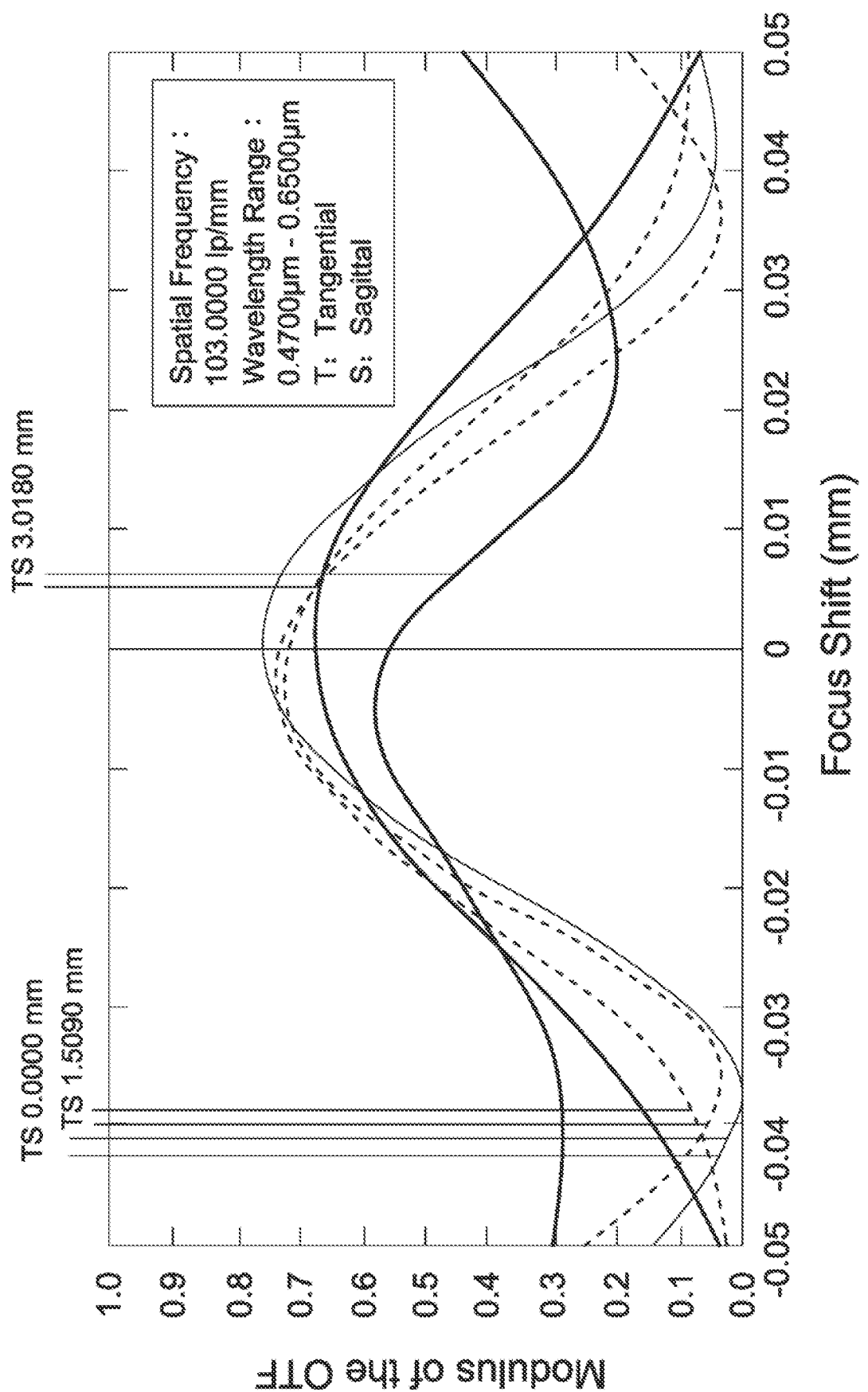
FIG. 20D is a through focus modulation transfer function diagram of the wide-angle lens assembly in accordance with the tenth embodiment of the invention.

It can be seen from FIG. 20A that the field curvature of tangential direction and sagittal direction in the wide-angle lens assembly 10 of the tenth embodiment ranges from −0.06 mm to 0.05 mm. It can be seen from FIG. 20B that the distortion in the wide-angle lens assembly 10 of the tenth embodiment ranges from −12% to 0%. It can be seen from FIG. 20C that the root mean square spot radius is equal to 1.082 μm and geometrical spot radius is equal to 2.763 μm as image height is equal to 0.000 mm, the root mean square spot radius is equal to 1.567 μm and geometrical spot radius is equal to 5.539 μm as image height is equal to 1.509 mm, and the root mean square spot radius is equal to 2.370 μm and geometrical spot radius is equal to 7.535 μm as image height is equal to 3.018 mm for the wide-angle lens assembly 10 of the tenth embodiment. It can be seen from FIG. 20D that the through focus modulation transfer function of tangential direction and sagittal direction in the wide-angle lens assembly 10 of the tenth embodiment ranges from 0.0 to 0.76 as focus shift ranges from −0.05 mm to 0.05 mm.

It is obvious that the field curvature and the distortion of the wide-angle lens assembly 10 of the tenth embodiment can be corrected effectively, and the resolution and the depth of focus of the wide-angle lens assembly 10 of the tenth embodiment can meet the requirement. Therefore, the wide-angle lens assembly 10 of the tenth embodiment is capable of good optical performance.

Figure 21:
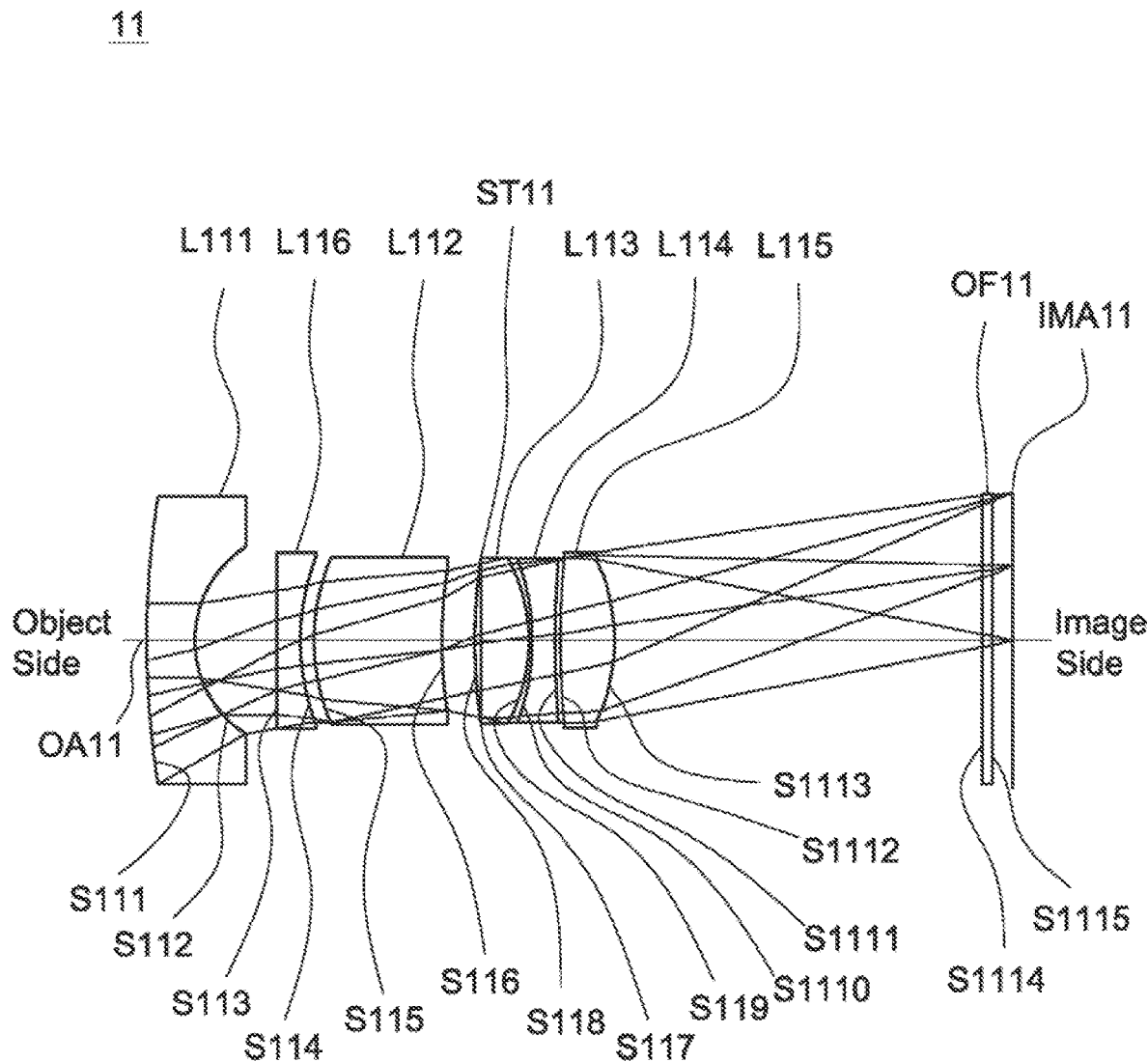
FIG. 21 is a lens layout and optical path diagram of a wide-angle lens assembly in accordance with a eleventh embodiment of the invention.

Referring to FIG. 21, the wide-angle lens assembly 11 includes a first lens L111, a sixth lens L116, a second lens L112, a stop ST1, a third lens L113, a fourth lens L114, a fifth lens L115, and an optical filter OF11, all of which are arranged in order from an object side to an image side along an optical axis OA11. In operation, an image of light rays from the object side is formed at an image plane IMA1.

According to the foregoing, wherein: the sixth lens L116 is a biconcave lens with negative refractive power and made of plastic material, wherein the object side surface S113 is a concave surface, the image side surface S114 is a concave surface and both of the object side surface S113 and image side surface S114 are aspheric surfaces; and both of the object side surface S1114 and image side surface S1115 of the optical filter OF11 are plane surfaces.

With the above design of the lenses and stop ST1 1and at least any one of the conditions (6)-(10) satisfied, the wide-angle lens assembly 11 can have an effective decreased total lens length, an effective increased resolution, an effective corrected chromatic aberration, and is capable of an effective corrected aberration.

Table 26 shows the optical specification of the wide-angle lens assembly 11 in FIG. 21.

TABLE 26

Effective Focal Len = 3.93 mm F-number = 2.4
Total Lens Length = 17.84 mm Field of View = 81.162 degrees

| Surface Number | Radius of Curvature (mm) | Thickness (mm) | Nd | Vd | Effective Focal Length (mm) | Remark |
|---|---|---|---|---|---|---|
| S111 | 33.77 | 1.00 | 1.54 | 56.1 | −4.70 | The First Lens L111 |
| S112 | 2.33 | 1.69 | | | | |
| S113 | −66.70 | 0.50 | 1.54 | 56.1 | −9.70 | The Sixth Lens L116 |
| S114 | 5.67 | 0.27 | | | | |
| S115 | 5.00 | 2.64 | 1.64 | 23.5 | 7.27 | The Second Lens L112 |
| S116 | −59.78 | 0.77 | | | | |
| S117 | ∞ | −0.12 | | | | Stop ST11 |
| S118 | 15.04 | 1.17 | 1.54 | 56.1 | 5.09 | The Third Lens L113 |
| S119 | −3.25 | 0.02 | | | | |
| S1110 | −6.15 | 0.45 | 1.64 | 23.5 | −5.12 | The Fourth Lens L114 |

TABLE 26-continued

Effective Focal Len = 3.93 mm F-number = 2.4
Total Lens Length = 17.84 mm Field of View = 81.162 degrees

| Surface Number | Radius of Curvature (mm) | Thickness (mm) | Nd | Vd | Effective Focal Length (mm) | Remark |
|---|---|---|---|---|---|---|
| S1111 | 7.31 | 0.11 | | | | |
| S1112 | 23.26 | 1.16 | 1.54 | 56.1 | 5.27 | The Fifth Lens L115 |
| S1113 | −3.16 | 7.58 | | | | |
| S1114 | ∞ | 0.21 | 1.52 | 64.2 | | Optical Filter OF11 |
| S1115 | ∞ | 7.98 | | | | |

The definition of aspheric surface sag z of each aspheric lens in table 26 is the same as that of in Table 23, and is not described here again.

In the eleventh embodiment, the conic constant k and the aspheric coefficients A, B, C, D, E, F, G of each aspheric lens are shown in Table 27.

TABLE 27

| Surface Number | k | A / E | B / F | C / G | D |
|---|---|---|---|---|---|
| S111 | 44.5389357 | 0.0010175 / 0 | 0.000084 / 0 | −0.0000162 / 0 | 0.0000006 |
| S112 | −0.7142937 | 0.0056736 / 0 | 0.0013314 / 0 | 0.0001267 / 0 | 0.0000095 |
| S113 | 924.2849143 | 0.0000536 / 0 | 0.0002429 / 0 | −0.000024 / 0 | 0 |
| S114 | 2.0752097 | 0.000977 / 0 | 0.0000095 / 0 | 0.000074 / 0 | 0 |
| S115 | −2.6792813 | 0.0056831 / −0.0000042 | 0.0015161 / 0 | −0.0001071 / 0 | 0.0000378 |
| S116 | −6311.015553 | 0.0097376 / 0.000103 | 0.003752 / 0 | 0.0006117 / 0 | −0.0002295 |
| S118 | −1.2599151 | 0.0019372 / 0 | 0.0022384 / 0 | −0.0003637 / 0 | −0.0000676 |
| S119 | −0.1691989 | −0.0036349 / 0 | −0.0006791 / 0 | 0.0003373 / 0 | −0.0000335 |
| S1110 | −23.2079011 | −0.0291747 / −0.0000551 | 0.0052129 / −0.000006 | −0.0019223 / 0 | 0.0008605 |
| S1111 | −81.2604771 | 0.0080223 / −0.000032 | −0.0064728 / 0.0000059 | 0.0012535 / 0 | 0.0000568 |
| S1112 | 38.0017304 | −0.0002551 / −0.0003637 | 0.0070056 / 0.00004 | −0.0044036 / −0.0000021 | 0.0017526 |
| S1113 | −2.4292809 | −0.0047875 / −0.0000492 | 0.0018718 / 0.0000084 | 0.0000185 / −0.0000012 | 0.0002047 |

Table 28 shows the parameters and condition values for conditions (6)-(10) in accordance with the eleventh embodiment of the invention. It can be seen from Table 28 that the wide-angle lens assembly 11 of the eleventh embodiment satisfies the conditions (6)-(10).

TABLE 28

| BFL | 8.19 mm | IH | 3.0175 mm | | |
|---|---|---|---|---|---|
| BFL/TTL | 0.46 | TTL/IH | 5.91 | $|f_1|/f$ | 1.20 |
| BFL/IH | 2.72 | $f_1/f_5$ | −0.89 | | |

By the above arrangements of the lenses and stop ST1, the wide-angle lens assembly 11 of the eleventh embodiment can meet the requirements of optical performance as seen in FIGS. 22A-22D.

Figure 22A:
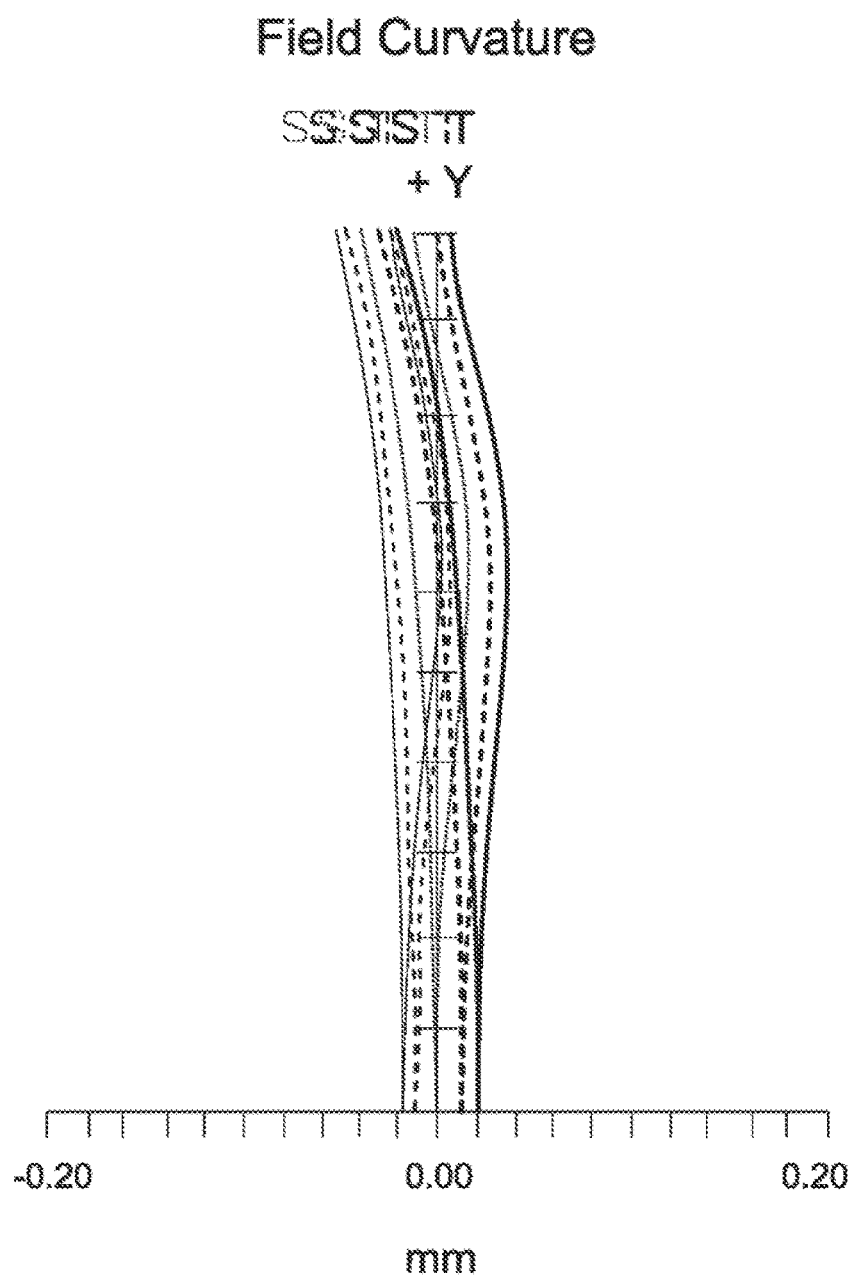
FIG. 22A depicts a field curvature diagram of the wide-angle lens assembly in accordance with the eleventh embodiment of the invention.
Figure 22B:
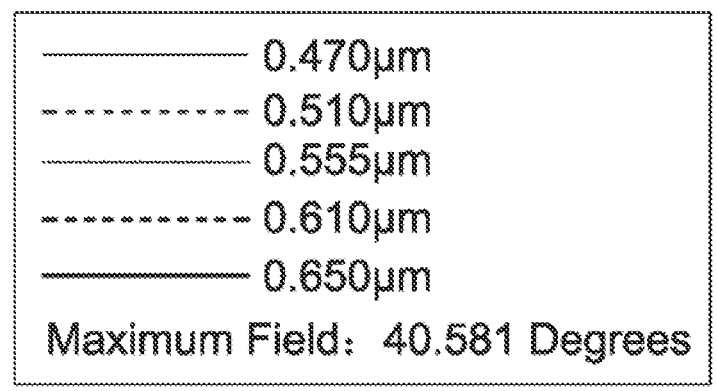
FIG. 22B is a distortion diagram of the wide-angle lens assembly in accordance with the eleventh embodiment of the invention.
Figure 22B:
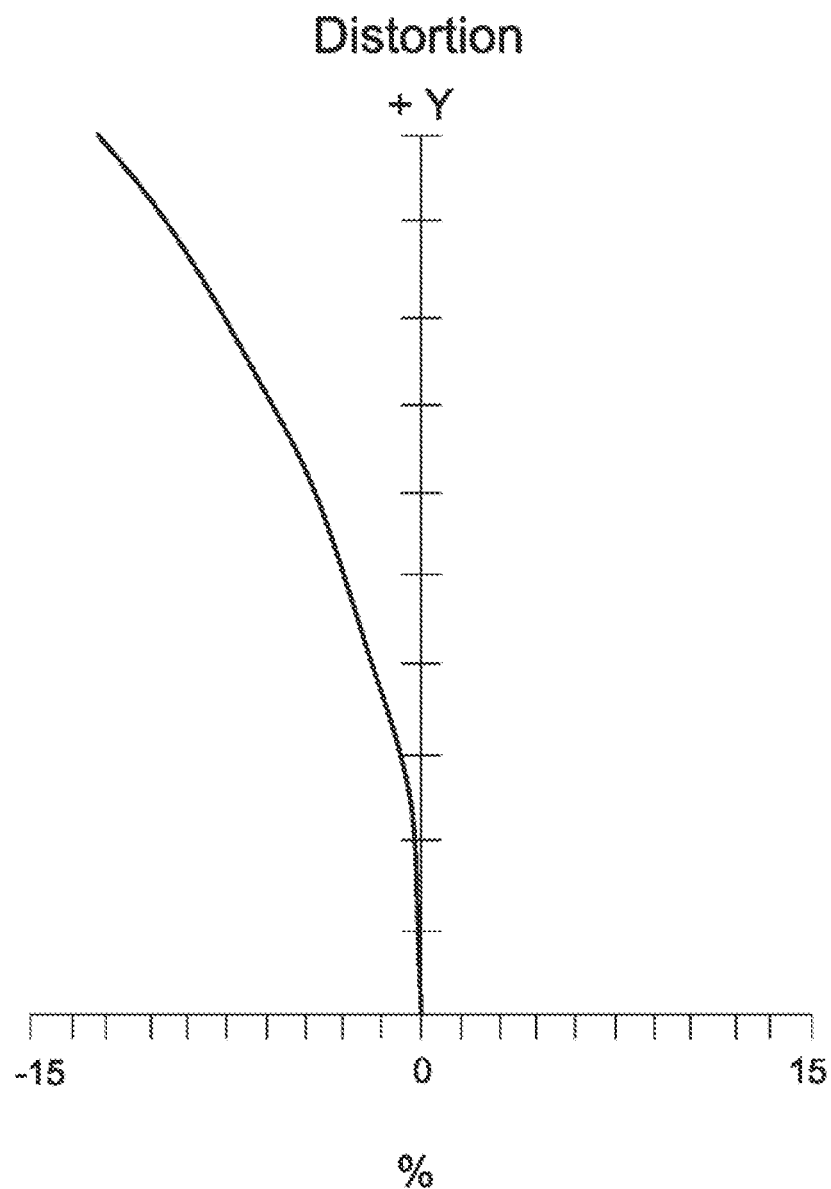
Figure 22C:
FIG. 22C is a spot diagram of the wide-angle lens assembly in accordance with the eleventh embodiment of the invention.
Figure 22C:
Figure 22C:
Figure 22D:
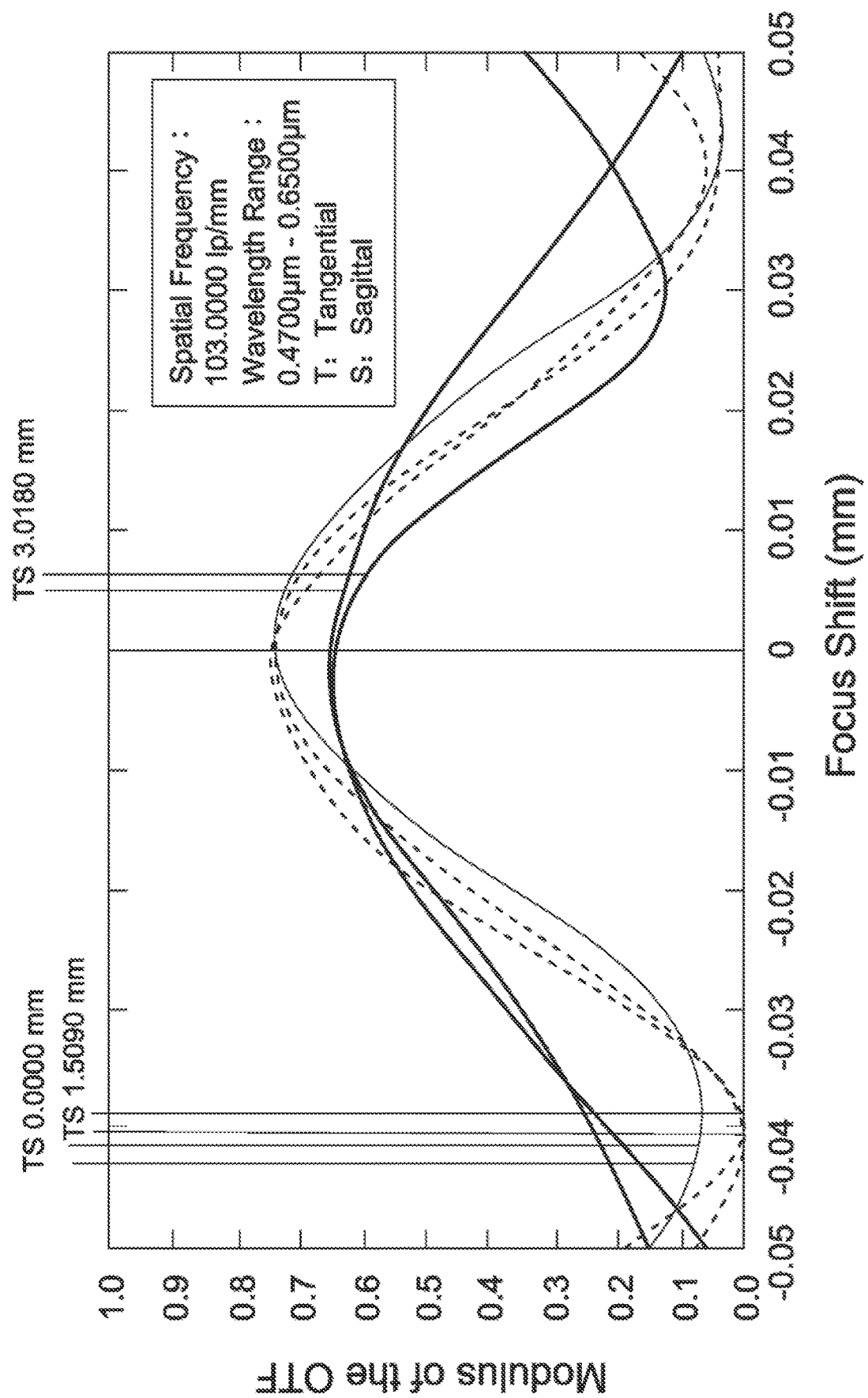
FIG. 22D is a through focus modulation transfer function diagram of the wide-angle lens assembly in accordance with the eleventh embodiment of the invention.

It can be seen from FIG. 22A that the field curvature of tangential direction and sagittal direction in the wide-angle lens assembly 11 of the eleventh embodiment ranges from −0.06 mm to 0.04 mm. It can be seen from FIG. 22B that the distortion in the wide-angle lens assembly 11 of the eleventh embodiment ranges from −13% to 0%. It can be seen from FIG. 22C that the root mean square spot radius is equal to 1.126 μm and geometrical spot radius is equal to 2.701 μm as image height is equal to 0.000 mm, the root mean square spot radius is equal to 1.327 μm and geometrical spot radius is equal to 4.898 μm as image height is equal to 1.509 mm, and the root mean square spot radius is equal to 2.613 μm and geometrical spot radius is equal to 7.727 μm as image height is equal to 3.018 mm for the wide-angle lens assembly 11 of the eleventh embodiment. It can be seen from FIG. 22D that the through focus modulation transfer function of tangential direction and sagittal direction in the wide-angle lens assembly 11 of the eleventh embodiment ranges from 0.0 to 0.75 as focus shift ranges from −0.05 mm to 0.05 mm.

It is obvious that the field curvature and the distortion of the wide-angle lens assembly 11 of the eleventh embodiment can be corrected effectively, and the resolution and the depth of focus of the wide-angle lens assembly 11 of the eleventh embodiment can meet the requirement. Therefore, the wide-angle lens assembly 11 of the eleventh embodiment is capable of good optical performance.

Figure 23:
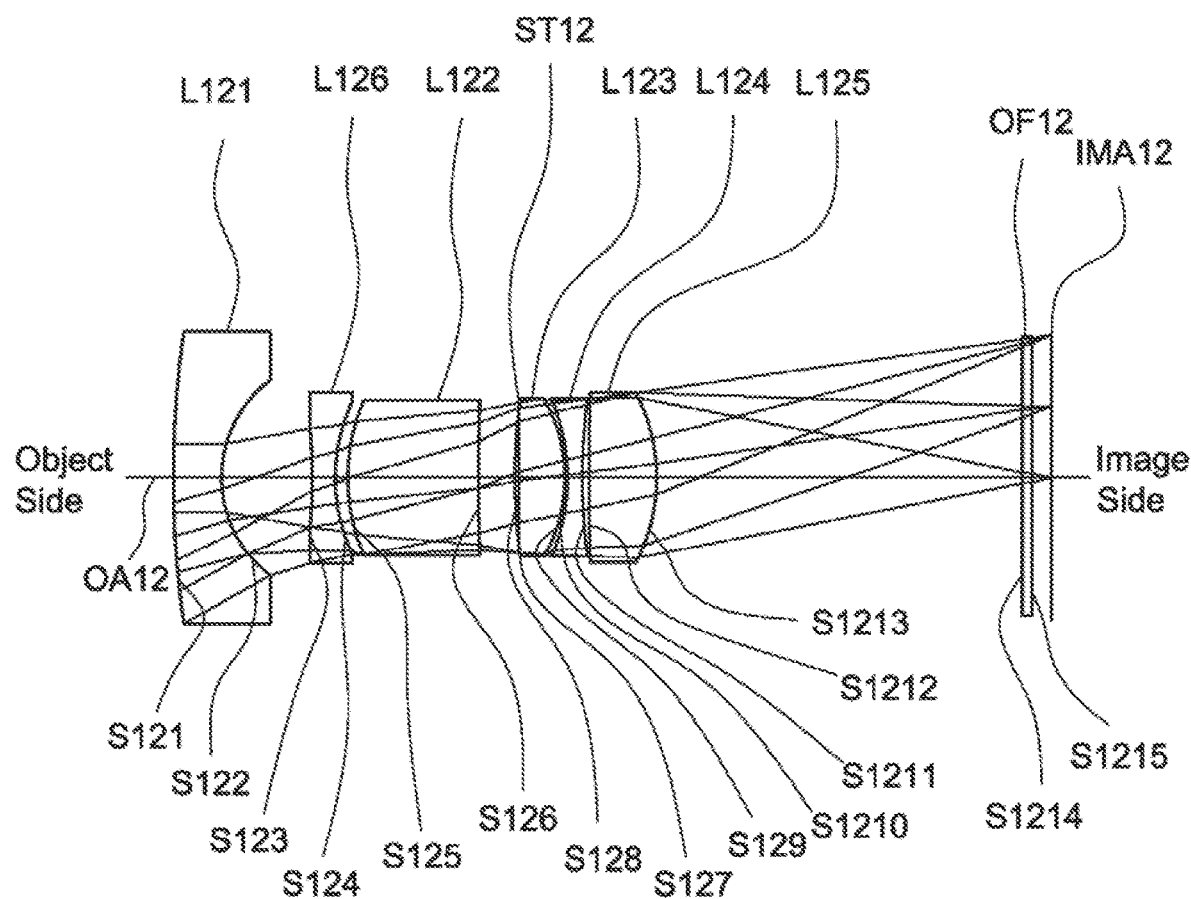
FIG. 23 is a lens layout and optical path diagram of a wide-angle lens assembly in accordance with a twelfth embodiment of the invention.

Referring to FIG. 23, the wide-angle lens assembly 12 includes a first lens L121, a sixth lens L126, a second lens L122, a stop ST12, a third lens L123, a fourth lens L124, a fifth lens L125, and an optical filter OF12, all of which are arranged in order from an object side to an image side along an optical axis OA12. In operation, an image of light rays from the object side is formed at an image plane IMA12.

According to the foregoing, wherein: the sixth lens L126 is a biconcave lens with negative refractive power and made of plastic material, wherein the object side surface S123 is a concave surface, the image side surface S124 is a concave surface, and both of the object side surface S123 and image side surface S124 are aspheric surfaces; and both of the object side surface S1214 and image side surface S1215 of the optical filter OF12 are plane surfaces.

With the above design of the lenses and stop ST12 and at least any one of the conditions (6)-(10) satisfied, the wide-angle lens assembly 12 can have an effective decreased total lens length, an effective increased resolution, an effective corrected chromatic aberration, and is capable of an effective corrected aberration.

Table 29 shows the optical specification of the wide-angle lens assembly 12 in FIG. 23.

TABLE 29

| Effective Focal Length = 3.92 mm F-number = 2.4 Total Lens Length = 18.69 mm Field of View = 81.412 degrees | | | | | | |
|---|---|---|---|---|---|---|
| Surface Number | Radius of Curvature (mm) | Thickness (mm) | Nd | Vd | Effective Focal Length (mm) | Remark |
| S121 | 46.84 | 1.00 | 1.54 | 56.12 | −5.13 | The First Lens L121 |
| S122 | 2.58 | 1.93 | | | | |
| S123 | −55.11 | 0.50 | 1.54 | 56.12 | −7.84 | The Sixth Lens L126 |
| S124 | 4.57 | 0.25 | | | | |
| S125 | 4.55 | 2.77 | 1.64 | 23.53 | 6.79 | The Second Lens L122 |
| S126 | −85.39 | 0.88 | | | | |
| S127 | ∞ | −0.10 | | | | Stop ST12 |
| S128 | 14.54 | 1.09 | 1.54 | 56.12 | 4.90 | The Third Lens L123 |
| S129 | −3.13 | 0.02 | | | | |
| S1210 | −4.55 | 0.35 | 1.64 | 23.53 | −5.10 | The Fourth Lens L124 |
| S1211 | 12.17 | 0.11 | | | | |
| S1212 | 19.28 | 1.46 | 1.54 | 56.12 | 5.55 | The Fifth Lens L125 |
| S1213 | −3.43 | 7.78 | | | | |
| S1214 | ∞ | 0.21 | 1.52 | 64.17 | | Optical Filter OF12 |
| S1215 | ∞ | 0.40 | | | | |

The definition of aspheric surface sag z of each aspheric lens in table 29 is the same as that of in Table 23, and is not described here again.

In the twelfth embodiment, the conic constant k and the aspheric coefficients A, B, C, D, E, F, G of each aspheric lens are shown in Table 30.

TABLE 30

| Surface Number | k | A E | B F | C G | D |
|---|---|---|---|---|---|
| S121 | 15.3161638 | 0.0009408 0 | 0.000093 0 | −0.0000116 0 | 0.0000004 |
| S122 | −0.885804 | 0.0035739 0 | 0.0009657 0 | −0.0000103 0 | 0.0000103 |
| S123 | −0.5589648 | 0.0003789 0 | 0.0002637 0 | −0.0000314 0 | 0 |
| S124 | 2.8375333 | 0.0006462 0 | 0.00058 0 | 0.0000295 0 | 0 |
| S125 | −3.2573632 | 0.0048196 −0.0000067 | 0.0009845 0 | −0.0000205 0 | 0.0000492 |
| S126 | −0.1073453 | 0.006034 0.0000055 | 0.000962 0 | 0.0004804 0 | −0.0000916 |
| S128 | −55.3373499 | 0.000893 0 | 0.0023911 0 | −0.0003813 0 | −0.0001643 |
| S129 | −0.3269725 | −0.0028112 0 | −0.0005785 0 | 0.0003199 0 | −0.0000139 |
| S1210 | −23.8967329 | −0.0298676 −0.0000535 | 0.0051815 −0.0000064 | −0.0018536 0 | 0.0008799 |
| S1211 | −156.3954852 | 0.0093588 −0.0000353 | −0.0060775 0.0000037 | 0.0013421 0 | 0.0000658 |
| S1212 | −206.8419484 | −0.0024283 −0.0003663 | 0.0063691 0.0000402 | −0.0045604 −0.000002 | 0.0017237 |
| S1213 | −2.2301746 | −0.0057566 −0.0000541 | 0.0009997 0.0000088 | −0.0002512 −0.0000007 | 0.0001595 |

Table 31 shows the parameters and condition values for conditions (6)-(10) in accordance with the twelfth embodiment of the invention. It can be seen from Table 31 that the wide-angle lens assembly 12 of the twelfth embodiment satisfies the conditions (6)-(10).

TABLE 31

| BFL | 8.39 mm | IH | 3.0175 mm | | |
|---|---|---|---|---|---|
| BFL/TTL | 0.45 | TTL/IH | 6.19 | $|f_1|/f$ | 1.31 |
| BFL/IH | 2.78 | $f_1/f_5$ | −0.924 | | |

By the above arrangements of the lenses and stop ST12, the wide-angle lens assembly 12 of the twelfth embodiment can meet the requirements of optical performance as seen in FIGS. 24A-24D.

Figure 24A:
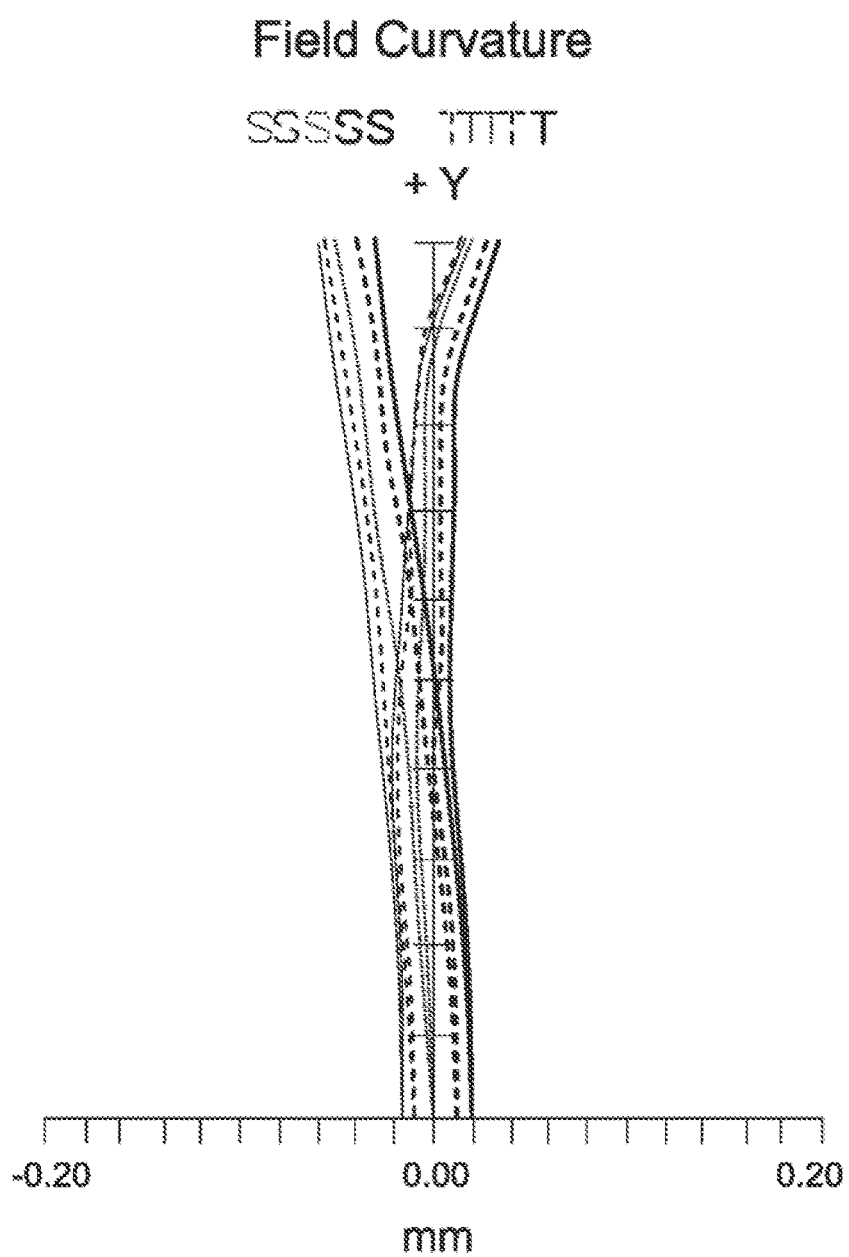
FIG. 24A depicts a field curvature diagram of the wide-angle lens assembly in accordance with the twelfth embodiment of the invention.
Figure 24B:
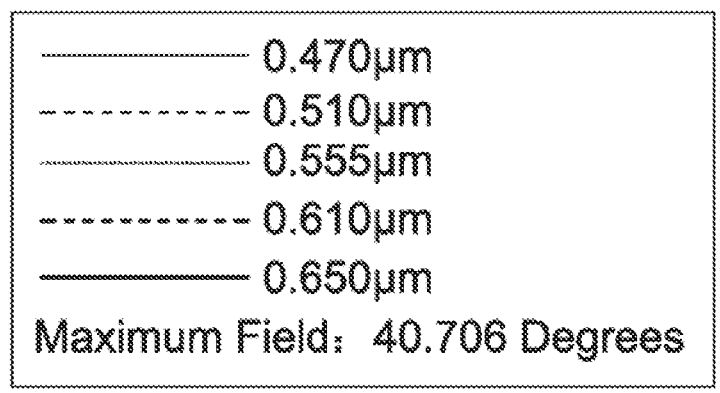
FIG. 24B is a distortion diagram of the wide-angle lens assembly in accordance with the twelfth embodiment of the invention.
Figure 24B:
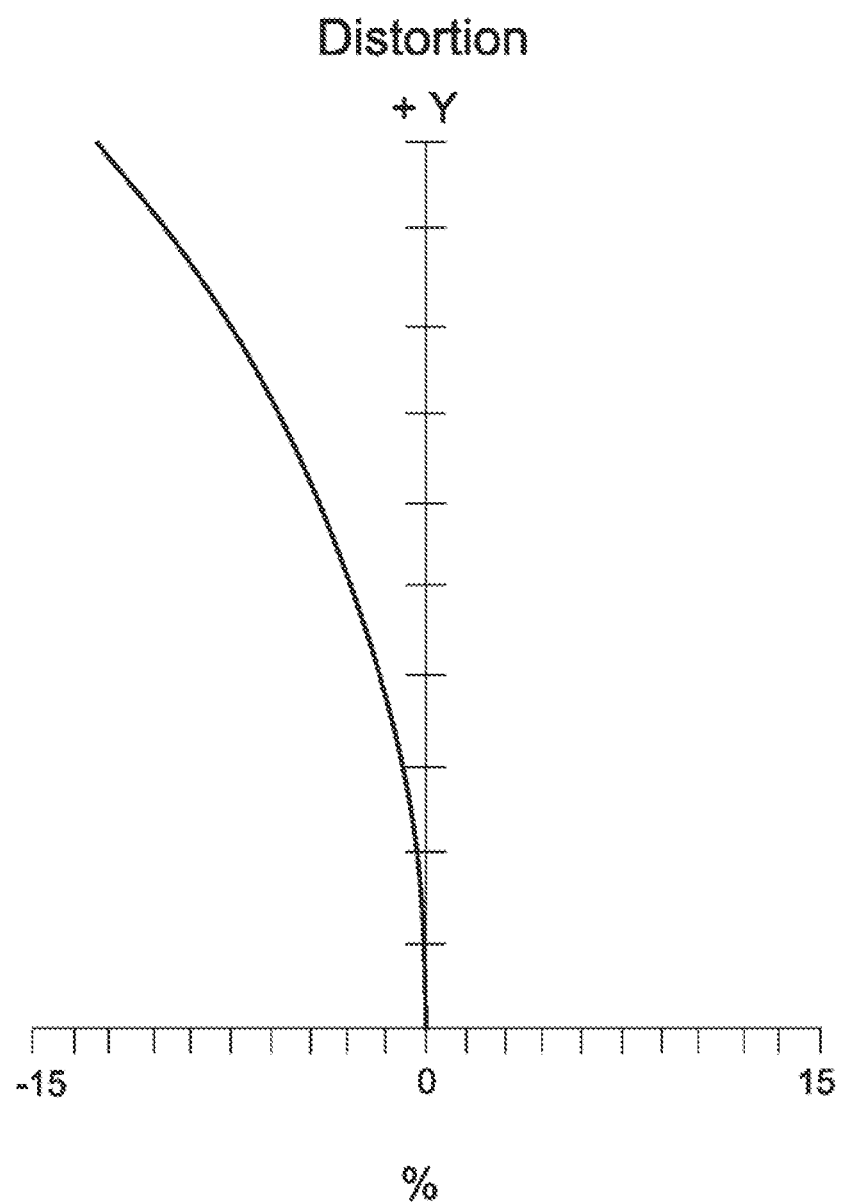
Figure 24C:
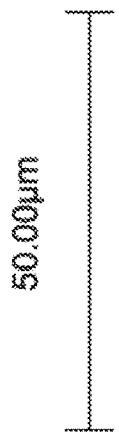
FIG. 24C is a spot diagram of the wide-angle lens assembly in accordance with the twelfth embodiment of the invention.
Figure 24C:
Figure 24C:
Figure 24C:
Figure 24C:
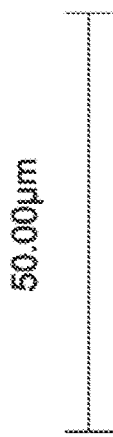
Figure 24C:
Figure 24D:
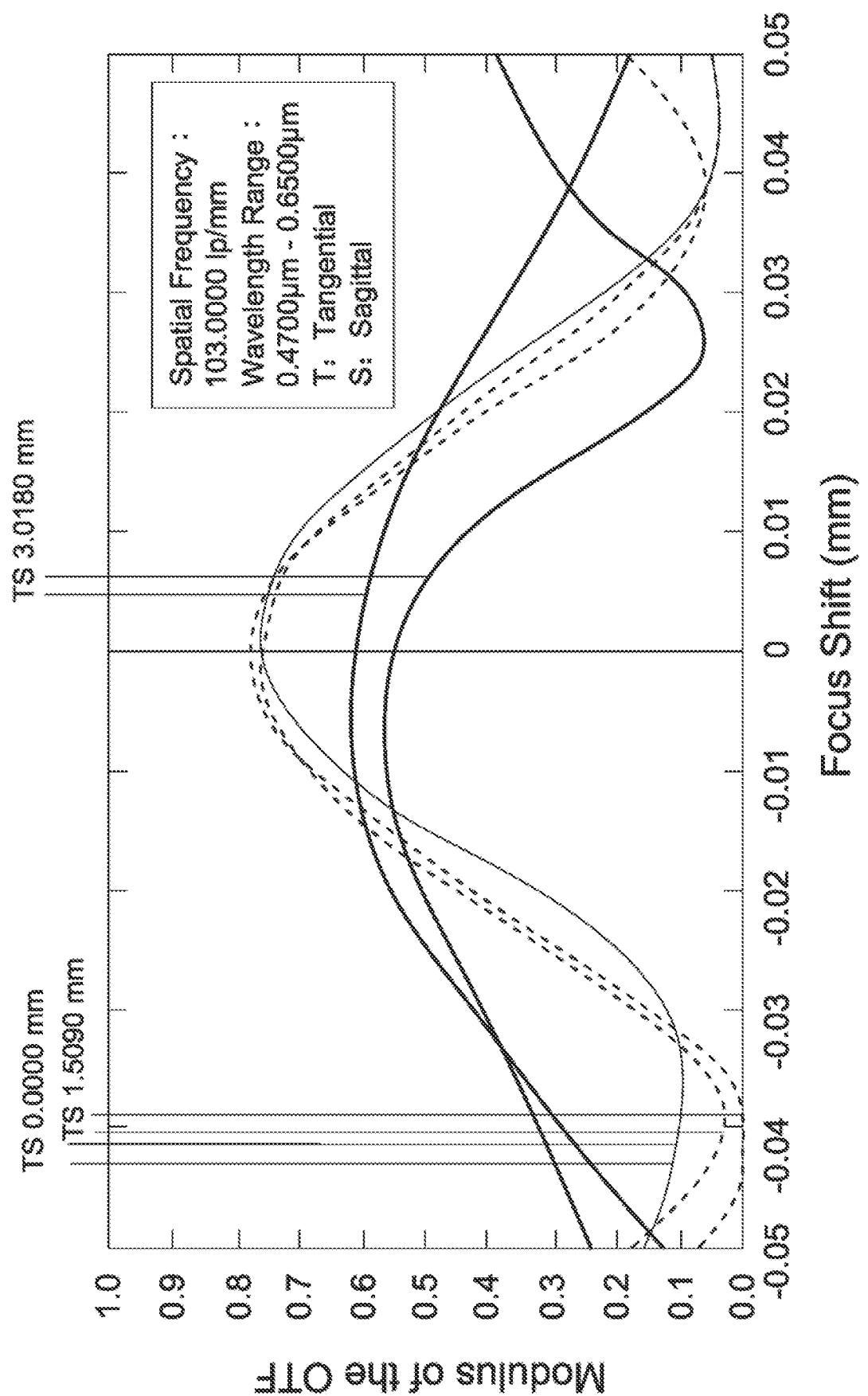
FIG. 24D is a through focus modulation transfer function diagram of the wide-angle lens assembly in accordance with the twelfth embodiment of the invention.

It can be seen from FIG. 24A that the field curvature of tangential direction and sagittal direction in the wide-angle lens assembly 12 of the twelfth embodiment ranges from −0.06 mm to 0.04 mm. It can be seen from FIG. 24B that the distortion in the wide-angle lens assembly 12 of the twelfth embodiment ranges from −13% to 0%. It can be seen from FIG. 24C that the root mean square spot radius is equal to 1.037 μm and geometrical spot radius is equal to 2.675 μm as image height is equal to 0.000 mm, the root mean square spot radius is equal to 1.991 μm and geometrical spot radius is equal to 7.342 μm as image height is equal to 1.509 mm, and the root mean square spot radius is equal to 3.880 μm and geometrical spot radius is equal to 17.837 μm as image height is equal to 3.018 mm for the wide-angle lens assembly 12 of the twelfth embodiment. It can be seen from FIG. 24D that the through focus modulation transfer function of tangential direction and sagittal direction in the wide-angle lens assembly 12 of the twelfth embodiment ranges from 0.0 to 0.78 as focus shift ranges from −0.05 mm to 0.05 mm.

It is obvious that the field curvature and the distortion of the wide-angle lens assembly 12 of the twelfth embodiment can be corrected effectively, and the resolution and the depth of focus of the wide-angle lens assembly 12 of the twelfth embodiment can meet the requirement. Therefore, the wide-angle lens assembly 12 of the twelfth embodiment is capable of good optical performance.

Figure 25:
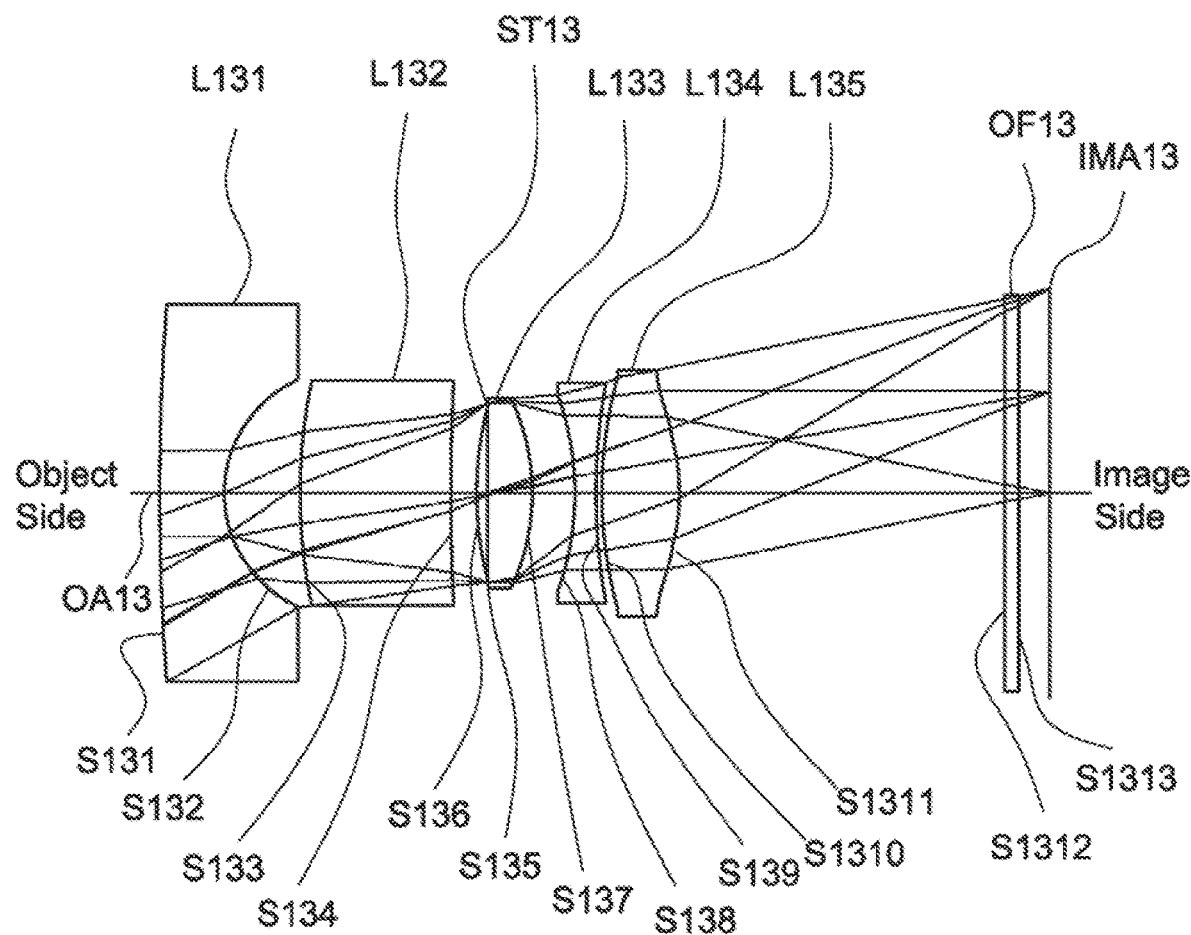
FIG. 25 is a lens layout and optical path diagram of a wide-angle lens assembly in accordance with a thirteenth embodiment of the invention.

Referring to FIG. 25, the wide-angle lens assembly 13 includes a first lens L131, a second lens L132, a stop ST13, a third lens L133, a fourth lens L134, a fifth lens L135, and an optical filter OF13, all of which are arranged in order from an object side to an image side along an optical axis OA13. In operation, an image of light rays from the object side is formed at an image plane IMA13.

According to the foregoing, wherein: both of the object side surface S1312 and image side surface S1313 of the optical filter OF13 are plane surfaces.

With the above design of the lenses and stop ST13 and at least any one of the conditions (6)-(10) satisfied, the wide-angle lens assembly 13 can have an effective decreased total lens length, an effective increased resolution, an effective corrected chromatic aberration, and is capable of an effective corrected aberration.

Table 32 shows the optical specification of the wide-angle lens assembly 13 in FIG. 25.

TABLE 32

| Effective Focal Length = 3.44 mm F-number = 2.4 Total Lens Length = 14.13 mm Field of View = 89.958 degrees | | | | | |
|---|---|---|---|---|---|
| Surface Number | Radius of Curvature (mm) | Thickness (mm) | Nd | Vd | Effective Focal Length (mm) | Remark |
| S131 | 28.128 | 1 | 1.5352 | 56.1153 | −3.03 | The First Lens L131 |
| S132 | 1.5207 | 1.2336 | | | | |
| S133 | 9.7744 | 2.391 | 1.6397 | 23.5289 | 12.28 | The Second Lens L132 |
| S134 | −37.6456 | 0.5693 | | | | |
| S135 | ∞ | −0.17 | | | | Stop ST13 |
| S136 | 5.4028 | 0.8771 | 1.5352 | 56.1153 | 3.88 | The Third Lens L133 |
| S137 | −3.204 | 0.682 | | | | |
| S138 | −5.4262 | 0.3309 | 1.6397 | 23.5289 | −4.26 | The Fourth Lens L134 |
| S139 | 5.6889 | 0.1105 | | | | |
| S1310 | 7.6414 | 1.2095 | 1.5352 | 56.1153 | 4.35 | The Fifth Lens L135 |
| S1311 | −3.1828 | 5.58 | | | | |
| S1312 | ∞ | 0.21 | 1.5168 | 64.1673 | | Optical Filter OF13 |
| S1313 | ∞ | 0.4 | | | | |

The definition of aspheric surface sag z of each aspheric lens in table 32 is the same as that of in Table 23, and is not described here again.

In the thirteenth embodiment, the conic constant k and the aspheric coefficients A, B, C, D, E, F, G of each aspheric lens are shown in Table 33.

TABLE 33

| Surface Number | k | A E | B F | C G | D |
|---|---|---|---|---|---|
| S131 | 35.7858423 | −0.00116270 | 0.00006280 | −0.00001280 | 0.0000007 |
| S132 | −0.6199112 | 0.00404980 | 0.0019050 | 0.00011540 | 0.000114 |
| S133 | −22.8562195 | 0.0024563 −0.0000142 | 0.0010324 0 | 0.0000628 0 | 0.0000661 |

TABLE 33-continued

| Surface Number | k | A E | B F | C G | D |
|---|---|---|---|---|---|
| S134 | −1103.80427 | 0.0062148 0.000.1116 | 0.0039612 0 | 0.0006772 0 | −0.0002474 |
| S136 | 0.8115018 | 0.0024823 0 | 0.0022463 0 | −0.0002488 0 | −0.0000531 |
| S137 | −0.1093024 | −0.0038448 0 | −0.0009207 0 | 0.0001884 0 | −0.0000359 |
| S138 | −19.8472466 | −0.0324739 −0.0000913 | 0.0044539 −0.00002 | −0.0020362 0 | 0.0008045 |
| S139 | −37.7167556 | 0.0107961 −0.0000392 | −0.0063087 0.0000036 | 0.0011593 0 | 0.0000194 |
| S1310 | 5.234827 | −0.0009657 −0.0003761 | 0.0069102 0.000037 | −0.004419 −0.0000017 | 0.00173 |
| S1311 | −2.909845 | −0.0025451 −0.0000492 | 0.0026151 0.0000074 | 0.0001165 −0.000002 | 0.0002158 |

Table 34 shows the parameters and condition values for conditions (6)-(10) in accordance with the thirteenth embodiment of the invention. It can be seen from Table 34 that the wide-angle lens assembly 13 of the thirteenth embodiment satisfies the conditions (6)-(10).

TABLE 34

| BFL | 6.19 mm | IH | 3.0175 mm | $|f_1|/f$ | 0.88 |
|---|---|---|---|---|---|
| BFL/TTL | 0.44 | TTL/IH | 4.68 | | |
| BFL/IH | 2.05 | $f_1/f_5$ | −0.697 | | |

By the above arrangements of the lenses and stop ST13, the wide-angle lens assembly 13 of the thirteenth embodiment can meet the requirements of optical performance as seen in FIGS. 26A-26D.

Figure 26A:
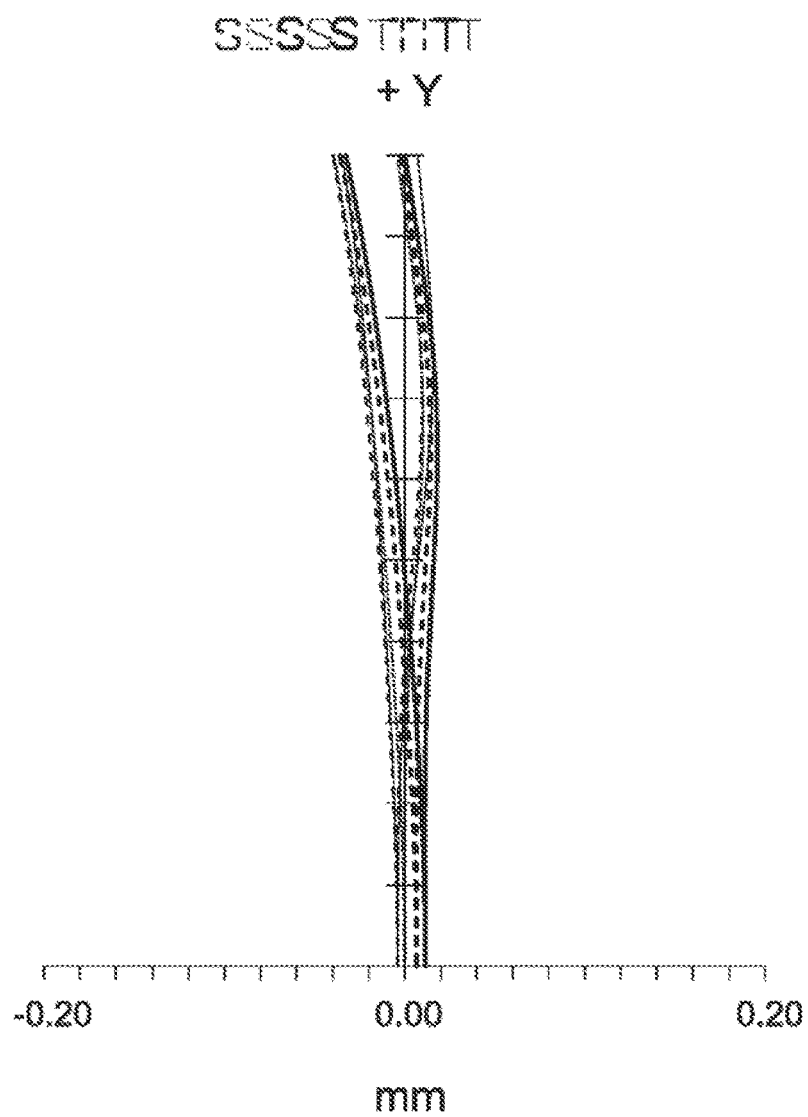
FIG. 26A depicts a field curvature diagram of the wide-angle lens assembly in accordance with the thirteenth embodiment of the invention.
Figure 26B:
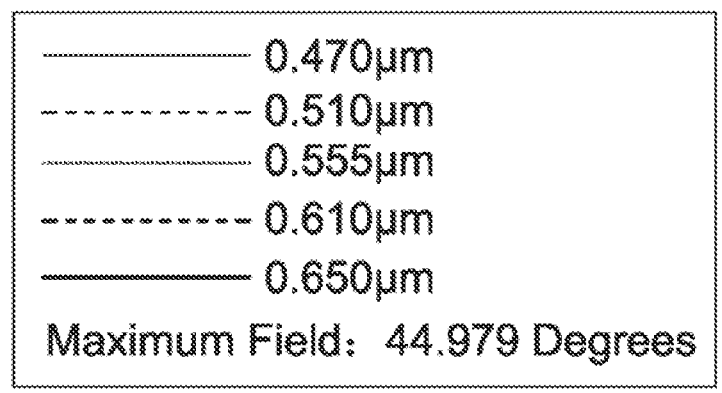
FIG. 26B is a distortion diagram of the wide-angle lens assembly in accordance with the thirteenth embodiment of the invention.
Figure 26B:
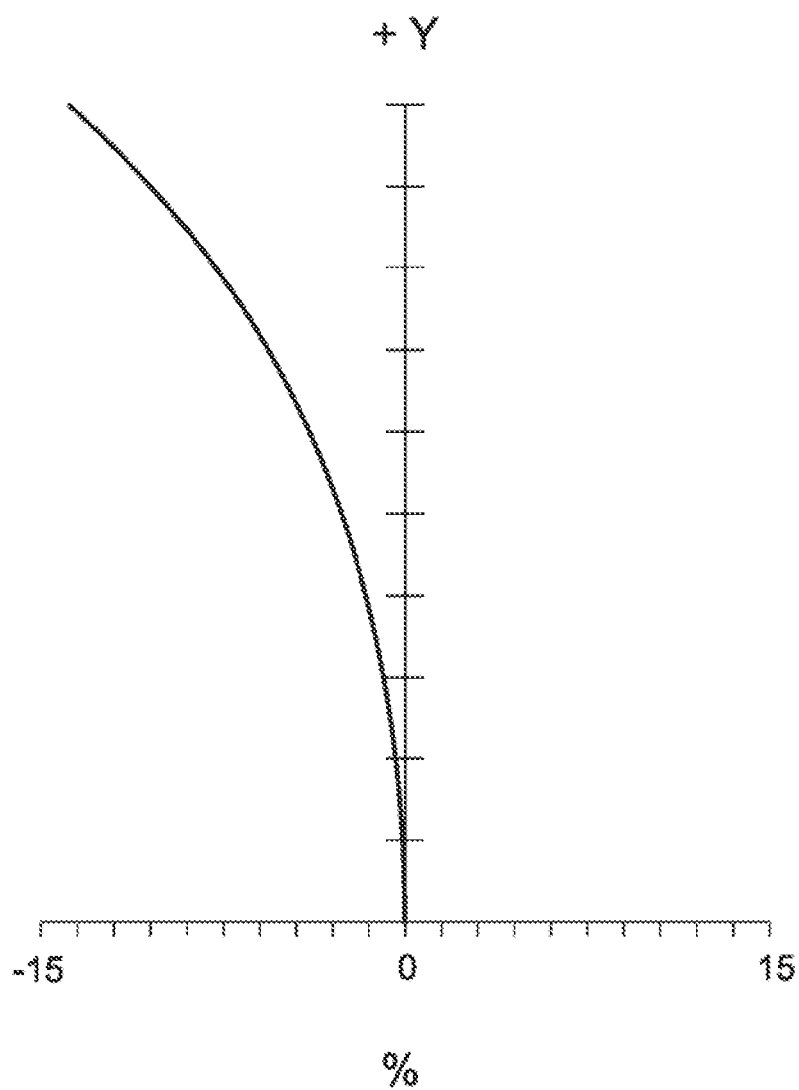
Figure 26C:
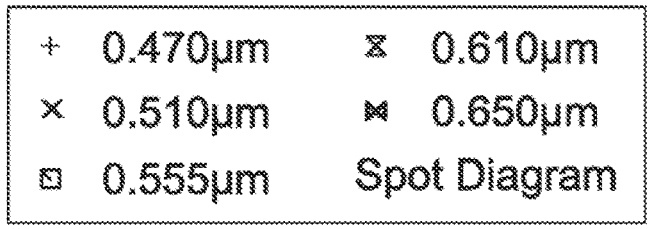
FIG. 26C is a spot diagram of the wide-angle lens assembly in accordance with the thirteenth embodiment of the invention.
Figure 26C:
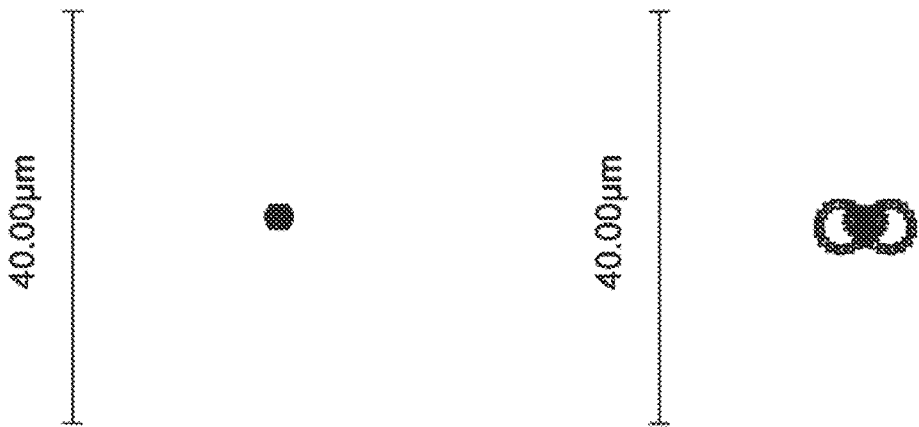
Figure 26C:
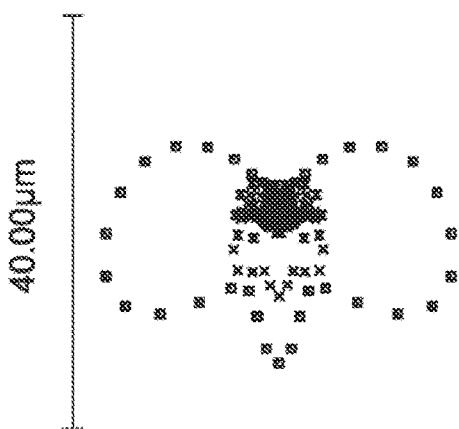
Figure 26D:
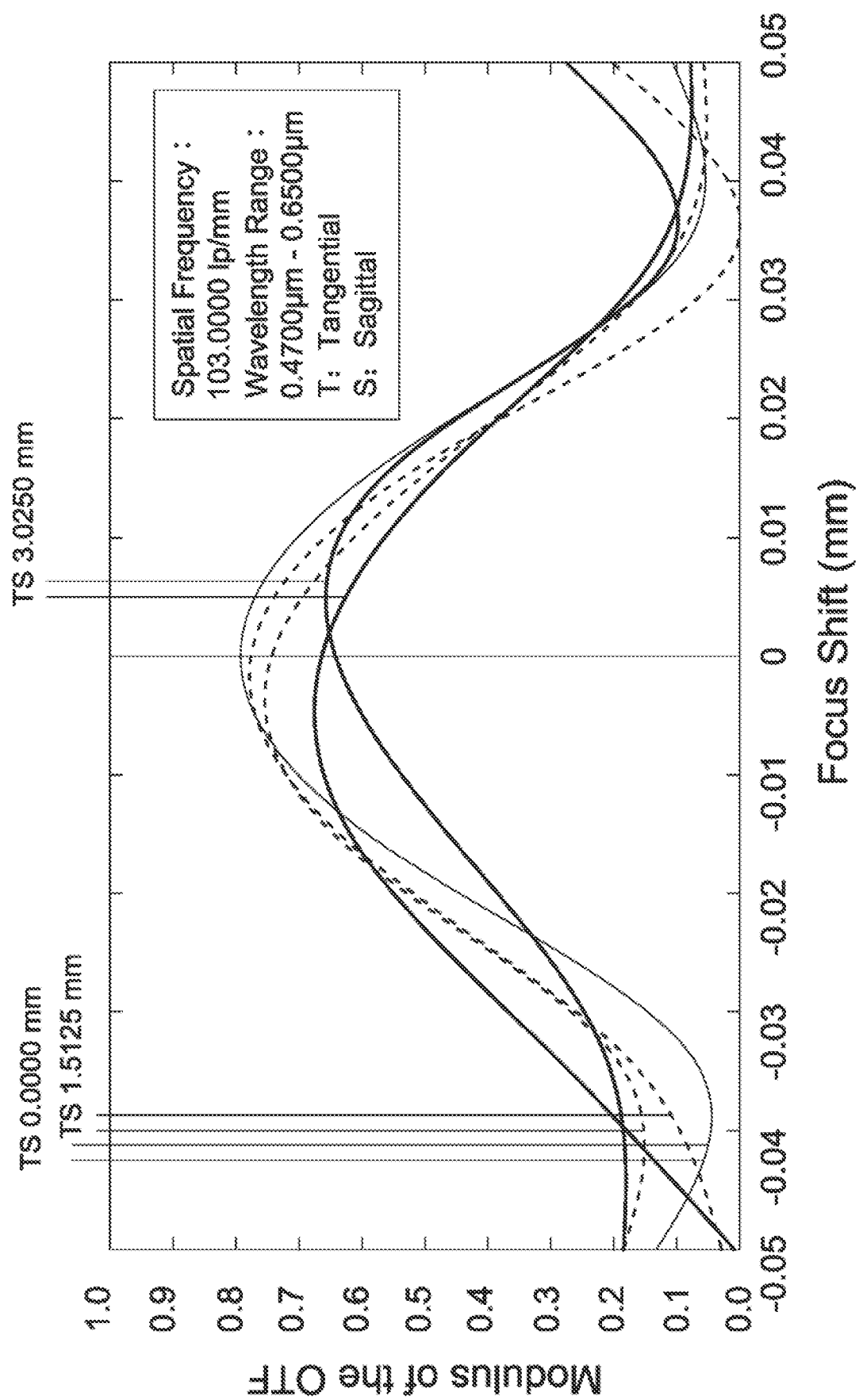
FIG. 26D is a through focus modulation transfer function diagram of the wide-angle lens assembly in accordance with the thirteenth embodiment of the invention.

It can be seen from FIG. 26A that the field curvature of tangential direction and sagittal direction in the wide-angle lens assembly 13 of the thirteenth embodiment ranges from −0.04 mm to 0.03 mm. It can be seen from FIG. 26B that the distortion in the wide-angle lens assembly 13 of the thirteenth embodiment ranges from −14% to 0%. It can be seen from FIG. 26C that the root mean square spot radius is equal to 0.499 μm and geometrical spot radius is equal to 0.840 μm as image height is equal to 0.000 mm, the root mean square spot radius is equal to 1.483 μm and geometrical spot radius is equal to 4.682 μm as image height is equal to 1.512 mm, and the root mean square spot radius is equal to 4.840 μm and geometrical spot radius is equal to 17.559 μm as image height is equal to 3.025 mm for the wide-angle lens assembly 13 of the thirteenth embodiment. It can be seen from FIG. 26D that the through focus modulation transfer function of tangential direction and sagittal direction in the wide-angle lens assembly 13 of the thirteenth embodiment ranges from 0.0 to 0.79 as focus shift ranges from −0.05 mm to 0.05 mm.

It is obvious that the field curvature and the distortion of the wide-angle lens assembly 13 of the thirteenth embodiment can be corrected effectively, and the resolution and the depth of focus of the wide-angle lens assembly 13 of the thirteenth embodiment can meet the requirement. Therefore, the wide-angle lens assembly 13 of the thirteenth embodiment is capable of good optical performance.

The fourteenth embodiment (not shown) is substantially the same as the tenth embodiment, so no longer describe. The difference is that the IH value of the fourteenth embodiment is 3.414 mm. Table 35 shows the parameters and condition values for conditions (6)-(10) in accordance with the fourteenth embodiment of the invention. It can be seen from Table 35 that the wide-angle lens assembly of the

TABLE 35

| BFL | 8.01 mm | IH | 3.414 mm | $|f_1|/f$ | 1.21 |
|---|---|---|---|---|---|
| BFL/TTL | 0.46 | TTL/IH | 5.14 | | |
| BFL/IH | 2.35 | $f_1/f_5$ | −0.91 | | |

The fifteenth embodiment (not shown) is substantially the same as the eleventh embodiment, so no longer describe. The difference is that the IH value of the fifteenth embodiment is 3.414 mm. Table 36 shows the parameters and condition values for conditions (6)-(10) in accordance with the fifteenth embodiment of the invention. It can be seen from Table 36 that the wide-angle lens assembly of the fifteenth embodiment satisfies the conditions (6)-(10).

TABLE 36

| BFL | 8.19 mm | IH | 3.414 mm | $|f_1|/f$ | 1.20 |
|---|---|---|---|---|---|
| BFL/TTL | 0.46 | TTL/IH | 5.23 | | |
| BFL/IH | 2.4 | $f_1/f_5$ | −0.89 | | |

The sixteenth embodiment (not shown) is substantially the same as the twelfth embodiment, so no longer describe. The difference is that the IH value of the sixteenth embodiment is 3.414 mm. Table 37 shows the parameters and condition values for conditions (6)-(10) in accordance with the sixteenth embodiment of the invention. It can be seen from Table 37 that the wide-angle lens assembly of the sixteenth embodiment satisfies the conditions (6)-(10).

TABLE 37

| BFL | 8.39 mm | IH | 3.414 mm | $|f_1|/f$ | 1.31 |
|---|---|---|---|---|---|
| BFL/TTL | 0.45 | TTL/IH | 5.47 | | |
| BFL/IH | 2.46 | $f_1/f_5$ | −0.924 | | |

The seventeenth embodiment (not shown) is substantially the same as the thirteenth embodiment, so no longer describe. The difference is that the IH value of the seventeenth embodiment is 3.414 mm. Table 38 shows the parameters and condition values for conditions (6)-(10) in accordance with the seventeenth embodiment of the invention. It can be seen from Table 38 that the wide-angle lens assembly of the seventeenth embodiment satisfies the conditions (6)-(10).

TABLE 38

| BFL | 6.19 mm | IH | 3.414 mm | | |
|---|---|---|---|---|---|
| BFL/TTL | 0.44 | TTL/IH | 4.14 | \|f₁\|/f | 0.88 |
| BFL/IH | 1.81 | f₁/f₅ | −0.697 | | |

In practical applications, the aboved tenth to seventeenth embodiments can be added a reflective element between the fifth lens and the optical filter, so as to deflect the light path and benefit the design of the mechanism to achieve effective space utilization. With the design of the aboved tenth to seventeenth embodiments and combine with any one of the conditions (1)-(5), the wide-angle lens assembly of the present invention can be applied not only to long-range shooting but also to close-range shooting (for example, about 5 cm, but not limited to this distance).

Referring to Table 39, Table 40, Table 42, Table 43, Table 45, Table 46, Table 48, Table 49, Table 51, and Table 52, wherein Table 39, Table 42, Table 45, Table 48, and Table 51 show optical specification in accordance with an eighteenth, nineteenth, twentieth, twenty-first, twenty-second embodiments of the invention respectively and Table 40, Table 43, Table 46, Table 49, and Table 52 show aspheric coefficients of each aspheric lens in Table 39, Table 42, Table 45, Table 48, and Table 51 respectively.

FIG. 27, FIG. 29, FIG. 31, FIG. 33, and FIG. 35 are lens layout and optical path diagrams of the wide-angle lens assemblies in accordance with the eighteenth, nineteenth, twentieth, twenty-first, twenty-second embodiments of the invention respectively.

The first lenses L181, L191, L201, L211, L221 are meniscus lenses with negative refractive power and made of glass material, wherein the object side surfaces S181, S191, S201, S211, S221 are convex surfaces, the image side surfaces S182, S192, S202, S212, S222 are concave surfaces, and the object side surfaces S181, S191, S201, S211, S221 and the image side surfaces S182, S192, S202, S212, S222 are spherical surfaces.

The sixth lenses L186, L196, L206, L216, L226 are meniscus lenses with negative refractive power and made of plastic material, wherein the object side surfaces S183, S193, S203, S213, S223 are convex surfaces, the image side surfaces S184, S194, S204, S214, S224 are concave surfaces, and the object side surfaces S183, S193, S203, S213, S223 and the image side surfaces S184, S194, S204, S214, S224 are aspheric surfaces.

The second lenses L182, L192, L202, L212, L222 are with positive refractive power and made of plastic material, wherein the the image side surfaces S186, S196, S206, S216, S226 are convex surfaces, and the object side surfaces S185, S195, S205, S215, S225 and the image side surfaces S186, S196, S206, S216, S226 are aspheric surfaces.

The third lenses L183, L193, L203, L213, L223 are biconvex lenses with positive refractive power and made of glass material, wherein the object side surfaces S188, S198, S208, S218, S228 are convex surfaces, the image side surfaces S189, S199, S209, S219, S229 are convex surfaces, and the object side surfaces S188, S198, S208, S218, S228 and the image side surfaces S189, S199, S209, S219, S229 are spherical surfaces.

The fourth lenses L184, L194, L204, L214, L224 are biconcave lenses with negative refractive power and made of plastic material, wherein the object side surfaces S1810, S1910, S2010, S2110, S2210 are concave surfaces, the image side surfaces S1811, S1911, S2011, S2111, S2211 are concave surfaces, and the object side surfaces S1810, S1910, S2010, S2110, S2210 and the image side surfaces S1811, S1911, S2011, S2111, S2211 are aspheric surfaces.

The fifth lenses L185, L195, L205, L215, L225 are biconvex lenses with positive refractive power and made of plastic material, wherein the object side surfaces S1812, S1912, S2012, S2112, S2212 are convex surfaces, the image side surfaces S1813, S1913, S2013, S2113, S2213 are convex surfaces, and the object side surfaces S1812, S1912, S2012, S2112, S2212 and the image side surfaces S1813, S1913, S2013, S2113, S2213 are aspheric surfaces.

In addition, the lens assemblies 18, 19, 20, 21, 22 satisfy at least one of the following conditions:

$$-8.3 \leq f_{162}/f \leq 14; \quad (11)$$

$$4 \text{ mm} \leq f+f_3 \leq 5 \text{ mm}; \quad (12)$$

$$-5.65 \text{ mm} \leq (R_{21} \times R_{22})/(R_{21}+R_{22}) \leq -3.8 \text{ mm}; \quad (13)$$

$$0.5 < |(CRA-MRA)/CRA| < 1.02; \quad (14)$$

$$-45 \text{ degrees/mm} \leq FOV/f_1 \leq -22 \text{ degrees/mm}; \quad (15)$$

$$105 \leq Vd_1 + Vd_3 \leq 140; \quad (16)$$

$$-5.1 \leq (f_6+f_4)/f < -3.6; \quad (17)$$

$$0.12 \leq BFL/TTL \leq 0.23; \quad (18)$$

$$9 \leq TTL/T_3 \leq 19; \quad (19)$$

wherein f is an effective focal length of the wide-angle lens assembly 18, 19, 20, 21, 22 for the eighteenth to twenty-second embodiments, $f_{162}$ is an effective focal length of a combination of the first lenses L181, L191, L201, L211, L221, the sixth lenses L186, L196, L206, L216, L226, and the second lenses L182, L192, L202, L212, L222 respectively for the eighteenth to twenty-second embodiments, $f_3$ is an effective focal length of the third lenses L183, L193, L203, L213, L223 for the eighteenth to twenty-second embodiments, $R_1$ is a radius of curvature of the object side surfaces S185, S195, S205, S215, S225 of the second lenses L182, L192, L202, L212, L222 for the eighteenth to twenty-second embodiments, R is a radius of curvature of the image side surfaces S186, S196, S206, S216, S226 of the second lenses L182, L192, L202, L212, L222 respectively for the eighteenth to twenty-second embodiments, CRA is a chief ray angle of a maximum image height of the wide-angle lens assemblies 18, 19, 20, 21, 22 respectively for the eighteenth to twenty-second embodiments, MRA is a marginal ray angle of the maximum image height of the wide-angle lens assemblies 18, 19, 20, 21, 22 respectively for the eighteenth to twenty-second embodiments, FOV is a field of view of the wide-angle lens assemblies 18, 19, 20, 21, 22 respectively for the eighteenth to twenty-second embodiments, $f_1$ is an effective focal length of the first lenses L181, L191, L201, L211, L221 for the eighteenth to twenty-second embodiments, $Vd_1$ is an Abbe number of the first lenses L181, L191, L201, L211, L221 respectively for the eighteenth to twenty-second embodiments, $Vd_3$ is an Abbe number of the third lenses L183, L193, L203, L213, L223 respectively for the eighteenth to twenty-second embodiments, $f_6$ is an effective focal length of the sixth lenses L186, L196, L206, L216, L226 for the eighteenth to twenty-second embodiments, $f_4$ is an effective focal length of the fourth lenses L184, L194, L204, L214, L224 for the eighteenth to twenty-second embodiments, BFL is an interval from the image side surfaces S1813, S1913, S2013, S2115, S2215 of the lenses L185, L195, L205, L217, L227 which are closest to the image side to the image planes IMA18, IMA19, IMA20, IMA21, IMA22 along the optical axes OA18, OA19, OA20, OA21, OA22 respectively for the eighteenth to twenty-second embodiments, TTL is an interval from the object side surfaces S181, S191, S201, S211, S221 of the first lenses L181, L191, L201, L211, L221 to the image planes IMA18, IMA19, IMA20, IMA21, IMA22 along the optical axes OA18, OA19, OA20, OA21, OA22 respectively for the eighteenth to twenty-second embodiments, and $T_3$ is a thickness of the third lenses L183, L193, L203, L213, L223 along the optical axes OA18, OA19, OA20, OA21, OA22 respectively for the eighteenth to twenty-second embodiments. With the lens assemblies 18, 19, 20, 21, 22 satisfying at least one of the above conditions (11)-(19), the total lens length can be effectively shortened, the field of view can be effectively increased, the chromatic aberration can be effectively corrected, and the aberration can be effectively corrected.

When the condition (11): $-8.3 \leq f_{162}/f \leq 14$ is satisfied, the relative illumination of the wide-angle lens assembly can be increased.

When the condition (12): $4 \text{ mm} \leq f + f_3 \leq 5 \text{ mm}$ is satisfied, the refractive power of the third lens can be controlled so that the refractive power of the third lens is not too large, which is beneficial to the manufacturing of the third lens.

When the condition (13): $-5.65 \text{ mm} \leq (R_{21} \times R_{22})/(R_{21} + R_{22}) \leq -3.8 \text{ mm}$ is satisfied, the manufacturing sensitivity of the second lens can be decreased to improve the manufacturing yield of the wide-angle lens assembly.

When the condition (14): $0.5 < |(CRA-MRA)/CRA| < 1.02$ is satisfied, the marginal ray angle of the maximum image height can be adjusted to improve the illumination and image quality of the wide-angle lens assembly.

When the condition (15): $-45 \text{ degrees/mm} \leq FOV/f_1 \leq -22$ degrees/mm is satisfied, the refractive power of the first lens can be controlled so that the refractive power of the first lens is not too large, which is beneficial to the manufacturing of the first lens.

When the condition (16): $105 \leq Vd_1 + Vd_3 \leq 140$ is satisfied, the chromatic aberration of the wide-angle lens assembly can be reduced and the image quality can be improved.

When the condition (17): $-5.1 \leq (f_6 + f_4)/f < -3.6$ is satisfied, the manufacturing sensitivity of wide-angle lens assembly can be reduced to improve image quality.

When the condition (18): $0.12 \leq BFL/TTL \leq 0.23$ is satisfied, the back focal length can be increased, which is beneficial to the assembly and manufacturing of the wide-angle lens assembly.

When the condition (19): $9 \leq TTL/T_3 \leq 19$ is satisfied, the impact of temperature change on image quality can be reduced effectively, which is beneficial to the manufacture of wide-angle lens assembly.

Figure 27:
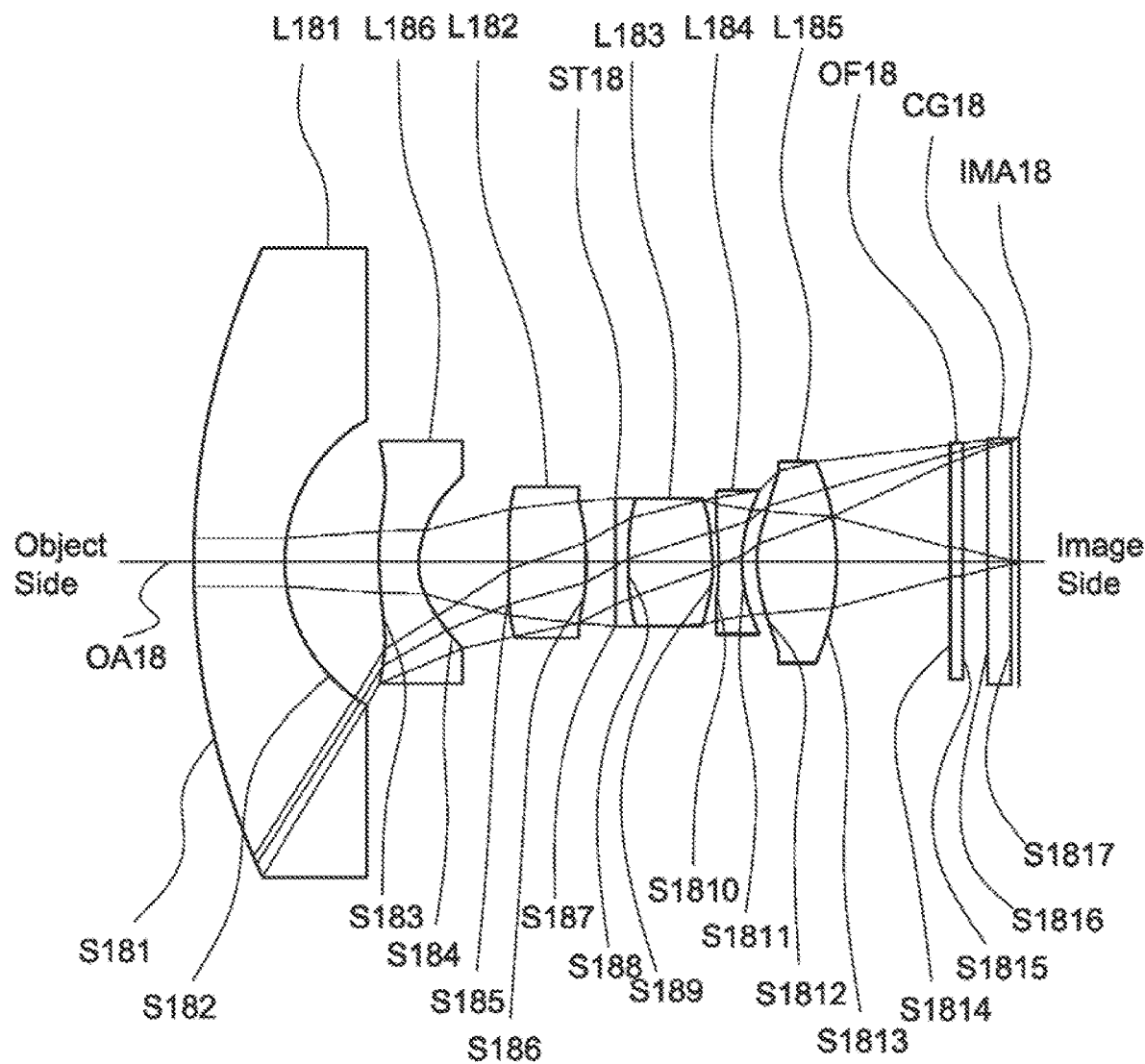
FIG. 27 is a lens layout and optical path diagram of a wide-angle lens assembly in accordance with a eighteenth embodiment of the invention.

A detailed description of a wide-angle lens assembly in accordance with an eighteenth embodiment of the invention is as follows. Referring to FIG. 27, the wide-angle lens assembly 18 includes a first lens L181, a sixth lens L186, a second lens L182, a stop ST18, a third lens L183, a fourth lens L184, a fifth lens L185, an optical filter OF18, and a cover glass CG18, all of which are arranged in order from an object side to an image side along an optical axis OA18. In operation, an image of light rays from the object side is formed at an image plane IMA18.

According to the foregoing, wherein: the second lens L182 is a biconvex lens, wherein the object side surface S185 is a convex surface; both of the object side surface S1814 and image side surface S1815 of the optical filter OF18 are plane surfaces; and both of the object side surface S1816 and image side surface S1817 of the cover glass CG18 are plane surfaces.

With the above design of the lenses and stop ST18 and at least any one of the conditions (11)-(19) satisfied, the wide-angle lens assembly 18 can have an effective decreased total lens length, an effective increased field of view, an effective increased resolution, an effective corrected aberration, and is capable of effective corrected chromatic aberration.

Table 39 shows the optical specification of the wide-angle lens assembly 18 in FIG. 27.

TABLE 39

Effective Focal Length = 1.5849 mm  F-number = 2.0
Total Lens Length = 13.5 mm  Field of View = 200 degrees

| Surface Number | Radius of Curvature (mm) | Thickness (mm) | Nd | Vd | Effective Focal Length (mm) | Remark |
|---|---|---|---|---|---|---|
| S181 | 12.33 | 1.50 | 1.7 | 54.7 | −5.06 | The First Lens L181 |
| S182 | 2.70 | 1.53 | | | | |
| S183 | 4.57 | 0.65 | 1.5 | 56.0 | −3.86 | The Sixth Lens L186 |
| S184 | 1.37 | 1.47 | | | | |
| S185 | 19.18 | 1.27 | 1.6 | 24.0 | 5.19 | The Second Lens L182 |
| S186 | −3.92 | 0.48 | | | | |
| S187 | ∞ | 0.21 | | | | Stop ST18 |
| S188 | 4.46 | 1.38 | 1.6 | 68.6 | 3.39 | The Third Lens L183 |
| S189 | −3.26 | 0.11 | | | | |
| S1810 | −7.22 | 0.40 | 1.7 | 20.4 | −2.98 | The Fourth Lens L184 |
| S181.1 | 2.80 | 0.25 | | | | |
| S1812 | 2.36 | 1.28 | 1.5 | 56.0 | 3.19 | The Fifth Lens L185 |
| S1813 | −5.35 | 1.86 | | | | |
| S1814 | ∞ | 0.21 | 1.5 | 64 | | Optical Filter OF18 |
| S1815 | ∞ | 0.40 | | | | |
| S1816 | ∞ | 0.40 | 1.5 | 64 | | Cover Glass CG18 |
| S1817 | ∞ | 0.11 | | | | |

The definition of aspheric surface sag z of each aspheric lens in Table 39 is the same as that of in Table 23, and is not described here again.

In the eighteenth embodiment, the conic constant k and the aspheric coefficients A, B, C, D, E, F, G of each aspheric lens are shown in Table 40.

TABLE 40

| Surface Number | k | A<br>E | B<br>F | C<br>G | D |
|---|---|---|---|---|---|
| S183 | −7.08 | −2.73E−02<br>1.71E−06 | −2.11E−05<br>−3.44E−07 | 2.26E−04<br>−2.37E−07 | 3.72E−05 |
| S184 | −1.17 | 2.87E−03<br>−1.20E−04 | 6.21E−03<br>4.16E−04 | −5.33E−03<br>−1.66E−04 | 1.28E−03 |
| S185 | 151.59 | 1.84E−02<br>−2.31E−04 | −1.00E−03<br>8.00E−05 | 1.55E−03<br>4.34E−05 | −6.86E−04 |
| S186 | −12.86 | −9.26E−03<br>1.56E−02 | 2.84E−02<br>−3.89E−02 | −4.69E−02<br>1.61E−02 | 3.65E−02 |
| S1810 | −86.23 | 2.98E−02<br>−1.18E−02 | −2.89E−02<br>2.40E−02 | 2.32E−02<br>−1.03E−02 | −1.43E−02 |
| S1811 | 0.39 | 1.88E−02<br>2.67E−03 | −4.15E−03<br>−2.20E−03 | −6.07E−03<br>3.80E−04 | 2.06E−03 |
| S1812 | −5.57 | −5.15E−03<br>4.02E−05 | 4.28E−03<br>1.05E−04 | −4.28E−04<br>−2.11E−05 | −5.76E−04 |
| S1813 | −27.13 | −2.94E−02<br>−1.20E−04 | 2.83E−03<br>5.16E−08 | −2.57E−04<br>7.24E−06 | 1.63E−04 |

Table 41 shows the parameters and condition values for conditions (11)-(19) in accordance with the eighteenth embodiment of the invention. It can be seen from Table 41 that the wide-angle lens assembly 18 of the eighteenth embodiment satisfies the conditions (11)-(19).

TABLE 41

| $f_{162}$ | −12.08 mm | CRA | 15.376 degrees | MRA | 7.06 degrees |
|---|---|---|---|---|---|
| $f_{162}/f$ | −7.62 | $f + f_3$ | 4.98 mm | $(R_{21} \times R_{22})/(R_{21} + R_{22})$ | −4.92 mm |
| \| (CRA − MRA)/CRA \| | 0.540 | FOV/$f_1$ | −39.50 degrees/mm | $Vd_1 + Vd_3$ | 123.3 |
| $(f_6 + f_4)/f$ | −4.32 | BTF/TTL | 0.22 | TTL/$T_3$ | 9.76 |

Figure 28A:
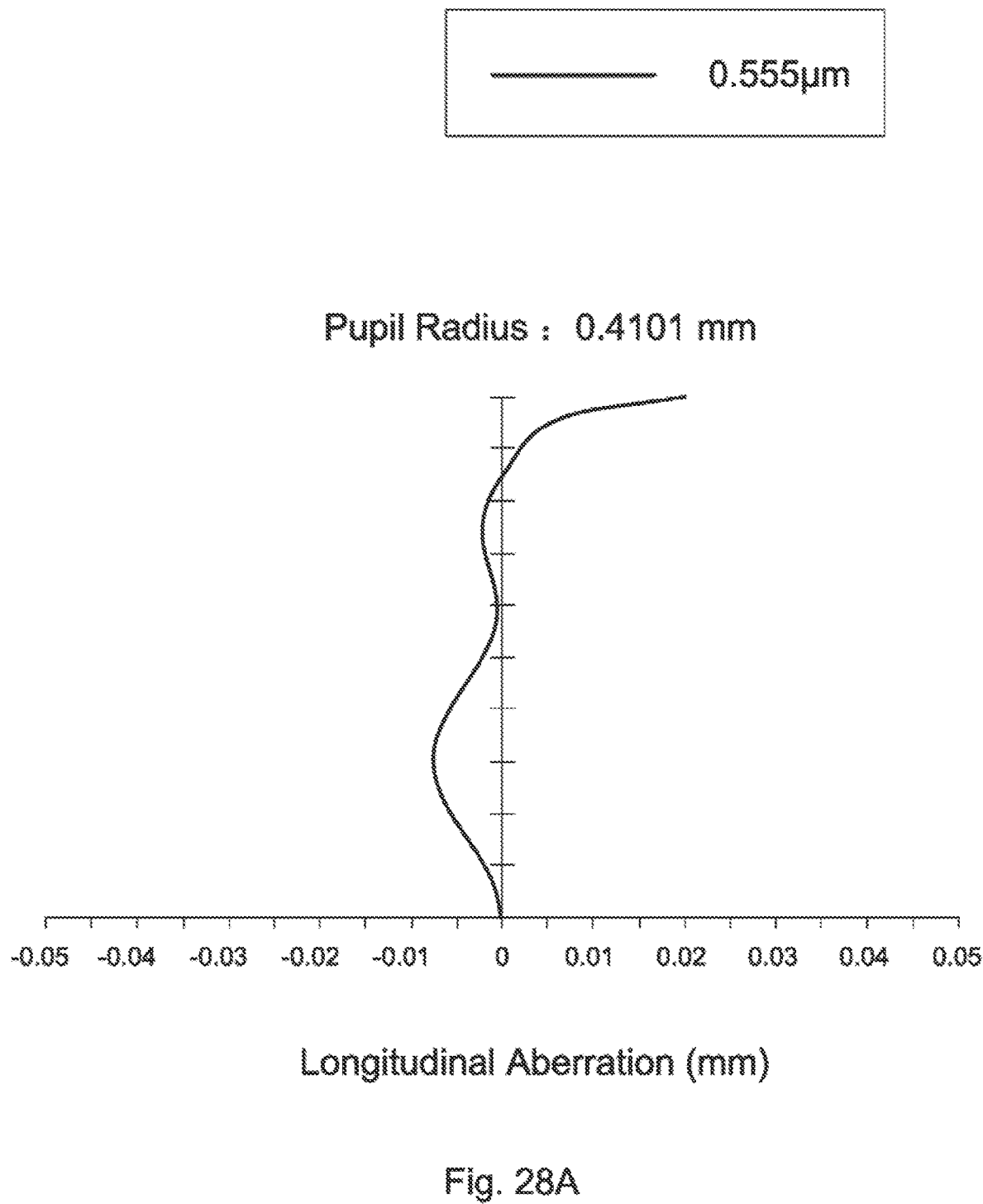
FIG. 28A depicts a longitudinal aberration diagram of the wide-angle lens assembly in accordance with the eighteenth embodiment of the invention.
Figure 28B:
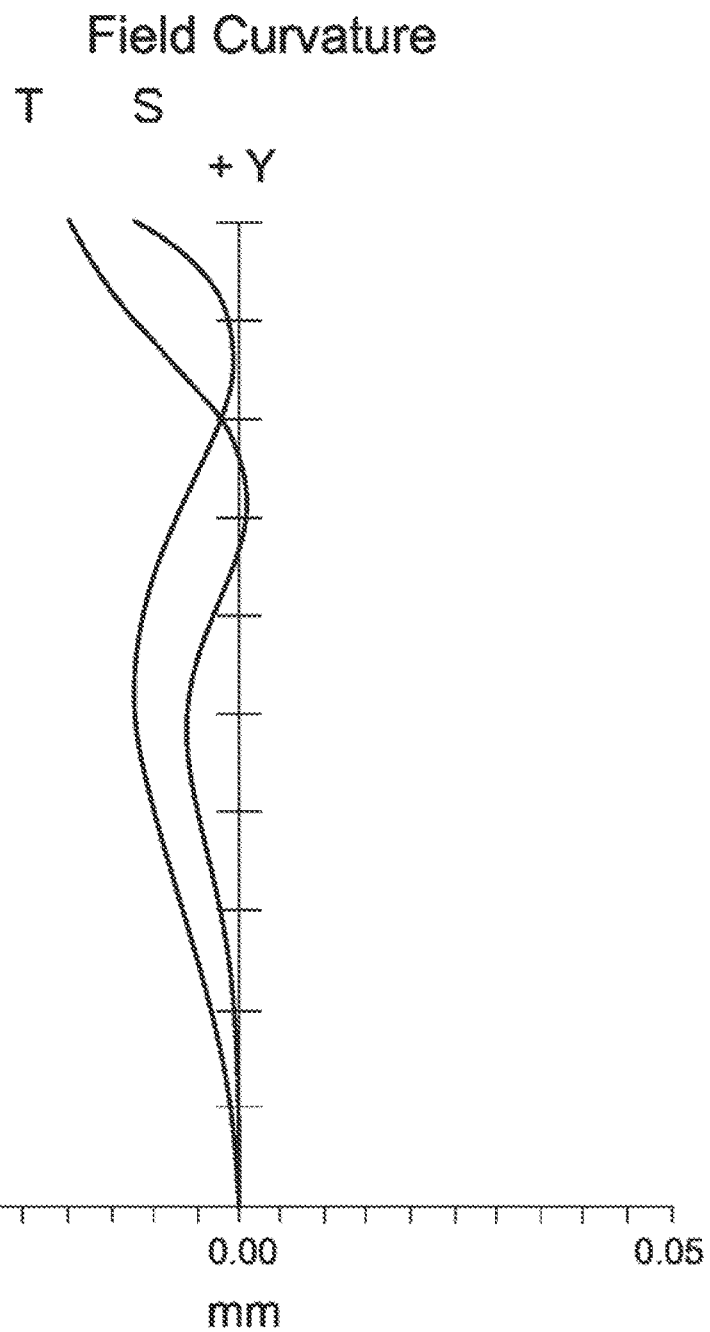
FIG. 28B is a field curvature diagram of the wide-angle lens assembly in accordance with the eighteenth embodiment of the invention.
Figure 28C:
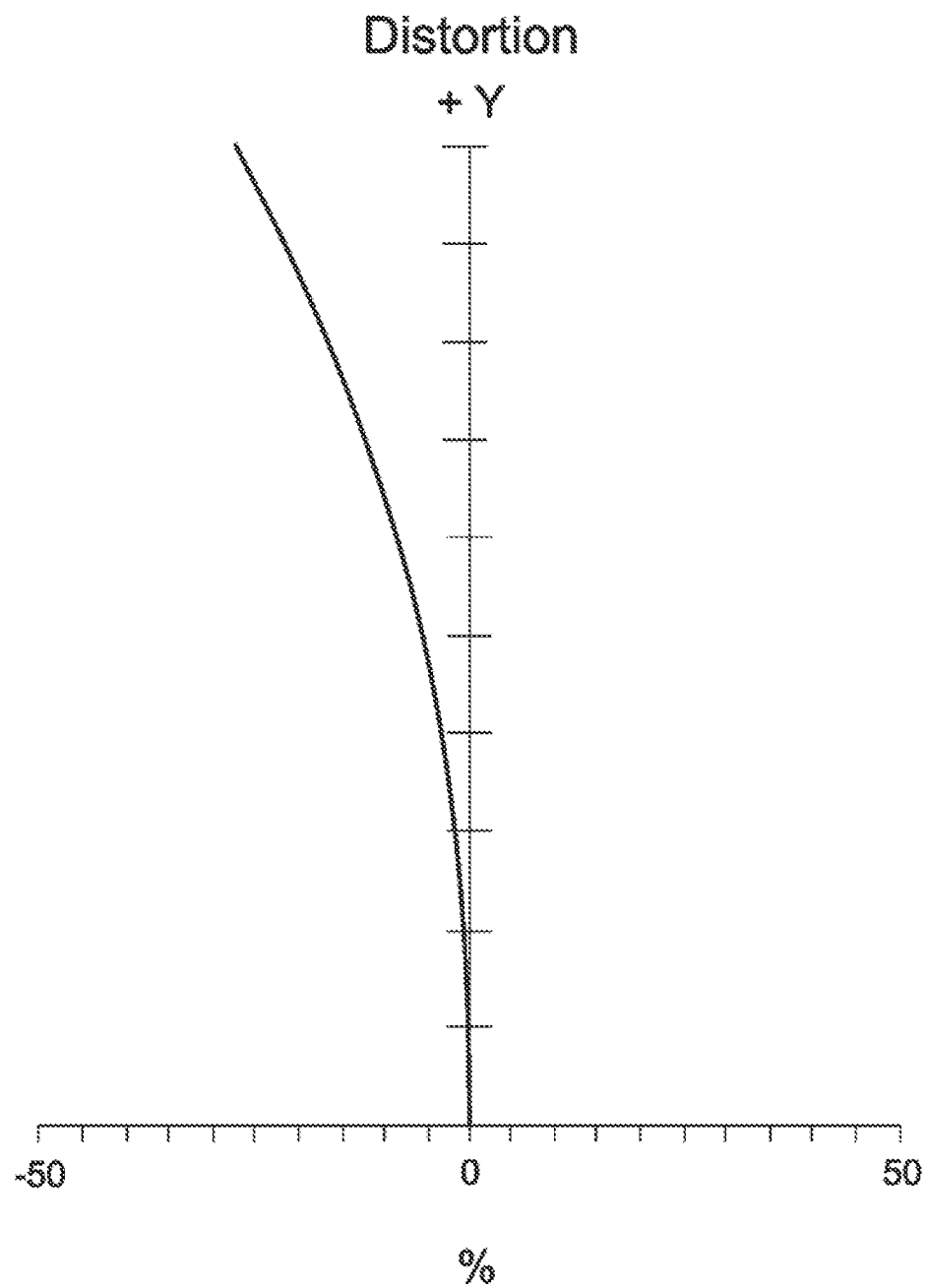
FIG. 28C is a distortion diagram of the wide-angle lens assembly in accordance with the eighteenth embodiment of the invention.

By the above arrangements of the lenses and stop ST18, the wide-angle lens assembly 18 of the eighteenth embodiment can meet the requirements of optical performance as seen in FIGS. 28A-28C.

It can be seen from FIG. 28A that the longitudinal aberration in the wide-angle lens assembly 18 of the eighteenth embodiment ranges from −0.01 mm to 0.025 mm. It can be seen from FIG. 28B that the field curvature of tangential direction and sagittal direction in the wide-angle lens assembly 18 of the eighteenth embodiment ranges from −0.02 mm to 0.005 mm. It can be seen from FIG. 28C that the distortion in the wide-angle lens assembly 18 of the eighteenth embodiment ranges from −30% to 0%.

It is obvious that the longitudinal aberration, the field curvature and the distortion of the wide-angle lens assembly 18 of the eighteenth embodiment can be corrected effectively. Therefore, the wide-angle lens assembly 18 of the eighteenth embodiment is capable of good optical performance.

Figure 29:
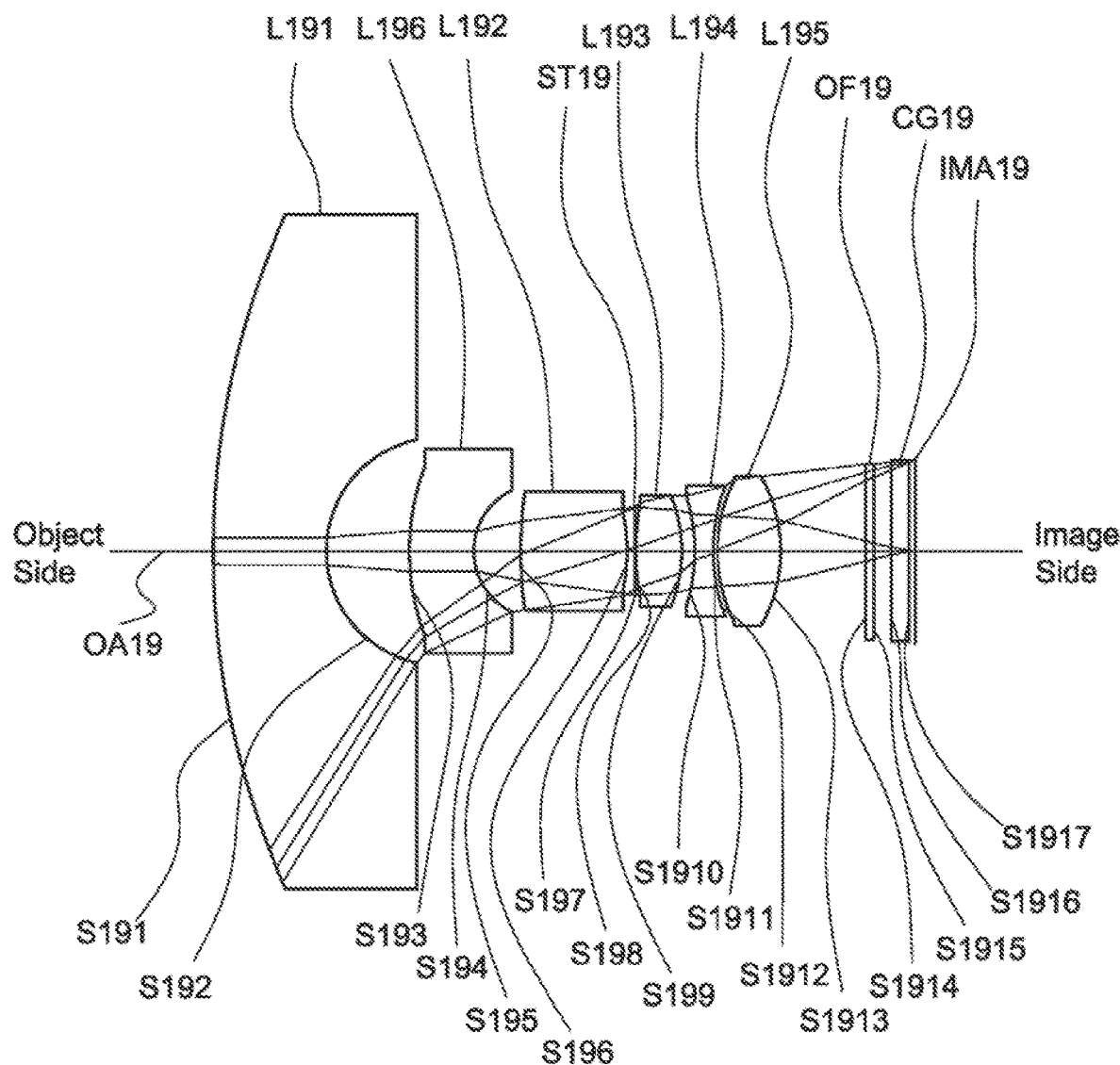
FIG. 29 is a lens layout and optical path diagram of a wide-angle lens assembly in accordance with a nineteenth embodiment of the invention.

Referring to FIG. 29, the wide-angle lens assembly 19 includes a first lens L191, a sixth lens L196, a second lens L192, a stop ST19, a third lens L193, a fourth lens L194, a fifth lens L195, an optical filter OF19, and a cover glass CG19, all of which are arranged in order from an object side to an image side along an optical axis OA19. In operation, an image of light rays from the object side is formed at an image plane IMA19.

According to the foregoing, wherein: the second lens L192 is a biconvex lens, wherein the object side surface S195 is a convex surface; both of the object side surface S1914 and image side surface S1915 of the optical filter OF19 are plane surfaces; and both of the object side surface S1916 and image side surface S1917 of the cover glass CG19 are plane surfaces.

With the above design of the lenses and stop ST19 and at least any one of the conditions (11)-(19) satisfied, the wide-angle lens assembly 19 can have an effective decreased total lens length, an effective increased field of view, an effective increased resolution, an effective corrected aberration, and is capable of effective corrected chromatic aberration.

Table 42 shows the optical specification of the wide-angle lens assembly 19 in FIG. 29.

TABLE 42

Effective Focal Length = 1.353 mm F-number = 2.1
Total Lens Length = 16.32 mm Field of View = 200 degrees

| Surface Number | Radius of Curvature (mm) | Thickness (mm) | Nd | Vd | Effective Focal Length (mm) | Remark |
|---|---|---|---|---|---|---|
| S191 | 18.00 | 2.55 | 1.7 | 55.5 | -4.53 | The First Lens L191 |
| S192 | 2.54 | 1.86 | | | | |
| S193 | 3.56 | 1.44 | 1.5 | 56.1 | -4.12 | The Sixth Lens L196 |
| S194 | 1.17 | 1.08 | | | | |
| S195 | 15.20 | 2.39 | 1.6 | 24.0 | 5.26 | The Second Lens L192 |
| S196 | -4.06 | 0.19 | | | | |
| S197 | ∞ | -0.03 | | | | Stop ST19 |
| S198 | 3.72 | 1.08 | 1.49 | 81.60 | 3.45 | The Third Lens L193 |
| S199 | -2.88 | 0.29 | | | | |
| S1910 | -5.07 | 0.40 | 1.7 | 20.4 | -2.65 | The Fourth Lens L194 |
| S1911 | 2.80 | 0.12 | | | | |
| S1912 | 2.70 | 1.43 | 1.5 | 56.1 | 2.79 | The Fifth Lens L195 |
| S1913 | -2.75 | 1.90 | | | | |
| S1914 | ∞ | 0.21 | 1.5 | 64.0 | | Optical Filter OF19 |
| S1915 | ∞ | 0.40 | | | | |
| S1916 | ∞ | 0.40 | 1.5 | 64.0 | | Cover Glass CG19 |
| S1917 | ∞ | 0.11 | | | | |

The definition of aspheric surface sag z of each aspheric lens in Table 42 is the same as that of in Table 23, and is not described here again.

In the nineteenth embodiment, the conic constant k and the aspheric coefficients A, B, C, D, E, F, G of each aspheric lens are shown in Table 43.

TABLE 43

| Surface Number | k | A E | B F | C G | D |
|---|---|---|---|---|---|
| S193 | -3.91 | -1.73E-03 | -8.73E-04 | -7.71E-05 | -3.08E-06 |
| | | 6.63E-07 | 5.77E-08 | 1.23E-08 | |
| S194 | -1.08 | 2.32E-02 | 5.02E-03 | -1.42E-03 | 7.21E-04 |
| | | -7.30E-04 | 2.69E-04 | 5.73E-05 | |
| S195 | 83.50 | 1.49E-03 | 5.55E-03 | -1.33E-03 | -4.45E-04 |
| | | 3.66E-04 | 1.12E-04 | -4.03E-05 | |
| S196 | -12.71 | -1.95E-02 | 1.60E-02 | -1.11E-02 | -4.29E-03 |
| | | 1.31E-02 | -1.89E-03 | -3.21E-03 | |
| S1910 | -0.21 | -1.62E-02 | 1.12E-03 | 1.36E-03 | -1.35E-03 |
| | | 4.05E-04 | 1.93E-04 | -1.41E-04 | |
| S1911 | -5.77 | -9.53E-03 | 4.56E-03 | 1.74E-04 | -3.03E-04 |
| | | -4.71E-05 | -1.27E-05 | 1.66E-05 | |
| S1912 | -6.04 | -4.05E-03 | 2.92E-03 | 1.40E-04 | -1.89E-04 |
| | | 8.55E-06 | 8.43E-06 | 2.52E-06 | |
| S1913 | -2.89 | -7.93E-03 | 3.54E-03 | -8.22E-04 | 2.96E-04 |
| | | -4.80E-05 | -2.88E-06 | 4.03E-06 | |

Table 44 shows the parameters and condition values for conditions (11)-(19) in accordance with the nineteenth embodiment of the invention. It can be seen from Table 44 that the wide-angle lens assembly 19 of the nineteenth embodiment satisfies the conditions (11)-(19).

Figure 30A:
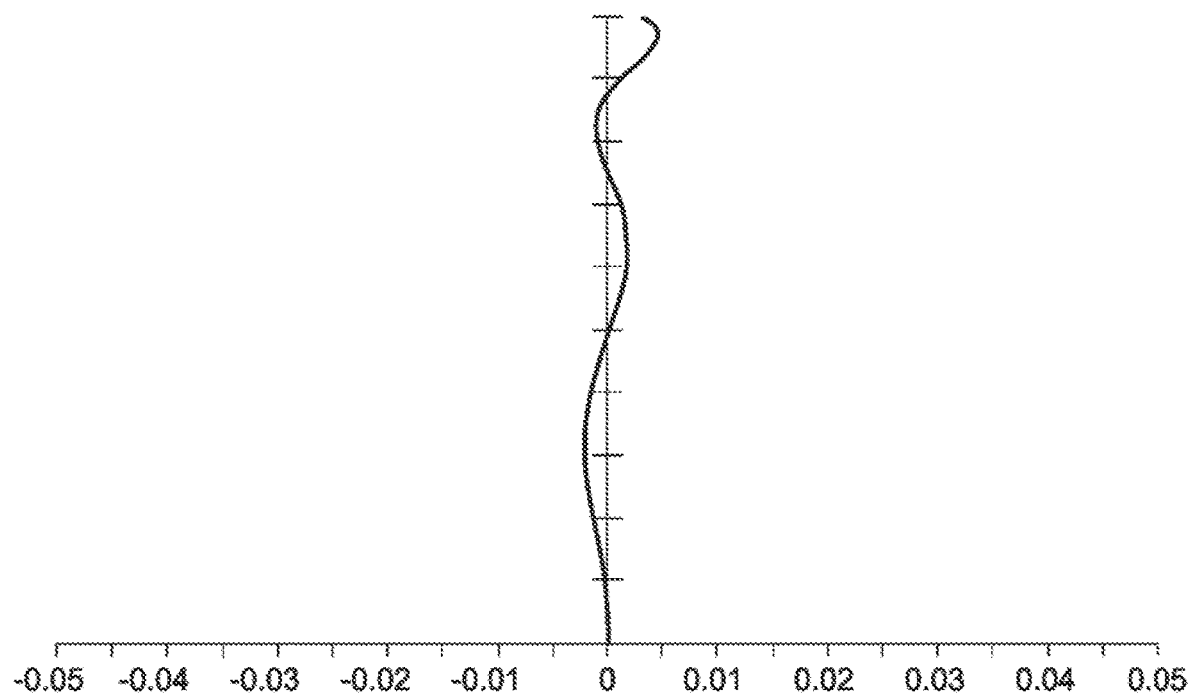
FIG. 30A depicts a longitudinal aberration diagram of the wide-angle lens assembly in accordance with the nineteenth embodiment of the invention.
Figure 30B:
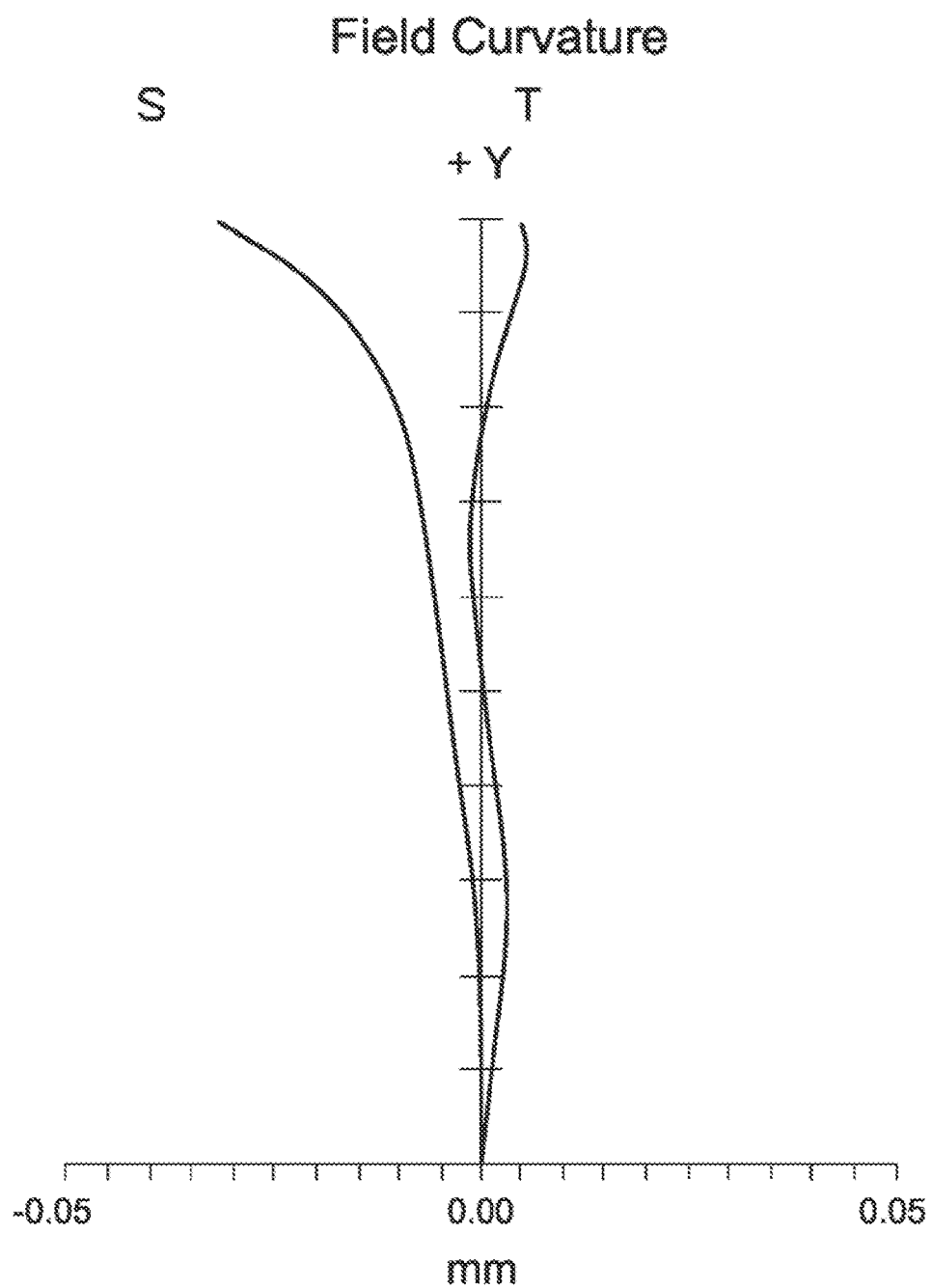
FIG. 30B is a field curvature diagram of the wide-angle lens assembly in accordance with the nineteenth embodiment of the invention.
Figure 30C:
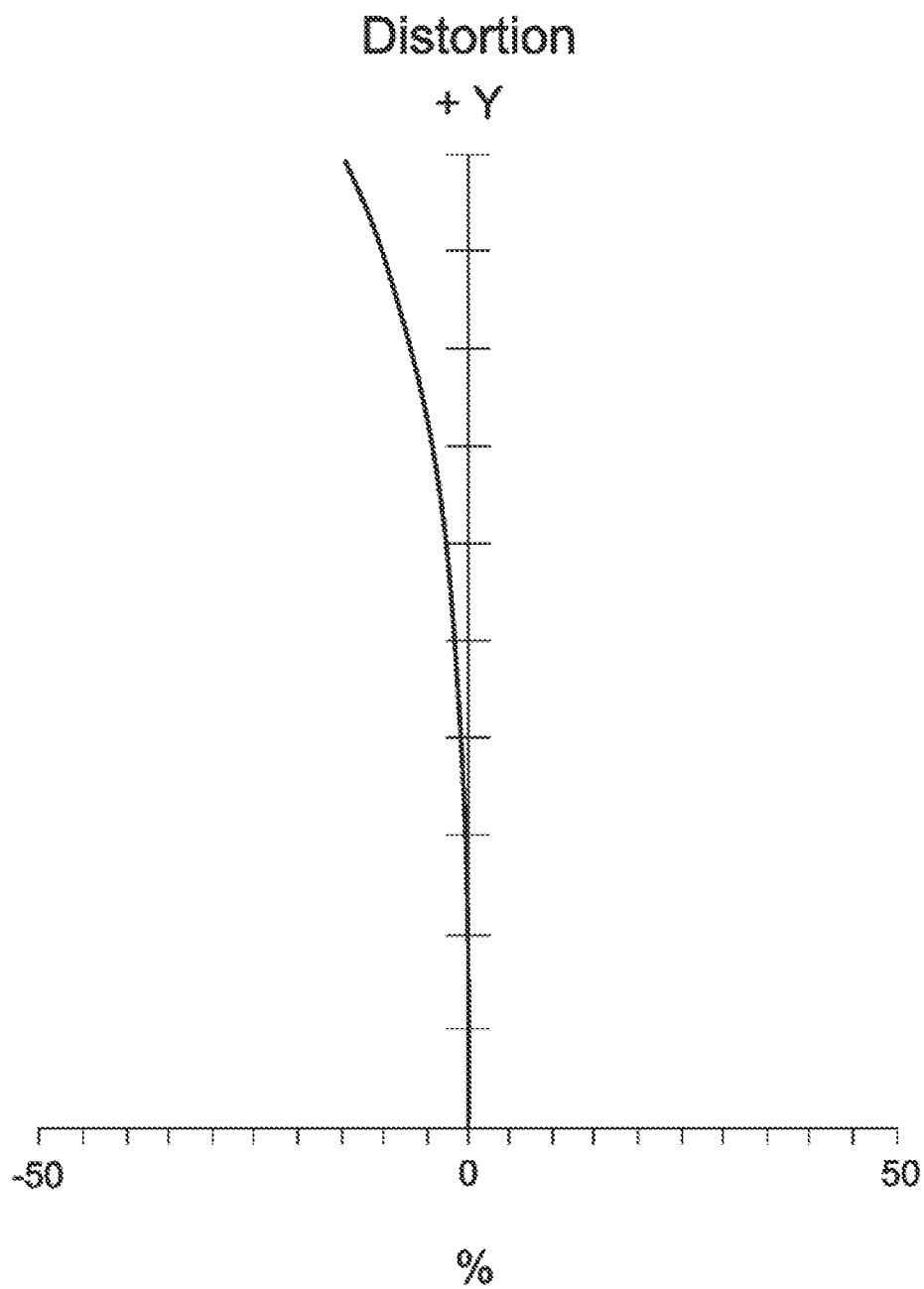
FIG. 30C is a distortion diagram of the wide-angle lens assembly in accordance with the nineteenth embodiment of the invention.

By the above arrangements of the lenses and stop ST19, the wide-angle lens assembly 19 of the nineteenth embodiment can meet the requirements of optical performance as seen in FIGS. 30A-30C.

It can be seen from FIG. 30A that the longitudinal aberration in the wide-angle lens assembly 19 of the nineteenth embodiment ranges from -0.005 mm to 0.005 mm. It can be seen from FIG. 30B that the field curvature of tangential direction and sagittal direction in the wide-angle lens assembly 19 of the nineteenth embodiment ranges from -0.035 mm to 0.01 mm. It can be seen from FIG. 30C that

TABLE 44

| | | | | | |
|---|---|---|---|---|---|
| $f_{162}$ | -9.61 mm | CRA | 16.031 degrees | MRA | 6.013 degrees |
| $f_{162}/f$ | -7.10 | $f + f_3$ | 4.80 mm | $(R_{21} \times R_{22})/(R_{21} + R_{22})$ | -5.54 mm |
| $\|(CRA - MRA)/CRA\|$ | 0.624 | $FOV/f_1$ | -44.14 degrees/mm | $Vd_1 + Vd_3$ | 137.1 |
| $(f_6 + f_4)/f$ | -5.00 | BTF/TTL | 0.19 | $TTL/T_3$ | 14.70 | the distortion in the wide-angle lens assembly 19 of the nineteenth embodiment ranges from −15% to 0%.

It is obvious that the longitudinal aberration, the field curvature and the distortion of the wide-angle lens assembly 19 of the nineteenth embodiment can be corrected effectively. Therefore, the wide-angle lens assembly 19 of the nineteenth embodiment is capable of good optical performance.

Figure 31:
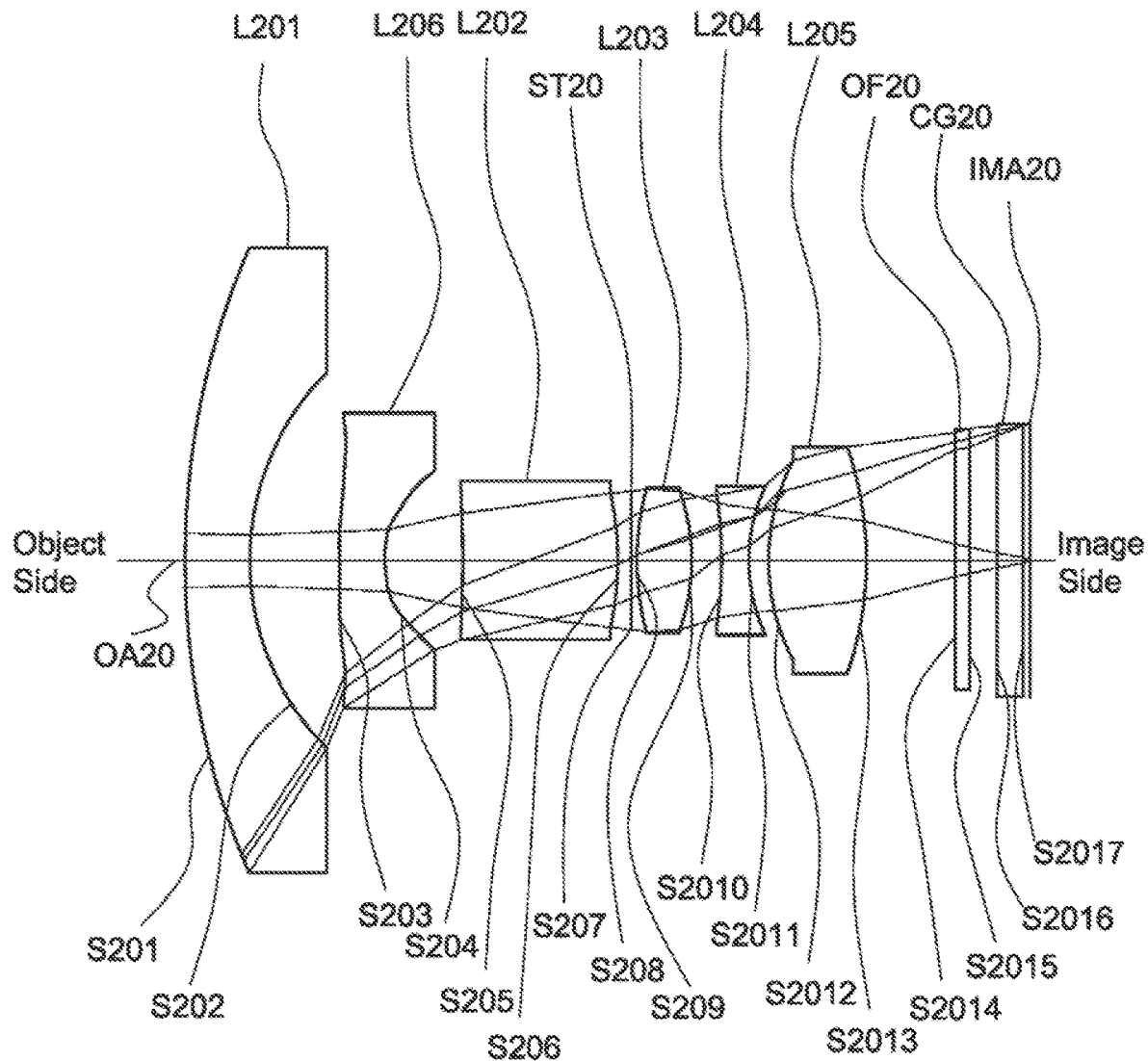
FIG. 31 is a lens layout and optical path diagram of a wide-angle lens assembly in accordance with a twentieth embodiment of the invention.

Referring to FIG. 31, the wide-angle lens assembly 20 includes a first lens L201, a sixth lens L206, a second lens L202, a stop ST20, a third lens L203, a fourth lens L204, a fifth lens L205, an optical filter OF20, and a cover glass CG20, all of which are arranged in order from an object side to an image side along an optical axis OA20. In operation, an image of light rays from the object side is formed at an image plane IMA20.

According to the foregoing, wherein: the second lens L202 is a meniscus lens, wherein the object side surface S205 is a concave surface; both of the object side surface S2014 and image side surface S2015 of the optical filter OF20 are plane surfaces; and both of the object side surface S2016 and image side surface S2017 of the cover glass CG20 are plane surfaces.

With the above design of the lenses and stop ST20 and at least any one of the conditions (11)-(19) satisfied, the wide-angle lens assembly 20 can have an effective decreased total lens length, an effective increased field of view, an effective increased resolution, an effective corrected aberration, and is capable of effective corrected chromatic aberration.

Table 45 shows the optical specification of the wide-angle lens assembly 20 in FIG. 31.

TABLE 45

| Effective Focal Length = 1.5601 mm F-number = 2.0 Total Lens Length = 12.62 mm Field of View = 200 degrees | | | | | | |
|---|---|---|---|---|---|---|
| Surface Number | Radius of Curvature (mm) | Thickness (mm) | Nd | Vd | Effective Focal Length (mm) | Remark |
| S201 | 11.53 | 0.97 | 1.7 | 54.7 | −8.61 | The First Lens L201 |
| S202 | 3.93 | 1.33 | | | | |
| S203 | 8.96 | 0.68 | 1.5 | 56.0 | −3.11 | The Sixth Lens L206 |
| S204 | 1.39 | 1.14 | | | | |
| S205 | −71.20 | 2.32 | 1.6 | 24.0 | 7.83 | The Second Lens L202 |
| S206 | −4.74 | 0.23 | | | | |
| S207 | ∞ | 0.08 | | | | Stop ST20 |
| S208 | 4.00 | 0.81 | 1.7 | 53.2 | 2.67 | The Third Lens L203 |
| S209 | −3.18 | 0.46 | | | | |
| S2010 | −5.09 | 0.41 | 1.7 | 19.2 | −2.62 | The Fourth Lens L204 |
| S2011 | 2.81 | 0.25 | | | | |
| S2012 | 2.40 | 1.47 | 1.5 | 56.1 | 3.12 | The Fifth Lens L205 |
| S2013 | −4.35 | 1.34 | | | | |
| S2014 | ∞ | 0.21 | 1.5 | 64.0 | | Optical Filter OF20 |
| S2015 | ∞ | 0.40 | | | | |
| S2016 | ∞ | 0.40 | 1.5 | 64.0 | | Cover Glass CG20 |
| S2017 | ∞ | 0.11 | | | | |

The definition of aspheric surface sag z of each aspheric lens in Table 45 is the same as that of in Table 23, and is not described here again.

In the twentieth embodiment, the conic constant k and the aspheric coefficients A, B, C, D, E, F, G of each aspheric lens are shown in Table 46.

TABLE 46

| Surface Number | k | A E | B F | C G | D |
|---|---|---|---|---|---|
| S203 | −7.88 | −5.51E−03 | −7.66E−04 | −2.76E−05 | 2.53E−05 |
| | | −2.30E−06 | 3.27E−07 | −3.59E−08 | |
| S204 | −0.77 | 2.56E−02 | 1.10E−02 | −3.96E−03 | −3.46E−04 |
| | | 5.26E−04 | −3.97E−04 | −5.89E−05 | |
| S205 | 942.09 | 1.19E−04 | 7.66E−04 | 2.39E−03 | −4.25E−03 |
| | | −2.31E−04 | 1.64E−03 | −6.06E−04 | |
| S206 | −14.11 | −6.26E−03 | 2.00E−02 | −4.55E−02 | 4.94E−02 |
| | | 5.78E−03 | −4.60E−02 | 2.28E−02 | |
| S2010 | −58.05 | −1.36E−02 | −6.73E−04 | 1.43E−03 | −8.81E−03 |
| | | 9.20E−04 | 6.27E−03 | −2.60E−03 | |
| S2011 | 0.29 | 1.95E−02 | −1.70E−02 | −2.59E−04 | 5.15E−03 |
| | | −1.28E−03 | −3.05E−03 | 1.86E−03 | |
| S2012 | −4.97 | 7.18E−03 | 3.69E−03 | −1.46E−03 | −4.74E−04 |
| | | 1.44E−04 | 8.56E−05 | −3.10E−05 | |
| S2013 | −9.03 | −8.95E−03 | 3.06E−03 | −6.10E−04 | 3.46E−04 |
| | | −8.08E−05 | −2.22E−05 | 3.93E−06 | |

Table 47 shows the parameters and condition values for conditions (11)-(19) in accordance with the twentieth embodiment of the invention. It can be seen from Table 47 that the wide-angle lens assembly 20 of the twentieth embodiment satisfies the conditions (11)-(19).

TABLE 47

| $f_{162}$ | −5.452 mm | CRA | 16.337 degrees | MRA | 8.324 degrees |
|---|---|---|---|---|---|
| $f_{162}/f$ | −3.49 | $f + f_3$ | 4.23 mm | $(R_{21} \times R_{22})/(R_{21} + R_{22})$ | −4.44 mm |
| \|(CRA − MRA)/CRA\| | 0.490 | FOV/$f_1$ | −23.23 degrees/mm | $Vd_1 + Vd_3$ | 107.9 |
| $(f_6 + f_4)/f$ | −3.67 | BTF/TTL | 0.19 | TTL/$T_3$ | 15.51 |

Figure 32A:
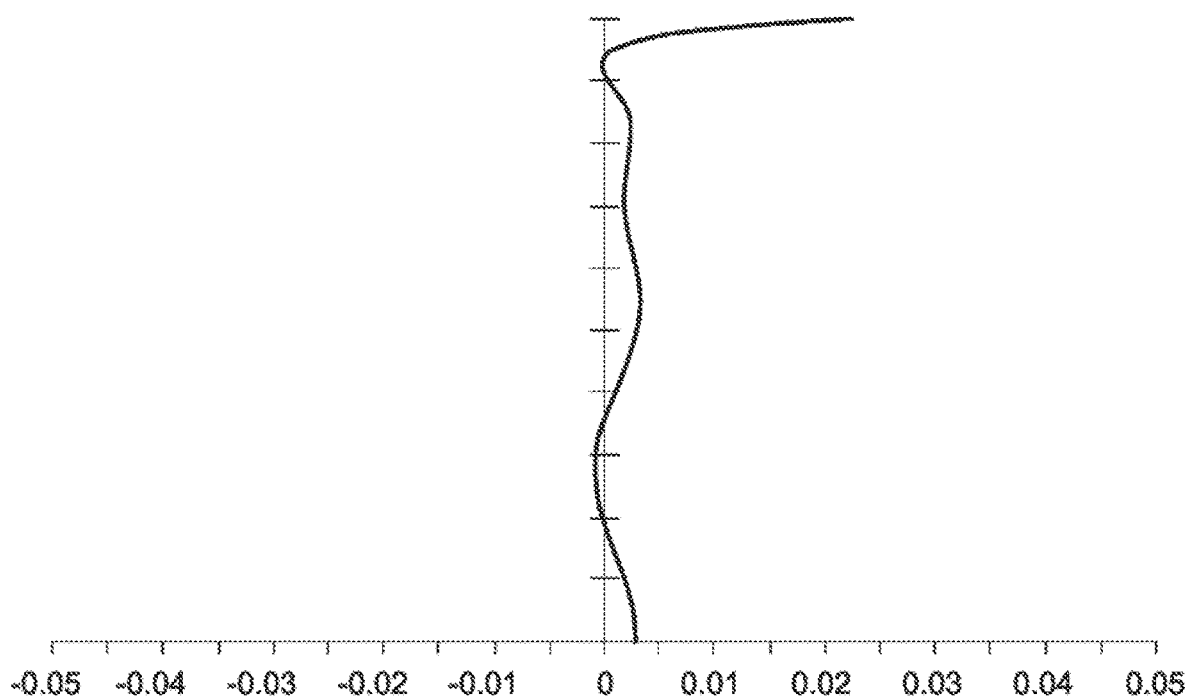
FIG. 32A depicts a longitudinal aberration diagram of the wide-angle lens assembly in accordance with the twentieth embodiment of the invention.
Figure 32B:
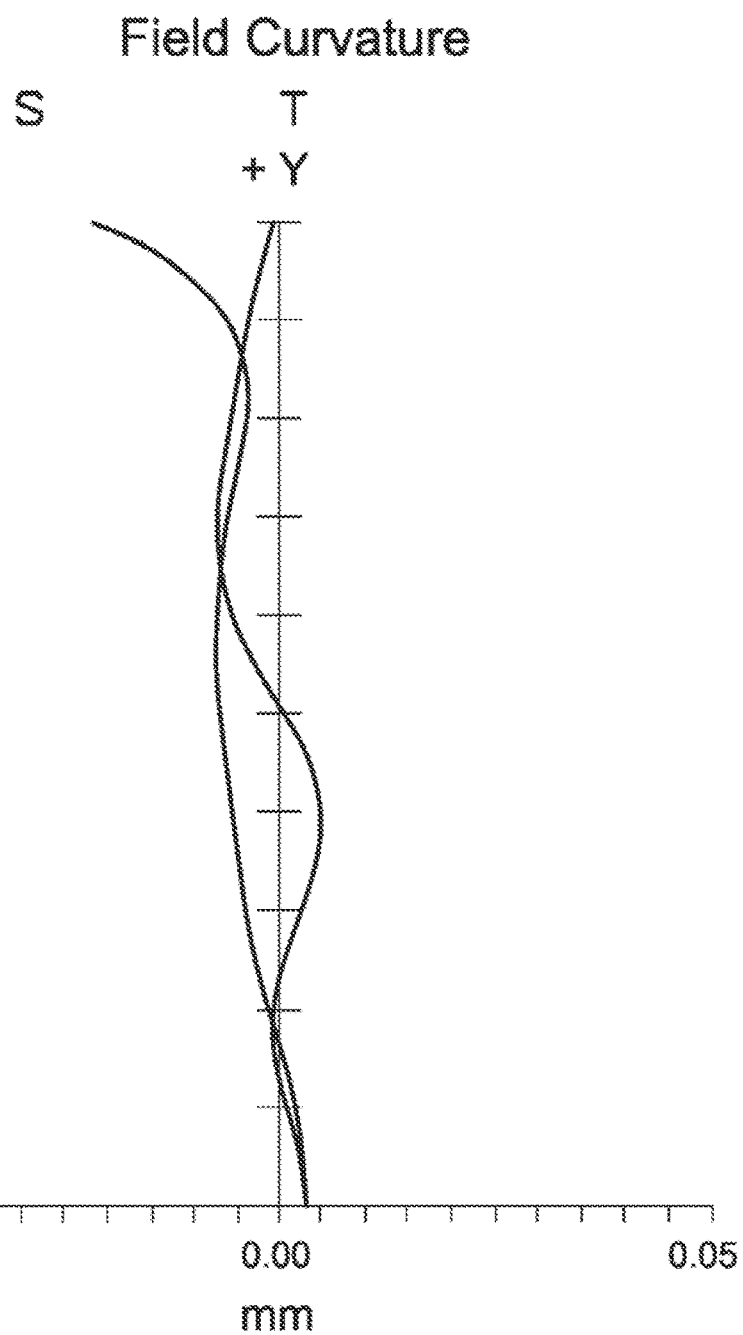
FIG. 32B is a field curvature diagram of the wide-angle lens assembly in accordance with the twentieth embodiment of the invention.
Figure 32C:
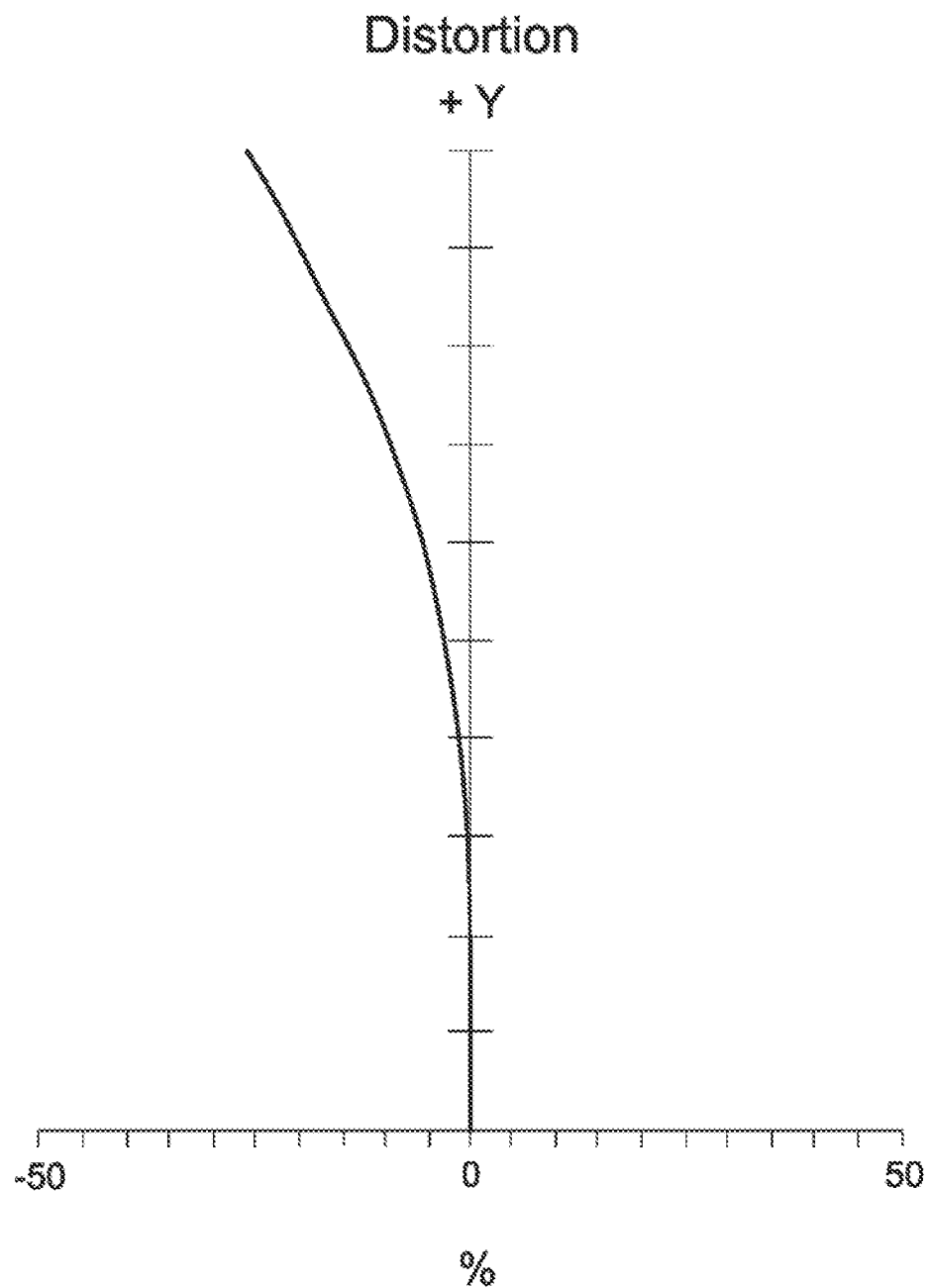
FIG. 32C is a distortion diagram of the wide-angle lens assembly in accordance with the twentieth embodiment of the invention.

By the above arrangements of the lenses and stop ST20, the wide-angle lens assembly 20 of the twentieth embodiment can meet the requirements of optical performance as seen in FIGS. 32A-32C.

It can be seen from FIG. 32A that the longitudinal aberration in the wide-angle lens assembly 20 of the twentieth embodiment ranges from −0.005 mm to 0.025 mm. It can be seen from FIG. 32B that the field curvature of tangential direction and sagittal direction in the wide-angle lens assembly 20 of the twentieth embodiment ranges from −0.025 mm to 0.01 mm. It can be seen from FIG. 32C that the distortion in the wide-angle lens assembly 20 of the twentieth embodiment ranges from −30% to 0%.

It is obvious that the longitudinal aberration, the field curvature and the distortion of the wide-angle lens assembly 20 of the twentieth embodiment can be corrected effectively. Therefore, the wide-angle lens assembly 20 of the twentieth embodiment is capable of good optical performance.

Figure 33:
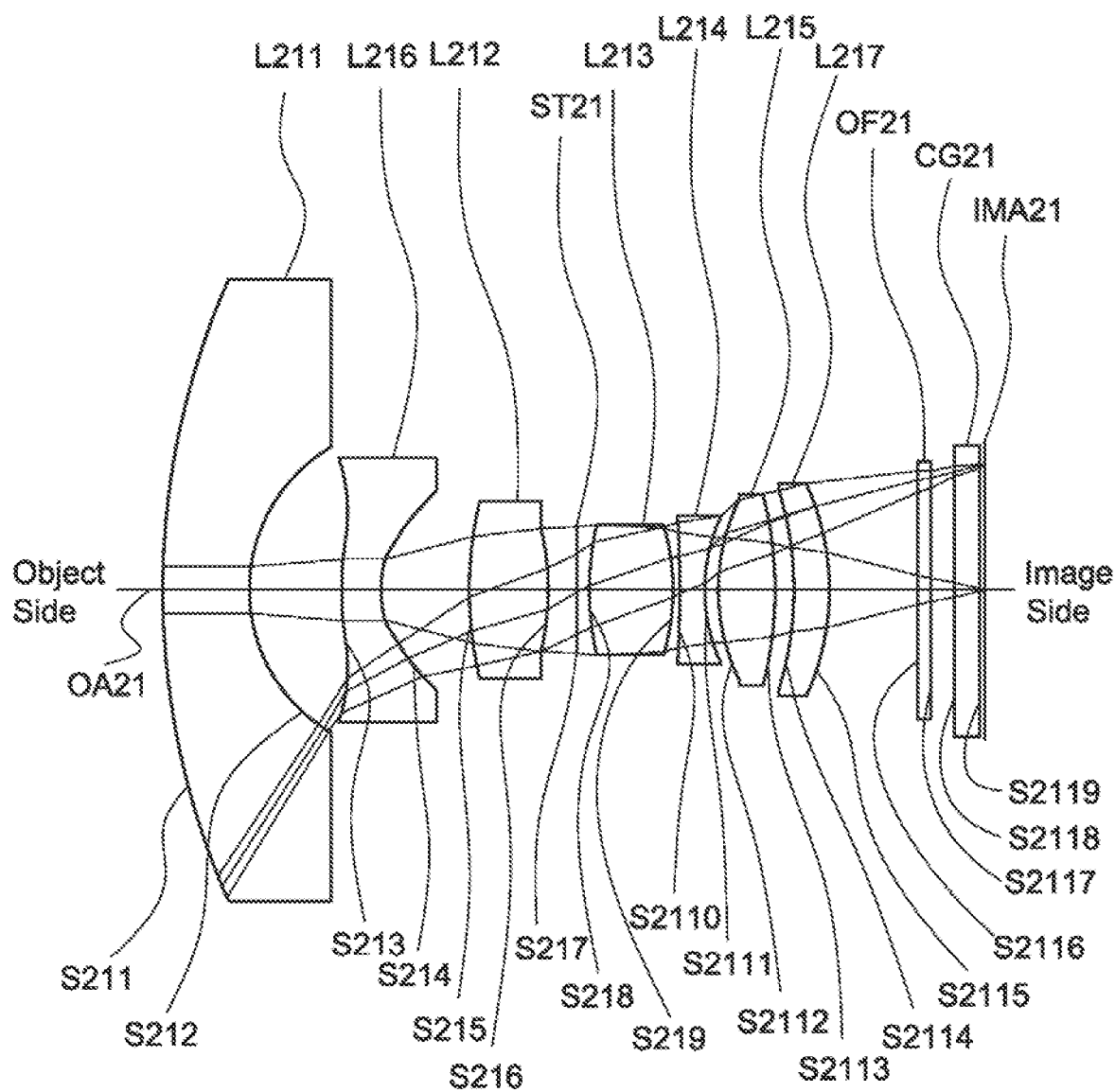
FIG. 33 is a lens layout and optical path diagram of a wide-angle lens assembly in accordance with a twenty-first embodiment of the invention.

Referring to FIG. 33, the wide-angle lens assembly 21 includes a first lens L211, a sixth lens L216, a second lens L212, a stop ST21, a third lens L213, a fourth lens L214, a fifth lens L215, a seventh lens L217, an optical filter OF21, and a cover glass CG21, all of which are arranged in order from an object side to an image side along an optical axis OA21. In operation, an image of light rays from the object side is formed at an image plane IMA21.

According to the foregoing, wherein: the second lens L212 is a biconvex lens, wherein the object side surface S215 is a convex surface; the seventh lens L217 is a meniscus lens with positive refractive power and made of plastic material, wherein the object side surface S2114 is a concave surface, the image side surface S2115 is a convex surface, and both of the object side surface S2114 and image side surface S2115 are aspheric surfaces; both of the object side surface S2116 and image side surface S2117 of the optical filter OF21 are plane surfaces; and both of the object side surface S2118 and image side surface S2119 of the cover glass CG21 are plane surfaces.

With the above design of the lenses and stop ST21 and at least any one of the conditions (11)-(19) satisfied, the wide-angle lens assembly 21 can have an effective decreased total lens length, an effective increased field of view, an effective increased resolution, an effective corrected aberration, and is capable of effective corrected chromatic aberration.

Table 48 shows the optical specification of the wide-angle lens assembly 21 in FIG. 3.

TABLE 48

Effective Focal Length = 1.6121 mm F-number = 2.0
Total Lens Length = 13.52 mm Field of View = 200 degrees

| Surface Number | Radius of Curvature (mm) | Thickness (mm) | Nd | Vd | Effective Focal Length (mm) | Remark |
|---|---|---|---|---|---|---|
| S211 | 12.24 | 1.43 | 1.7 | 54.7 | −5.05 | The First Lens L211 |
| S212 | 2.70 | 1.52 | | | | |
| S213 | 4.53 | 0.64 | 1.5 | 56.0 | −3.91 | The Sixth Lens L216 |
| S214 | 1.38 | 1.47 | | | | |
| S215 | 19.14 | 1.27 | 1.6 | 24.0 | 5.19 | The Second Lens L212 |
| S216 | −3.92 | 0.48 | | | | |
| S217 | ∞ | 0.20 | | | | Stop ST21 |
| S218 | 4.43 | 1.38 | 1.6 | 68.6 | 3.39 | The Third Lens L213 |
| S219 | −3.26 | 0.10 | | | | |
| S2110 | −7.19 | 0.40 | 1.7 | 20.4 | −2.97 | The Fourth Lens L214 |
| S2111 | 2.80 | 0.23 | | | | |
| S2112 | 2.37 | 0.95 | 1.5 | 56.0 | 3.13 | The Fifth Lens L215 |
| S2113 | −5.31 | 0.30 | | | | |
| S2114 | −5.31 | 0.58 | 1.5 | 55.0 | 334.22 | The Seventh Lens L217 |
| S2115 | −5.35 | 1.45 | | | | |
| S2116 | ∞ | 0.21 | 1.5 | 64.0 | | Optical Filter OF21 |
| S2117 | ∞ | 0.40 | | | | |
| S2118 | ∞ | 0.40 | 1.5 | 64.0 | | Cover Glass CG21 |
| S2119 | ∞ | 0.11 | | | | |

The definition of aspheric surface sag z of each aspheric lens in Table 48 is the same as that of in Table 23, and is not described here again.

In the twenty-first embodiment, the conic constant k and the aspheric coefficients A, B, C, D, E, F, G of each aspheric lens are shown in Table 49.

TABLE 49

| Surface Number | k | A E | B F | C G | D |
|---|---|---|---|---|---|
| S213 | -7.1 | -2.74E-02<br>1.72E-06 | -1.66E-05<br>-3.26E-07 | 2.30E-04<br>-2.33E-07 | 3.78E-05 |
| S214 | -1.2 | 2.74E-03<br>-1.13E-04 | 6.16E-03<br>4.20E-04 | -5.26E-03<br>-1.63E-04 | 1.27E-03 |
| S215 | 151.1 | 1.84E-02<br>-2.49E-04 | -1.03E-03<br>6.71E-05 | 1.46E-03<br>3.70E-05 | -7.16E-04 |
| S216 | -12.7 | -9.37E-03<br>1.55E-02 | 2.83E-02<br>-3.89E-02 | -4.69E-02<br>1.60E-02 | 3.64E-02 |
| S2110 | -87.5 | 3.02E-02<br>-1.15E-02 | -2.88E-02<br>2.40E-02 | 2.32E-02<br>-1.05E-02 | -1.40E-02 |
| S2111 | 0.4 | 1.90E-02<br>2.65E-03 | -4.30E-03<br>-2.19E-03 | -6.24E-03<br>3.62E-04 | 1.98E-03 |
| S2112 | -5.6 | -5.13E-03<br>5.34E-05 | 4.26E-03<br>1.11E-04 | -4.43E-04<br>-2.11E-05 | -5.69E-04 |
| S2113 | 0.0 | 7.44E-05<br>0.00E+00 | 3.46E-05<br>0.00E+00 | 1.02E-05<br>0.00E+00 | 0.00E+00 |
| S2114 | 0.0 | -1.09E-04<br>0.00E+00 | -3.63E-05<br>0.00E+00 | -7.98E-06<br>0.00E+00 | 0.00E+00 |
| S2115 | -27.9 | -2.92E-02<br>-1.19E-04 | 2.91E-03<br>-2.30E-07 | -2.45E-04<br>7.21E-06 | 1.64E-04 |

Table 50 shows the parameters and condition values for conditions (11)-(19) in accordance with the twenty-first embodiment of the invention. It can be seen from Table 50 that the wide-angle lens assembly 21 of the twenty-first embodiment satisfies the conditions (11)-(19).

TABLE 50

| $f_{162}$ | -12.437 mm | CRA | 14.129 degrees | MRA | 6.436 degrees |
|---|---|---|---|---|---|
| $f_{162}/f$ | -7.74 | $f + f_3$ | 4.99 mm | $(R_{21} \times R_{22})/(R_{21} + R_{22})$ | -4.92 mm |
| \| (CRA − MRA)/CRA \| | 0.544 | $FOV/f_1$ | -39.64 degrees/mm | $Vd_1 + Vd_3$ | 123.3 |
| $(f_6 + f_4)/f$ | -4.28 | BTF/TTL | 0.19 | $TTL/T_3$ | 9.80 |

Figure 34A:
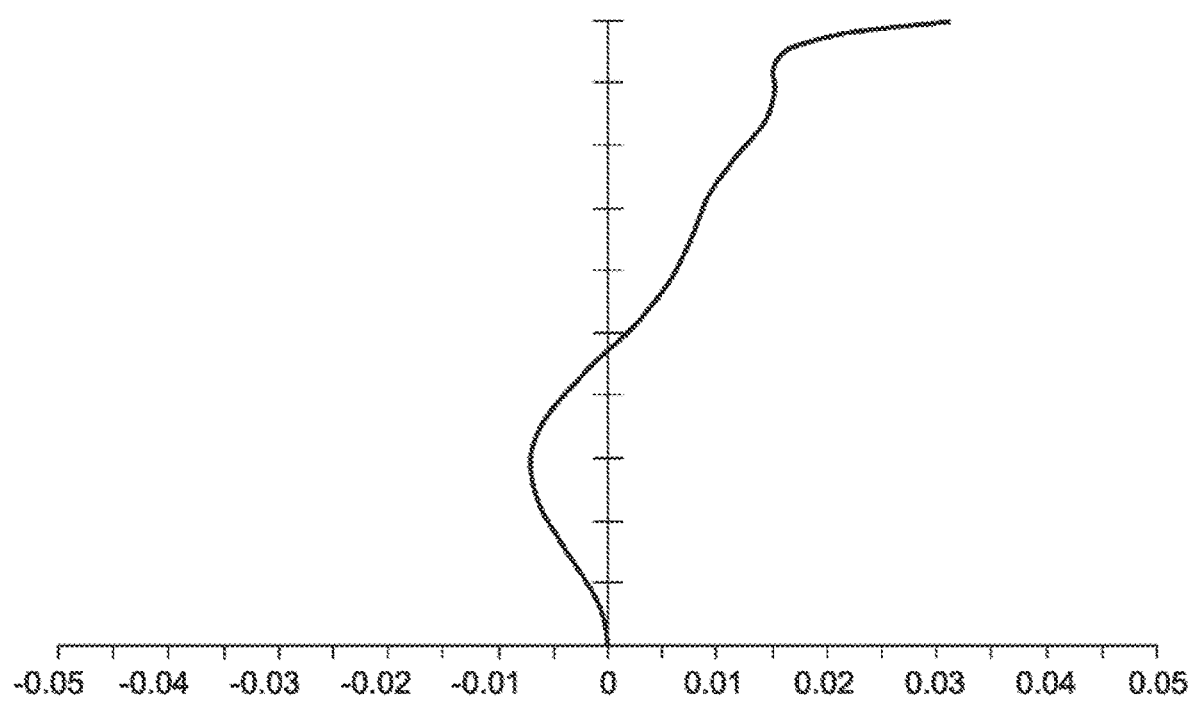
FIG. 34A depicts a longitudinal aberration diagram of the wide-angle lens assembly in accordance with the twenty-first embodiment of the invention.
Figure 34B:
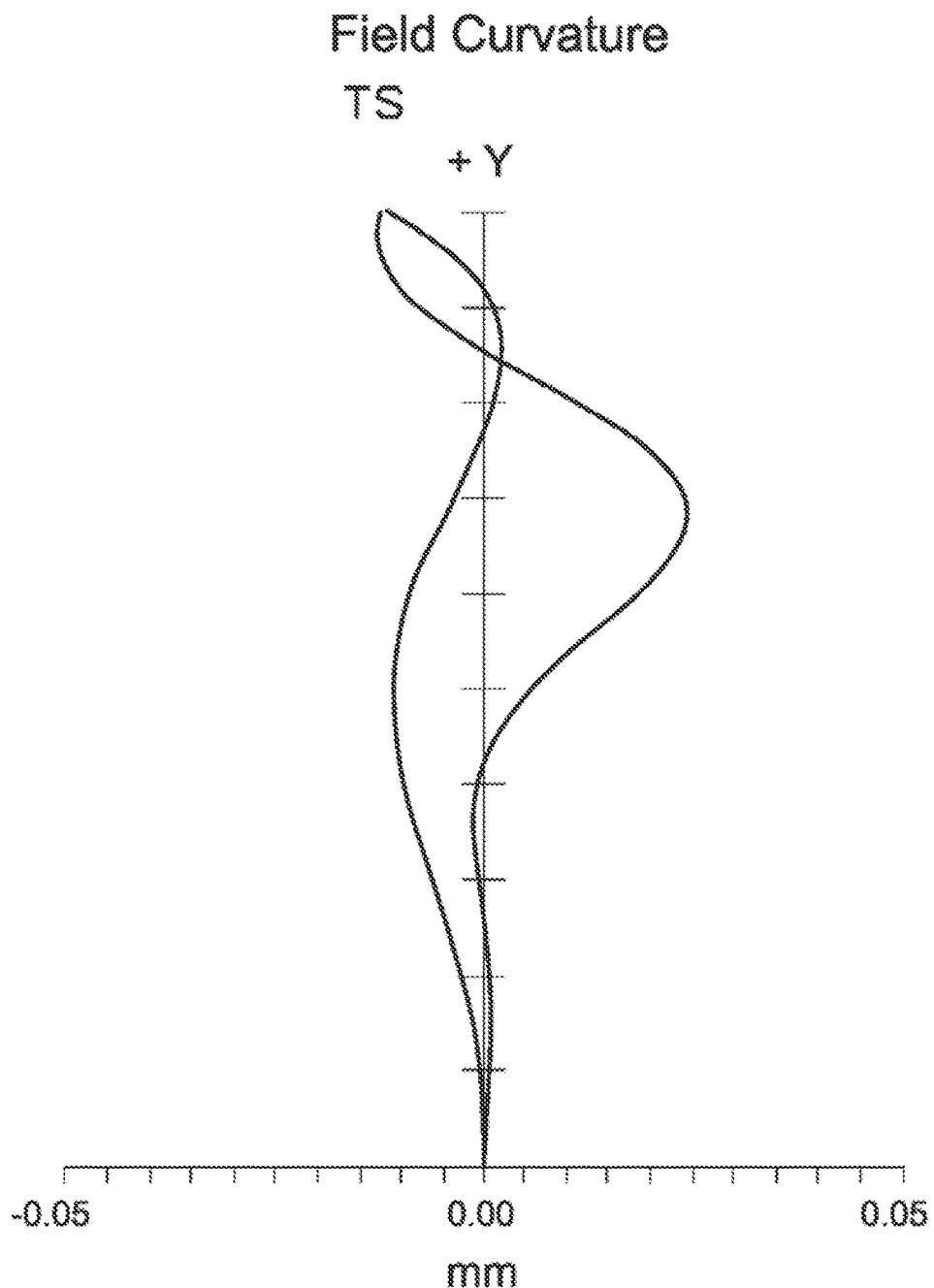
FIG. 34B is a field curvature diagram of the wide-angle lens assembly in accordance with the twenty-first embodiment of the invention.
Figure 34C:
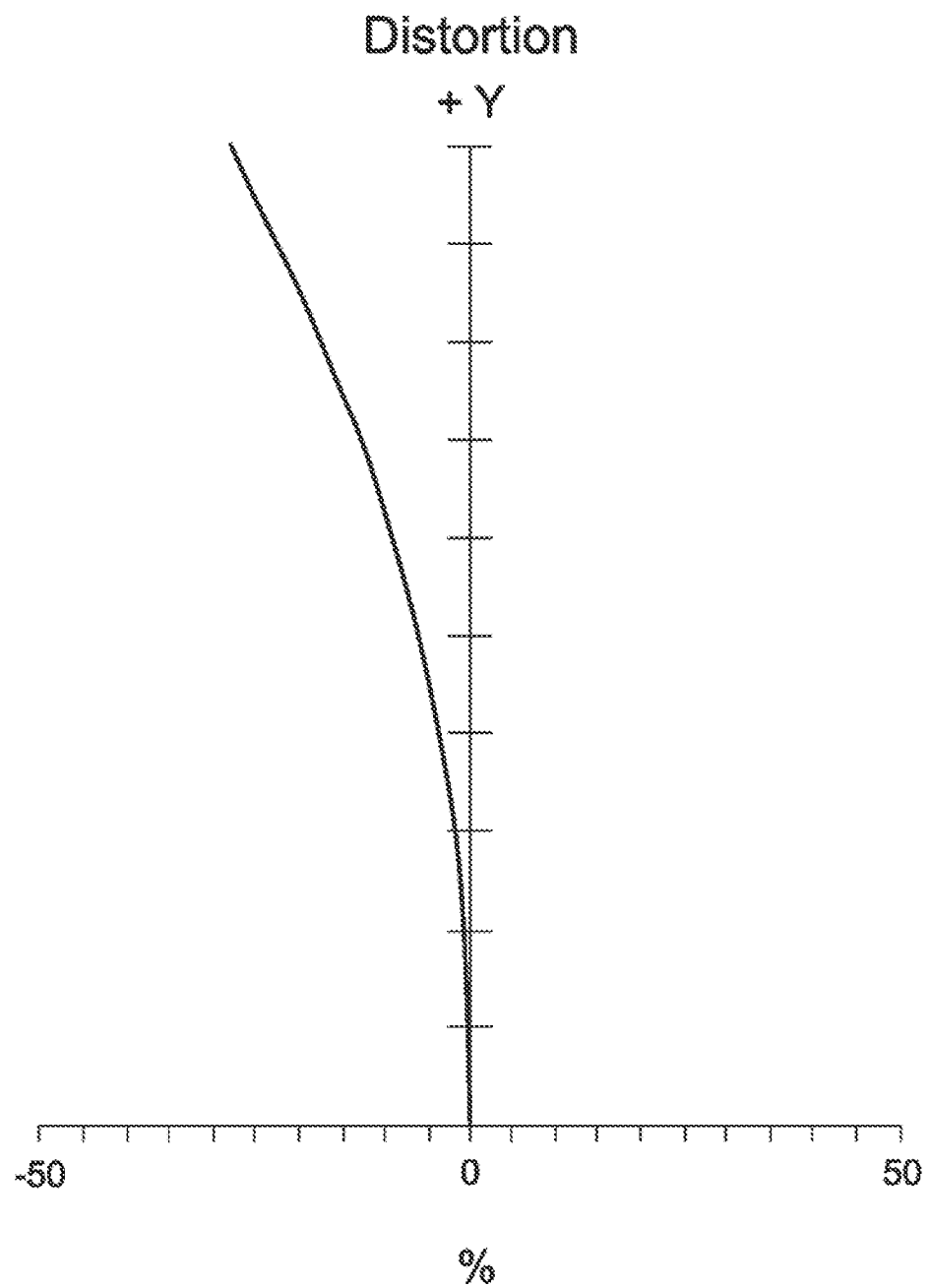
FIG. 34C is a distortion diagram of the wide-angle lens assembly in accordance with the twenty-first embodiment of the invention.

By the above arrangements of the lenses and stop ST21, the wide-angle lens assembly 21 of the twenty-first embodiment can meet the requirements of optical performance as seen in FIGS. 34A-34C.

It can be seen from FIG. 34A that the longitudinal aberration in the wide-angle lens assembly 21 of the twenty-first embodiment ranges from −0.01 mm to 0.035 mm. It can be seen from FIG. 34B that the field curvature of tangential direction and sagittal direction in the wide-angle lens assembly 21 of the twenty-first embodiment ranges from −0.015 mm to 0.025 mm. It can be seen from FIG. 34C that the distortion in the wide-angle lens assembly 21 of the twenty-first embodiment ranges from −30% to 0%.

It is obvious that the longitudinal aberration, the field curvature and the distortion of the wide-angle lens assembly 21 of the twenty-first embodiment can be corrected effectively. Therefore, the wide-angle lens assembly 21 of the twenty-first embodiment is capable of good optical performance.

Figure 35:
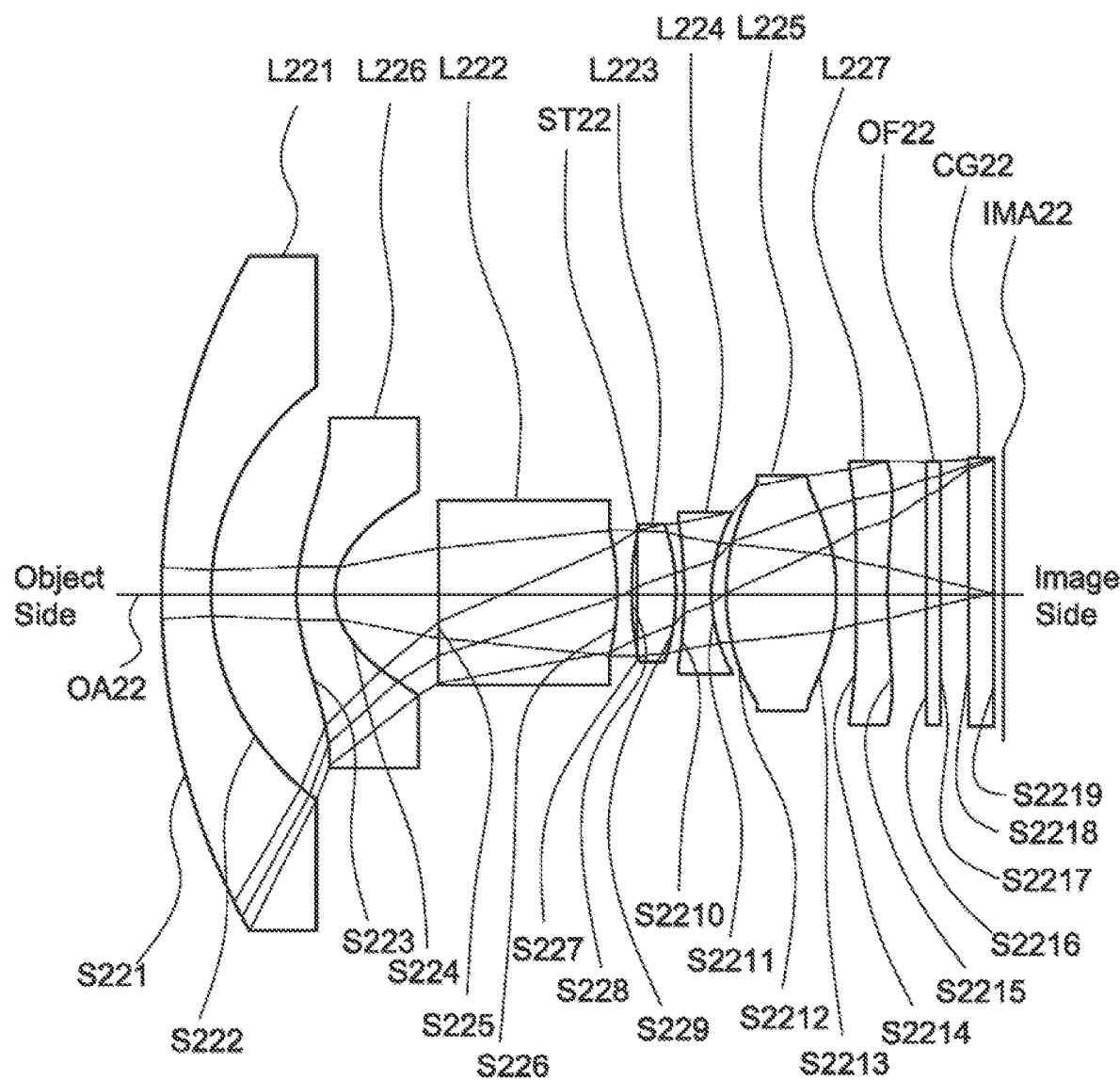
FIG. 35 is a lens layout and optical path diagram of a wide-angle lens assembly in accordance with a twenty-second embodiment of the invention.

Referring to FIG. 35, the wide-angle lens assembly 22 includes a first lens L221, a sixth lens L226, a second lens L222, a stop ST22, a third lens L223, a fourth lens L224, a fifth lens L225, a seventh lens L227, an optical filter OF22, and a cover glass CG22, all of which are arranged in order from an object side to an image side along an optical axis OA22. In operation, an image of light rays from the object side is formed at an image plane IMA22.

According to the foregoing, wherein: the second lens L222 is a biconvex lens, wherein the object side surface S225 is a convex surface; the seventh lens L227 is a biconcave lens with negative refractive power and made of plastic material, wherein the object side surface S2214 is a concave surface, the image side surface S2215 is a concave surface, and both of the object side surface S2214 and image side surface S2215 are aspheric surfaces; both of the object side surface S2216 and image side surface S2217 of the optical filter OF22 are plane surfaces; and both of the object side surface S2218 and image side surface S2219 of the cover glass CG22 are plane surfaces.

With the above design of the lenses and stop ST22 and at least any one of the conditions (11)-(19) satisfied, the wide-angle lens assembly 22 can have an effective decreased total lens length, an effective increased field of view, an effective increased resolution, an effective corrected aberration, and is capable of effective corrected chromatic aberration.

Table 51 shows the optical specification of the wide-angle lens assembly 22 in FIG. 35.

TABLE 51

Effective Focal Length = 1.4527 mm F-number = 1.98
Total Lens Length = 12.6 mm Field of View = 205 degrees

| Surface Number | Radius of Curvature (mm) | Thickness (mm) | Nd | Vd | Effective Focal Length (mm) | Remark |
|---|---|---|---|---|---|---|
| S221 | 10.44 | 0.76 | 1.7 | 54.7 | -8.69 | The First Lens L221 |
| S222 | 3.83 | 1.29 | | | | |
| S223 | 2.80 | 0.59 | 1.5 | 56.0 | -3.43 | The Sixth Lens L226 |
| S224 | 1.04 | 1.54 | | | | |
| S225 | 24.76 | 2.71 | 1.6 | 24.0 | 4.84 | The Second Lens L222 |
| S226 | -3.39 | 0.37 | | | | |
| S227 | ∞ | -0.10 | | | | Stop ST22 |
| S228 | 4.67 | 0.68 | 1.7 | 54.7 | 2.66 | The Third Lens L223 |
| S229 | -3.14 | 0.12 | | | | |
| S2210 | -8.53 | 0.40 | 1.7 | 20.4 | -2.13 | The Fourth Lens L224 |
| S2211 | 1.73 | 0.23 | | | | |

TABLE 51-continued

Effective Focal Length = 1.4527 mm  F-number = 1.98
Total Lens Length = 12.6 mm  Field of View = 205 degrees

| Surface Number | Radius of Curvature (mm) | Thickness (mm) | Nd | Vd | Effective Focal Length (mm) | Remark |
|---|---|---|---|---|---|---|
| S2212 | 2.20 | 1.67 | 1.5 | 56.1 | 2.62 | The Fifth Lens L225 |
| S2213 | −2.87 | 0.31 | | | | |
| S2214 | −17.16 | 0.47 | 1.7 | 20.4 | −10.69 | The Seventh Lens L227 |
| S2215 | 12.34 | 0.49 | | | | |
| S2216 | ∞ | 0.21 | 1.5 | 64.0 | | Optical Filter OF22 |
| S2217 | ∞ | 0.40 | | | | |
| S2218 | ∞ | 0.40 | 1.5 | 64.0 | | Cover Glass CG22 |
| S2219 | ∞ | 0.11 | | | | |

The definition of aspheric surface sag z of each aspheric lens in Table 51 is the same as that of in Table 23, and is not described here again.

In the twenty-second eighteenth embodiment, the conic constant k and the aspheric coefficients A, B, C, D, E, F, G of each aspheric lens are shown in Table 52.

TABLE 52

| Surface Number | k | A E | B F | C G | D |
|---|---|---|---|---|---|
| S223 | −6.11 | −1.87E−03 | −5.30E−04 | −4.12E−05 | 2.40E−06 |
| | | 1.08E−06 | −6.87E−09 | −6.01E−09 | |
| S224 | −1.03 | 8.87E−03 | 1.32E−02 | 1.34E−03 | 1.01E−03 |
| | | −1.03E−03 | 9.47E−05 | −5.25E−05 | |
| S225 | 6.94 | −9.22E−03 | 2.49E−03 | −1.94E−03 | −9.30E−04 |
| | | 3.97E−05 | 4.01E−05 | −3.35E−05 | |
| S226 | −12.33 | −2.35E−02 | 1.43E−02 | −9.16E−03 | −4.03E−03 |
| | | 1.64E−02 | −1.04E−02 | 1.78E−03 | |
| S2210 | 2.59 | −2.26E−02 | −5.04E−03 | 5.35E−03 | 3.78E−04 |
| | | −1.25E−04 | −4.98E−04 | −1.06E−03 | |
| S2211 | −3.57 | −9.88E−04 | 5.96E−03 | 2.07E−04 | −3.58E−04 |
| | | −2.95E−04 | −2.15E−04 | 8.86E−05 | |
| S2212 | −4.93 | −4.06E−03 | 3.26E−03 | 3.14E−04 | −2.40E−04 |
| | | 1.10E−05 | 1.86E−05 | −2.40E−06 | |
| S2213 | −3.64 | −1.22E−02 | 2.71E−03 | −5.35E−04 | 3.81E−04 |
| | | −5.20E−05 | −9.39E−06 | 4.44E−06 | |
| S2214 | 0.00 | −5.39E−04 | 6.09E−04 | 4.62E−05 | −1.20E−05 |
| | | −6.05E−06 | 0.00E+00 | 0.00E+00 | |
| S2215 | 0.00 | −2.33E−03 | −1.31E−03 | −1.84E−04 | −1.49E−05 |
| | | 2.30E−06 | 0.00E+00 | 0.00E+00 | |

Table 53 shows the parameters and condition values for conditions (11)-(19) in accordance with the twenty-second embodiment of the invention. It can be seen from Table 53 that the wide-angle lens assembly 22 of the twenty-second embodiment satisfies the conditions (11)-(19).

TABLE 53

| $f_{162}$ | 19.583 mm | CRA | 19.918 degrees | MRA | 1.749 degrees |
|---|---|---|---|---|---|
| $f_{162}/f$ | 13.48 | $f + f_3$ | 4.12 mm | $(R_{21} \times R_{22})/(R_{21} + R_{22})$ | −3.93 mm |
| $\|(CRA - MRA)/CRA\|$ | 0.912 | $FOV/f_1$ | −23.58 degrees/mm | $Vd_1 + Vd_3$ | 109.3 |
| $(f_6 + f_4)/f$ | −3.83 | BTF/TTL | 0.13 | $TTL/T_3$ | 18.56 |

Figure 36A:
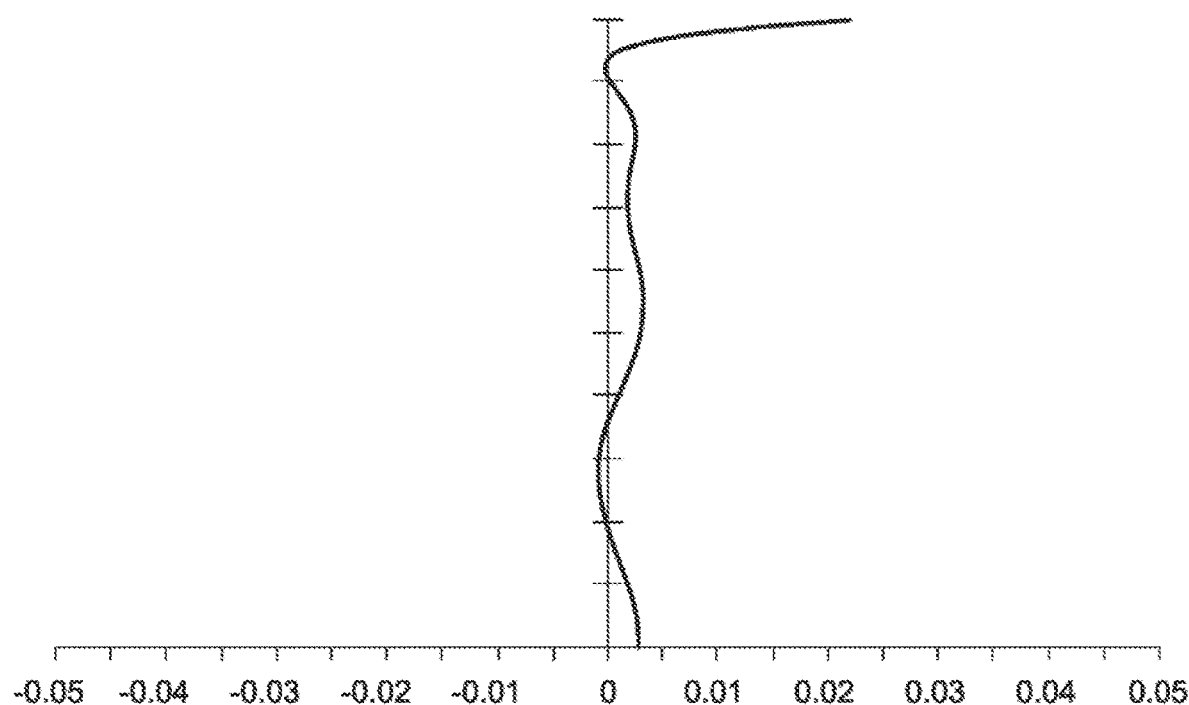
FIG. 36A depicts a longitudinal aberration diagram of the wide-angle lens assembly in accordance with the twenty-second embodiment of the invention.
Figure 36B:
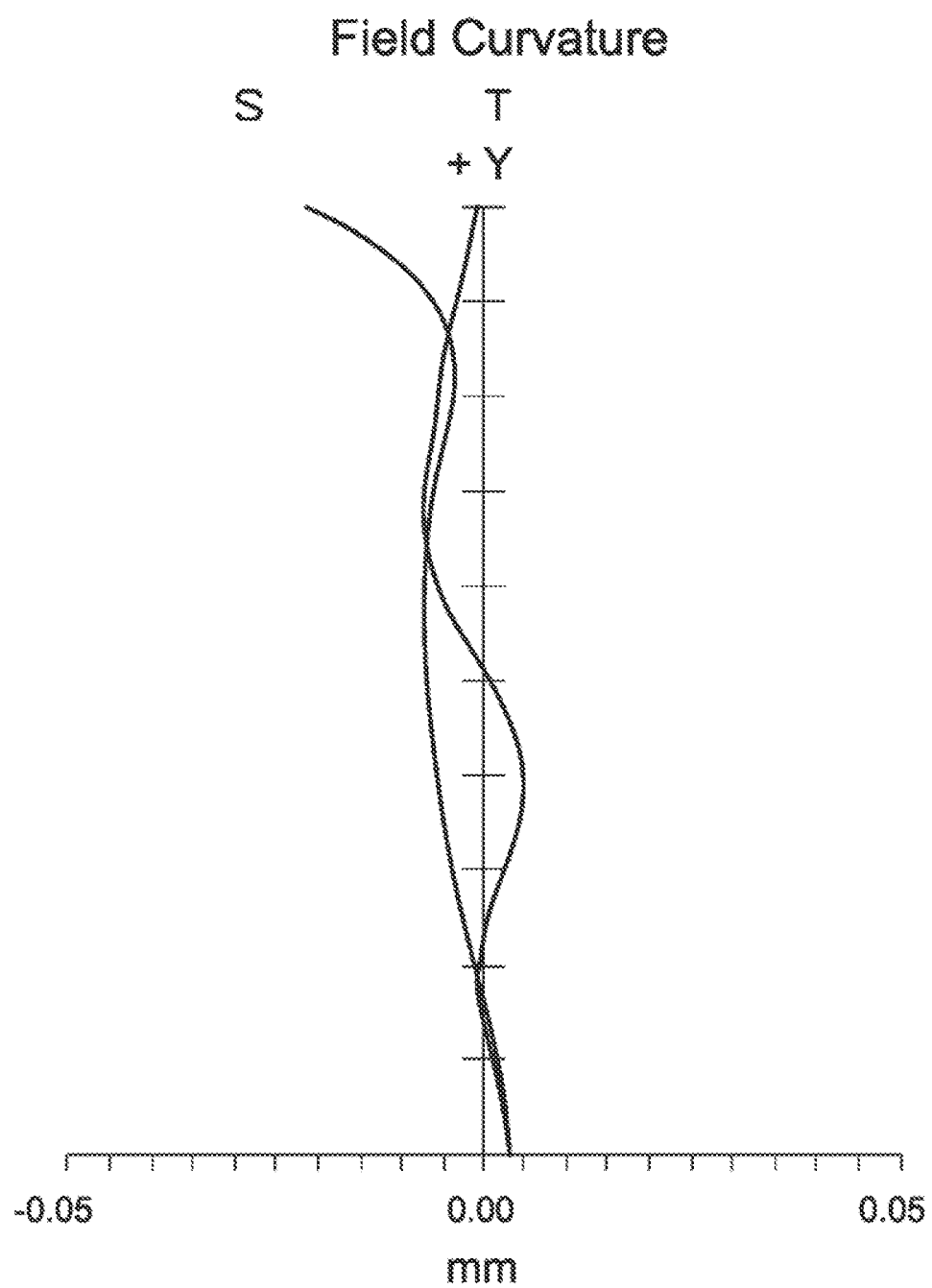
FIG. 36B is a field curvature diagram of the wide-angle lens assembly in accordance with the twenty-second embodiment of the invention.
Figure 36C:
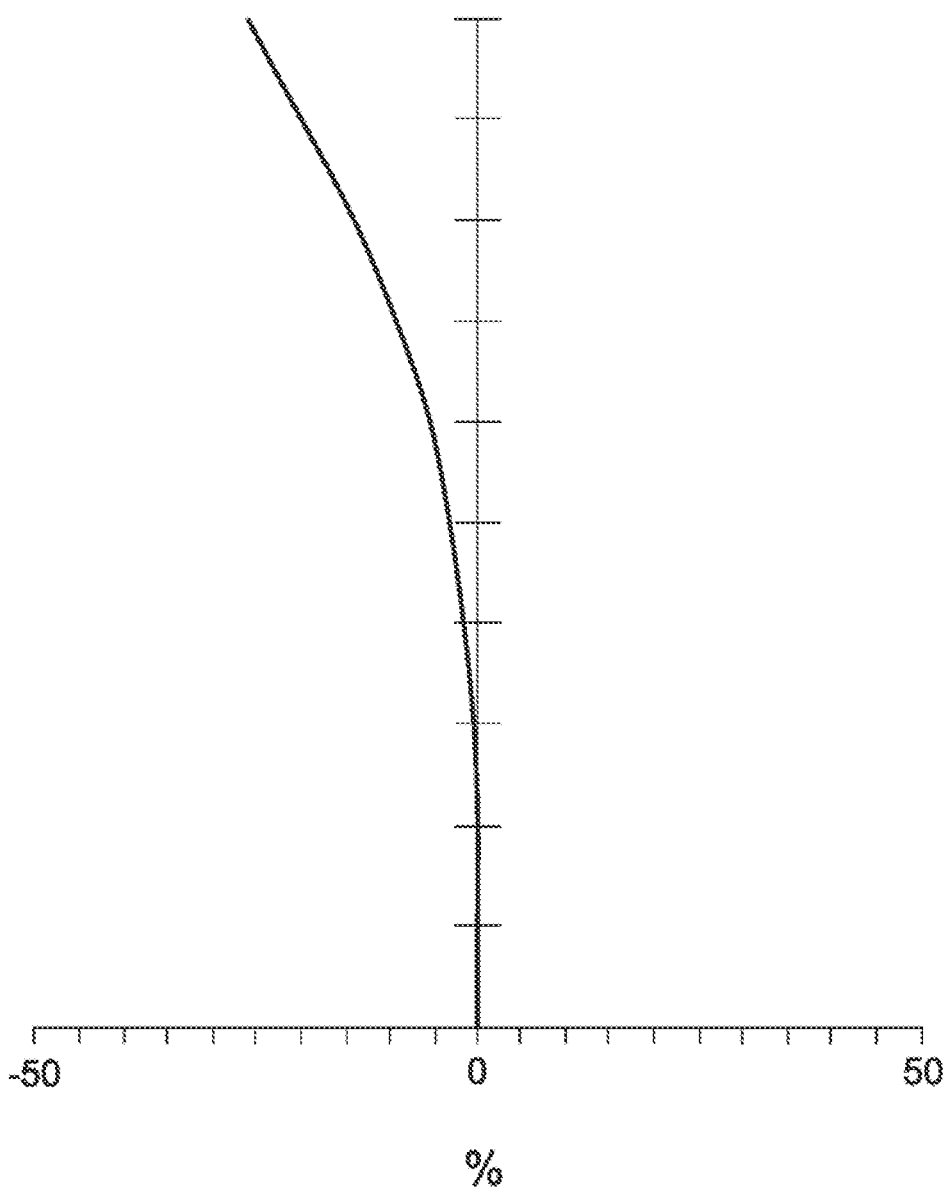
FIG. 36C is a distortion diagram of the wide-angle lens assembly in accordance with the twenty-second embodiment of the invention.

By the above arrangements of the lenses and stop ST22, the wide-angle lens assembly 22 of the twenty-second embodiment can meet the requirements of optical performance as seen in FIGS. 36A-36C.

It can be seen from FIG. 36A that the longitudinal aberration in the wide-angle lens assembly 22 of the twenty-second embodiment ranges from −0.005 mm to 0.025 mm. It can be seen from FIG. 36B that the field curvature of tangential direction and sagittal direction in the wide-angle lens assembly 22 of the twenty-second embodiment ranges from −0.025 mm to 0.005 mm. It can be seen from FIG. 36C that the distortion in the wide-angle lens assembly 22 of the twenty-second embodiment ranges from −30% to 0%.

It is obvious that the longitudinal aberration, the field curvature and the distortion of the wide-angle lens assembly 22 of the twenty-second embodiment can be corrected effectively. Therefore, the wide-angle lens assembly 22 of the twenty-second embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
a seventh lens which is with refractive power and comprises a convex surface facing an object side;
a first lens which is a meniscus lens with refractive power and comprises a convex surface facing the object side and a concave surface facing an image side;
a sixth lens which is with refractive power;
a second lens which is with positive refractive power;
a stop;
a third lens which is with positive refractive power and comprises a convex surface facing the object side;
an eighth lens which is with positive refractive power;
a fourth lens which is with refractive power and comprises a concave surface facing the object side; and
a fifth lens which is a biconvex lens with positive refractive power and comprises a convex surface facing the object side and another convex surface facing the image side;
wherein the sixth lens and the seventh lens have opposite refractive power;
wherein the seventh lens, the first lens, the sixth lens, the second lens, the third lens, the eighth lens, the fourth lens, and the fifth lens are arranged from the object side to the image side along an optical axis;
wherein the stop is disposed between the second lens and the eighth lens;
wherein the relative positions of the lenses are fixed;
wherein the wide-angle lens assembly satisfies the following condition:

$5.5<TTL/f<10$;

wherein TTL is an interval from an object side surface of the lens closest to the object side to an image plane along the optical axis and f is an effective focal length of the wide-angle lens assembly.

2. The wide-angle lens assembly as claimed in claim 1, wherein the eighth lens is cemented with the fourth lens.

3. The wide-angle lens assembly as claimed in claim 1, further comprising a ninth lens disposed between the fifth lens and the image side, the ninth lens is with negative refractive power and comprises a concave surface facing the object side.

4. The wide-angle lens assembly as claimed in claim 3, wherein the fifth lens is cemented with the ninth lens.

5. The wide-angle lens assembly as claimed in claim 1, further comprising a tenth lens disposed between the fourth lens and the image side, the tenth lens is with positive refractive power and comprises a convex surface facing the object side and another convex surface facing the image side.

6. The wide-angle lens assembly as claimed in claim 1, wherein the second lens comprises a convex surface facing the image side, the sixth lens is with negative refractive power and comprises a concave surface facing the image side, and the seventh lens is with positive refractive power.

7. The wide-angle lens assembly as claimed in claim 1, wherein:
the seventh lens is with negative refractive power;
the sixth lens is with positive refractive power;
the sixth lens comprises a concave surface facing the object side;
the sixth lens comprises a convex surface facing the image side, or the third lens comprises a convex surface facing the image side, or both the sixth lens and the third lens comprise a convex surface facing the image side; and
the second lens comprises a convex surface facing the object side and a concave surface facing the image side.

8. The wide-angle lens assembly as claimed in claim 1, wherein the seventh lens further comprises a concave surface facing the image side, the first lens is with negative refractive power, or the fourth lens is with negative refractive power, or both the first lens and the fourth lens are with negative refractive power, and the eighth lens comprises a convex surface facing the object side and another convex surface facing the image side.

9. The wide-angle lens assembly as claimed in claim 1, wherein the wide-angle lens assembly satisfies at least one of the following conditions:

$1.3<TTL/R_{71}<2.6$;

$0.03<|f_{71}/f_{62}|<1.7$;

$30<Vd_7<64.3$;

$35<Vd_1<54.5$;

wherein TTL is the interval from the object side surface of the lens closest to the object side to the image plane along the optical axis, $R_{71}$ is a radius of curvature of the object side surface of the seventh lens, $f_{71}$ is an effective focal length of a combination of the seventh lens and the first lens, $f_{62}$ is an effective focal length of a combination of the sixth lens and the second lens, $Vd_7$ is an Abbe number of the seventh lens, and $Vd_1$ is an Abbe number of the first lens.

10. A wide-angle lens assembly comprising:
a seventh lens which is with refractive power and comprises a convex surface facing an object side;
a first lens which is a meniscus lens with refractive power and comprises a convex surface facing the object side and a concave surface facing an image side;
a sixth lens which is with refractive power;
a second lens which is with positive refractive power;
a third lens which is with positive refractive power and comprises a convex surface facing the object side;
an eighth lens which is with positive refractive power;
a fourth lens which is with refractive power and comprises a concave surface facing the object side;
a fifth lens which is a biconvex lens with positive refractive power and comprises a convex surface facing the object side and another convex surface facing the image side; and
a ninth lens which is with negative refractive power and comprises a concave surface facing the object side;
wherein the sixth lens and the seventh lens have opposite refractive power;
wherein the wide-angle lens assembly satisfies the following condition:

$5.5<TTL/f<10$;

wherein TTL is an interval from an object side surface of the lens closest to the object side to an image plane along the optical axis and f is an effective focal length of the wide-angle lens assembly;
wherein the seventh lens, the first lens, the sixth lens, the second lens, the third lens, the eighth lens, the fourth lens, the fifth lens, and the ninth lens are arranged from the object side to the image side along the optical axis;
wherein the relative positions of the lenses are fixed.

11. The wide-angle lens assembly as claimed in claim 1, wherein the first lens is with negative refractive power, the second lens comprises a convex surface facing the object side, and the third lens comprises a convex surface facing the image side.

12. The wide-angle lens assembly as claimed in claim 11, wherein the wide-angle lens assembly satisfies at least one of the following condition:

$$0.4 \leq BFL/TTL \leq 0.5;$$

$$1.1 \leq BFL/TTL \leq 2.8;$$

$$4 \leq TTL/IH \leq 6.5;$$

$$0.8 \leq |f_1|/f \leq 1.5;$$

$$-0.93 < f_1/f_5 \leq -0.68;$$

wherein BFL is an interval from an image side surface of the fifth lens to an image plane along the optical axis, TTL is an interval from an object side surface of the first lens to the image plane along the optical axis, IH is a half image height of the image plane of the wide-angle lens assembly, f is an effective focal length of the wide-angle lens assembly, $f_1$ is the effective focal length of the first lens, and $f_5$ is an effective focal length of the fifth lens.

13. The wide-angle lens assembly as claimed in claim 11, wherein the sixth lens is with negative refractive power and comprises a concave surface facing the object side and another concave surface facing the image side.

14. The wide-angle lens assembly as claimed in claim 11, wherein the second lens further comprises another convex surface facing the image side, and the fourth lens is with negative refractive power and comprises a concave surface facing the object side and another concave surface facing the image side.

15. The wide-angle lens assembly as claimed in claim 11, further comprising a stop disposed between the second lens and the third lens.

16. The wide-angle lens assembly as claimed in claim 10, further comprising a stop disposed between the second lens and the eighth lens.

17. The wide-angle lens assembly as claimed in claim 10, wherein the eighth lens is cemented with the fourth lens.

18. The wide-angle lens assembly as claimed in claim 10, wherein the fifth lens is cemented with the ninth lens.

19. The wide-angle lens assembly as claimed in claim 10, wherein the seventh lens further comprises a concave surface facing the image side, the first lens is with negative refractive power, or the fourth lens is with negative refractive power, or both the first lens and the fourth lens are with negative refractive power, and the eighth lens comprises a convex surface facing the object side and another convex surface facing the image side.

20. The wide-angle lens assembly as claimed in claim 10, wherein the wide-angle lens assembly satisfies at least one of the following conditions:

$$1.3 < TTL/R_{71} < 2.6;$$

$$0.03 < |f_{71}/f_{62}| < 1.7;$$

$$30 < Vd_7 < 64.3;$$

$$35 < Vd_1 < 54.5;$$

wherein TTL is the interval from the object side surface of the lens closest to the object side to the image plane along the optical axis, $R_{71}$ is a radius of curvature of the object side surface of the seventh lens, $f_{71}$ is an effective focal length of a combination of the seventh lens and the first lens, $f_{62}$ is an effective focal length of a combination of the sixth lens and the second lens, $Vd_7$ is an Abbe number of the seventh lens, and $Vd_1$ is an Abbe number of the first lens.

* * * * *